United States Patent
Hu et al.

(10) Patent No.: US 12,222,576 B2
(45) Date of Patent: Feb. 11, 2025

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Kuen-Wang Tsai, Taoyuan (TW);
Liang-Ting Ho, Taoyuan (TW);
Chao-Hsi Wang, Taoyuan (TW);
Chih-Wei Weng, Taoyuan (TW);
He-Ling Chang, Taoyuan (TW);
Che-Wei Chang, Taoyuan (TW);
Sheng-Zong Chen, Taoyuan (TW);
Ko-Lun Chao, Taoyuan (TW);
Min-Hsiu Tsai, Taoyuan (TW);
Shu-Shan Chen, Taoyuan (TW);
Jungsuck Ryoo, Taoyuan (TW);
Mao-Kuo Hsu, Taoyuan (TW);
Guan-Yu Su, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 0 days.

(21) Appl. No.: 18/505,664

(22) Filed: Nov. 9, 2023

(65) Prior Publication Data

US 2024/0069299 A1 Feb. 29, 2024

Related U.S. Application Data

(63) Continuation of application No. 17/855,174, filed on Jun. 30, 2022, now Pat. No. 11,852,886, which is a
(Continued)

(51) Int. Cl.
*G02B 7/00* (2021.01)
*G02B 7/02* (2021.01)
*G02B 7/18* (2021.01)

(52) U.S. Cl.
CPC .......... *G02B 7/003* (2013.01); *G02B 7/023* (2013.01); *G02B 7/1805* (2013.01)

(58) Field of Classification Search
CPC ...... G02B 7/003; G02B 7/023; G02B 7/1805; G02B 7/08; G02B 7/00; G03B 9/08
See application file for complete search history.

(56) References Cited

U.S. PATENT DOCUMENTS

| 6,123,466 A | 9/2000 | Persson et al. |
| 2009/0237815 A1* | 9/2009 | Kim .................. G11B 7/0935 359/811 |

(Continued)

FOREIGN PATENT DOCUMENTS

| CN | 101266386 A | 9/2008 |
| CN | 104380170 A | 2/2015 |

(Continued)

OTHER PUBLICATIONS

Office Action and Search Report mailed Aug. 31, 2023 in corresponding CN Application 202011271047.0.
(Continued)

*Primary Examiner* — James C. Jones
(74) *Attorney, Agent, or Firm* — Muncy, Geissler, Olds & Lowe, P.C.

(57) ABSTRACT

An optical element driving mechanism includes a movable assembly, a fixed assembly, and a driving assembly. The movable assembly is configured to be connected to an optical element. The movable assembly is movable relative to the fixed assembly. The driving assembly is configured to drive the movable assembly to move relative to the fixed assembly in a range of motion. The optical element driving mechanism further includes a positioning assembly config-
(Continued)

ured to position the movable assembly at a predetermined position relative to the fixed assembly when the driving assembly is not operating.

10 Claims, 141 Drawing Sheets

Related U.S. Application Data continuation of application No. 17/097,763, filed on Nov. 13, 2020, now Pat. No. 11,409,069.

(60) Provisional application No. 63/065,865, filed on Aug. 14, 2020, provisional application No. 63/058,932, filed on Jul. 30, 2020, provisional application No. 63/041,459, filed on Jun. 19, 2020, provisional application No. 63/017,313, filed on Apr. 29, 2020, provisional application No. 63/000,604, filed on Mar. 27, 2020, provisional application No. 62/986,039, filed on Mar. 6, 2020, provisional application No. 62/972,259, filed on Feb. 10, 2020, provisional application No. 62/950,520, filed on Dec. 19, 2019, provisional application No. 62/944,496, filed on Dec. 6, 2019, provisional application No. 62/935,926, filed on Nov. 15, 2019.

(56) References Cited

U.S. PATENT DOCUMENTS

| 2018/0052298 A1 | 2/2018 | Sueoka |
| 2019/0235202 A1 | 8/2019 | Smyth et al. |

FOREIGN PATENT DOCUMENTS

| CN | 112083544 A | 12/2020 |
| GB | 1278003 | 6/1972 |
| JP | H0579542 U | 10/1993 |
| JP | 2007133169 A | 5/2007 |
| JP | 2015125430 A | 7/2015 |
| KR | 100931721 B1 | 12/2009 |
| WO | WO2019148027 A1 | 8/2019 |

OTHER PUBLICATIONS

Office Action and Search Report issued Apr. 23, 2023 in corresponding CN Application 202111340453.5.

European Search Report mailed Apr. 14, 2021 in EP Application 20207538.8, 8 pages.

Office Action issued Apr. 30, 2021 in corresponding CN Application 202022635055.3, 1 page.

\* cited by examiner

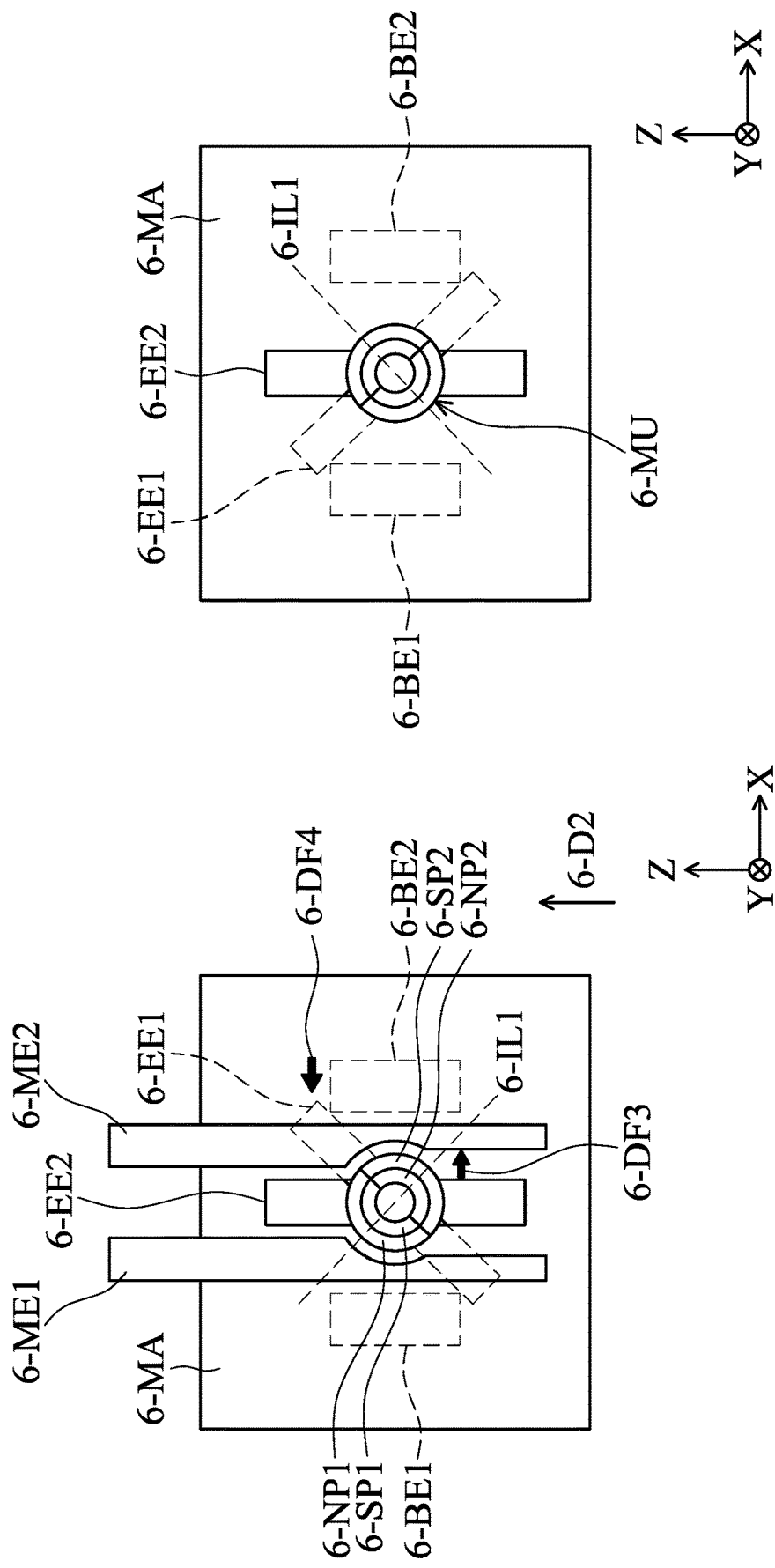

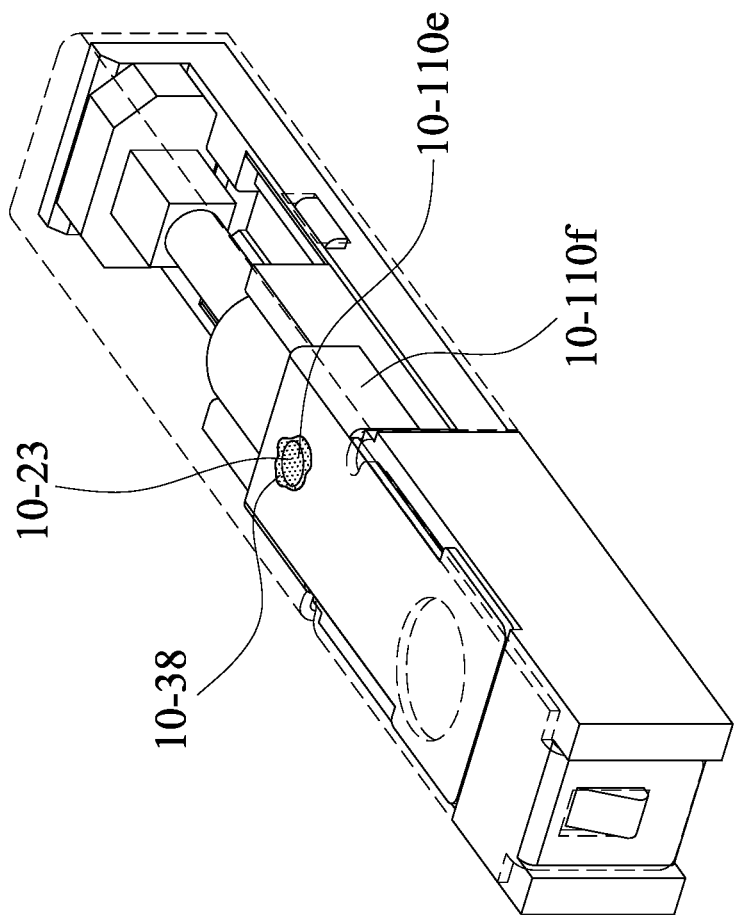
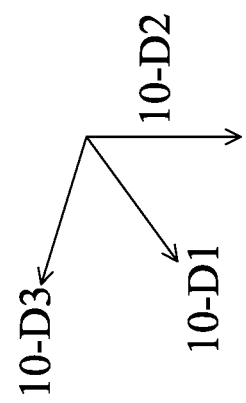
FIG. 118

11-1

OPTICAL ELEMENT DRIVING MECHANISM

CROSS REFERENCE TO RELATED APPLICATIONS

The present application is a Continuation of application Ser. No. 17/855,174, filed on Jun. 30, 2022, which is a Continuation of application Ser. No. 17/097,763, filed on Nov. 13, 2020, which claims priority of U.S. Provisional Patent Application No. 62/935,926 filed on Nov. 15, 2019, U.S. Provisional Patent Application No. 62/944,496 filed on Dec. 6, 2019, U.S. Provisional Patent Application No. 62/950,520 filed on Dec. 19, 2019, U.S. Provisional Patent Application No. 62/972,259 filed on Feb. 10, 2020, U.S. Provisional Patent Application No. 62/986,039 filed on Mar. 6, 2020, U.S. Provisional Patent Application No. 63/000,604 filed on Mar. 27, 2020, U.S. Provisional Patent Application No. 63/017,313 filed on Apr. 29, 2020, U.S. Provisional Patent Application No. 63/041,459 filed on Jun. 19, 2020, U.S. Provisional Patent Application No. 63/058,932 filed on Jul. 30, 2020, and U.S. Provisional Patent Application No. 63/065,865 filed on Aug. 14, 2020, the entirety of which are incorporated by reference herein.

BACKGROUND OF THE DISCLOSURE

Field of the Disclosure

The present disclosure relates to an optical element driving mechanism, and in particular it relates to an optical element driving mechanism with a locking structure.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

BRIEF SUMMARY OF THE DISCLOSURE

According to some embodiments of the disclosure, the present disclosure provides an optical element driving mechanism, which includes a movable assembly, a fixed assembly, and a driving assembly. The movable assembly is configured to be connected to an optical element. The movable assembly is movable relative to the fixed assembly. The driving assembly is configured to drive the movable assembly to move relative to the fixed assembly in a range of motion. The optical element driving mechanism further includes a positioning assembly configured to position the movable assembly at a predetermined position relative to the fixed assembly when the driving assembly is not operating.

According to some embodiments, the positioning assembly includes: a first engaging element; a second engaging element, wherein the first engaging element and the second engaging element are respectively disposed on the movable assembly and the fixed assembly; and a driving unit, configured to drive the first engaging element to move relative to the second engaging element; wherein when the driving unit drives the first engaging element to a release position relative to the second engaging element, the movable assembly is movable relative to the fixed assembly; when the driving unit drives the first engaging element to be at a locked position relative to the second engaging element, the movable assembly is affixed to the fixed assembly.

According to some embodiments, the driving unit includes: a first magnetic conductive element, made of a magnetically conductive material; a first coil, disposed on the first magnetic conductive element; a magnetic unit, corresponding to the first coil and having a first N pole and a first S pole, which are arranged along a first imaginary line; a second magnetic conductive element, made of a magnetically conductive material; and a second coil, disposed on the second magnetic conductive element; wherein the first coil is wound on the first magnetic conductive element; the first magnetic conductive element includes a first segment having a long strip-shaped structure, and the first coil is wound around the first segment; the magnetic unit further includes a second N pole and a second S pole, which are arranged along the first imaginary line; the first S pole is located between the first N pole and the second N pole; the first magnetic conductive element includes a first body, a first end portion and a second end portion, and the first end portion and the second end portion are located on both sides of the first body; the first segment is located on the first body; the driving unit is configured to drive the first engaging element to rotate relative to the second engaging element around a first direction; in a second direction, a maximum size of the first magnetic conductive element is greater than a maximum size of the magnetic unit; the first direction is perpendicular to the second direction; when viewed in a third direction, in the second direction, the magnetic unit does not exceed the first magnetic conductive element; the first direction, the second direction, and the third direction are perpendicular to each other; when viewed in the second direction, the first end portion and the second end portion overlap at least a portion of the magnetic unit; the first magnetic conductive element further includes a first fixed structure for fixing the first coil; the first fixed structure includes a protruding structure protruding in a direction that is not parallel to an extending direction of the first segment; when viewed in the third direction, the first fixed structure is located between the first coil and the magnetic unit; the second magnetic conductive element further includes a second body, a third end portion and a fourth end portion, and the third end portion and the fourth end portion are located on both sides of the second body; when viewed in the second direction, the magnetic unit is located between the first magnetic conductive element and the second magnetic conductive element; the first end portion and the third end portion are arranged in the third direction; when viewed in the second direction, there is a gap between the first end portion and the third end portion; when viewed in the first direction, the center of the magnetic unit is located between the first end portion and the third end portion; in the second direction, a maximum size of the second magnetic conductive element is greater than a maximum size of the magnetic unit; when viewed in the third direction, in the second direction, the magnetic unit does not exceed the second magnetic conductive element; the second coil is wound on the second magnetic conductive element; the second magnetic conductive element includes a second segment having a long strip-shaped structure, and the second coil is wound around the second segment; the first segment and the second segment extend in a same direction; the second magnetic conductive element further includes a second fixed structure for fixing the second coil; the second fixed structure includes a protruding structure protruding in a direction that is not parallel to an extending direction of the second segment;

when viewed in the third direction, the second fixed structure is located between the second coil and the magnetic unit; when viewed in the third direction, a shortest distance between the center of the first coil and the first end portion is different from a shortest distance between the center of the first coil and the second end portion; when viewed in the third direction, the shortest distance between the center of the first coil and the first end portion is greater than the shortest distance between the center of the first coil and the second end portion; when viewed in the third direction, a shortest distance between the center of the magnetic unit and the first end portion is different from a shortest distance between the center of the magnetic unit and the second end portion; when viewed in the third direction, the shortest distance between the center of the magnetic unit and the first end portion is less than the shortest distance between the center of the magnetic unit and the second end portion.

According to some embodiments, the second end portion is connected to the fourth end portion; the first magnetic conductive element and the second magnetic conductive element are integrally formed; when the driving unit does not drive the first engaging element, a first driving force between the magnetic unit and the first magnetic conductive element drive the first engaging element to be located at a first position relative to the second engaging element; wherein the first position is the release position or the locked position; the positioning assembly further includes a first blocking element for limiting movement of the first engaging element relative to the second engaging element in a limited range; when the driving unit does not drive the first engaging element, the first blocking element generates a second driving force to the first engaging element, and the driving force and the second driving force position the first engaging element at the first position relative to the second engaging element; when the first engaging element is located at the first position relative to the second engaging element, the first imaginary line is not parallel to the second direction; when the first engaging element is at the first position relative to the second engaging element and when viewed in the first direction, the first imaginary line passes through the first magnetic conductive element; when the first engaging element is located at the first position relative to the second engaging element and when viewed in the first direction, the first imaginary line passes through the second magnetic conductive element.

According to some embodiments, the driving assembly is configured to drive the movable assembly to move relative to the fixed assembly in a fourth direction; when viewed in a fifth direction, the fixed assembly has a polygonal structure; when viewed in the fifth direction, a length of a first side of the fixed assembly is different from a length of a second side of the fixed assembly; when viewed in the fifth direction, the length of the first side of the fixed assembly is less than the length of the second side of the fixed assembly; extending directions of the first side and the second side are not parallel; the first side extends in a sixth direction, and the second side extends in a fourth direction; the fourth direction, the fifth direction, and the sixth direction are perpendicular to each other; when viewed in the fifth direction, the driving unit is located on the second side.

According to some embodiments, the first direction is parallel to the fourth direction; the third direction is parallel to the sixth direction.

According to some embodiments, the third direction is parallel to the fourth direction; the second direction is parallel to the fifth direction.

According to some embodiments, the second direction is parallel to the fourth direction; the first direction is parallel to the fifth direction; when viewed in the fifth direction, the driving unit is located at a first corner of the fixed assembly.

According to some embodiments, when the driving unit does not drive the first engaging element, a third driving force between the magnetic unit and the second magnetic conductive element drives the first engaging element to be located at a second position relative to the second engaging element; the first position is the locked position; the second position is the locked position; the first position is different from the second position; the positioning assembly further includes a second blocking element for limiting the movement of the first engaging element relative to the second engaging element in the limited range; when the driving unit does not drive the first engaging element, the second blocking element generates a fourth driving force to the first engaging element, and the third driving force and the fourth driving force position the first engaging element at the second position relative to the second engaging element; when the first engaging element is located at the second position relative to the second engaging element, the first imaginary line is not parallel to the second direction; when the first engaging element is located at the second position relative to the second engaging element and when viewed in the first direction, the first imaginary line passes through the first magnetic conductive element; when the first engaging element is located at the second position relative to the second engaging element and when viewed in the first direction, the first imaginary line passes through the second magnetic conductive element; when the first engaging element is located at the release position relative to the second engaging element, the first imaginary line is parallel to the third direction.

According to some embodiments, when the driving unit does not drive the first engaging element, a third driving force between the magnetic unit and the second magnetic conductive element drives the first engaging element to be located at a second position relative to the second engaging element; the first position is the locked position; the second position is the release position; the positioning assembly further includes a second blocking element for limiting the movement of the first engaging element relative to the second engaging element in the limited range; when the driving unit does not drive the first engaging element, the second blocking element generates a fourth driving force to the first engaging element, and the third driving force and the fourth driving force position the first engaging element at the second position relative to the second engaging element; when the first engaging element is located at the second position relative to the second engaging element, the first imaginary line is not parallel to the second direction; when the first engaging element is located at the second position relative to the second engaging element and when viewed in the first direction, the first imaginary line passes through the first magnetic conductive element; when the first engaging element is located at the second position relative to the second engaging element and when viewed in the first direction, the first imaginary line passes through the second magnetic conductive element.

The present disclosure provides an optical element driving mechanism, and in some embodiments, the positioning assembly may include a first engaging element, a second engaging element, and a driving unit. The first engaging element and the second engaging element can be respectively disposed on the fixed assembly and the movable assembly. The driving unit can control the first engaging element to a locked position relative to the second engaging element. Based on the structural design of the present disclosure, when the optical element driving mechanism is impacted, it can effectively prevent the first engaging element from separating from the second engaging element. In addition, the structural design of the present disclosure can also save costs and achieve the purpose of miniaturization.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

FIG. 68 and FIG. 69 are diagrams illustrated that the first engaging element 6-EE1 is located at the first position and the second position, respectively.

FIG. 118 shows a perspective view of the optical element driving mechanism and the optical element according to an embodiment of the present disclosure, wherein the outer frame is shown as a dashed line.

DETAILED DESCRIPTION OF THE ILLUSTRATIVE EMBODIMENTS

Figure 1:
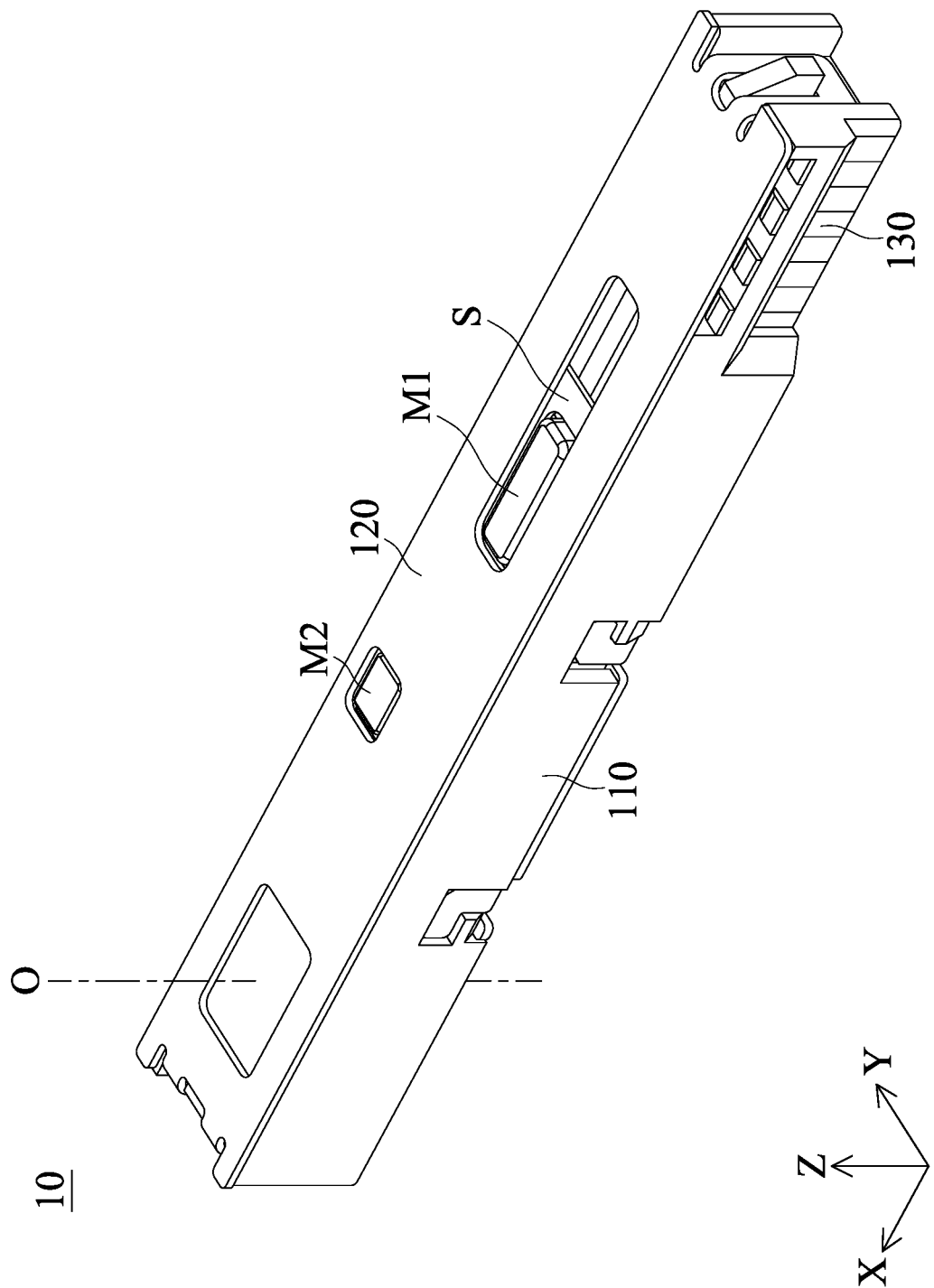
FIG. 1 is a perspective view illustrating an optical member driving mechanism in accordance with some embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

First Embodiment

FIG. 1 is a perspective view illustrating an optical member driving mechanism 1-10 in accordance with some embodiment of the present disclosure. It should be noted that, in this embodiment, the optical member driving mechanism 1-10 is, for example, a shutter mechanism, which may be disposed in an electronic device (not shown) with camera function, and an optical member may be driven by the optical member driving mechanism. By controlling the position of the optical member, light may pass through or br blocked, and the exposure time of the camera module of the electronic device may be controlled. In other embodiments, the optical member driven by the optical member driving mechanism 1-10 may also be a lens, a prism, a reflective mirror, a photosensitive element, and other optical-related elements.

Figure 2:
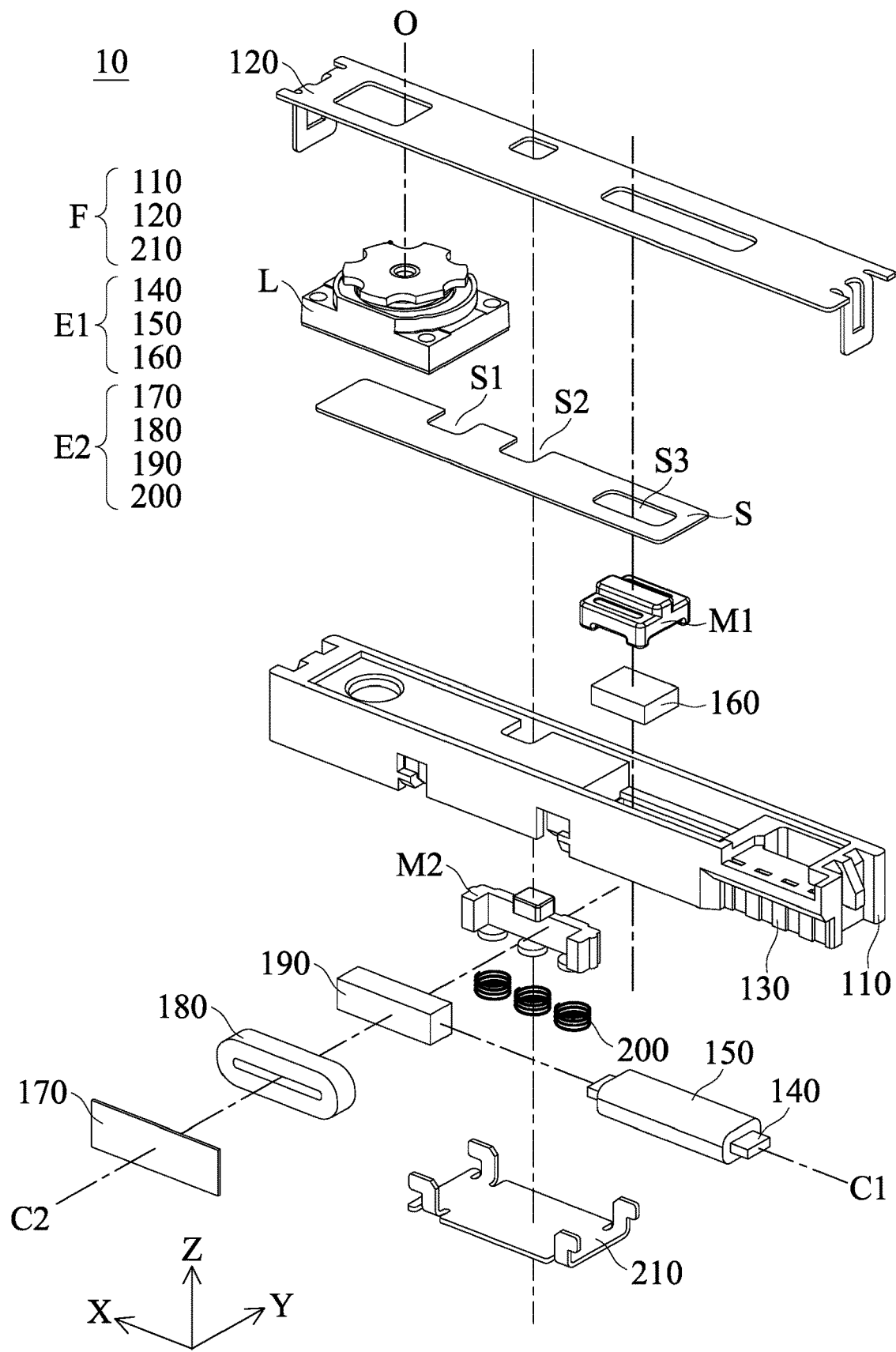
FIG. 2 is an exploded view illustrating the optical member driving mechanism shown in FIG. 1.

FIG. 2 is an exploded view illustrating the optical member driving mechanism 1-10 shown in FIG. 1. As shown in FIG. 2, the optical member driving mechanism 1-10 may include: a first movable portion 1-M1, a fixed portion 1-F, a first driving assembly 1-E1, a second movable portion 1-M2, and a second driving assembly 1-E2. In this embodiment, the fixing portion 1-F includes a body 1-110, a top cover 1-120, and a bottom cover 1-210. The top cover 1-120 and the bottom cover 1-210 are connected to the body 1-110, and the body 1-110 may be located between the top cover 1-120 and the bottom cover 1-210. The body 1-110 may be configured to carry the first movable portion 1-M1 (and the optical member 1-S connected to the first movable portion 1-M1), and is connected to an optical module 1-L. In some embodiments, the fixing portion 1-F and the optical module 1-L may be fixedly disposed on a substrate (not shown). In some embodiments, the optical member driving mechanism 1-10 does not directly contact the optical module 1-L, but the disclosure is not limited thereto.

In the direction parallel to the optical axis 1-O, the maximum size of the optical member driving mechanism 1-10 is larger than the maximum size of the optical module 1-L. For example, the height of the optical member driving mechanism 1-10 along the optical axis 1-O is greater than the height of the optical module 1-L along the optical axis 1-O. In addition, the optical member 1-S may include a baffle plate, which includes SOMA or any other suitable light-shielding material. The optical module 1-L may include a camera module, which includes a lens or any other suitable light-transmitting material, so that light may pass in a direction substantially parallel to the optical axis 1-O, thereby achieving a camera function. However, this disclosure is not limited thereto.

The first movable portion 1-M1 may be configured to connect the optical member 1-S, wherein the optical member 1-S may be configured to block light (for example, the light traveling in a direction substantially parallel to the optical axis 1-O). The first movable portion 1-M1 is relatively movable along the X axis (that is, the first direction) relative to the fixed portion 1-F. The first driving assembly 1-E1 is configured to drive the first movable portion 1-M1 to move substantially along the X axis (that is, the first direction) relative to the fixed portion 1-F. In this embodiment, the first driving assembly 1-E1 includes a first magnetic conductor 1-140, a first coil 1-150, and a first magnetic element 1-160 corresponding to the first coil 1-150. In some embodiments, the first driving assembly 1-E1 may drive the first movable portion 1-M1 (and the connected optical member S) to move between the first position (also referred to as the first extreme position) and the second position (also referred to as the second extreme position). For example, the first position and the second position may be arranged along the X axis (that is, the line connecting the first position and the second position may be substantially parallel to the X axis). That is, the connection line between the first position and the second position is different from the optical axis 1-O (Z axis). In some embodiments, the line (for example, the X axis) connecting the first position and the second position is substantially perpendicular to the optical axis O (for example, the Z axis).

The second movable portion 1-M2 may be configured to affix the optical member 1-S at the first position or the second position relative to the fixed portion 1-F. The second driving assembly 1-E2 may be configured to drive the second movable portion 1-M2 to move relative to the fixed portion 1-F substantially along the Z axis (that is, the second direction). It is shown that the movement direction of the second movable portion 1-M2 is different from the movement direction of the optical member 1-S. In some embodiments, the movement direction of the second movable portion 1-M2 is substantially perpendicular to the movement direction of the optical member 1-S. The second driving assembly 1-E2 may include a second magnetic conductor 1-170, a second coil 1-180, and a second magnetic element 1-190 corresponding to the second coil 1-180. In some embodiments, the second movable portion 1-M2 may fix the optical member 1-S at the aforementioned first position or the second position relative to the fixed portion 1-F. In some embodiments, the maximum dimension of the fixed portion 1-F in the direction (for example, the X axis) of the first winding axis 1-C1 of the first coil 1-150 is larger than the maximum dimension of the fixed portion 1-F in the direction (for example, Y axis) of the second winding axis 1-C2 of the second coil 1-180.

In this embodiment, the optical member driving mechanism 1-10 further includes at least one elastic element 1-200, abutting the second movable portion 1-M2 and capable of driving the second movable portion 1-M2 to move relative to the fixed portion 1-F. The elastic element 1-200 may be disposed on the bottom cover 1-210. In some embodiments, the elastic element 1-200 may drive the second movable portion 1-M2 to move relative to the fixed portion 1-F in the second direction (for example, parallel to the Z axis). More specifically, the elastic element 1-200 may continuously apply an elastic force that is parallel to the second direction (for example, toward the top cover 1-120) to the second movable portion 1-M2.

Figure 3:
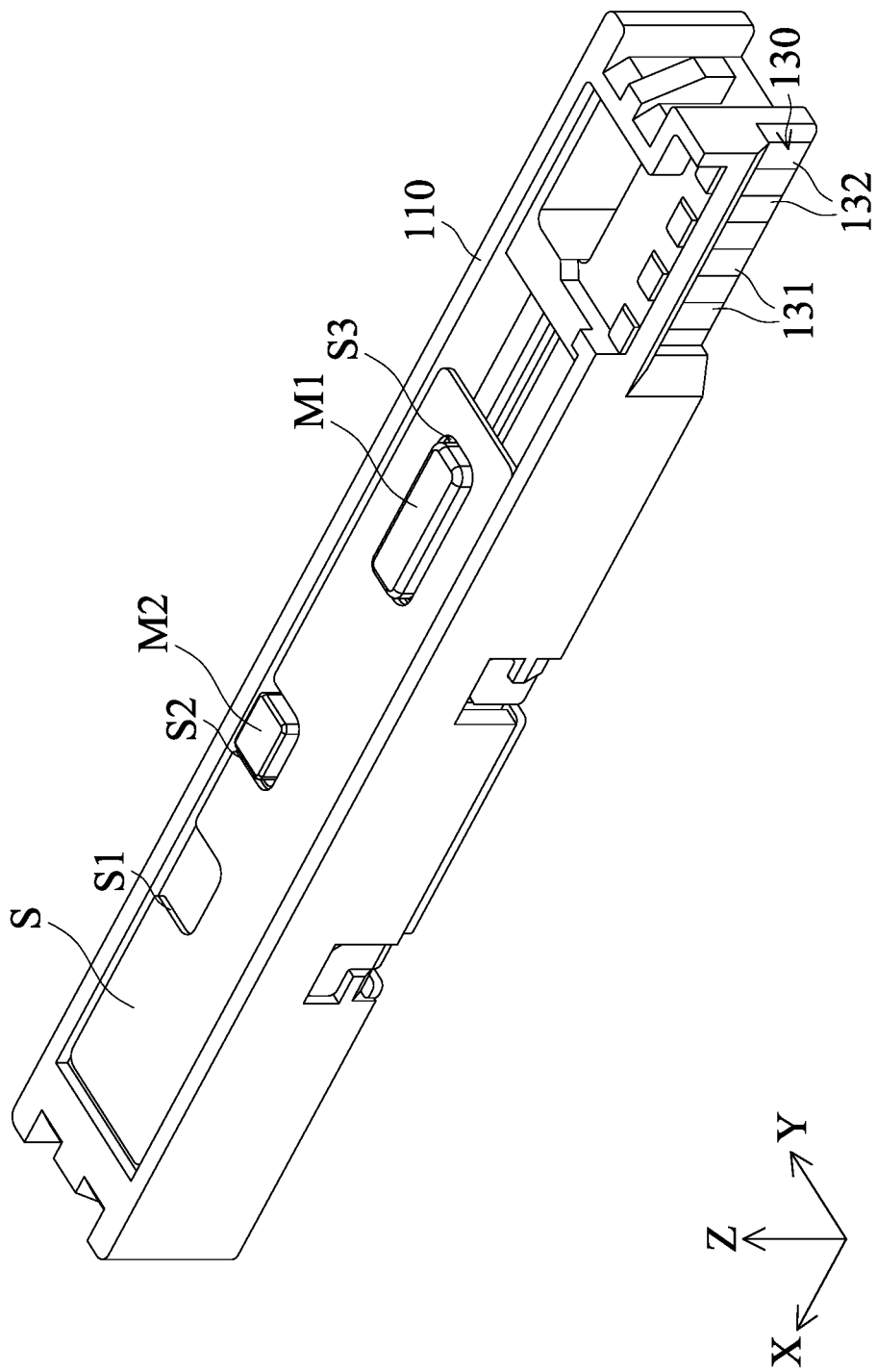
FIG. 3 is a perspective view illustrating the optical member driving mechanism in accordance with some embodiment of the present disclosure.

FIG. 3 is a perspective view illustrating the optical member driving mechanism 1-10 in accordance with some embodiment of the present disclosure. It should be noted that, in order to more clearly illustrate the internal structure of the optical member driving mechanism 1-10, the top cover 1-120 is not shown in this embodiment. As shown in FIG. 3, the optical member driving mechanism 1-10 further includes a circuit assembly 1-130, which is disposed on the fixed portion 1-F (for example, the body 1-110). The circuit assembly 1-130 includes a plurality of first contacts 1-131 and a plurality of second contacts 1-132, wherein the first contacts 1-131 may be electrically connected to the first driving assembly 1-E1, and the second contact 1-132 may be electrically connected to the second driving assembly 1-E2. It should be understood that the configuration of the first contacts 1-131 and the second contacts 1-132 shown in this embodiment is merely an illustrative example. Those skilled in the art may adjust the configuration of the first contacts 1-131 and the second contacts 1-132 as required, and will not be described in detail below. A plurality of insulating materials (not shown) may be respectively disposed on the first contacts 1-131 and the second contacts 1-132 to protect the first contacts 1-131 and the second contacts 1-132. In some embodiments, the insulating material on the first contacts 1-131 and each insulating material on the second contacts 1-132 are separated from each other. In other embodiments, the insulating material on the first contacts 1-131 and the insulating material on the second contacts 1-132 are connected to each other.

Figure 4:
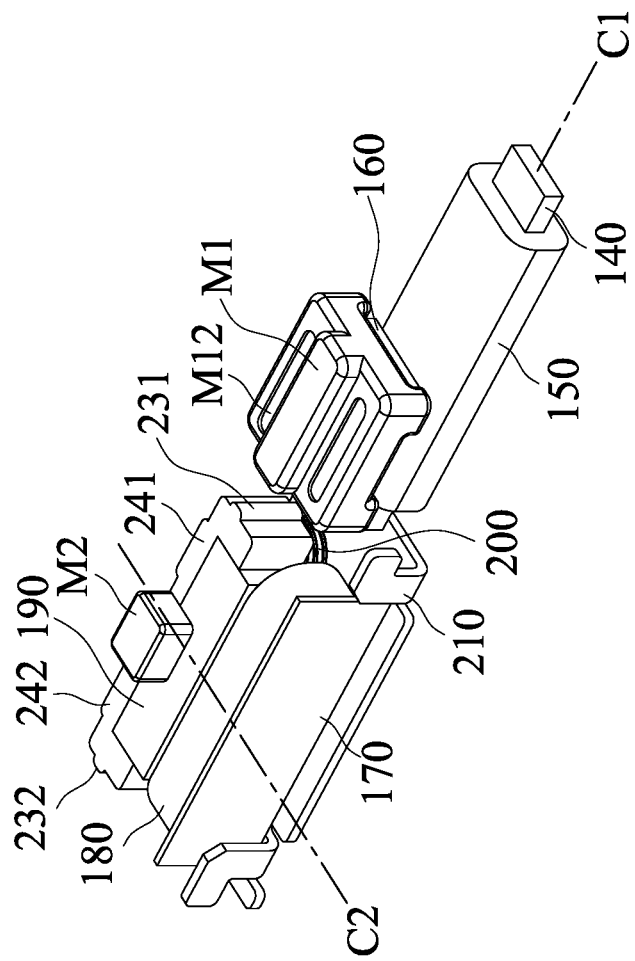
FIG. 4 is a perspective view illustrating the internal structure of the optical member driving mechanism in accordance with some embodiment of the present disclosure.

FIG. 4 is a perspective view illustrating the internal structure of the optical member driving mechanism 1-10 in accordance with some embodiment of the present disclosure. It should be noted that, in order to more clearly describe the internal structure of the optical member driving mechanism 1-10, the body 1-110, the top cover 1-120, and the optical member 1-S are not shown in this embodiment. As shown in FIG. 4, the second winding axis 1-C2 (for example, parallel to the Y axis) of the second coil 1-180 and the first winding axis 1-C1 (for example, parallel to the X axis) of the first coil 1-150 are not parallel. In some embodiments, the second winding axis 1-C2 of the second coil 1-180 is substantially perpendicular to the first winding axis 1-C1 of the first coil 1-150.

In addition, the maximum dimension of the first coil 1-150 in the direction (X-axis) parallel to the first winding axis 1-C1 is different from the maximum dimension of the second coil 1-180 in the direction (Y axis) parallel to the second winding axis 1-C2. In some embodiments, the maximum dimension of the first coil 1-150 in the direction (X axis) parallel to the first winding axis 1-C1 is larger than the maximum dimension of the second coil 1-180 in the direction (Y axis) parallel to the second winding axis 1-C2. In this embodiment, the first winding axis 1-C1 passes through the first magnetic conductor 1-140, and when viewed from a direction (for example, the Z axis) perpendicular to the first winding axis 1-C1, the first coil 1-150 overlaps with the first magnetic conductor 1-140. The second winding axis 1-C2 passes through the second magnetic conductor 1-170, and when viewed from a direction (such as the Z axis) perpendicular to the second winding axis 1-C2, the second coil 1-180 and the second magnetic conductor 1-170 do not overlap.

In some embodiments, the first driving assembly 1-E1 (including the first magnetic conductor 1-140, the first coil 1-150, and the first magnetic element 1-160) is configured to drive the first movable portion 1-M1 moves in the first dimension relative to the fixed portion 1-F. The second driving assembly 1-E2 is configured to drive the second movable portion 1-M2 to move relative to the fixed portion 1-F in the second dimension. The first dimension and the second dimension are different. In some embodiments, the first dimension is movement along the first direction (such as X axis), and the second dimension is movement along the second direction (such as Z axis), and the first direction and the second direction are not parallel. In some embodiments, when viewed along the second direction, the arrangement direction (for example, the Y axis) of the second movable portion 1-M2 and the second driving assembly 1-E2 is different from the first direction. In addition, when viewed along the second direction, the arrangement direction of the second movable portion 1-M2 and the second driving assembly 1-E2 is parallel to the third direction (for example, the Y axis). In some embodiments, the first direction and the second direction are perpendicular to each other, the second direction and the third direction are perpendicular to each other, and the first direction and the third direction are perpendicular to each other.

In some embodiments, when viewed along the second direction (such as the Z axis), the direction of the line connecting the center of the first movable portion 1-M1 and the center of the second movable portion 1-M2 is not parallel to the first direction (for example, the X axis). When viewed along the second direction, the direction of the line connecting between the center of the first movable portion 1-M1 and the center of the second movable portion 1-M2 is not parallel to the third direction (for example, the Y axis). In addition, the first movable portion 1-M1 is provided with at least one groove 1-M12, which may be used to receive an adhesive (not shown), so that the optical member 1-S and the first movable portion 1-M1 are fixedly connected.

Furthermore, a first stop element 1-230 and a second stop element 1-240 are provided on the second movable portion 1-M2. The first stop element 1-230 may be configured to limit the movement range of the second movable portion 1-M2 relative to the fixed portion 1-F in the first direction (for example, the X axis). The first stop element 1-230 includes a plurality of first stop units 1-231, 1-232, wherein the first stop units 1-231, 1-232 are arranged along the first direction. When viewed along the second direction (for example, the Z axis), the line connecting the centers of the first stop units 1-231 and 1-232 does not overlap with the first winding axis 1-C1. In some embodiments, the line connecting the centers of the first stop units 1-231, 1-232 is parallel to the first winding axis 1-C1. The second stop element 1-240 may be used to limit the movement range of the second movable portion 1-M2 relative to the fixed portion 1-F in the third direction (for example, the Y axis). The second stop element 1-240 may include a plurality of second stop units 1-241, 1-242, wherein the second stop units 1-241, 1-242 have a protruding structure extending along a third direction.

Figure 5:
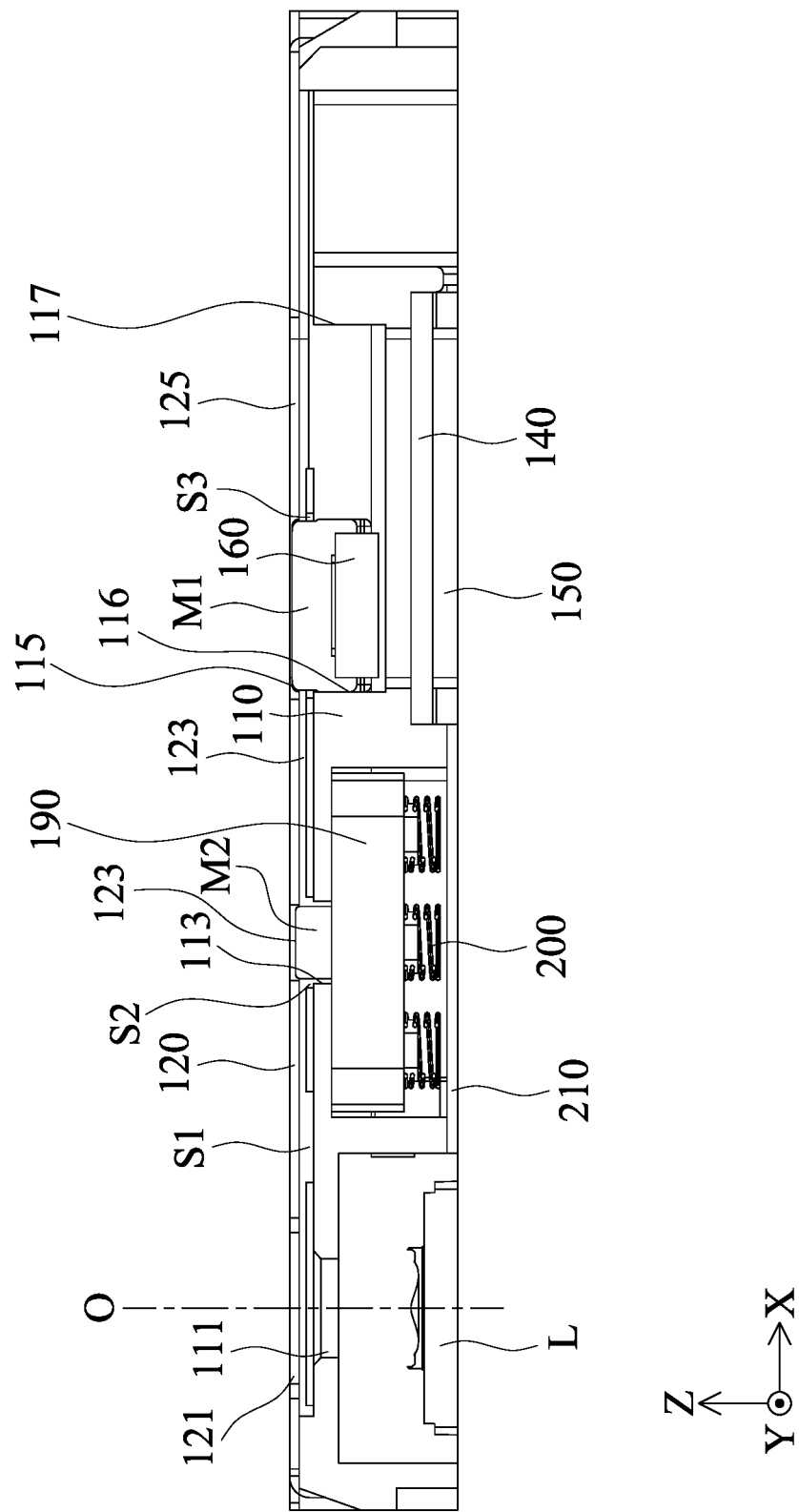
FIGS. 5 to 8 are cross-sectional views illustrating the optical member driving mechanism in accordance with some embodiment of the present disclosure.

FIGS. 5 to 8 are cross-sectional views illustrating the optical member driving mechanism in accordance with some embodiment of the present disclosure. As shown in FIG. 5, the body 1-110 has a first optical hole 1-111, which corresponds to the optical module 1-L. The top cover 1-120 has a second optical hole 1-121 corresponding to the optical module 1-L and the first optical hole 1-111. In some embodiments, the shapes of the first optical hole 1-111 and the second optical hole 1-121 are different. For example, the first optical hole 1-111 has a circular cross-section, and a chamfer is formed on the edge of the first optical hole 1-111 toward the top cover 1-120. The second optical hole 1-121 has a rectangular cross-section and is configured to correspond to a photoelectric converter (such as a photosensitive element, not shown). When viewed along the main axis (for example, substantially parallel to the optical axis 1-O) of the photoelectric converter, the photoelectric converter has a first edge extending along the fifth direction and a second edge extending along the sixth direction. The fifth direction, the sixth direction and the main axis are perpendicular to each other.

In some embodiments, the length and width ratio of the second optical hole 1-121 is the same as the length ratio of the first edge and the second edge of the photoelectric converter. In some embodiments, the second optical hole 1-121 is a rectangle with an aspect ratio of 16:9. Viewed from the traveling direction of the light (for example, parallel to the optical axis 1-O), the area of the first optical hole 1-111 is smaller than the area of the second optical hole 1-121. As shown in FIG. 5, the optical member 1-S is in the second position. At this time, the optical member 1-S completely overlaps the first optical hole 1-111 and the second optical hole 1-121. In this way, the optical member 1-S may block the light and prevent the light from entering the optical module 1-L through the optical axis 1-O.

In addition, the body 1-110 has a first receiving portion 1-113 for receiving the second movable portion 1-M2. The top cover 1-120 has a second receiving portion 1-123 for receiving the second movable portion 1-M2. In this embodiment, the size of the first receiving portion 1-113 is substantially equal to the size of the second receiving portion 1-123. In some embodiments, the size of the first receiving portion 1-113 is smaller than the size of the second receiving portion 1-123. In addition, the optical member 1-S has a third receiving portion 1-S1 and a fourth receiving portion 1-S2, respectively corresponding to the second movable portion 1-M2. When the optical member 1-S is in the second position (that is, when it completely overlaps the first optical hole 1-111 and the second optical hole 1-121), the second movable portion 1-M2 passes through the fourth receiving portion 1-S2.

As shown in FIG. 5, the optical member 1-S is located between the body 1-110 and the top cover 1-120. Viewed from the movement direction of the second movable portion 1-M2 (for example, parallel to the Z axis), the size of the fourth receiving portion 1-S2 is larger than the size of the first receiving portion 1-113 or the size of the second receiving portion 1-123. As a result, the gap between the second movable portion 1-M2 and the optical member 1-S is smaller than the gap between the optical member 1-S and the fixed portion 1-F (for example, the body 1-110, the top cover 1-120). With this configuration, the probability that the second movable portion 1-M2 cannot move normally due to the contact between the second movable portion 1-M2 and the optical member 1-S may be reduced. For example, the first receiving portion 1-113 has a recessed structure to provide a space for the second movable portion 1-M2 to move. For example, the first receiving portion 1-113, the second receiving portion 1-123, the third receiving portion 1-S1, and the fourth receiving portion 1-S2 are rectangular, but the disclosure is not limited thereto. In some embodiments, the first receiving portion 1-113, the second receiving portion 1-123, the third receiving portion 1-S1, and the fourth receiving portion 1-S2 may be any shape corresponding to the second movable portion 1-M2, as long as the second movable portion 1-M2 may be received.

In addition, the body 1-110 has a first opening 1-115 for receiving the first movable portion 1-M1, and the first driving assembly 1-E1 (including the first magnetic conductor 1-140, the first coil 1-150 and the first magnetic element 1-160) drives the first movable portion 1-M1 to move in the first opening 1-115. The top cover 1-120 has a second opening 1-125 for receiving the first movable portion 1-M1, and the first driving assembly 1-E1 drives the first movable portion 1-M1 to move in the second opening 1-125. In some embodiments, the size of the first opening 1-115 is different from the size of the second opening 1-125. In some embodiments, the size of the first opening 1-115 is larger than the size of the second opening 1-125.

The optical member 1-S has a third opening 1-S3 corresponding to the first movable portion 1-M1. In some embodiments, the first movable portion 1-M1 may be disposed in the third opening 1-S3. In some embodiments, the size of the first opening 1-115 is different from the size of the third opening 1-S3. In some embodiments, the size of the first opening 1-115 is larger than the size of the third opening 1-S3. In some embodiments, the size of the second opening 1-125 is different from the size of the third opening 1-S3. In some embodiments, the size of the second opening 1-125 is larger than the size of the third opening 1-S3. Based on FIG. 5, the size of the first opening 1-115 is different from the size of the first receiving portion 1-113. In some embodiments, the size of the first opening 1-115 is larger than the size of the first receiving portion 1-113. The first opening 1-115 has a first sidewall 1-116 and a second sidewall 1-117 opposite to the first sidewall 1-116. When the second movable portion 1-M2 is located at the second position, the first movable portion 1-M1 abuts the first sidewall 1-116.

Since the elastic element 1-200 continues to exert an upward elastic force on the second movable portion 1-M2, the second movable portion 1-M2 may protrude from the first receiving portion 1-113 and the fourth receiving portion 1-S2, such that the optical member 1-S is maintained at the second position to keep blocking the light entering the optical module 1-L through the optical axis 1-O. In this way, the probability of failure of the optical member 1-S due to external impact may be reduced.

Figure 6:
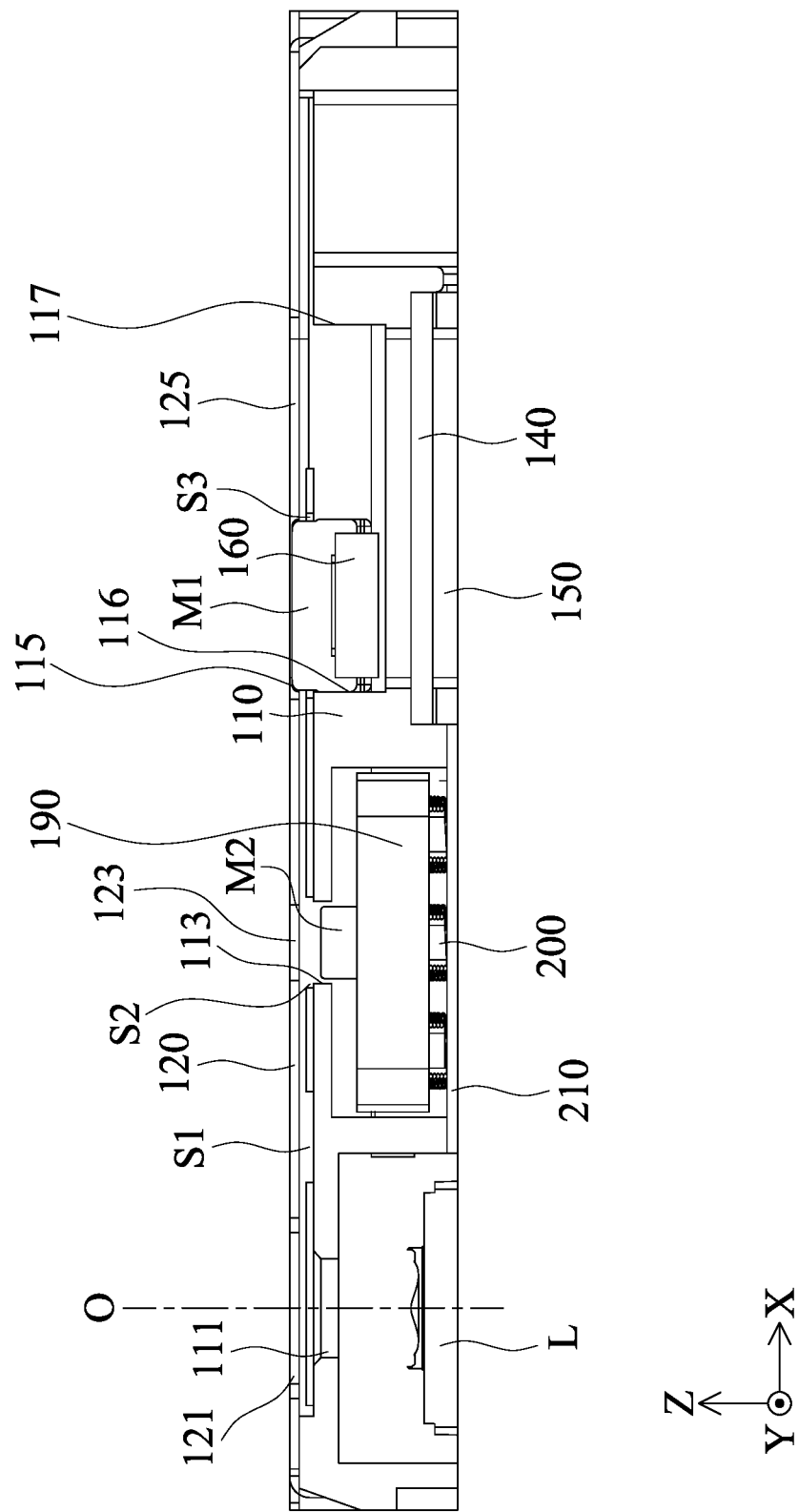

Next, as shown in FIG. 6, the second driving assembly 1-E2 may drive the second movable portion 1-M2 to move downward, so that the second movable portion 1-M2 leaves the fourth receiving portion 1-S2. More specifically, an electrical signal may be transmitted to the second coil 1-180 (as shown in FIG. 4), so that the second magnetic conductor 1-170 generates a magnetic force corresponding to the second magnetic element 1-190. In this way, the second magnetic element 1-170 will generate a downward force with the second magnetic element 1-190, so that the second magnetic element 1-190 may offset the elastic force generated by the elastic element 1-200 and drive the second movable portion 1-M2 to move downward.

Figure 7:
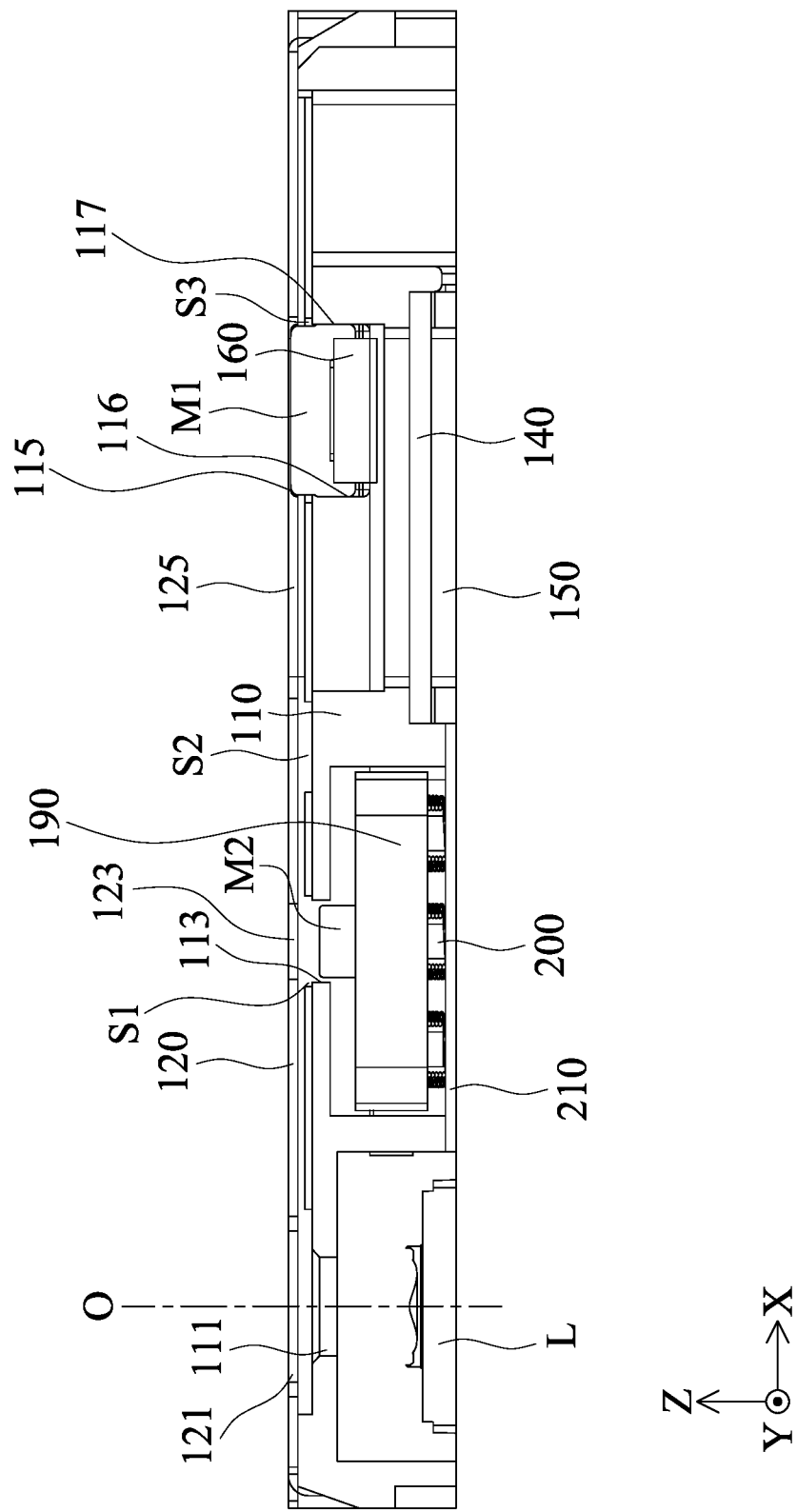

Next, as shown in FIG. 7, the first driving assembly 1-E1 may drive the first movable portion 1-M1 and the optical member 1-S to leave the second position and reach the first position. More specifically, an electrical signal may be transmitted to the first coil 1-150, so that the first magnetic conductor 1-140 generates a magnetic force corresponding to the first magnetic element 1-160. In this way, the first magnetic conductor 1-140 will generate a force with the first magnetic element 1-160 to drive the first movable portion 1-M1 and the optical member 1-S away from the second position. At this time, the optical member 1-S does not overlap the first optical hole 1-111 and the second optical hole 1-121. In this way, light may enter the optical module 1-L through the optical axis 1-O.

In order to ensure that the first movable portion 1-M1 and the optical member 1-S move after the second movable portion 1-M2 leaves the fourth receiving portion 1-S2, the electrical signal may be transmitted to the second coil 1-180 before transmitted to the first coil 1-150. For example, the time difference between transmitting electrical signals to the first coil 1-150 and the second coil 1-180 may be between about 1 ms and about 10 ms, such as about 5 ms, but the disclosure is not limited thereto. With the above design, the probability of damage due to the collision between the second movable portion 1-M2 and the optical member 1-S may be reduced.

Figure 8:
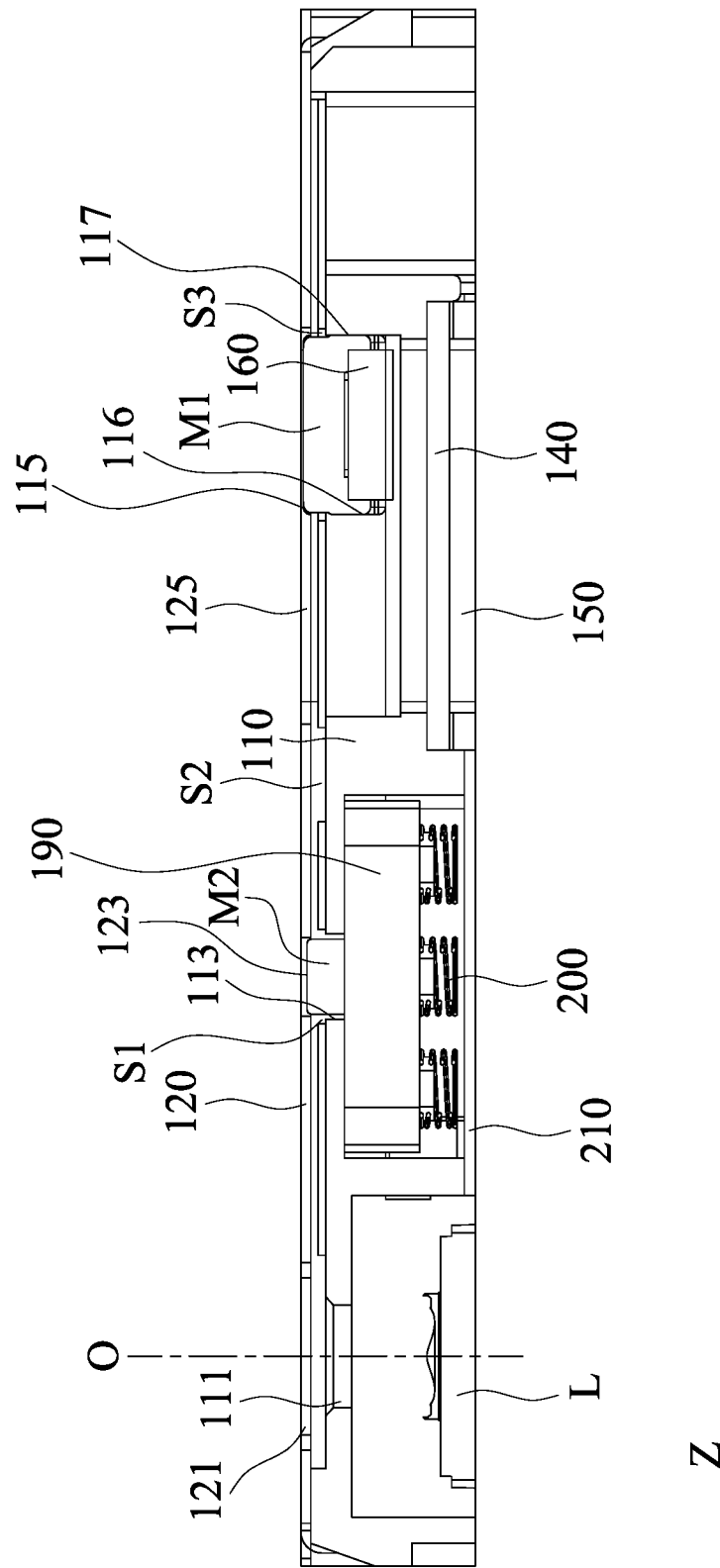

As shown in FIG. 8, after the optical member 1-S reaches the first position (for example, when the first movable portion 1-M1 abuts the second sidewall 1-117), the second driving assembly 1-E2 and/or the elastic element 1-200 may drive the second movable portion 1-M2 to move upward, so that the second movable portion 1-M2 passes through the third receiving portion 1-S1. In some embodiments, the second driving assembly 1-E2 may be closed, so that the elastic force generated by the elastic element 1-200 drives the second movable portion 1-M2 to move upward. In other embodiments, electrical signals may be transmitted to the second coil 1-180 (as shown in FIG. 4), so that the second magnetic conductor 1-170 generates a magnetic force corresponding to the second magnetic element 1-190. As a result, the second magnetic conductor 1-170 and the second magnetic element 1-190 will generate upward force, which may cooperate with the elastic force generated by the elastic element 1-200 to drive the second movable portion 1-M2 moves upward and passes through the third receiving portion 1-S1. Viewed from the movement direction (for example, parallel to the Z axis) of the second movable portion 1-M2, the size of the third receiving portion 1-S1 is larger than the size of the first receiving portion 1-113 or the size of the second receiving portion 1-123.

Similarly, in order to ensure that the second movable portion 1-M2 moves after the first movable portion 1-M1 abuts the second sidewall 1-117, the electrical signal may be transmitted to the first coil 1-150 before transmitted to the second coil 1-180. For example, the time difference between transmitting electrical signals to the first coil 1-150 and the second coil 1-180 may be between about 1 ms and about 10 ms, such as about 5 ms, but the disclosure is not limited thereto. With the above design, the probability of damage due to collision between the second movable portion 1-M2 and the optical member 1-S may also be reduced.

Figure 9:
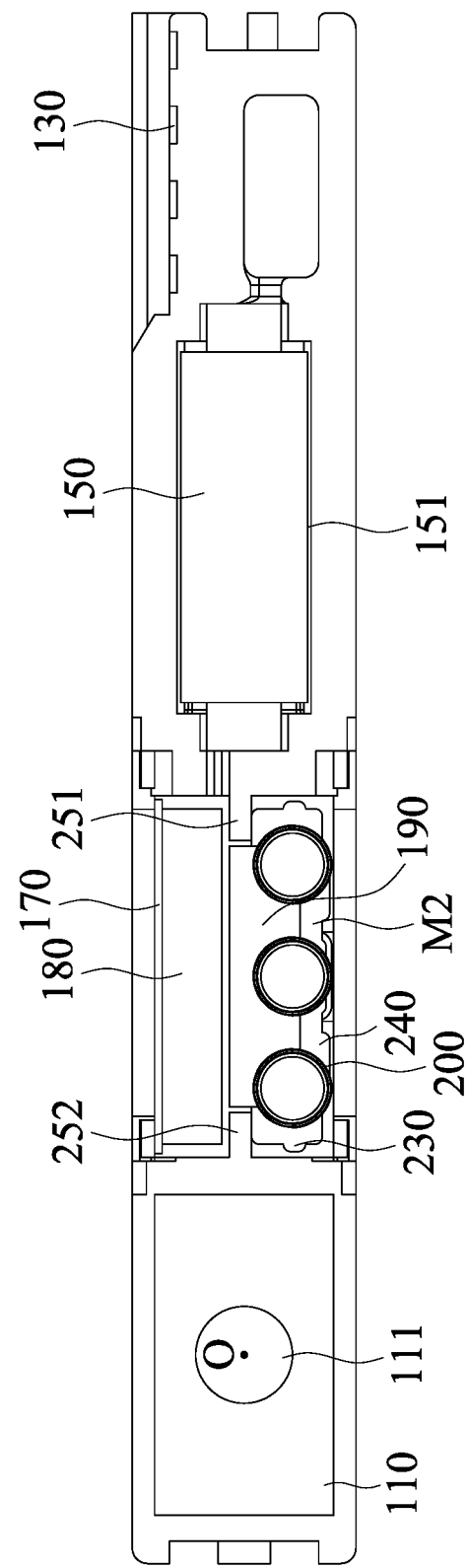
FIG. 9 is a bottom view illustrating the optical member driving mechanism in accordance with some embodiment of the present disclosure.

FIG. 9 is a bottom view illustrating the optical member driving mechanism 1-10 in accordance with some embodiment of the present disclosure. It should be noted that, in order to more clearly illustrate the internal structure of the optical member driving mechanism 1-10, the bottom cover 1-210 and the optical member 1-S are not shown in this embodiment. As shown in FIG. 9, when viewed from the second direction (for example, the Z axis), the elastic element 1-200 and the second coil 1-180 do not overlap. In some embodiments, viewed from a direction perpendicular to the second direction (for example, the Y axis), the elastic element 1-200 and the second coil 1-180 at least partially overlap.

In this embodiment, the elastic element 1-200 may include a plurality of elastic units 1-200 arranged along a first direction (for example, the X axis). In other words, when viewed along the second direction, the elastic units do not overlap each other. The elastic coefficients of the elastic units may be different respectively. In this way, it is easier to control the elastic force of the elastic element 1-200 to drive the second movable portion 1-M2, so that the movement of the second movable portion 1-M2 may be smoother.

In addition, when viewed along the winding axis of the first coil 1-150 (for example, the first winding axis 1-C1), the first coil 1-150 has one side 1-151 extending along the fourth direction (for example, the X axis). The first coil 1-150 has a first lead (not shown) connected to the circuit assembly 1-130, and the second coil 1-180 has a second lead (not shown) connected to the circuit assembly 1-130. When viewed along the direction of the winding axis of the first coil 1-150, the first lead of the first coil 1-150 and the second lead of the second coil 1-180 are located on the same side 1-151. In some embodiments, the second lead directly contacts the first coil 1-150. In some embodiments, when viewed along the third direction (for example, the Y axis), the first lead and second lead at least partially overlap.

In addition, the third stop element 1-250 includes third stop units 1-251, 1-252, which have a protruding structure extending along the first direction (for example, the X axis). The third stop element 1-250 may be configured to limit the movement range of the second movable portion 1-M2 relative to the fixed portion 1-F in the third direction. In some embodiments, the third stop unit 1-250 is fixedly disposed on the fixed portion 1-F (for example, on the body 1-110). When viewed along the second direction (for example, the Z axis), the third stop unit 1-250 is at least partially located between the second movable portion 1-M2 and the second coil 1-180. In this embodiment, the first stop unit 1-230, the second stop unit 1-240, and the third stop unit 1-250 may constitute a stop assembly 1-220 for restricting the second movable portion 1-M2 moves relative to the fixed portion 1-F within a movement range. With the arrangement of the stop assembly 1-220, the second movable portion 1-M2 may move stably relative to the fixed portion 1-F, which helps to reduce the probability of failure of the optical member driving mechanism 1-10.

Figure 10:
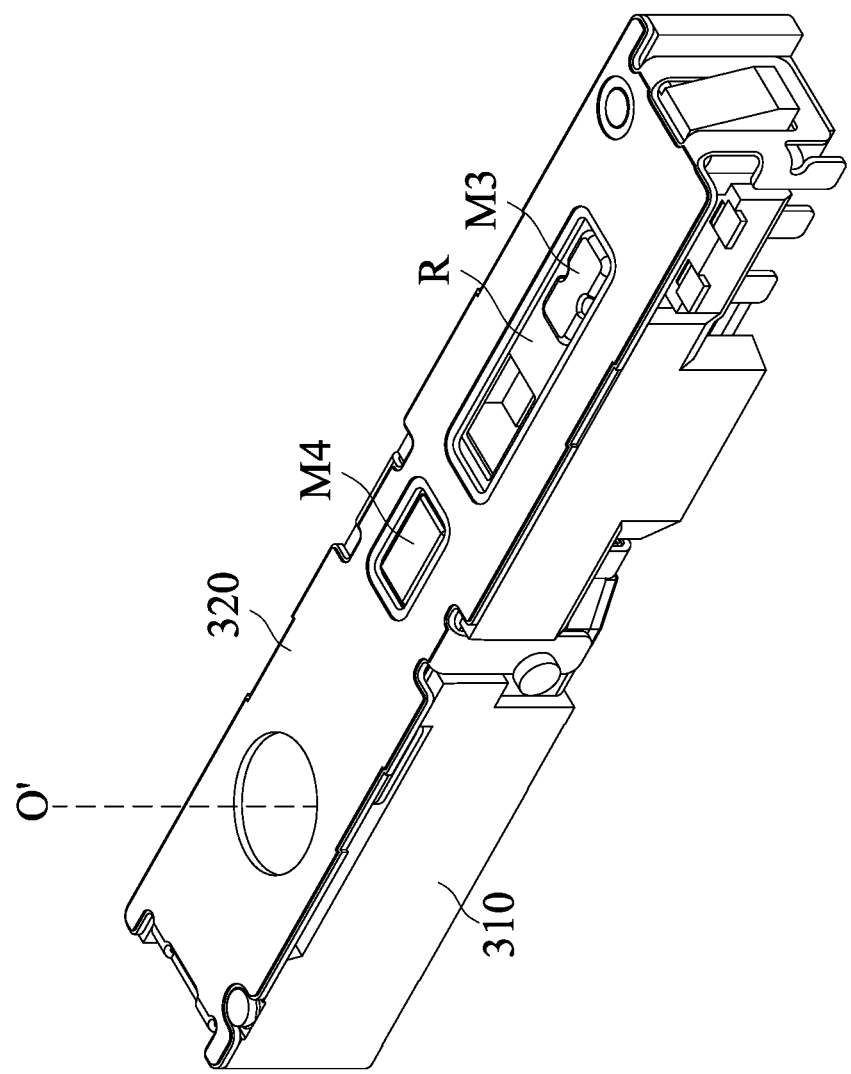
FIG. 10 is a perspective view illustrating the optical member driving mechanism in accordance with some embodiment of the present disclosure.

FIG. 10 is a perspective view illustrating the optical member driving mechanism 1-20 in accordance with some embodiment of the present disclosure. It should be noted that, in this embodiment, the optical member driving mechanism 1-20 is, for example, a shutter mechanism, and may be disposed in an electronic device (not shown) with camera function, and the optical member may be driven by the optical member driving mechanism. By controlling the position of the optical member, light may be passed through or blocked, and the exposure time of the camera module of the electronic device may be controlled.

Figure 11:
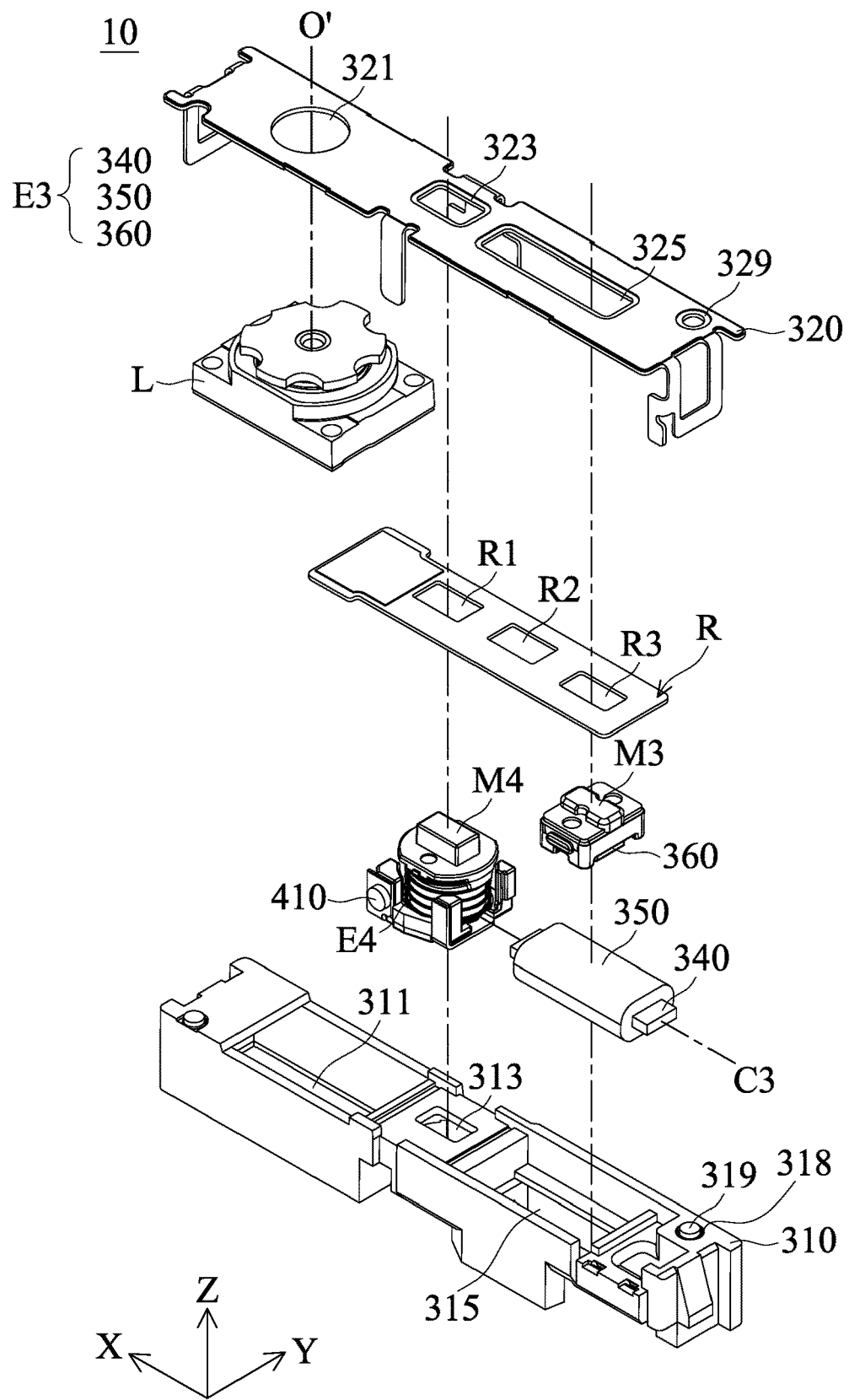
FIG. 11 is an exploded view illustrating the optical member driving mechanism shown in FIG. 10.

FIG. 11 is an exploded view illustrating the optical member driving mechanism 1-20 shown in FIG. 10. As shown in FIG. 11, the optical member driving mechanism 1-20 may include: a first movable portion 1-M3, a fixed portion 1-F, a first driving assembly 1-E3, a second movable portion 1-M4, and a second driving assembly 1-E4. In this embodiment, the fixed portion 1-F includes a body 1-310, a top cover 1-320, and a bottom cover 1-410. The top cover 1-320 and the bottom cover 1-410 are connected to the body 1-310, and the body 1-310 may be located between the top cover 1-320 and the bottom cover 1-410. The body 1-310 may be configured to carry the first movable portion 1-M3 (and the optical member 1-R connected to the first movable portion 1-M3), and is connected to the optical module 1-L.

In some embodiments, the body 1-310 has a recess 1-318 and a protrusion 1-319 protruding from the recess 1-318, and a rounded corner is formed between the protrusion 1-319 and the recess 1-318. In this way, the protrusions 1-319 may be effectively disposed in the positioning holes 1-329 of the top cover 1-320, and the top cover 1-320 may be more accurately disposed on the body 1-310. In some embodiments, the fixing portion 1-F and the optical module 1-L may be fixedly disposed on a substrate (not shown). In some embodiments, the optical member driving mechanism 1-20 does not directly contact the optical module 1-L, but the disclosure is not limited thereto.

In the direction parallel to the optical axis 1-O', the maximum size of the optical member driving mechanism 1-20 is larger than the maximum size of the optical module 1-L. For example, the height of the optical member driving mechanism 1-10 along the optical axis 1-O' is greater than the height of the optical module 1-L along the optical axis 1-O'. In addition, the optical member 1-R may include a baffle plate, which includes SOMA or any other suitable light-shielding material. The optical module 1-L may include a camera module, which includes a lens or any other suitable light-transmitting material to allow light to pass in a direction substantially parallel to the optical axis 1-O' to achieve the function of imaging. However, this disclosure is not limited thereto.

The first movable portion 1-M3 may be used to connect the optical member 1-R, wherein the optical member 1-R may be used to block light (for example, light traveling in a direction substantially parallel to the optical axis 1-O'). The first movable portion 1-M3 is relatively movable along the X axis (that is, the first direction) relative to the fixed portion 1-F. The first driving assembly 1-E3 is used for driving the first movable portion 1-M3 to move substantially along the X axis (that is, the first direction) relative to the fixed portion 1-F. In this embodiment, the first driving assembly 1-E3 includes a first magnetic conductor 1-340, a first coil 1-350, and a first magnetic element 1-360 corresponding to the first coil 1-350. In this embodiment, the first coil 1-350 has a winding axis 1-C3, which is substantially parallel to the X axis.

In some embodiments, the first driving assembly 1-E3 may make the first movable portion 1-M3 (and the connected optical member 1-R) to move between in the first position (also referred to as the first extreme position) and the second position (also referred to as the second extreme position). For example, the first position and the second position may be arranged along the X axis (that is, the line connecting the first position and the second position may be substantially parallel to the X axis). That is, the connection line between the first position and the second position is different from the optical axis 1-O' (Z axis). In some embodiments, the line (for example, the X axis) connecting the first position and the second position is substantially perpendicular to the optical axis 1-O' (for example, the Z axis).

The second movable portion 1-M4 may be used to affix the optical member 1-R at the first position or the second position relative to the fixed portion 1-F. The second driving assembly 1-E4 may be used to drive the second movable portion 1-M4 to move relative to the fixed portion 1-F substantially along the Z axis (that is, the second direction). It is shown that the movement direction of the second movable portion 1-M4 is different from the movement direction of the optical member 1-R. In some embodiments, the movement direction of the second movable portion 1-M4 is substantially perpendicular to the movement direction of the optical member 1-R. In some embodiments, the second movable portion 1-M4 may affix the optical member 1-R at the first position or the second position relative to the fixed portion 1-F. The structure of the second driving assembly 1-E4 will be further described below in accompany with FIGS. 16 and 17.

In this embodiment, the optical member driving mechanism 1-20 further includes an elastic element 1-400 that abuts the second movable portion 1-M4 and may drive the second movable portion 1-M4 to move relative to the fixed portion 1-F. The elastic element 1-400 may be arranged on the bottom cover 1-410. In some embodiments, the elastic element 1-400 may drive the second movable portion 1-M4 to move relative to the fixed portion 1-F in the second direction (for example, parallel to the Z axis). More specifically, the elastic element 1-400 may continuously exert an elastic force that is parallel to the second direction (for example, toward the top cover 1-320) to the second movable portion 1-M4.

Figure 12:
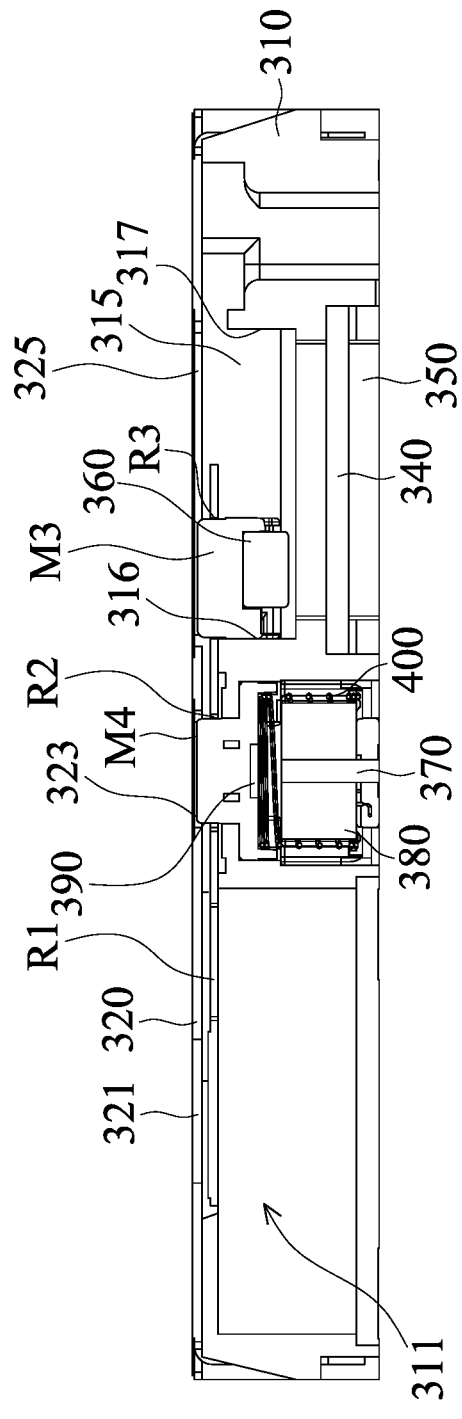
FIGS. 12 to 15 are cross-sectional views illustrating the optical member driving mechanism in accordance with some embodiment of the present disclosure.

FIGS. 12 to 15 are cross-sectional views illustrating the optical member driving mechanism 1-20 in accordance with some embodiment of the present disclosure. As shown in FIG. 12, the body 1-310 has a first optical hole 1-311, which corresponds to the optical module 1-L. The top cover 1-320 has a second optical hole 1-321 corresponding to the optical module 1-L and the first optical hole 1-311. In some embodiments, the shapes of the first optical holes 1-311 and the second optical holes 1-321 are different. As shown in FIG. 12, the optical member 1-R is in the second position. At this time, the optical member 1-R completely overlaps the first optical hole 1-311 and the second optical hole 1-321. In this way, the optical member 1-R may block the light and prevent the light from entering the optical module 1-L via the optical axis 1-O' (as shown in FIG. 11).

In addition, the body 1-310 has a first receiving portion 1-313 for receiving the second movable portion 1-M4. The top cover 1-320 has a second receiving portion 1-323 for receiving the second movable portion 1-M4. In this embodiment, the size of the first receiving portion 1-313 is substantially equal to the size of the second receiving portion 1-323. In some embodiments, the size of the first receiving portion 1-313 is smaller than the size of the second receiving portion 1-323. In addition, the optical member 1-R has a third receiving portion 1-R1 and a fourth receiving portion 1-R2, corresponding to the second movable portion 1-M4, respectively. When the optical member 1-R is located at the second position (that is, when it completely overlaps the first optical hole 1-311 and the second optical hole 321), the second movable portion 1-M4 passes through the fourth receiving portion 1-R2.

As shown in FIG. 12, the optical member 1-R is located between the body 1-310 and the top cover 1-320. Viewed from the movement direction of the second movable portion 1-M4 (for example, parallel to the Z axis), the size of the fourth receiving portion 1-R2 is larger than the size of the first receiving portion 1-313 or the size of the second receiving portion 1-323. As a result, the gap between the second movable portion 1-M4 and the optical member 1-R is smaller than the gap between the optical member 1-R and the fixed portion 1-F (for example, the body 1-310, the top cover 1-320, etc.). With this configuration, the probability that the second movable portion 1-M4 cannot move normally due to the contact between the second movable portion 1-M4 and the optical member 1-R may be reduced. For example, the first receiving portion 1-313 has a recessed structure to provide a space for the second movable portion 1-M4 to move. For example, the first receiving portion 1-313, the second receiving portion 1-323, the third receiving portion 1-R1, and the fourth receiving portion 1-R2 are rectangular, but the disclosure is not limited thereto. In some embodiments, the first receiving portion 1-313, the second receiving portion 1-323, the third receiving portion 1-R1, and the fourth receiving portion 1-R2 may be any shape corresponding to the second movable portion 1-M4, as long as the second movable portion 1-M4 may be received.

In addition, the body 1-310 has a first opening 1-315 for receiving the first movable portion 1-M3, and the first driving assembly 1-E3 (including the first magnetic conductor 1-340, the first coil 1-350 and the first magnetic element 1-360) drives the first movable portion 1-M3 to move in the first opening 1-315. The top cover 1-320 has a second opening 1-325 for receiving the first movable portion 1-M3, and the first driving assembly 1-E3 drives the first movable portion 1-M3 to move in the second opening 1-325. In some embodiments, the size of the first opening 1-315 is different from the size of the second opening 1-325. In some embodiments, the size of the first opening 1-315 is larger than the size of the second opening 1-325.

The optical member 1-R has a third opening 1-R3 corresponding to the first movable portion 1-M3. In some embodiments, the first movable portion 1-M3 may be disposed in the third opening 1-R3. In some embodiments, the size of the first opening 1-315 is different from the size of the third opening 1-R3. In some embodiments, the size of the first opening 1-315 is larger than the size of the third opening 1-R3. In some embodiments, the size of the second opening 1-325 is different from the size of the third opening 1-R3. In some embodiments, the size of the second opening 1-325 is larger than the size of the third opening 1-R3. It is shown in FIG. 12 that the size of the first opening 1-315 is different from the size of the first receiving portion 1-313. In some embodiments, the size of the first opening 1-315 is larger than the size of the first receiving portion 1-313. The first opening 1-315 has a first sidewall 1-316 and a second sidewall 1-317 opposite to the first sidewall 1-316. The first sidewall 1-316 and the second sidewall 1-317 may constitute a stop portion for limiting the movement of the first movable portion 1-M3 relative to the fixed portion 1-F within a range of motion. When the second movable portion 1-M4 is in the second position, the first movable portion 1-M3 abuts the first sidewall 1-316.

As shown in FIG. 12, when the first movable portion 1-M3 is located at the second position, when viewed along the second direction (such as the Z axis), the optical member 1-R completely covers the second optical hole 1-321, so that the first optical hole 1-311 is completely not exposed from the second optical hole 1-321. At this time, the first movable portion 1-M3 may be in contact with the first sidewall 1-316, or the fixed portion 1-F (for example, the body 1-310) may be in contact with the stop structure on the first movable portion 1-M3. When the first movable portion 1-M3 is in direct contact with the fixed portion 1-F, and the optical member 1-R is not in contact with the fixed portion 1-F. In this way, the probability of damage due to the collision of the optical member 1-R and the fixing portion 1-F with each other may be reduced. In this embodiment, the optical member 1-R and the second movable portion 1-M4 have a non-zero gap, that is, the optical member 1-R and the second movable portion 1-M4 are not in direct contact.

Since the elastic element 1-400 continues to exert an upward elastic force on the second movable portion 1-M4, the second movable portion 1-M4 may protrude from the first receiving portion 1-313 and the fourth receiving portion 1-R2, maintaining the optical member 1-R at the second position to keep blocking the light entering the optical module 1-L via the optical axis 1-O'. In this way, the probability of failure of the optical member 1-R due to external impact may be reduced.

Figure 13:
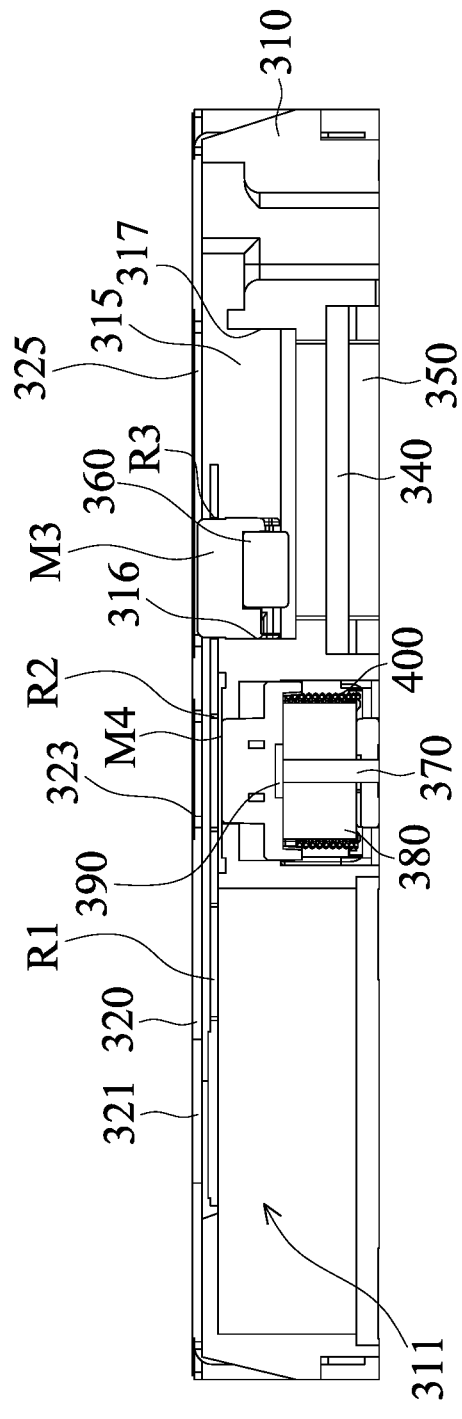

Next, as shown in FIG. 13, the second driving assembly 1-E4 may drive the second movable portion 1-M4 to move downward, so that the second movable portion 1-M4 leaves the fourth receiving portion 1-R2. In this embodiment, the second driving assembly 1-E4 may include a second magnetic conductor 1-370, a second coil 1-380, and a second magnetic element 1-390. The electrical signal may be transmitted to the second coil 1-380, so that the second magnetic conductor 1-370 generates a magnetic force corresponding to the second magnetic element 1-390. In this way, the second magnetic element 1-370 will generate a downward force with the second magnetic element 1-390, so that the second magnetic element 1-390 may offset the elastic force generated by the elastic element 1-400 and drive the second magnetic element 1-400. The second movable portion 1-M4 moves downward. In other words, the maximum driving force generated by the second driving assembly 1-E4 is greater than the elastic force exerted by the elastic element 1-400.

Figure 14:
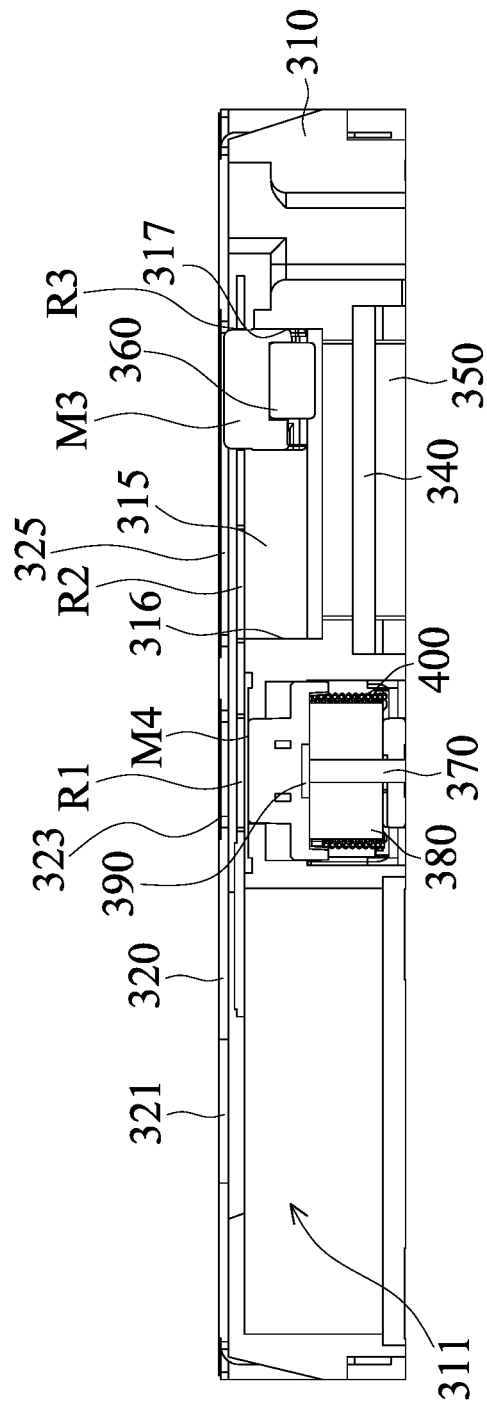

Next, as shown in FIG. 14, the first driving assembly 1-E3 may drive the first movable portion 1-M3 and the optical member 1-R to leave the second position and reach the first position. More specifically, electrical signals may be transmitted to the first coil 1-350, so that the first magnetic conductor 1-340 generates a magnetic force corresponding to the first magnetic element 1-360. In this way, the first magnetic conductor 1-340 generates a force with the first magnetic element 1-360 to drive the first movable portion 1-M3 and the optical member 1-R away from the second position. At this time, the optical member 1-R does not overlap the first optical hole 1-311 and the second optical hole 1-321. In this way, light may enter the optical module 1-L through the optical axis 1-O'. In addition, viewed from a direction perpendicular to the movement direction of the optical member 1-R (for example, the Z axis), the second movable portion 1-M4 partially overlaps the top cover 1-320.

In order to ensure that the first movable portion 1-M3 and the optical member 1-R move after the second movable portion 1-M4 leaves the fourth receiving portion 1-R2, the electrical signal may be transmitted to the first coil 1-350 after transmitted to the second coil 1-380. For example, the time difference between transmitting the electrical signal to the first coil 1-350 and the second coil 1-380 may be between about 1 ms and about 10 ms, such as about 5 ms, but the present disclosure is not limited thereto. With the above design, the probability of damage due to the collision between the second movable portion 1-M4 and the optical member 1-R may be reduced.

Figure 15:
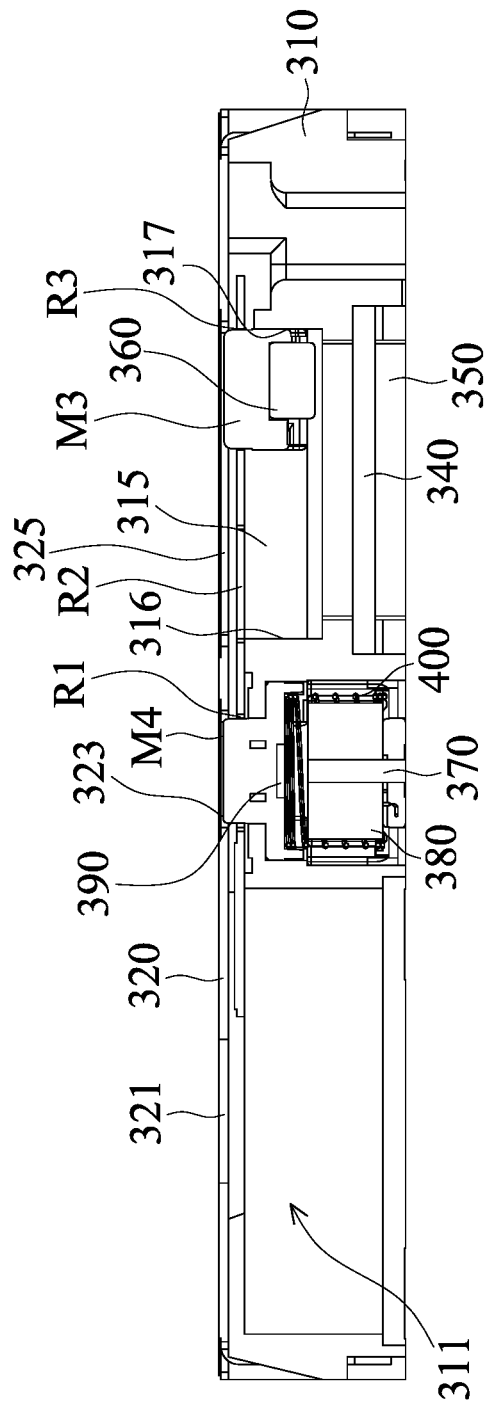

As shown in FIG. 15, after the optical member 1-R reaches the first position (for example, when the first movable portion 1-M3 abuts the second sidewall 1-317), the elastic element 1-400 may drive the second movable portion 1-M4 to move upward, so that the second movable portion 1-M4 passes through the third receiving portion 1-R1. Viewed from the movement direction (for example, parallel to the Z axis) of the second movable portion 1-M4, the size of the third receiving portion 1-R1 is larger than the size of the first receiving portion 1-313 or the size of the second receiving portion 1-323.

Similarly, in order to ensure that the second movable portion 1-M4 moves after the first movable portion 1-M3 abuts the second sidewall 1-317, the electrical signal may be transmitted to the first coil 1-350 after transmitted to the second coil 1-380. For example, the time difference between transmitting the electrical signal to the first coil 1-350 and the second coil 1-380 may be between about 1 ms and about 10 ms, for example, about 5 ms, but the present disclosure is not limited thereto. With the above design, the probability of damage due to the collision between the second movable portion 1-M4 and the optical member 1-R may also be reduced.

As shown in FIG. 15, when the first movable portion 1-M3 is located at the first position, the optical member 1-R does not cover the second optical hole 1-321 at all when viewed along the second direction (for example, the Z axis), so that the first optical hole 1-311 is completely exposed in the second optical hole 1-321. At this time, the first movable portion 1-M3 may be in contact with the second sidewall 1-317, or the fixed portion 1-F (for example, the body 1-310) may be in contact with the stop structure on the first movable portion 1-M3. When viewed along the second direction, the first movable portion 1-M3 is located between the stop structure, wherein the above-mentioned stop structure are arranged along the first direction (for example, the X axis).

Similarly, when the first movable portion 1-M3 is in direct contact with the fixed portion 1-F, the optical member 1-R is not in contact with the fixed portion 1-F. In this way, the probability of damage due to the collision between the optical member 1-R and the fixing portion 1-F may be reduced. In this embodiment, the optical member 1-R and the second movable portion 1-M4 have a non-zero gap, that is, the optical member 1-R and the second movable portion 1-M4 are not in direct contact.

Figure 16:
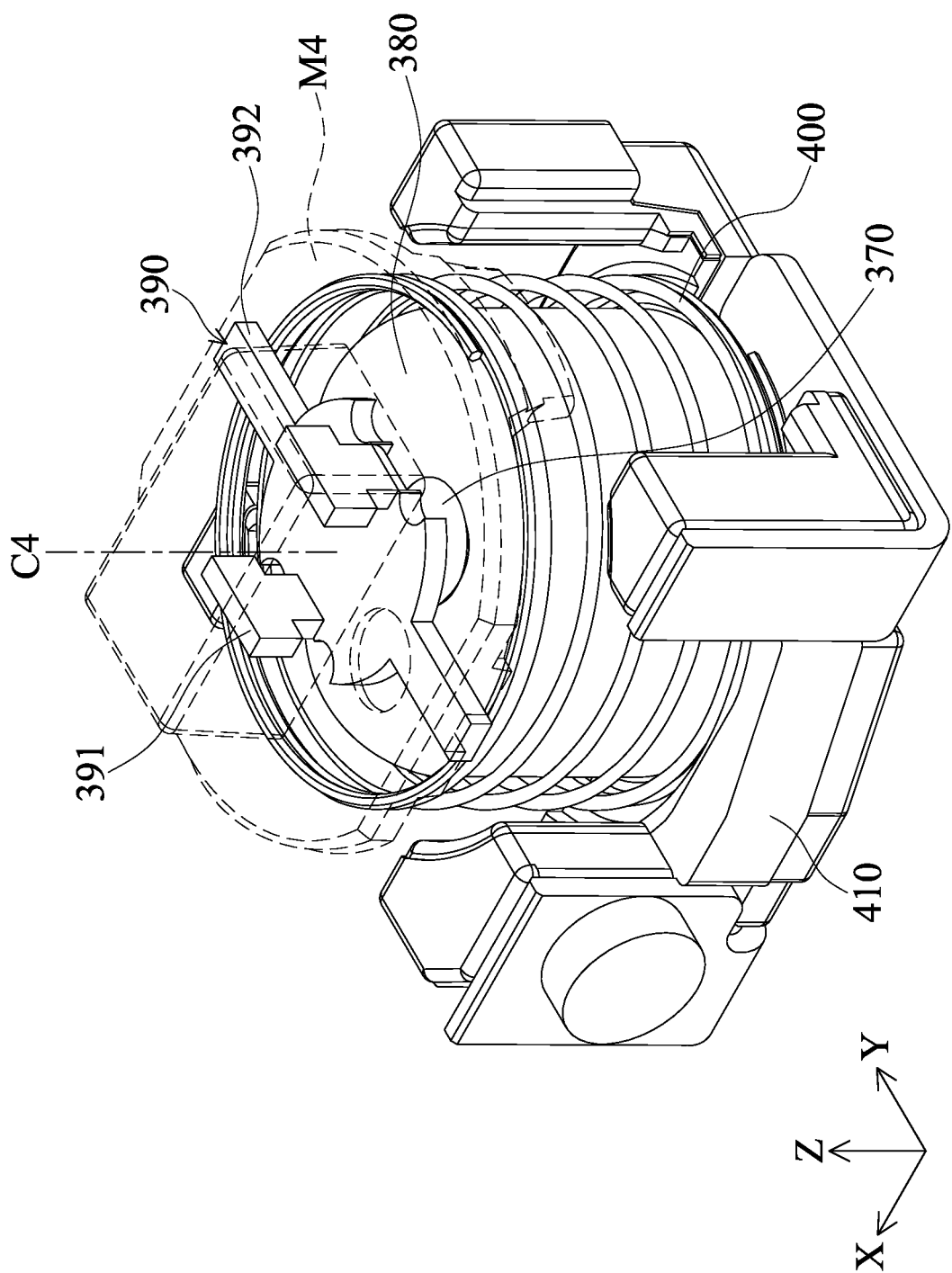
FIG. 16 is a perspective view illustrating the second driving assembly and the bottom cover in accordance with some embodiment of the present disclosure.

FIG. 16 is a perspective view illustrating the second driving assembly 1-E4 and the bottom cover 1-410 in accordance with some embodiment of the present disclosure. It should be noted that, in order to more clearly illustrate the structure of the second driving assembly 1-E4, the second movable portion 1-M4 is drawn with a dotted line in this embodiment. In some embodiments, the second coil 1-380 is adjacent to the second magnetic conductor 1-370. In some embodiments, the second coil 1-380 surrounds the second magnetic conductor 1-370. The second magnetic conductor 1-370 has an elongated structure, and the extension direction (such as the Z axis) of the second magnetic conductor 1-370 is parallel to the winding axis 1-C4 of the second coil. In addition, the second magnetic element 1-390 corresponds to the second coil 1-380. In some embodiments, the second magnetic element 1-390 has a magnetically conductive material. In some embodiments, the second magnetic element 1-390 does not include any permanent magnets. In some embodiments, the second magnetic element 1-390 has a plate-like structure, which includes flat plate portions 1-391 and 1-392, which extend in different directions, respectively. The second magnetic element 1-390 is at least partially buried and not exposed in the second movable portion 1-M4 (shown in dashed lines).

Figure 17:
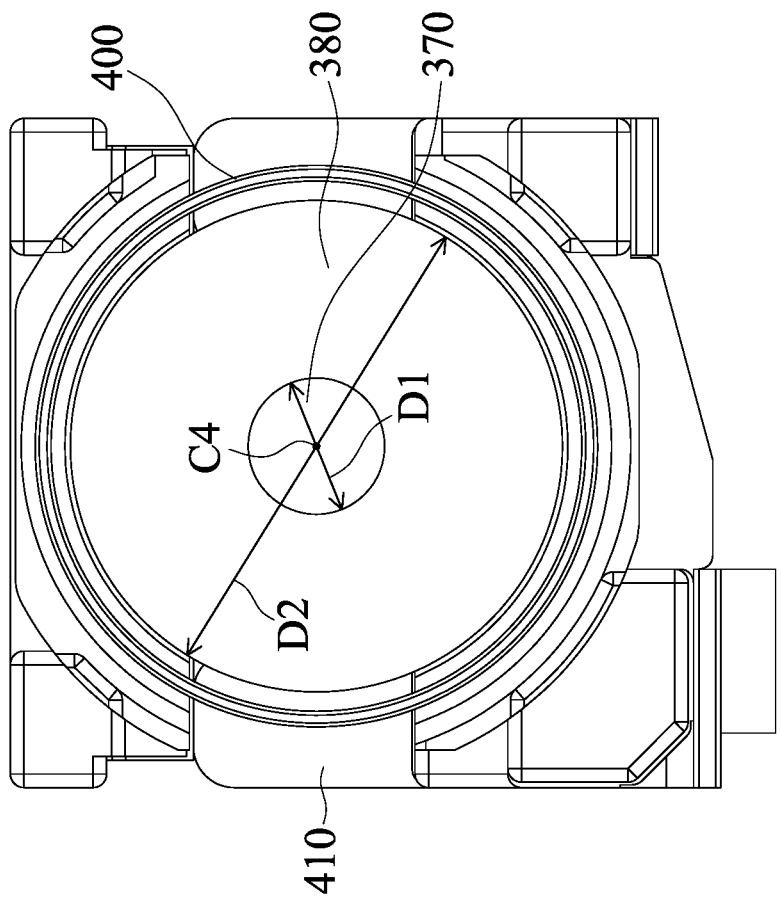
FIG. 17 is a top view illustrating the second driving assembly and the bottom cover in accordance with some embodiment of the present disclosure.

FIG. 17 is a top view illustrating the second driving assembly 1-E4 and the bottom cover 1-410 in accordance with some embodiment of the present disclosure. When viewed along the extension direction of the second magnetic conductor 1-370, in the first direction (such as the X axis), the maximum dimension (such as the diameter 1-D2) of the second coil 1-380 is larger than the maximum size (f such as the diameter 1-D1) of the second magnetic conductor 1-370. In some embodiments, the maximum size of the second coil 1-380 is at least twice the maximum size of the second magnetic conductor 1-370. The elastic element 1-400 surrounds the second coil 1-380. Viewed from the movement direction (such as the Z axis) of the second movable portion 1-M4, the elastic element 1-400 and the second coil 1-380 do not overlap. Viewed from a direction perpendicular to the direction of movement of the second movable portion 1-M4 (for example, the X-Y plane), the elastic element 1-400 and the second coil 1-380 at least partially overlap.

In summary, the embodiment of the present disclosure provides an optical member driving mechanism provided with a movable portion to affix the optical member. By arranging a movable portion with a movement direction different from that of the optical member, the optical member may be fixed in a specific position, which may reduce the probability of failure of the optical member due to external force impact. In addition, the driving time of the movable portion and the driving time of the optical member are designed to have a time difference, which may reduce the probability of damage due to collision between the movable portion and the optical member. In addition, a corresponding stop assembly is provided for the movable portion, so that the movable portion may move stably relative to the fixed portion, which helps to reduce the probability of failure of the optical member driving mechanism.

Second Embodiment

Figure 18:
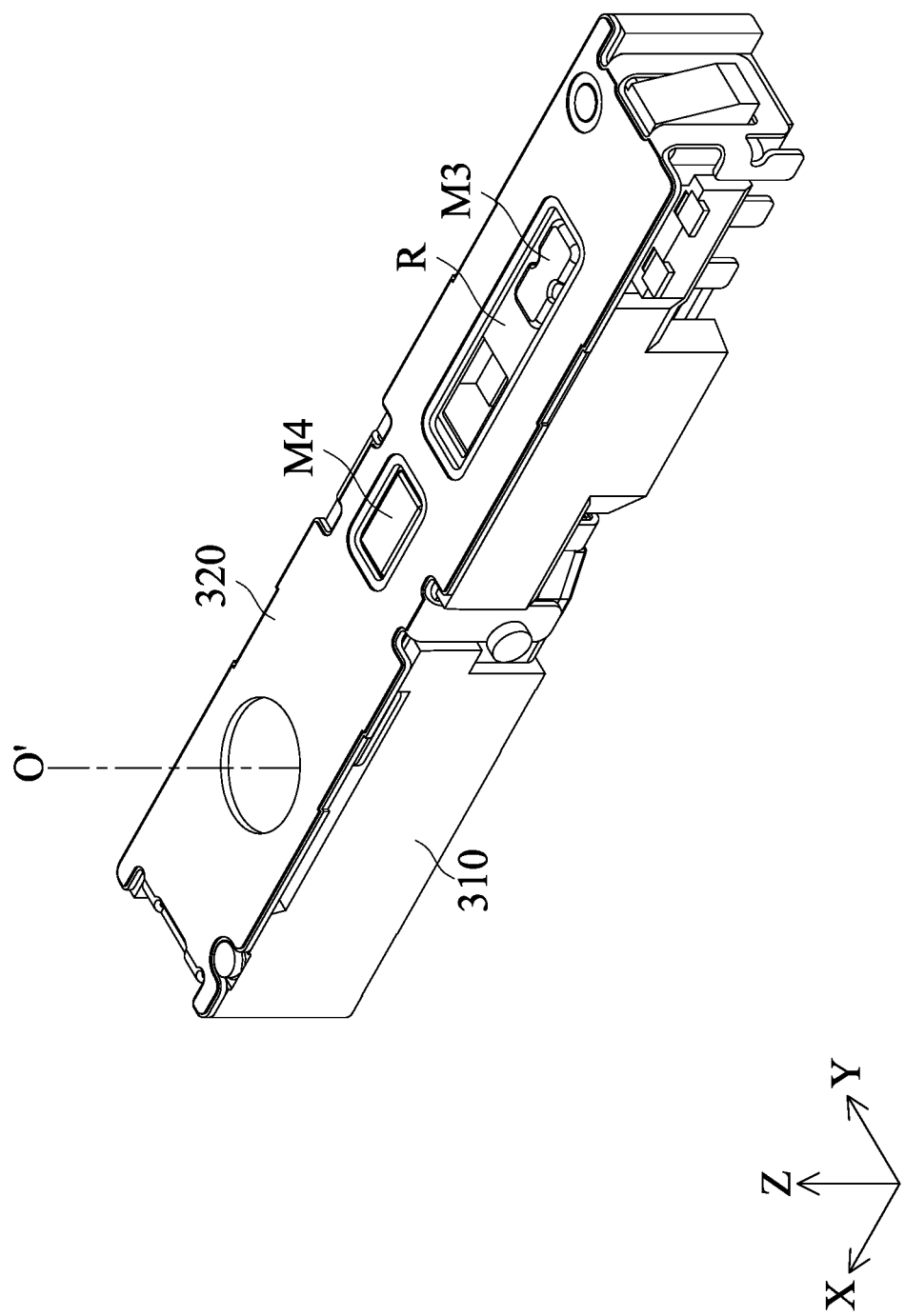
FIG. 18 is a perspective view illustrating the optical member driving mechanism in accordance with some embodiment of the present disclosure.

FIG. 18 is a perspective view illustrating the optical member driving mechanism 2-20 in accordance with some embodiment of the present disclosure. It should be noted that, in this embodiment, the optical member driving mechanism 2-20 is, for example, a shutter mechanism, and may be disposed in an electronic device (not shown) with camera function, and the optical member may be driven by the optical member driving mechanism. By controlling the position of the optical member, light may be passed through or blocked, and the exposure time of the camera module of the electronic device may be controlled.

Figure 19:
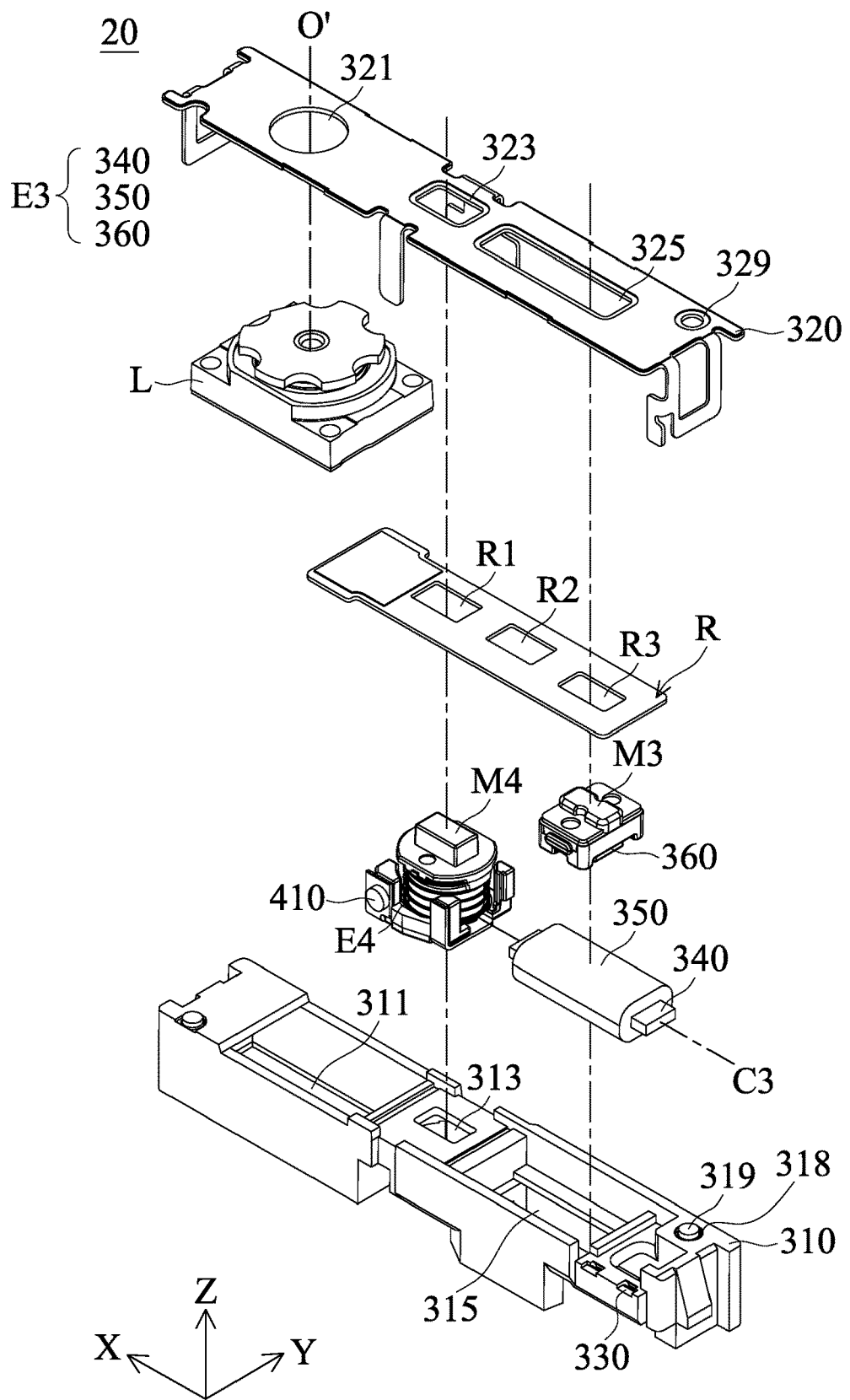
FIG. 19 is an exploded view illustrating the optical member driving mechanism shown in FIG. 18.

FIG. 19 is an exploded view illustrating the optical member driving mechanism 2-20 shown in FIG. 18. As shown in FIG. 19, the optical member driving mechanism 2-20 may include: a first movable portion 2-M3, a fixed portion 2-F, a first driving assembly 2-E3, a second movable portion 2-M4, and a second driving assembly 2-E4. In this embodiment, the fixed portion 2-F includes a body 2-310, a top cover 2-320, and a bottom cover 2-410. The top cover 2-320 and the bottom cover 2-410 are connected to the body 2-310, and the body 2-310 may be located between the top cover 2-320 and the bottom cover 2-410. The body 2-310 may be configured to carry the first movable portion 2-M3 (the first movable portion 2-M3 and the optical member 2-R may constitute a movable portion), and is connected to the optical module 2-L.

In some embodiments, the body 2-310 has a recess 2-318 and a protrusion 2-319 protruding from the recess 2-318, and a rounded corner is formed between the protrusion 2-319 and the recess 2-318. In this way, the protrusions 2-319 may be effectively disposed in the positioning holes 2-329 of the top cover 2-320, and the top cover 2-320 may be more accurately disposed on the body 2-310. In some embodiments, the fixed portion 2-F and the optical module 2-L may be fixedly disposed on a substrate (not shown). In some embodiments, the optical member driving mechanism 2-20 does not directly contact the optical module 2-L, but the disclosure is not limited thereto.

In the direction parallel to the optical axis 2-O', the maximum size of the optical member driving mechanism 2-20 is larger than the maximum size of the optical module 2-L. For example, the height of the optical member driving mechanism 2-10 along the optical axis 2-O' is greater than the height of the optical module 2-L along the optical axis 2-O'. In addition, the optical member 2-R may include a baffle plate, which includes SOMA or any other suitable light-shielding material. The optical module 2-L may include a camera module, which includes a lens or any other suitable light-transmitting material to allow light to pass in a direction substantially parallel to the optical axis 2-O' to achieve the function of imaging. However, this disclosure is not limited thereto.

The first movable portion 2-M3 may be configured to connect the optical member 2-R, wherein the optical member 2-R may be configured to block light (for example, light traveling in a direction substantially parallel to the optical axis 2-O'). The first movable portion 2-M3 is relatively movable along the X axis (that is, the first direction) relative to the fixed portion 2-F. The first driving assembly 2-E3 is used for driving the first movable portion 2-M3 to move substantially along the X axis (that is, the first direction) relative to the fixed portion 2-F. In this embodiment, the first driving assembly 2-E3 includes a first magnetic conductor 2-340, a first coil 2-350, and a first magnetic element 2-360 corresponding to the first coil 2-350.

In some embodiments, the first driving assembly 2-E3 may make the first movable portion 2-M3 (and the connected optical member 2-R) to move between in the first position and the second position. For example, the first position and the second position may be arranged along the X axis (that is, the line connecting the first position and the second position may be substantially parallel to the X axis). That is, the line connecting the first position and the second position is different from the optical axis 2-O' (Z axis). In some embodiments, the line (for example, the X axis) connecting the first position and the second position is substantially perpendicular to the optical axis 2-O' (for example, the Z axis).

The second movable portion 2-M4 may be used to affix the optical member 2-R at the first position or the second position relative to the fixed portion 2-F. The second driving assembly 2-E4 may be used to drive the second movable portion 2-M4 to move relative to the fixed portion 2-F substantially along the Z axis (that is, the second direction). It is shown that the movement direction of the second movable portion 2-M4 is different from the movement direction of the optical member 2-R. In some embodiments, the movement direction of the second movable portion 2-M4 is substantially perpendicular to the movement direction of the optical member 2-R. In some embodiments, the second movable portion 2-M4 may affix the optical member 2-R at the first position or the second position relative to the fixed portion 2-F. In addition, a control assembly 2-330 may be disposed on the body 2-310 and electrically connected to the first driving assembly 2-E3 and the second driving assembly 2-E4.

In this embodiment, the optical member driving mechanism 2-20 further includes an elastic element 2-400 that abuts the second movable portion 2-M4 and may drive the second movable portion 2-M4 to move relative to the fixed portion 2-F. The elastic element 2-400 may be arranged on the bottom cover 2-410. In some embodiments, the elastic element 2-400 may drive the second movable portion 2-M4 to move relative to the fixed portion 2-F in the second direction (for example, parallel to the Z axis). More specifically, the elastic element 2-400 may continuously exert an elastic force that is parallel to the second direction (for example, toward the top cover 2-320) to the second movable portion 2-M4.

Figure 20:
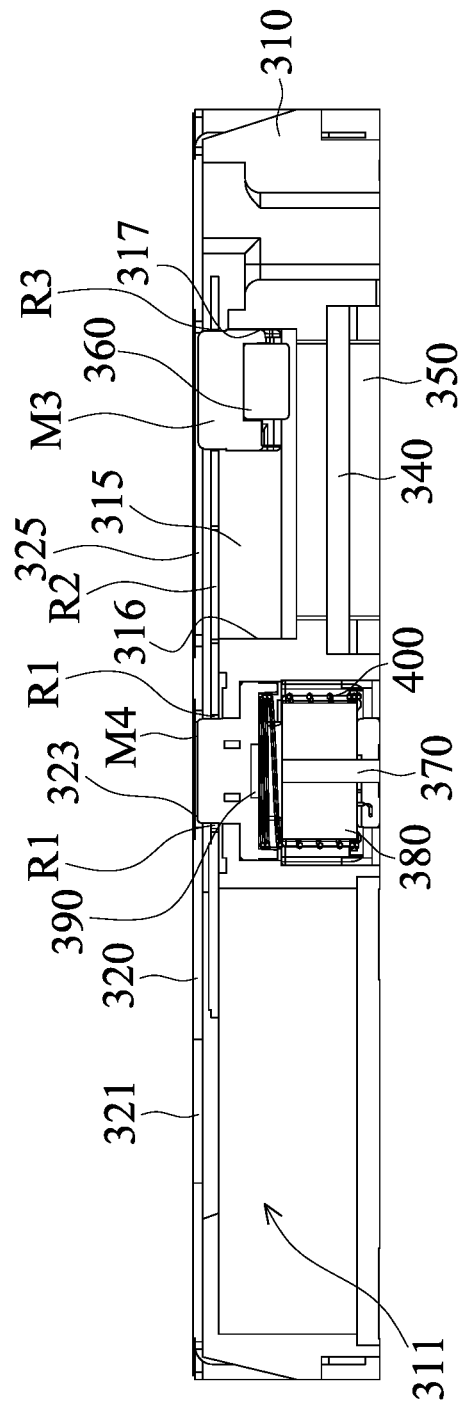
FIGS. 20 to 24 are cross-sectional views illustrating the optical member driving mechanism in accordance with some embodiment of the present disclosure.

FIGS. 20 to 24 are cross-sectional views illustrating the optical member driving mechanism 2-20 in accordance with some embodiment of the present disclosure. As shown in FIG. 20, the body 2-310 has a first optical hole 2-311, which corresponds to the optical module 2-L. The top cover 2-320 has a second optical hole 2-321 corresponding to the optical module 2-L and the first optical hole 2-311.

In addition, the body 2-310 has a first receiving portion 2-313 for receiving the second movable portion 2-M4. The top cover 2-320 has a second receiving portion 2-323 for receiving the second movable portion 2-M4. In this embodiment, the size of the first receiving portion 2-313 is substantially equal to the size of the second receiving portion 2-323. In some embodiments, the size of the first receiving portion 2-313 is smaller than the size of the second receiving portion 2-323. In addition, the optical member 2-R has a first engagement structure 2-R1 and a second engagement structure 2-R2, corresponding to the second movable portion 2-M4, respectively. When the optical member 2-R is located at the first position (that is, when it does not overlap with the first optical hole 2-311 and the second optical hole 2-321 at all), the second movable portion 2-M4 passes through the first engagement structure 2-R1.

In addition, the body 2-310 has a first opening 2-315 for accommodating the first movable portion 2-M3, and the first driving assembly 2-E3 (including the first magnetic conductor 2-340, the first coil 2-350 and the first magnetic element 2-360) drives the first movable portion 2-M3 to move in the first opening 2-315. The top cover 2-320 has a second opening 2-325 for receiving the first movable portion 2-M3, and the first driving assembly 2-E3 drives the first movable portion 2-M3 to move in the second opening 2-325. The optical member 2-R has a third opening 2-R3 corresponding to the first movable portion 2-M3. In some embodiments, the first movable portion 2-M3 may be disposed in the third opening 2-R3. The first opening 2-315 has a first sidewall 2-316 and a second sidewall 2-317 opposite to the first sidewall 2-316. The first sidewall 2-316 and the second sidewall 2-317 may constitute a stop portion for limiting the movement of the first movable portion 2-M3 relative to the fixed portion 2-F within a movement range. When the second movable portion 2-M4 is located at the first position, the first movable portion 2-M3 abuts the second sidewall 2-317.

In some embodiments, the second movable portion 2-M4 may deviate from the first position due to an external force impact, and contact the first engagement structure 2-R1 of the optical member 2-R. At this time, because the second movable portion 2-M4 will generate friction with the optical member 2-R, the second driving assembly 2-E4 may not easily overcome this friction to drive the second movable portion 2-M4 to move relative to the fixed portion 2-F along the Z axis.

Figure 21:
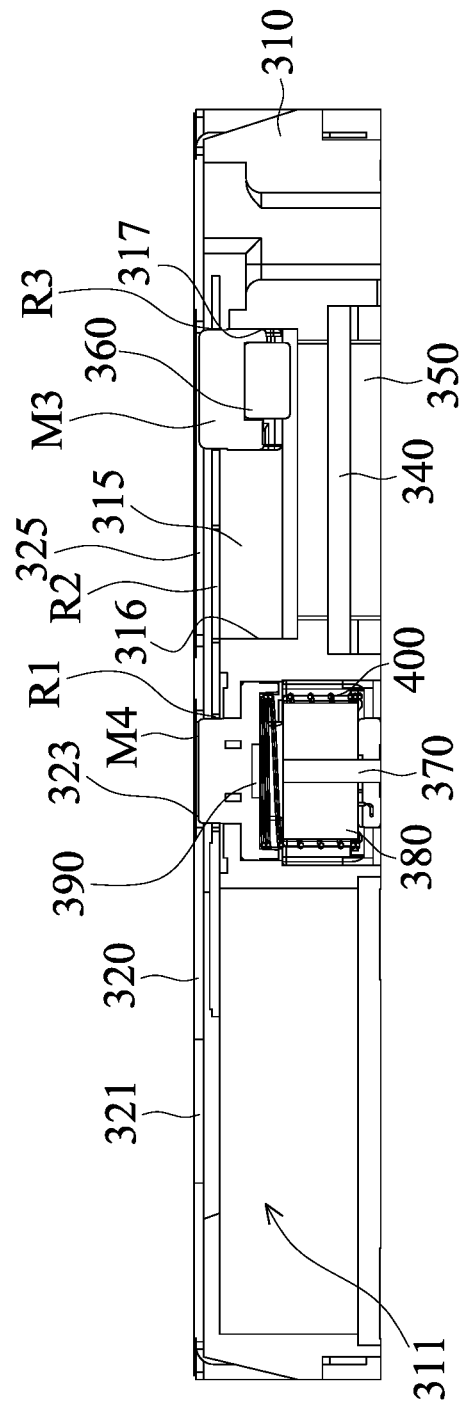

As shown in FIG. 21, the control assembly 2-330 may output a first driving signal to the first driving assembly 2-E3 to generate a first driving force for the optical member 2-R to make the optical member 2-R move relative to the fixed portion 2-F in a first direction (for example, to the right). In this way, the second movable portion 2-M4 may be kept away from the first engagement structure 2-R1, and the fixed relationship between the optical member 2-R and the second movable portion 2-M4 is released. In other words, the first engagement structure 2-R1 and the second movable portion 2-M4 have a non-zero gap, that is, the first engagement structure 2-R1 and the second movable portion 2-M4 are not in direct contact. In this way, it may be ensured that the second movable portion 2-M4 does not generate friction with the optical member 2-R, so that the second driving assembly 2-E4 may smoothly drive the second movable portion 2-M4 relative to the fixed portion 2-F along the Z axis.

When the optical member 2-R reaches the first position (for example, when the first movable portion 2-M3 abuts the second sidewall 2-317), when viewed along the Z axis, the optical member 2-R does not cover the second optical hole 2-321 at all. The first optical hole 2-311 may be completely exposed in the second optical hole 2-321.

Figure 22:
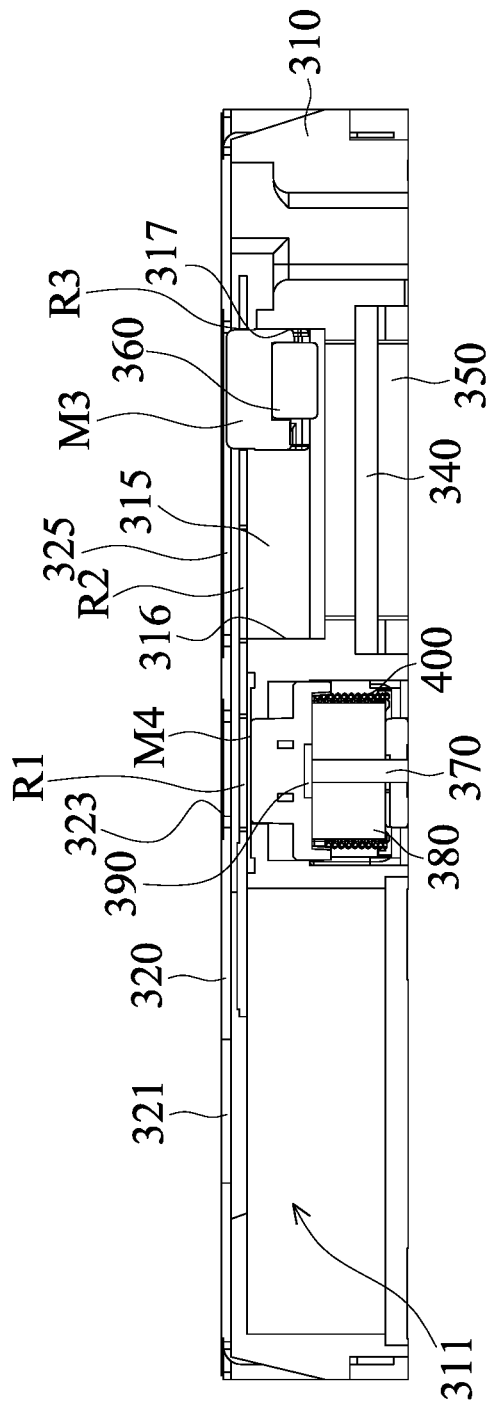

Next, as shown in FIG. 22, the control assembly 2-330 outputs a second driving signal to the second driving assembly 2-E4 to generate a second driving force to the second movable portion 2-M4, so that the second movable portion 2-M4 is far away from the first engagement structure 2-R1. In this embodiment, the second driving assembly 2-E4 may include a second magnetic conductor 2-370, a second coil 2-380, and a second magnetic element 2-390. The electrical signal may be transmitted to the second coil 2-380, so that the second magnetic conductor 2-370 generates a magnetic force corresponding to the second magnetic element 2-390. In this way, the second magnetic conductor 2-370 will generate a downward force with the second magnetic element 2-390, so that the second magnetic element 2-390 may offset the elastic force generated by the elastic element 2-400 and drive the second movable portion 2-M4 to move downward. In other words, the maximum driving force generated by the second driving assembly 2-E4 is greater than the elastic force exerted by the elastic element 2-400.

Figure 23:
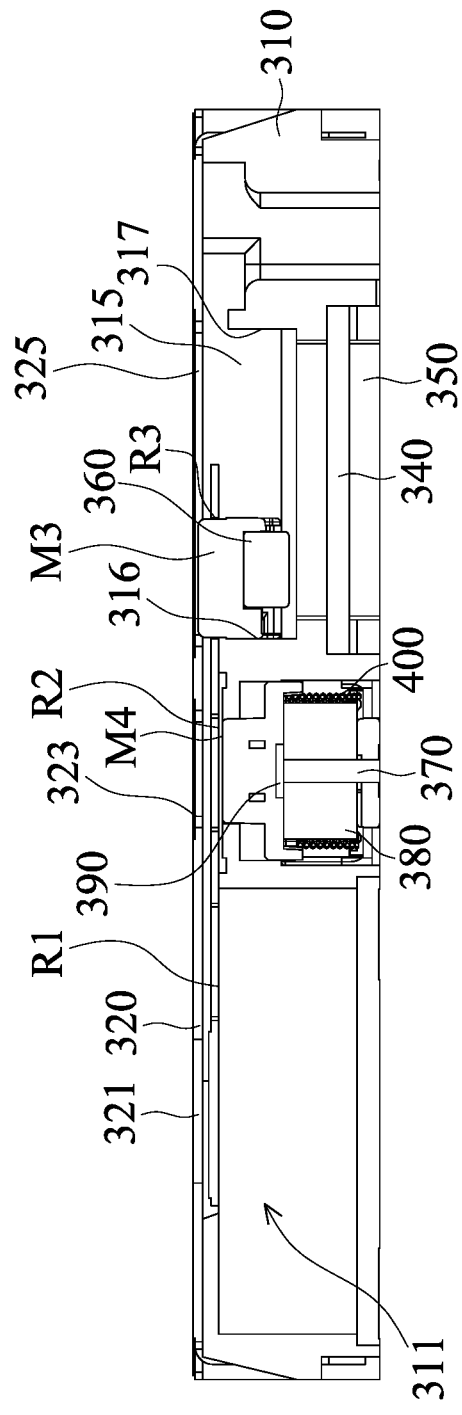

Next, as shown in FIG. 23, the first driving assembly 2-E3 may drive the first movable portion 2-M3 and the optical member 2-R to move from the first position to the second position in the second direction (for example, to the left). More specifically, an electrical signal may be transmitted to the first coil 2-350, so that the first magnetic conductor 2-340 generates a magnetic force corresponding to the first magnetic element 2-360. In this way, the first magnetic conductive member 2-340 generates a force with the first magnetic element 2-360 to drive the first movable portion 2-M3 and the optical member 2-R away from the first position. At this time, when the optical member 2-R is at the second position, the optical member 2-R overlaps the first optical hole 2-311 and the second optical hole 2-321. In this way, the light entering the optical module 2-L through the optical axis 2-O' may be blocked.

Figure 24:
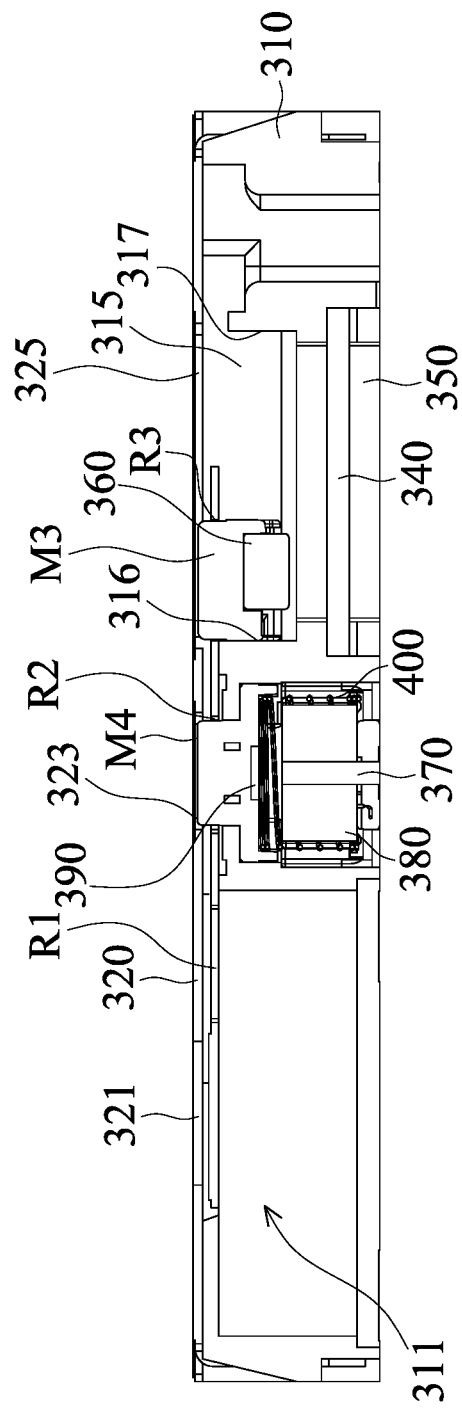

As shown in FIG. 24, since the elastic element 2-400 continues to exert upward elastic force on the second movable portion 2-M4, the second movable portion 2-M4 may approach the second engagement structure 2-R2, and thus the optical member 2-R is affixed at the second position relative to the fixed portion 2-F, and the light entering the optical module 2-L through the optical axis 2-O' is kept blocked. In this way, the probability that the optical member 2-R loses the function of blocking light due to an external force impact may be reduced. It should be understood that the above description exemplarily illustrates the process of moving the optical member from the first position to the second position. To move the optical member from the second position to the first position, the above steps may be performed reversely.

Figure 25:
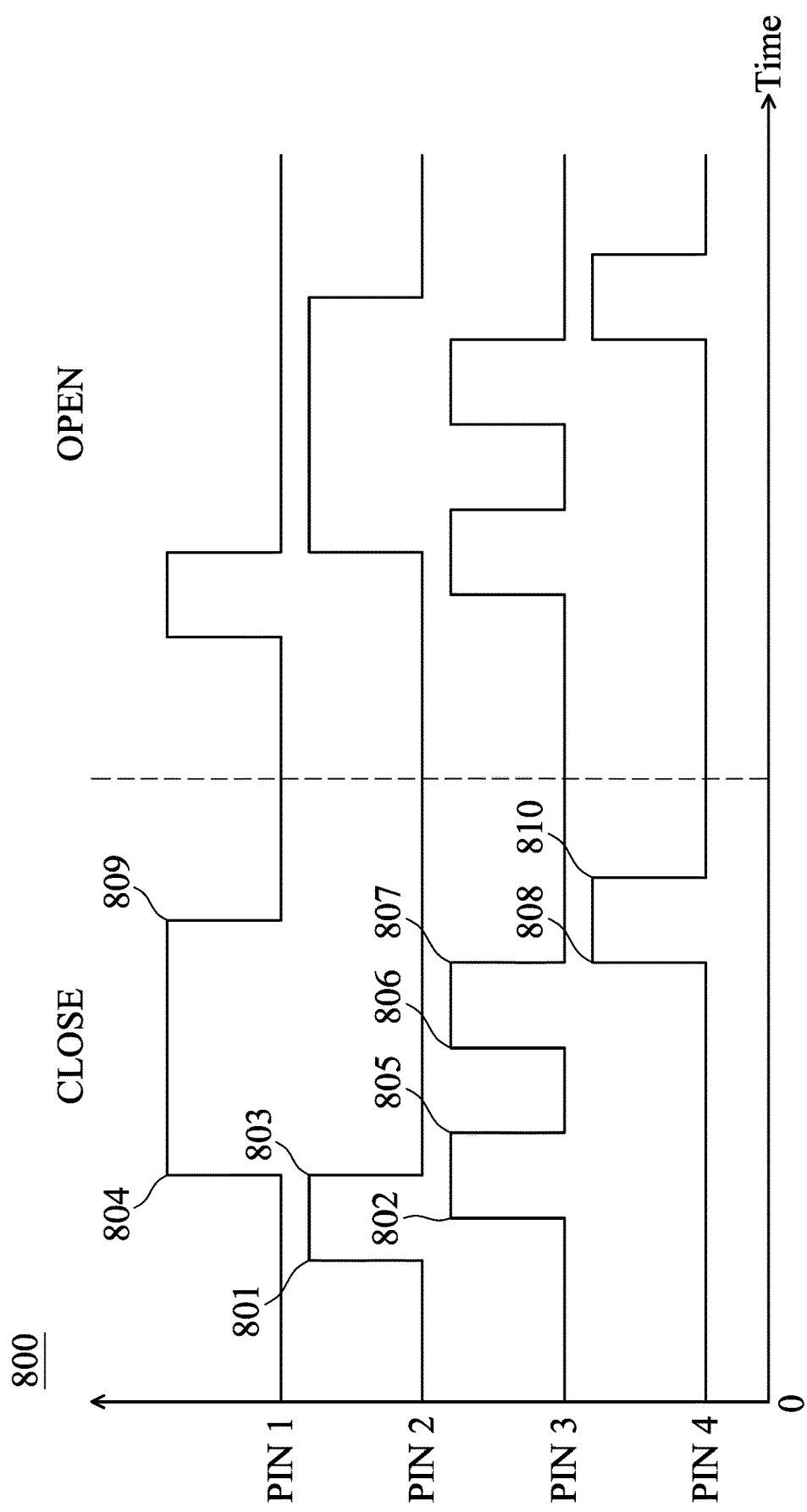
FIGS. 25 to 27 are schematic diagrams illustrating a control method of the optical member driving mechanism in accordance with some embodiment of the present disclosure.
Figure 26:
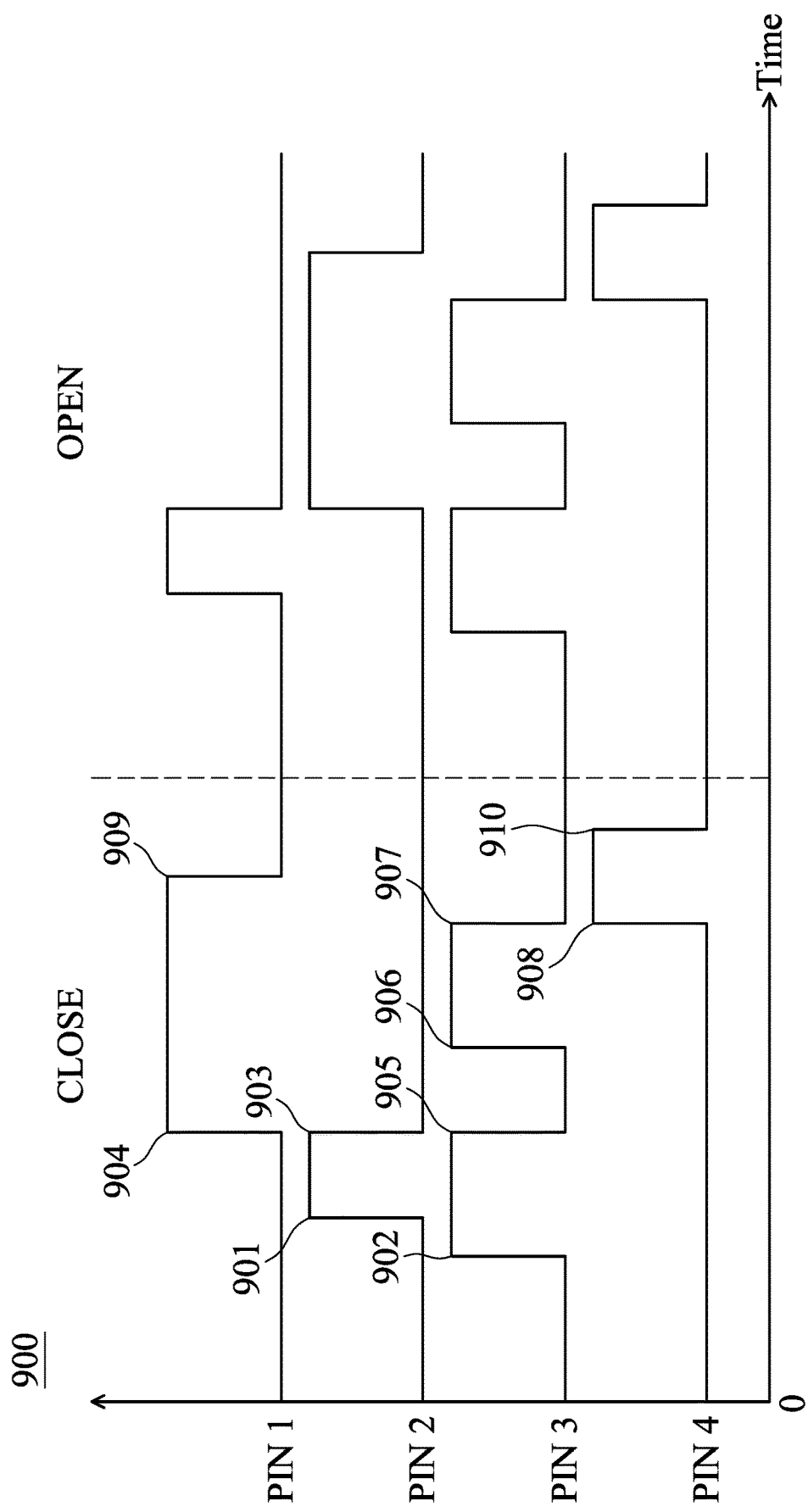
Figure 27:
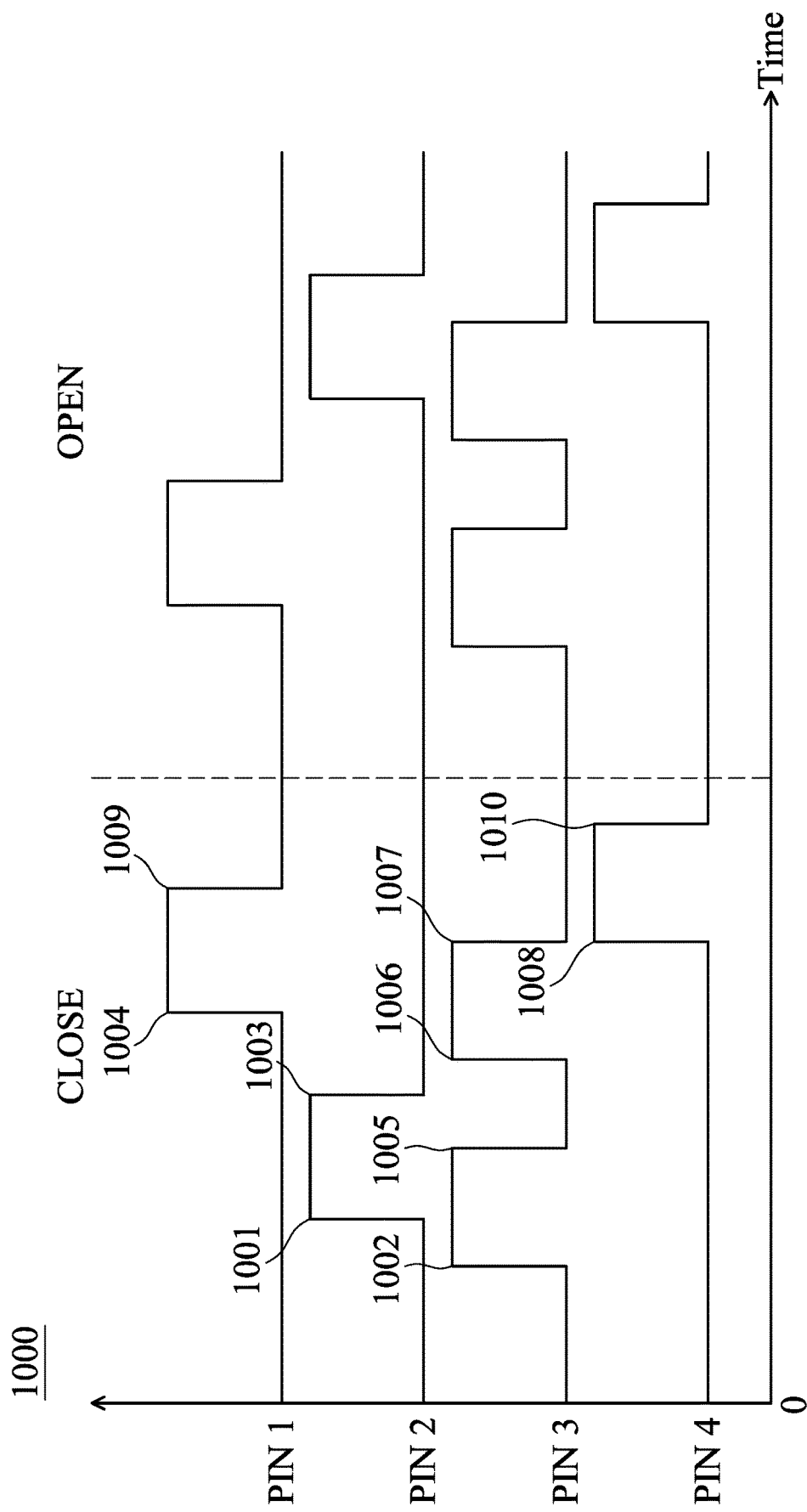

FIGS. 25-27 are schematic diagrams illustrating a control method of an optical member driving mechanism in accordance with some embodiments of the disclosure. Hereinafter, the control method of the optical member driving mechanism will be described with reference to the graph 2-800 shown in FIG. 25. In this embodiment, the vertical axis of the graph 2-800 represents different pins PIN1, PIN2, PIN3, and PIN4 of the control assembly (for example, the control assembly 2-330). It should be understood that the initial state of all pins PIN1, PIN2, PIN3, and PIN4 (that is, when the time is at 0) does not transmit any electrical signals, and a square wave is generated when electrical signals are transmitted.

Pins PIN1 and PIN2 are electrically connected to the first driving assembly 2-E3. The transmission of electrical signals to the pin PIN2 may make the optical member move in the first direction relative to the fixed portion, and the transmission of electrical signals to the pin PIN1 may make the optical member moves in the second direction relative to the fixed portion. In other words, the current directions of the electrical signals transmitted to the pins PIN1 and PIN2 are opposite. The pins PIN3 and PIN4 are electrically connected to the second driving assembly 2-E4. In some embodiments, transmitting electrical signals to the pin PIN3 may cause the second movable portion to move downward relative to the fixed portion, and transmitting electrical signals to the pin PIN4 may move the optical member upward relative to the fixed portion. The horizontal axis of graph 2-800 is a time axis. The charts 2-900 and 2-1000 shown in FIGS. 26 and 27 may also be interpreted in the above-mentioned manner, and will not be repeated herein.

In this embodiment, the control assembly starts to continuously output the first driving signal to the first driving assembly at the first time point 2-801, so as to generate a first driving force on the optical member so that the optical member is moved relative to the fixed portion in a first direction. The control assembly starts to continuously output the second driving signal to the second driving assembly at the second time point 2-802, so as to generate a second driving force on the second movable portion, and make the second movable portion away from the first engagement structure. In addition, the control assembly stops outputting the first driving signal to the first driving assembly at the third time point 2-803.

In some embodiments, the first time point 2-801 is different from the second time point 2-802. In some embodiments, the first time point 2-801 is earlier than the second time point 2-802, and the second time point 2-802 is between the first time point 2-801 and the third time point 2-803. In some embodiments, the interval between the first time point 2-801 and the second time point 2-802 is the same as the interval between the second time point 2-802 and the third time point 2-803. In some embodiments, the power of the first driving signal output by the control assembly at the first time point 2-801 and the second driving signal output by the control assembly at the second time point 2-802 are equal. With the above configuration, the optical member may be moved in the first direction relative to the fixed portion before the second driving assembly drives the second movable portion. In this way, it may be ensured that the second movable portion will not generate friction with the first engagement structure of the optical member, so that the second driving assembly may smoothly drive the second movable portion to move relative to the fixed portion.

Next, the control assembly starts to continuously output the third driving signal to the first driving assembly at the fourth time point 2-804 to generate a second driving force on the optical member, so that the optical member moves from the first position to the second position relative to the fixed portion in the second direction. In some embodiments, the third time point 2-803 may be equal to or earlier than the fourth time point 2-804. In some embodiments, the current direction of the first driving signal output by the control assembly at the first time point 2-801 and the current direction of the third driving signal output by the control assembly at the fourth time point 2-804 are opposite. In some embodiments, the power of the first driving signal and the power of the third driving signal are equal. In some embodiments, the directions of the first driving force and the second driving force are different. In some embodiments, the directions of the first driving force and the second driving force are opposite. In some embodiments, the first direction and the second direction are different. In some embodiments, the first direction and the second direction are parallel. In some embodiments, the first direction and the second direction are opposite. With the above configuration, after the second driving assembly drives the second movable portion, the optical member may be moved in the second direction relative to the fixed portion.

In addition, the control assembly stops outputting the second driving signal to the second driving assembly at the fifth time point 2-805. The control assembly starts to continuously output the second driving signal to the second driving assembly at the sixth time point 2-806. The control assembly stops outputting the second driving signal to the second driving assembly at the seventh time point 2-807. In this way, the energy loss may be saved as much as possible without affecting the movement of the optical member by the second movable portion.

In some embodiments, the fourth time point 2-804 is earlier than the fifth time point 2-805, the fifth time point 2-805 is earlier than the sixth time point 2-806, and the sixth time point 2-806 is earlier than the seventh time point 2-807. In other words, the fifth time point 2-805 is between the second time point 2-802 and the sixth time point 2-806, and the sixth time point 2-806 is between the fifth time point 2-805 and the seventh time point 2-807. In some embodiments, the interval between the first time point 2-801 and the third time point 2-803 is different from the interval between the second time point 2-802 and the seventh time point 2-807. In some embodiments, the interval between the first time point 2-801 and the third time point 2-803 is smaller than the interval between the second time point 2-802 and the seventh time point 2-807. In some embodiments, the sum of the intervals between the second time point 2-802, the fifth time point 2-805, and between the sixth time point 2-806, the seventh time point 2-807 is different from the interval between the fifth time point 2-805 and the sixth time point 2-806. In some embodiments, the sum of the intervals between the second time point 2-802, the fifth time point 2-805, and between the sixth time point 2-806, the seventh time point 2-807 is greater than the interval between the fifth time point 2-805 and the sixth time point 2-806.

In addition, in some embodiments, the control assembly may optionally start to continuously output the fourth driving signal to the second driving assembly at the eighth time point 2-808 to generate the fourth driving force to the second movable portion, so that the second movable portion approaches to the second engagement structure. The control assembly stops outputting the third driving signal to the first driving assembly at the ninth time point 2-809. The control assembly stops outputting the fourth driving signal to the second driving assembly at the tenth time point 2-810. In this way, after the optical member reaches the second position, the optical member may be fixed at the second position relative to the fixed portion through the second movable portion. In other embodiments, the control assembly may not output the fourth driving signal to the second driving assembly, and the second movable portion may actively approach the second engagement structure.

In some embodiments, the seventh time point 2-807 is equal to or earlier than the eighth time point 2-808, and the seventh time point 2-807 is earlier than the ninth time point 2-809. In some embodiments, the eighth time point 2-808 is earlier than the ninth time point 2-809, and the ninth time point 2-809 is earlier than the tenth time point 2-810. In some embodiments, the interval between the eighth time point 2-808 and the ninth time point 2-809 is the same as the interval between the ninth time point 2-809 and the tenth time point 2-810. In some embodiments, The interval between the first time point 2-801 and the third time point 2-803 is the same as the interval between the eighth time point 2-808 and the tenth time point 2-810, and The interval between the second time point 2-802 and the seventh time point 2-807 is the same as the interval between the fourth time point 2-804 and the ninth time point 2-809.

It should be understood that the above description exemplarily illustrates the process of moving the optical member from the first position to the second position. To move the optical member from the second position to the first position, the above steps may be performed reversely, which will not be repeated herein.

According to the graph 2-900 shown in FIG. 26, in this embodiment, the control assembly starts to continuously output the first driving signal to the first driving assembly at the first time point 2-901, so as to generate the first driving signal for the optical member. A driving force causes the optical member to move in a first direction relative to the fixed portion. The control assembly starts to continuously output the second driving signal to the second driving assembly at the second time point 2-902, so as to generate a second driving force on the second movable portion, and make the second movable portion away from the first engagement structure. In addition, the control assembly stops outputting the first driving signal to the first driving assembly at the third time point 2-903.

In some embodiments, the first time point 2-901 is different from the second time point 2-902. In this embodiment, the second time point 2-902 is earlier than the first time point 2-901, and the first time point 2-901 is between the second time point 2-902 and the third time point 2-903. In some embodiments, the interval between the first time point 2-901 and the second time point 2-902 is the same as the interval between the first time point 2-901 and the third time point 2-903. In some embodiments, the power of the first driving signal output by the control assembly at the first time point 2-901 and the second driving signal output by the control assembly at the second time point 2-902 are equal. With the above configuration, the optical member may move in the first direction before moving in the second direction relative to the fixed portion. In this way, it may be ensured that the second movable portion will not generate friction with the first engagement structure of the optical member, so that the second driving assembly may smoothly drive the second movable portion to move relative to the fixed portion.

Next, the control assembly starts to continuously output the third driving signal to the first driving assembly at the fourth time point 2-904 to generate a second driving force on the optical member, so that the optical member moves from the first position to the second position relative to the fixed portion in the second direction. In some embodiments, the third time point 2-903 may be equal to or earlier than the fourth time point 2-904. In some embodiments, the current direction of the first driving signal output by the control assembly at the first time point 2-901 and the current direction of the third driving signal output by the control assembly at the fourth time point 2-904 are opposite. In some embodiments, the power of the first driving signal and the power of the third driving signal are equal. In some embodiments, the directions of the first driving force and the second driving force are different. In some embodiments, the directions of the first driving force and the second driving force are opposite. In some embodiments, the first direction and the second direction are different. In some embodiments, the first direction and the second direction are parallel. In some embodiments, the first direction and the second direction are opposite. With the above configuration, after the second driving assembly drives the second movable portion, the optical member may be moved in the second direction relative to the fixed portion.

In addition, the control assembly stops outputting the second driving signal to the second driving assembly at the fifth time point 2-905. The control assembly starts to continuously output the second driving signal to the second driving assembly at the sixth time point 2-906. The control assembly stops outputting the second driving signal to the second driving assembly at the seventh time point 2-907. In this way, the energy loss may be saved as much as possible under the condition that the second movable portion does not affect the movement of the optical member. In some embodiments, the fourth time point 2-904 is earlier than the fifth time point 2-905, the fifth time point 2-905 is earlier than the sixth time point 2-906, and the sixth time point 2-906 is earlier than the seventh time point 2-907.

In addition, in some embodiments, the control assembly may optionally start to continuously output the fourth driving signal to the second driving assembly at the eighth time point 2-908 to generate the fourth driving force to the second movable portion, so that the second movable portion is close to the second engagement structure. The control assembly stops outputting the third driving signal to the first driving assembly at the ninth time point 2-909. The control assembly stops outputting the fourth driving signal to the second driving assembly at the tenth time point 2-910. In this way, after the optical member reaches the second position, the optical member may be fixed at the second position relative to the fixed portion through the second movable portion. In other embodiments, the control assembly may not output the fourth driving signal to the second driving assembly, and the second movable portion may actively approach the second engagement structure.

In some embodiments, the seventh time point 2-907 is equal to or earlier than the eighth time point 2-908, and the seventh time point 2-907 is earlier than the ninth time point 2-909. In some embodiments, the eighth time point 2-908 is earlier than the ninth time point 2-909, and the ninth time point 2-909 is earlier than the tenth time point 2-910. It should be understood that the above description exemplarily illustrates the process of moving the optical member from the first position to the second position. To move the optical member from the second position to the first position, the above steps may be performed reversely, which will not be repeated herein.

According to the graph 2-1000 shown in FIG. 27, in this embodiment, the control assembly starts to continuously output the first driving signal to the first driving assembly at the first time point 2-1001, so as to generate the first driving signal for the optical member A driving force makes the optical member move in a first direction relative to the fixed portion. The control assembly starts to continuously output the second driving signal to the second driving assembly at the second time point 2-1002, so as to generate a second driving force on the second movable portion, and make the second movable portion away from the first engagement structure. In addition, the control assembly stops outputting the first driving signal to the first driving assembly at the third time point 2-1003.

In some embodiments, the first time point 2-1001 is different from the second time point 2-1002. In this embodiment, the second time point 2-1002 is earlier than the first time point 2-1001, and the first time point 2-1001 is between the second time point 2-1002 and the third time point 2-1003. In some embodiments, the power of the first driving signal output by the control assembly at the first time point 2-1001 and the power of the second driving signal output by the control assembly at the second time point 2-1002 are equal. With the above configuration, the optical member may move in the first direction before moving in the second direction relative to the fixed portion. In this way, it may be ensured that the second movable portion will not generate friction with the first engagement structure of the optical member, so that the second driving assembly may smoothly drive the second movable portion to move relative to the fixed portion.

Then, the control assembly starts to continuously output the third driving signal to the first driving assembly at the fourth time point 2-1004 to generate a second driving force on the optical member, so that the optical member moves from the first position to the second position relative to the fixed portion in the second direction. In some embodiments, the third time point 2-1003 may be earlier than the fourth time point 2-1004. In some embodiments, the current direction of the first driving signal output by the control assembly at the first time point 2-1001 and the current direction of the third driving signal output by the control assembly at the fourth time point 2-1004 are opposite. In some embodiments, the power of the first driving signal and the power of the third driving signal are equal. In some embodiments, the directions of the first driving force and the second driving force are different. In some embodiments, the directions of the first driving force and the second driving force are opposite. In some embodiments, the first direction and the second direction are different. In some embodiments, the first direction and the second direction are parallel. In some embodiments, the first direction and the second direction are opposite. With the above configuration, after the second driving assembly drives the second movable portion, the optical member may be moved in the second direction relative to the fixed portion.

In addition, the control assembly stops outputting the second driving signal to the second driving assembly at the fifth time point 2-1005. The control assembly starts to continuously output the second driving signal to the second driving assembly at the sixth time point 2-1006. The control assembly stops outputting the second driving signal to the second driving assembly at the seventh time point 2-1007. In this way, the energy loss may be saved as much as possible under the condition that the second movable portion does not affect the movement of the optical member. In some embodiments, the fifth time point 2-1005 is earlier than the sixth time point 2-1006, the sixth time point 2-1006 is earlier than the seventh time point 2-1007, and the fourth time point 2-1004 is between the sixth time point 2-1006 and the seventh time point 2-1007.

In addition, in some embodiments, the control assembly may optionally start to continuously output the fourth driving signal to the second driving assembly at the eighth time point 2-1008 to generate the fourth driving force to the second movable portion, so that the second movable portion is close to the second engagement structure. The control assembly stops outputting the third driving signal to the first driving assembly at the ninth time point 2-1009. The control assembly stops outputting the fourth driving signal to the second driving assembly at the tenth time point 2-1010. In this way, after the optical member reaches the second position, the optical member may be fixed at the second position relative to the fixed portion through the second movable portion. In other embodiments, the control assembly may not output the fourth driving signal to the second driving assembly, and the second movable portion may actively approach the second engagement structure.

In some embodiments, the seventh time point 2-1007 is equal to or earlier than the eighth time point 2-1008, and the seventh time point 2-1007 is earlier than the ninth time point 2-1009. In some embodiments, the eighth time point 2-1008 is earlier than the ninth time point 2-1009, and the ninth time point 2-1009 is earlier than the tenth time point 2-1010. It should be understood that the above description exemplarily illustrates the process of moving the optical member from the first position to the second position. To move the optical member from the second position to the first position, the above steps may be performed reversely, which will not be repeated herein.

In summary, the embodiments of the present disclosure provide a method for controlling an optical member driving mechanism that moves an optical member from a first position to a second position. Before moving the optical member relative to the fixed portion from the first position to the second position in the second direction, the optical member is moved in the opposite first direction. In this way, before the second driving assembly drives the second movable portion, it may be ensured that the second movable portion will not generate friction with the first engagement structure of the optical member, so that the second driving assembly may smoothly drive the second movable portion to move relative to the fixed portion, which may help to reduce the probability of failure of the optical member drive mechanism.

Third Embodiment

Figure 28:
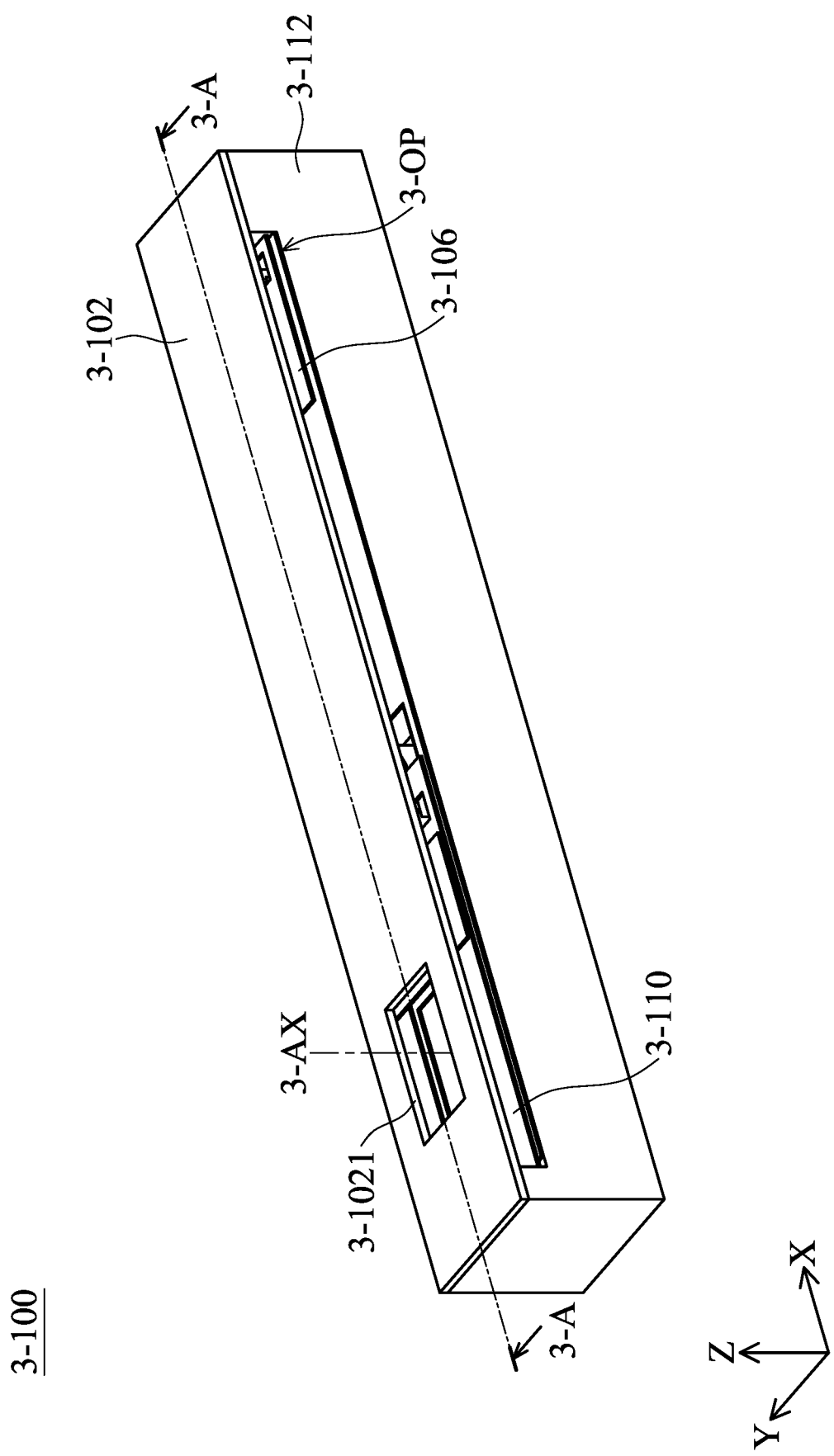
FIG. 28 is a schematic diagram of an optical element driving mechanism 3-100 according to an embodiment of the present disclosure.
Figure 29:
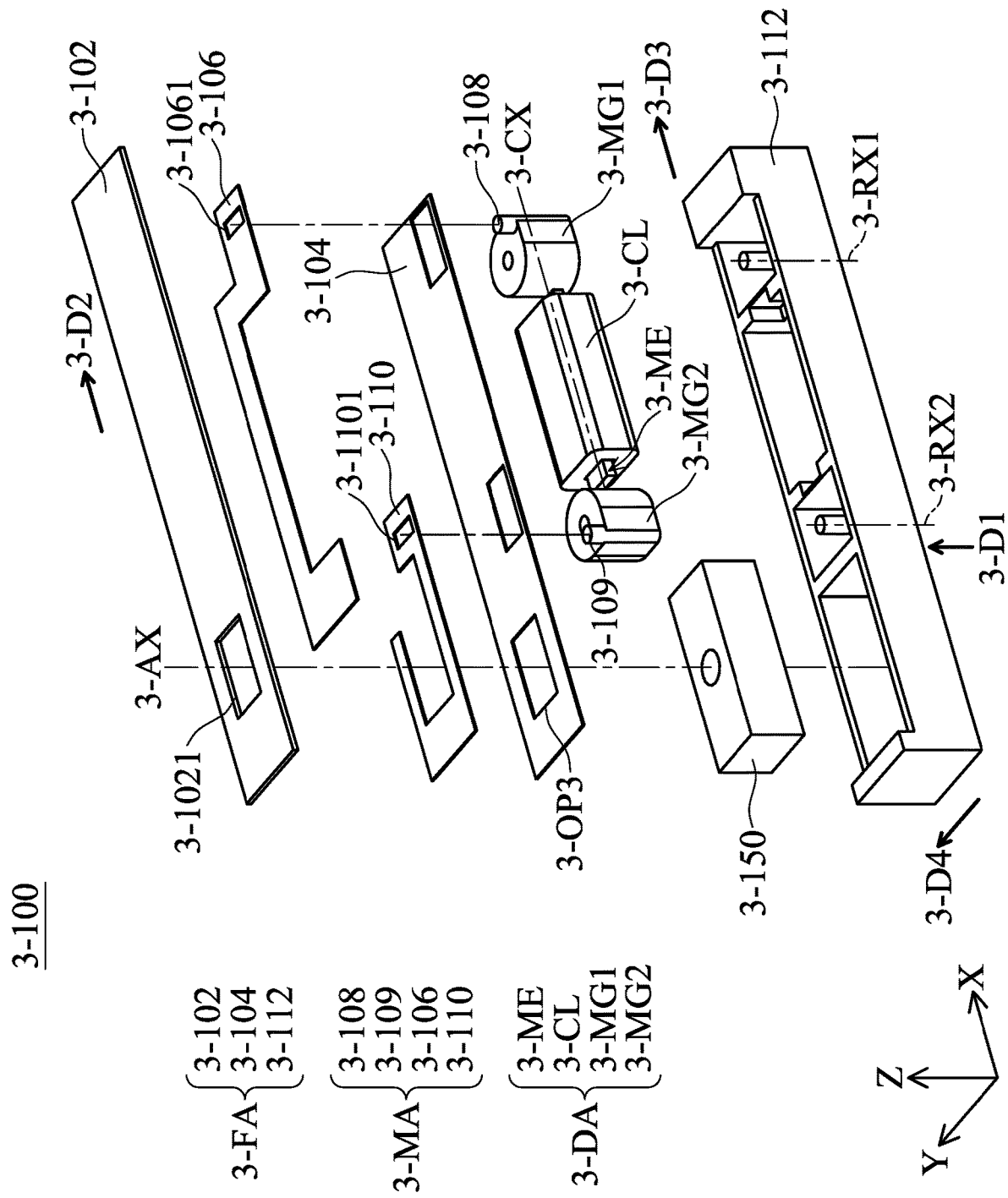
FIG. 29 is an exploded diagram of the optical element driving mechanism 3-100 according to the embodiment of the present disclosure.
Figure 30:
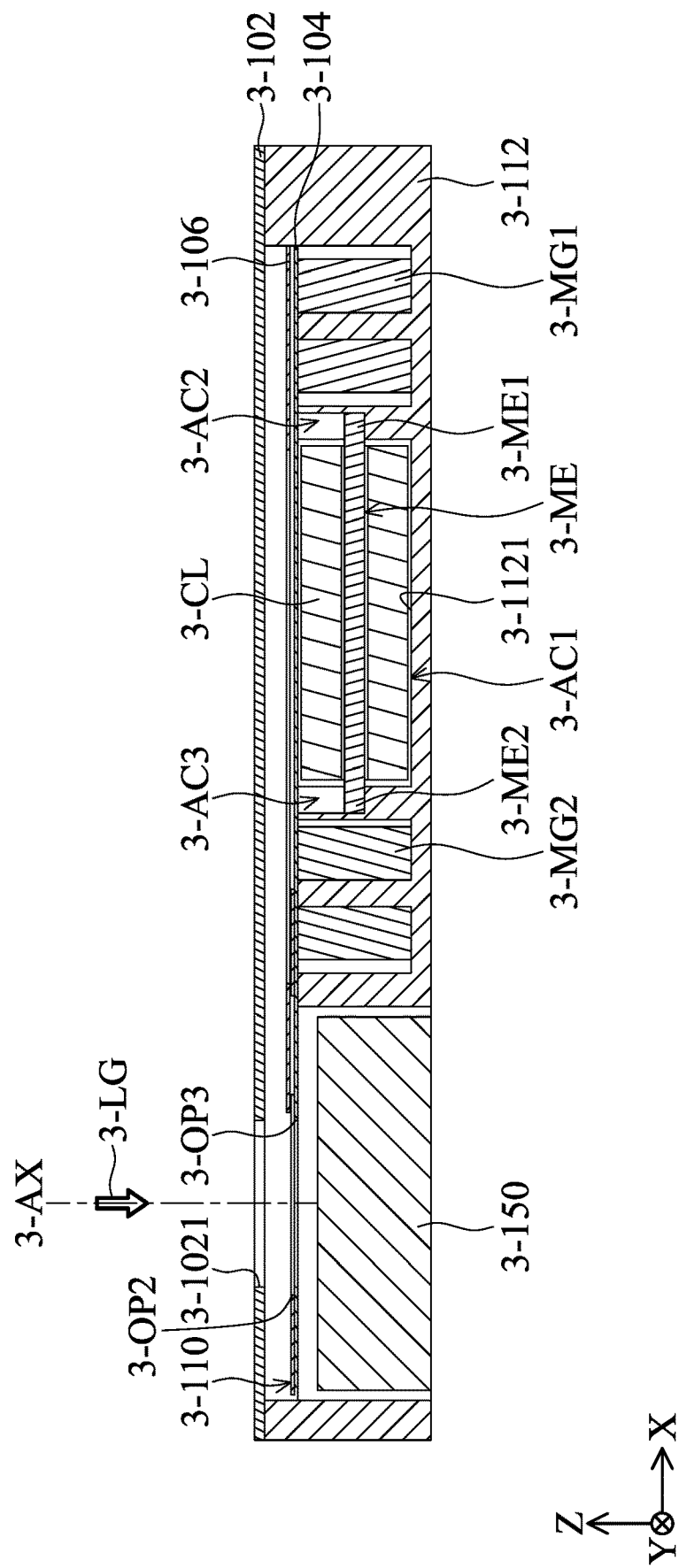
FIG. 30 shows a cross-sectional view along line 3-A-3-A in FIG. 28 according to the embodiment of the present disclosure.

Please refer to FIG. 28 to FIG. 30. FIG. 28 is a schematic diagram of an optical element driving mechanism 3-100 according to an embodiment of the present disclosure, FIG. 29 is an exploded diagram of the optical element driving mechanism 3-100 according to the embodiment of the present disclosure, and FIG. 30 shows a cross-sectional view along line 3-A-3-A in FIG. 28 according to the embodiment of the present disclosure. The optical element driving mechanism 3-100 can be an optical camera system and can be configured to hold and drive an optical element. The optical element driving mechanism 3-100 can be installed in different electronic devices or portable electronic devices, such as a smartphone or a tablet computer, for allowing a user to perform the image capturing function.

In this embodiment, the optical element driving mechanism 3-100 may include a fixed assembly 3-FA, a movable assembly 3-MA, and a driving assembly 3-DA. The movable assembly 3-MA is movably connected to the fixed assembly 3-FA. The driving assembly 3-DA is configured to drive the movable assembly 3-MA to move relative to the fixed assembly 3-FA.

In this embodiment, as shown in FIG. 29, the fixed assembly 3-FA includes a covering body 3-102, a partition 3-104 and a base 3-112. The movable assembly 3-MA includes a first movable part 3-108, a second movable part 3-109, a first light-quantity adjustment element 3-106, and a second light-quantity adjustment element 3-110.

The covering body 3-102 is fixedly disposed on the base 3-112 to accommodate the movable assembly 3-MA and the driving assembly 3-DA, and the partition 3-104 is disposed between the covering body 3-102 and the base 3-112.

As shown in FIG. 29, the aforementioned covering body 3-102 has a first opening 3-1021, and a photosensitive module 3-150 (an optical module) is accommodated by the base 3-112. The external light can travel along a main axis 3-AX, enter the base 3-112 through the first opening 3-102, and then be received by the aforementioned photosensitive module 3-150 so as to generate a digital image signal.

The first movable part 3-108 is configured to be connected to the first light-quantity adjustment element 3-106, the second movable part 3-109 is configured to be connected to the second light-quantity adjustment element 3-110, and the driving assembly 3-DA is configured to drive the first movable part 3-108 and the second movable part 3-109 to move relative to the fixed assembly 3-FA.

In this embodiment, the driving assembly 3-DA may include a magnetic conductive element 3-ME, a coil 3-CL, a first magnetic element 3-MG1, and a second magnetic element 3-MG2. The magnetic conductive element 3-ME can be, for example, an iron core, and the coil 3-CL corresponds to the magnetic conductive element 3-ME.

Furthermore, the first magnetic element 3-MG1 corresponds to the coil 3-CL to generate a first driving force, and the second magnetic element 3-MG2 corresponds to the coil 3-CL to generate a second driving force. It is worth noting that in this embodiment, the first magnetic element 3-MG1 and the first movable part 3-108 are integrally formed in one piece, and the second magnetic element 3-MG2 and the second movable part 3-109 are integrally formed in one piece.

As shown in FIG. 28, when the covering body 3-102 is affixed to the base 3-112, an opening 3-OP is formed at both sides of the fixed assembly 3-FA. Therefore, when viewed in a direction (for example, the Y axis) perpendicular to the main axis 3-AX, at least a portion of the first light-quantity adjustment element 3-106 is exposed by the fixed assembly 3-FA, and at least a portion of the second light-quantity adjustment element 3-110 is exposed by the fixed assembly 3-FA.

Furthermore, as shown in FIG. 30, the partition 3-104 is located between the first light-quantity adjustment element 3-106 and the driving assembly 3-DA, and the partition 3-104 is located between the second light-quantity adjustment element 3-110 and the driving assembly 3-DA. It is worth noting that the partition 3-104, the first light-quantity adjustment element 3-106 and the second light-quantity adjustment element 3-110 are made of the same material.

Figure 31:
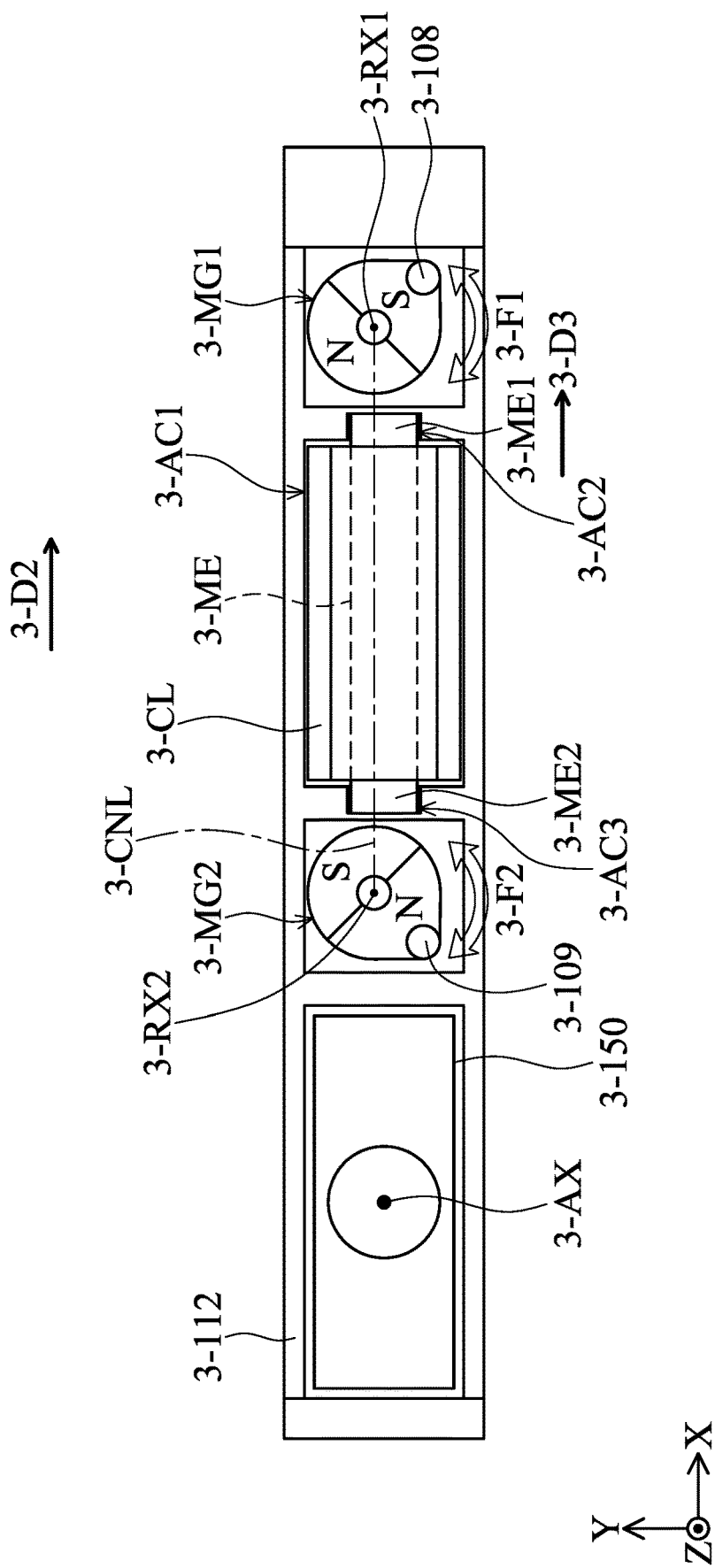
FIG. 31 is a top view of a partial structure of the optical element driving mechanism 3-100 according to an embodiment of the present disclosure.

Please refer to FIG. 29 to FIG. 31. FIG. 31 is a top view of a partial structure of the optical element driving mechanism 3-100 according to an embodiment of the present disclosure. In this embodiment, the driving assembly 3-DA is configured to drive the first movable part 3-108 to move in a first dimension relative to the fixed assembly 3-FA and the second movable part 3-109. Movement in the first dimension may be rotation around a first rotating axis 3-RX1.

Similarly, the driving assembly 3-DA is configured to drive the second movable part 3-109 to move relative to the fixed assembly 3-FA and the first movable part 3-108 in a second dimension. Movement in the second dimension may be rotation around a second rotating axis 3-RX2. The first rotation axis 3-RX1 is parallel to a first direction 3-D1, the second rotation axis 3-RX2 is parallel to the first direction 3-D1, and the first direction 3-D1 is parallel to the main axis 3-AX.

Specifically, the driving assembly 3-DA is configured to generate a first driving force 3-F1 to drive the first movable part 3-108, and the driving assembly 3-DA is configured to generate a second driving force 3-F2 to drive the second movable part 3-109. The first driving force 3-F1 is different from the second driving force 3-F2. For example, the direction of the first driving force 3-F1 is opposite to the direction of the second driving force 3-F2, and the first driving force 3-F1 and the second driving force 3-F2 can be linear force or rotational torque.

As shown in FIG. 29, the first movable part 3-108 and the second movable part 3-109 may be protrusions (a first protrusion and a second protrusion), respectively. The first light-quantity adjustment element 3-106 has a first engaging portion 3-1061, corresponding to the first movable part 3-108 (the first protrusion), so that the first movable part 3-108 passes through the first engaging portion 3-1061. Similarly, the second light-quantity adjustment element 3-110 has a second engaging portion 3-1101 so that the second movable part 3-109 (the second protrusion) passes through the second engaging portion 3-1101.

When the first movable part 3-108 moves in the first dimension, the first light-quantity adjustment element 3-106 is driven by the first movable part 3-108 to move in a third dimension relative to the fixed assembly 3-FA. Similarly, when the second movable part 3-109 moves in the second dimension, the second light-quantity adjustment element 3-110 is driven by the second movable part 3-109 to move in the third dimension relative to the fixed assembly 3-FA.

The movement in the third dimension includes movement in a second direction 3-D2. The second direction 3-D2 is not parallel to the first direction 3-D1. Specifically, the second direction 3-D2 is perpendicular to the first direction 3-D1.

It is worth noting that when the driving assembly 3-DA drives the first movable part 3-108 to move relative to the fixed assembly 3-FA, the driving assembly 3-DA drives the second movable part 3-109 to move relative to the fixed assembly 3-FA at the same time. In other words, the driving assembly 3-DA cannot individually drive the first movable part 3-108 or the second movable part 3-109 to move relative to the fixed assembly 3-FA.

Furthermore, as shown in FIG. 29, in the second direction 3-D2, the maximum size of the first light-quantity adjustment element 3-106 is different from the maximum size of the second light-quantity adjustment element 3-110. Specifically, in the second direction 3-D2, the maximum size of the first light-quantity adjustment element 3-106 is greater than the maximum size of the second light-quantity adjustment element 3-110.

In addition, the first movable part 3-108 (the first protrusion) extends in the first direction 3-D1, and the first engaging portion 3-1061 has a long strip-shaped structure. Specifically, the first engaging portion 3-1061 has a hollow structure, and the first engaging portion 3-1061 extends in a direction that is not parallel to the first direction 3-D1. For example, the first engaging portion 3-1061 extends in a direction perpendicular to the first direction 3-D1, such as along the X-axis.

In addition, as shown in FIG. 29 and FIG. 31, the magnetic conductive element 3-ME has a long strip-shaped structure and extends in a third direction 3-D3. The third direction 3-D3 is parallel to the second direction 3-D2.

The coil 3-CL is wound on the magnetic conductive element 3-ME, and a winding axis 3-CX of the coils 3-CL is parallel to the third direction 3-D3. When viewed in a direction perpendicular to the third direction 3-D3 (such as in the first direction 3-D1), as shown in FIG. 31, a first end 3-ME1 of the magnetic conductive element 3-ME protrudes from the coil 3-CL, and a second end 3-ME2 of the magnetic conductive element 3-ME protrudes from the coil 3-CL.

Furthermore, as shown in FIG. 31, the N pole of the first magnetic element 3-MG1 is closer to the coil 3-CL than the S pole of the first magnetic element 3-MG1. The S pole of the second magnetic element 3-MG2 is closer to the coil 3-CL than the N pole of the second magnetic element 3-MG2.

A center connection line 3-CNL of the first magnetic element 3-MG1 and the second magnetic element 3-MG2 is parallel to the third direction 3-D3. When viewed in a direction perpendicular to the third direction 3-D3 (such as in the first direction 3-D1), the coil 3-CL is located between the first magnetic element 3-MG1 and the second magnetic element 3-MG2. In addition, when viewed in the third direction 3-D3, the first magnetic element 3-MG1 overlaps at least a portion of the coil 3-CL.

Next, as shown in FIG. 30 and FIG. 31, the base 3-112 of the fixed assembly 3-FA has a first receiving portion 3-AC1 configured to receive the coil 3-CL. The base 3-112 of the fixed assembly 3-FA also has a second receiving portion 3-AC2 configured to receive the first end 3-ME1. The base 3-112 of the fixed assembly 3-FA further has a third receiving portion 3-AC3 configured to receive the second end 3-ME2. As shown in FIG. 31, when viewed along the main axis 3-AX, the first receiving portion 3-AC1 is located between the second receiving portion 3-AC2 and the third receiving portion 3-AC3.

As shown in FIG. 30, in the main axis 3-AX, the maximum size of the first receiving portion 3-AC1 is larger than the maximum size of the second receiving portion 3-AC2. It is worth noting that the coil 3-CL does not contact a first surface 3-1121 of the first receiving portion 3-AC1. The first surface 3-1121 is not parallel to the main axis 3-AX. Specifically, the first surface 3-1121 is perpendicular to the main axis 3-AX. In addition, the first end 3-ME1 and the second end 3-ME2 are in direct contact with the base 3-112 of the fixed assembly 3-FA to support the coil 3-CL above the first surface 3-1121.

Figure 32:
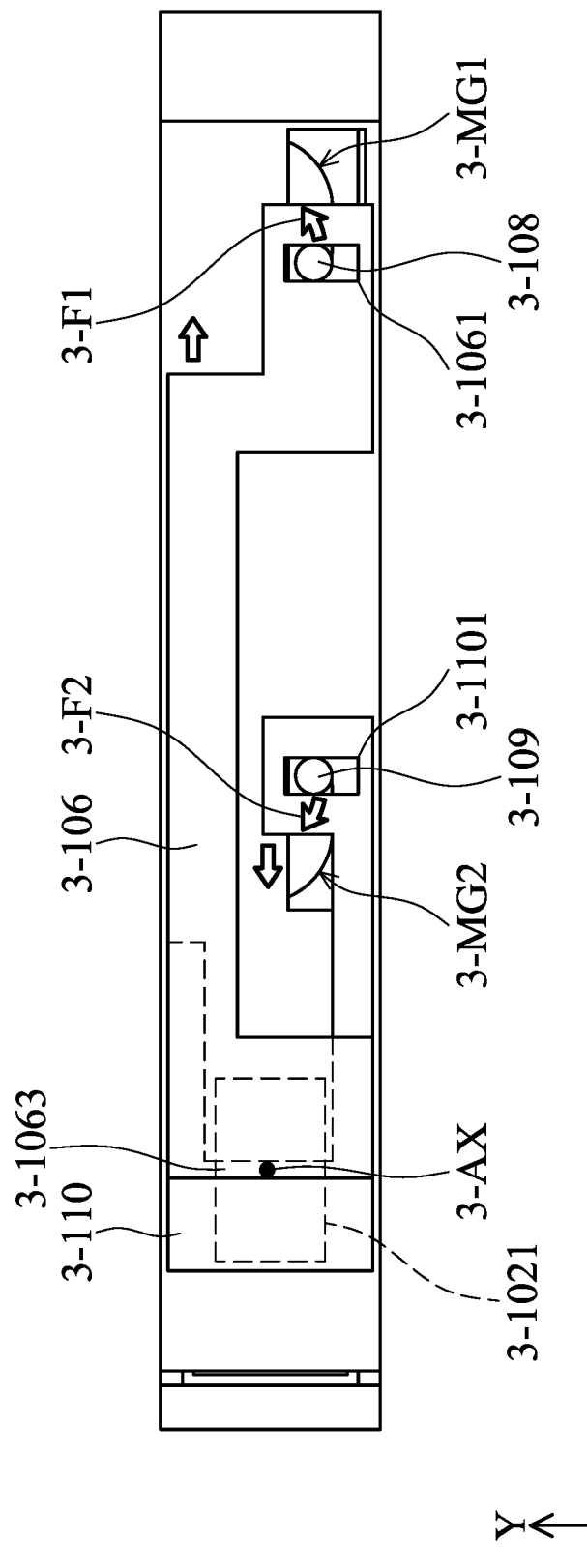
FIG. 32 is a top view of the optical element driving mechanism 3-100 according to an embodiment of the present disclosure.

Please refer to FIG. 32, which is a top view of the optical element driving mechanism 3-100 according to an embodiment of the present disclosure. For the sake of clarity, the covering body 3-102 in FIG. 32 is omitted, and the first opening 3-1021 is represented by a dashed line. In this embodiment, as shown in FIG. 32, when the first light-quantity adjustment element 3-106 is located in a first extreme position relative to the base 3-112 of the fixed assembly 3-FA, the second light-quantity adjustment element 3-110 is located in a second extreme position relative to the base 3-112 of the fixed assembly 3-FA.

When the first light-quantity adjustment element 3-106 is located in the first extreme position in FIG. 32, and when viewed along the main axis 3-AX, a first overlapping portion 3-1063 of the first light-quantity adjustment elements 3-106 overlaps the second light-quantity adjustment element 3-110.

In addition, when the first light-quantity adjustment element 3-106 is located in the first extreme position, and when viewed along the main axis 3-AX, the first overlapping portion 3-1063 is exposed from the first opening 3-1021. Furthermore, when the first light-quantity adjustment element 3-106 is located in the first extreme position, and when viewed along the main axis 3-AX, as shown in FIG. 32, the first light-quantity adjustment element 3-106 and the second light-quantity adjustment element 3-110 completely shield the first opening 3-102. Completely shielding the first opening 3-1021 means that the first light-quantity adjustment element 3-106 and the second light-quantity adjustment element 3-110 completely block the light from entering through the first opening 3-1021, so as to prevent the light from being received by the photosensitive module 3-150.

Figure 33:
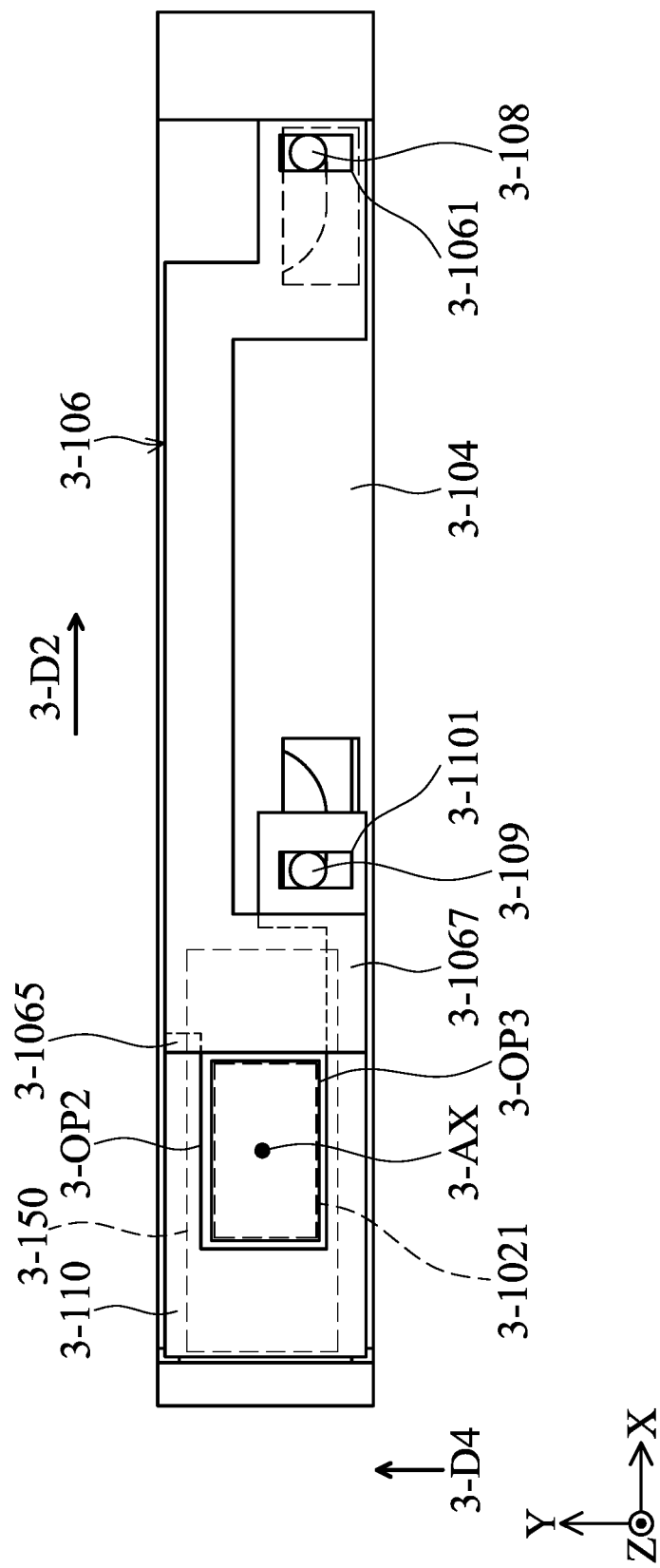
FIG. 33 is a top view of the first opening 3-1021 not being shielded according to an embodiment of the present disclosure.

Please refer to FIG. 32 and FIG. 33. FIG. 33 is a top view of the first opening 3-1021 not being shielded according to an embodiment of the present disclosure. In this embodiment, when the first light-quantity adjustment element 3-106 moves from the first extreme position in FIG. 32 to a third extreme position in FIG. 33 relative to the base 3-112 of the fixed assembly 3-FA, the second light-quantity adjustment element 3-110 moves from the second extreme position to a fourth extreme position relative to the base 3-112 of the fixed assembly 3-FA.

When the first light-quantity adjustment element 3-106 is located in the third extreme position, and when viewed along the main axis 3-AX, the first light-quantity adjustment element 3-106 overlaps at least a portion of the second light-quantity adjustment element 3-110. Specifically, when the first light-quantity adjustment element 3-106 is located in the third extreme position, and when viewed along the main axis 3-AX, a second overlapping portion 3-1065 and a third overlapping portion 3-1067 of the first light-quantity adjustment elements 3-106 overlap the second light-quantity adjustment element 3-110.

Furthermore, as shown in FIG. 33, when the first light-quantity adjustment element 3-106 is located in the third extreme position, the first light-quantity adjustment element 3-106 and the second light-quantity adjustment element 3-110 form a second opening 3-OP2. As shown in FIG. 33, when viewed along the main axis 3-AX, the second overlapping portion 3-1065 and the third overlapping portion 3-1067 are located on both sides (the upper and lower sides) of the second opening 3-OP2.

Furthermore, when viewed along the main axis 3-AX, the second opening 3-OP2 has a polygonal structure. Specifically, as shown in FIG. 33, when viewed along the main axis 3-AX, the second opening 3-OP2 has a non-square rectangular structure.

Please continue to refer to FIG. 29, FIG. 30 and FIG. 33. As shown in FIG. 33, when viewed along the main axis 3-AX, the first opening 3-1021 does not overlap the first light-quantity adjustment element 3-106 and the second light-quantity adjustment element 3-110 at all.

Furthermore, as shown in FIG. 30, the partition 3-104 of the fixed assembly 3-FA further includes a third opening 3-OP3, and in the main axis 3-AX, the second opening 3-OP2 is located between the first opening 3-1021 and the third opening 3-OP3.

As shown in FIG. 30 and FIG. 33, in a fourth direction 3-D4 perpendicular to the main axis 3-AX, the maximum size of the first opening 3-1021 is substantially equal to the maximum size of the third opening 3-OP3, but it is not limited thereto. In other embodiments, the maximum size of the first opening 3-1021 may be greater than the maximum size of the third opening 3-OP3.

In addition, in the fourth direction 3-D4, the maximum size of the second opening 3-OP2 is greater than the maximum size of the first opening 3-1021. In the fourth direction 3-D4, the maximum size of the second opening 3-OP2 is greater than the maximum size of the third opening 3-OP3.

As shown in FIG. 30, light 3-LG passes through the first opening 3-1021, the second opening 3-OP2, and the third opening 3-OP3 to reach the photosensitive module 3-150 (the optical module). The photosensitive module 3-150 (the optical module) is configured to receive light 3-LG to output an image information. As shown in FIG. 30, the third opening 3-OP3 is closer to the photosensitive module 3-150 (the optical module) than the first opening 3-1021.

In addition, in the second direction 3-D2, the maximum size of the fixed assembly 3-FA is greater than the maximum size of the photosensitive module 3-150. For example, in the second direction 3-D2, the maximum size of the fixed assembly 3-FA is at least twice that of the photosensitive module 3-150 (the optical module).

It should be noted that when the driving assembly 3-FA does not drive the first movable part 3-108 to move relative to the fixed assembly 3-FA, there is a first force (magnetic attraction force) between the magnetic conductive element 3-ME and the first magnetic element 3-MG1, so that the first light-quantity adjustment element 3-106 is located in the first extreme position or the third extreme position relative to the fixed assembly 3-FA via the first force.

The present disclosure provides an optical element driving mechanism, including a first movable part, a fixed assembly, and a driving assembly. The first movable part is configured to be connected to a first light-quantity adjustment element. The first movable part is movable relative to the fixed assembly. The driving assembly is configured to drive the first movable part to move relative to the fixed assembly. The fixed assembly includes a first opening corresponding to light traveling along the main axis. The first light-quantity adjustment element movably shields or does not shield the first opening. Therefore, the photosensitive module can be prevented from being exposed at the first opening. The safety of the photosensitive module when not in use can be improved. The first light-quantity adjustment element can serve as the shutter of the photosensitive module.

In addition, the optical element driving mechanism can be miniaturized through a special space configuration, and the special combination of different materials for the elements can achieve lightweight, and at the same time, it can strengthen the overall mechanical strength. Furthermore, the special configuration of the light-quantity adjustment elements can ensure that when the optical element driving mechanism is subject to a strong impact, the first opening can still be shielded to ensure the privacy of information.

Fourth Embodiment

Figure 34:
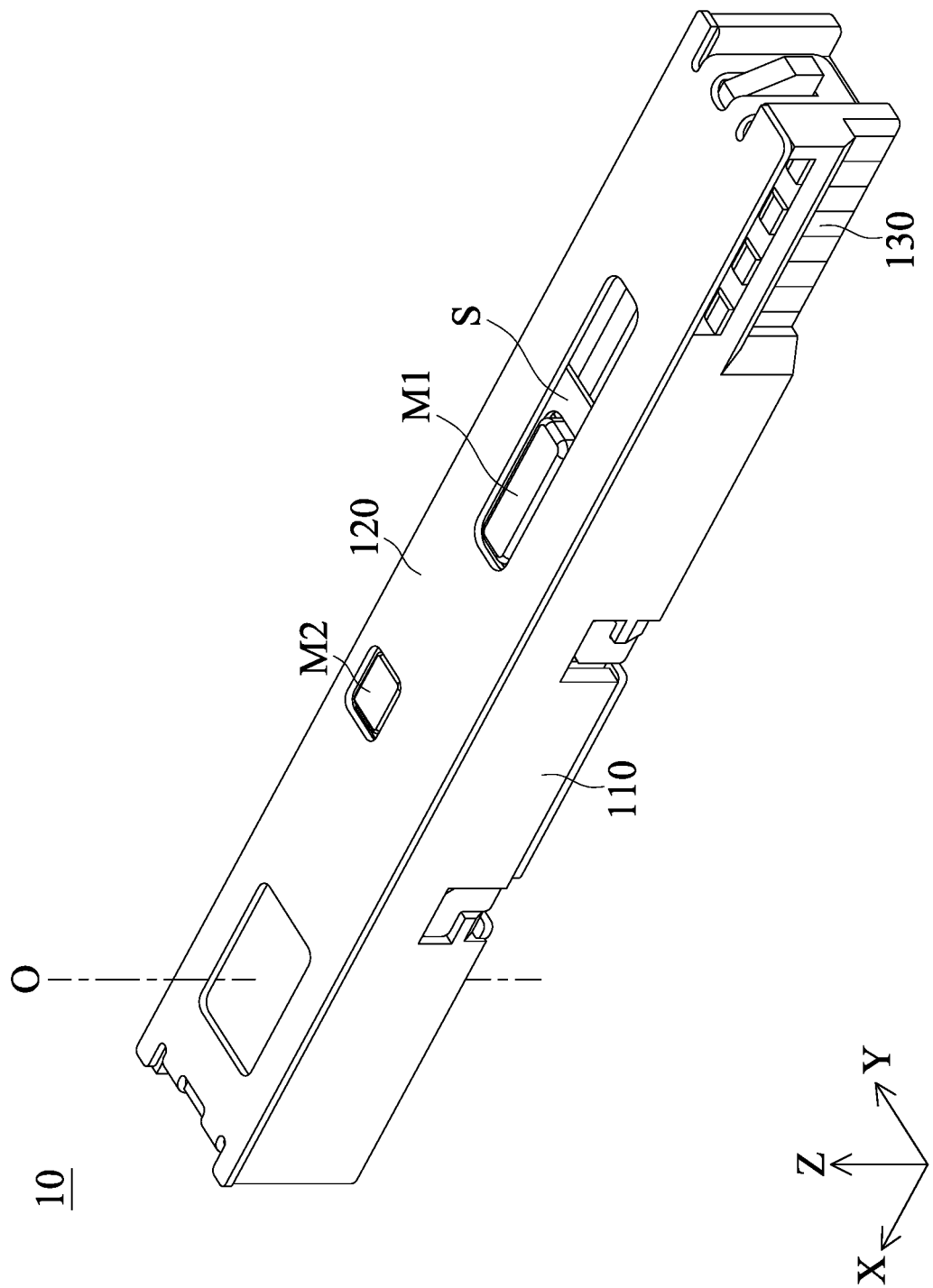
FIG. 34 is a perspective view illustrating an optical member driving mechanism in accordance with some embodiment of the present disclosure.

FIG. 34 is a perspective view illustrating an optical member driving mechanism 4-10 in accordance with some embodiment of the present disclosure. It should be noted that, in this embodiment, the optical member driving mechanism 4-10 is, for example, a shutter mechanism, which may be disposed in an electronic device (not shown) with camera function, and an optical member may be driven by the optical member driving mechanism. By controlling the position of the optical member, light may pass through or br blocked, and the exposure time of the camera module of the electronic device may be controlled. In other embodiments, the optical member driven by the optical member driving mechanism 4-10 may also be a lens, a prism, a reflective mirror, a photosensitive element, and other optical-related elements.

Figure 35:
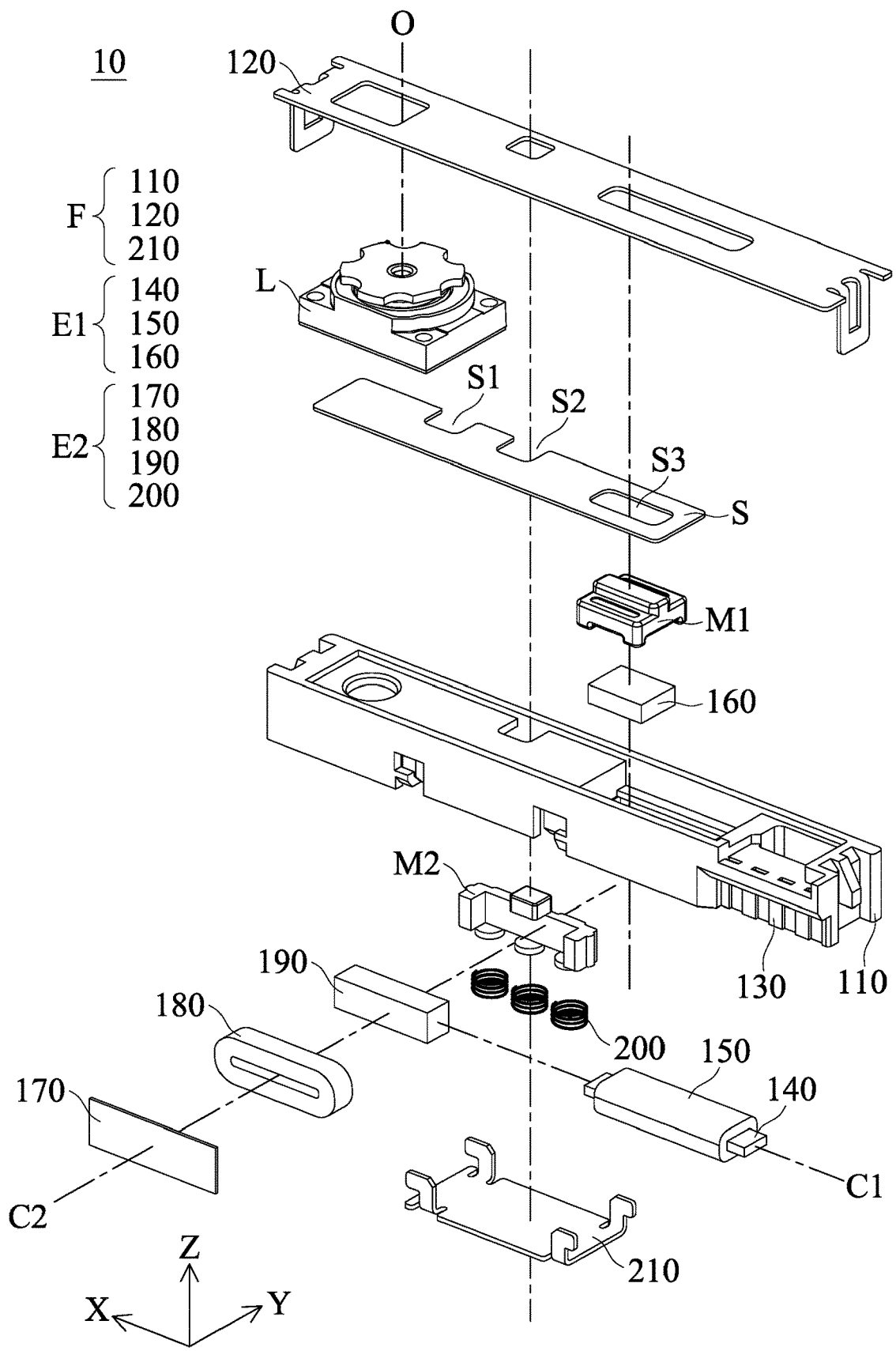
FIG. 35 is an exploded view illustrating the optical member driving mechanism shown in FIG. 34.

FIG. 35 is an exploded view illustrating the optical member driving mechanism 4-10 shown in FIG. 34. As shown in FIG. 35, the optical member driving mechanism 4-10 may include: a first movable portion 4-M1, a fixed portion 4-F, a first driving assembly 4-E1, a second movable portion 4-M2, and a second driving assembly 4-E2. In this embodiment, the fixing portion 4-F includes a body 4-110, a top cover 4-120, and a bottom cover 4-210. The top cover 4-120 and the bottom cover 4-210 are connected to the body 4-110, and the body 4-110 may be located between the top cover 4-120 and the bottom cover 4-210. The body 4-110 may be configured to carry the first movable portion 4-M1 (and the optical member 4-S connected to the first movable portion 4-M1), and is connected to an optical module 4-L. In some embodiments, the fixing portion 4-F and the optical module 4-L may be fixedly disposed on a substrate (not shown). In some embodiments, the optical member driving mechanism 4-10 does not directly contact the optical module 4-L, but the disclosure is not limited thereto.

In the direction parallel to the optical axis 4-O, the maximum size of the optical member driving mechanism 4-10 is larger than the maximum size of the optical module 4-L. For example, the height of the optical member driving mechanism 4-10 along the optical axis 4-O is greater than the height of the optical module 4-L along the optical axis 4-O. In addition, the optical member 4-S may include a baffle plate, which includes SOMA or any other suitable light-shielding material. The optical module 4-L may include a camera module, which includes a lens or any other suitable light-transmitting material, so that light may pass in a direction substantially parallel to the optical axis 4-O, thereby achieving a camera function. However, this disclosure is not limited thereto.

The first movable portion 4-M1 may be configured to connect the optical member 4-S, wherein the optical member 4-S may be configured to block light (for example, the light traveling in a direction substantially parallel to the optical axis 4-0). The first movable portion 4-M1 is relatively movable along the X axis (that is, the first direction) relative to the fixed portion 4-F. The first driving assembly 4-E1 is configured to drive the first movable portion 4-M1 to move substantially along the X axis (that is, the first direction) relative to the fixed portion 4-F. In this embodiment, the first driving assembly 4-E1 includes a first magnetic conductor 4-140, a first coil 4-150, and a first magnetic element 4-160 corresponding to the first coil 4-150. In some embodiments, the first driving assembly 4-E1 may drive the first movable portion 4-M1 (and the connected optical member S) to move between the first position (also referred to as the first extreme position) and the second position (also referred to as the second extreme position). For example, the first position and the second position may be arranged along the X axis (that is, the line connecting the first position and the second position may be substantially parallel to the X axis). That is, the connection line between the first position and the second position is different from the optical axis 4-O (Z axis). In some embodiments, the line (for example, the X axis) connecting the first position and the second position is substantially perpendicular to the optical axis O (for example, the Z axis).

The second movable portion 4-M2 may be configured to affix the optical member 4-S at the first position or the second position relative to the fixed portion 4-F. The second driving assembly 4-E2 may be configured to drive the second movable portion 4-M2 to move relative to the fixed portion 4-F substantially along the Z axis (that is, the second direction). It is shown that the movement direction of the second movable portion 4-M2 is different from the movement direction of the optical member 4-S. In some embodiments, the movement direction of the second movable portion 4-M2 is substantially perpendicular to the movement direction of the optical member 4-S. The second driving assembly 4-E2 may include a second magnetic conductor 4-170, a second coil 4-180, and a second magnetic element 4-190 corresponding to the second coil 4-180. In some embodiments, the second movable portion 4-M2 may fix the optical member 4-S at the aforementioned first position or the second position relative to the fixed portion 4-F. In some embodiments, the maximum dimension of the fixed portion 4-F in the direction (for example, the X axis) of the first winding axis 4-C1 of the first coil 4-150 is larger than the maximum dimension of the fixed portion 4-F in the direction (for example, Y axis) of the second winding axis 4-C2 of the second coil 4-180.

In this embodiment, the optical member driving mechanism 4-10 further includes at least one elastic element 4-200, abutting the second movable portion 4-M2 and capable of driving the second movable portion 4-M2 to move relative to the fixed portion 4-F. The elastic element 4-200 may be disposed on the bottom cover 4-210. In some embodiments, the elastic element 4-200 may drive the second movable portion 4-M2 to move relative to the fixed portion 4-F in the second direction (for example, parallel to the Z axis). More specifically, the elastic element 4-200 may continuously apply an elastic force that is parallel to the second direction (for example, toward the top cover 4-120) to the second movable portion 4-M2.

Figure 36:
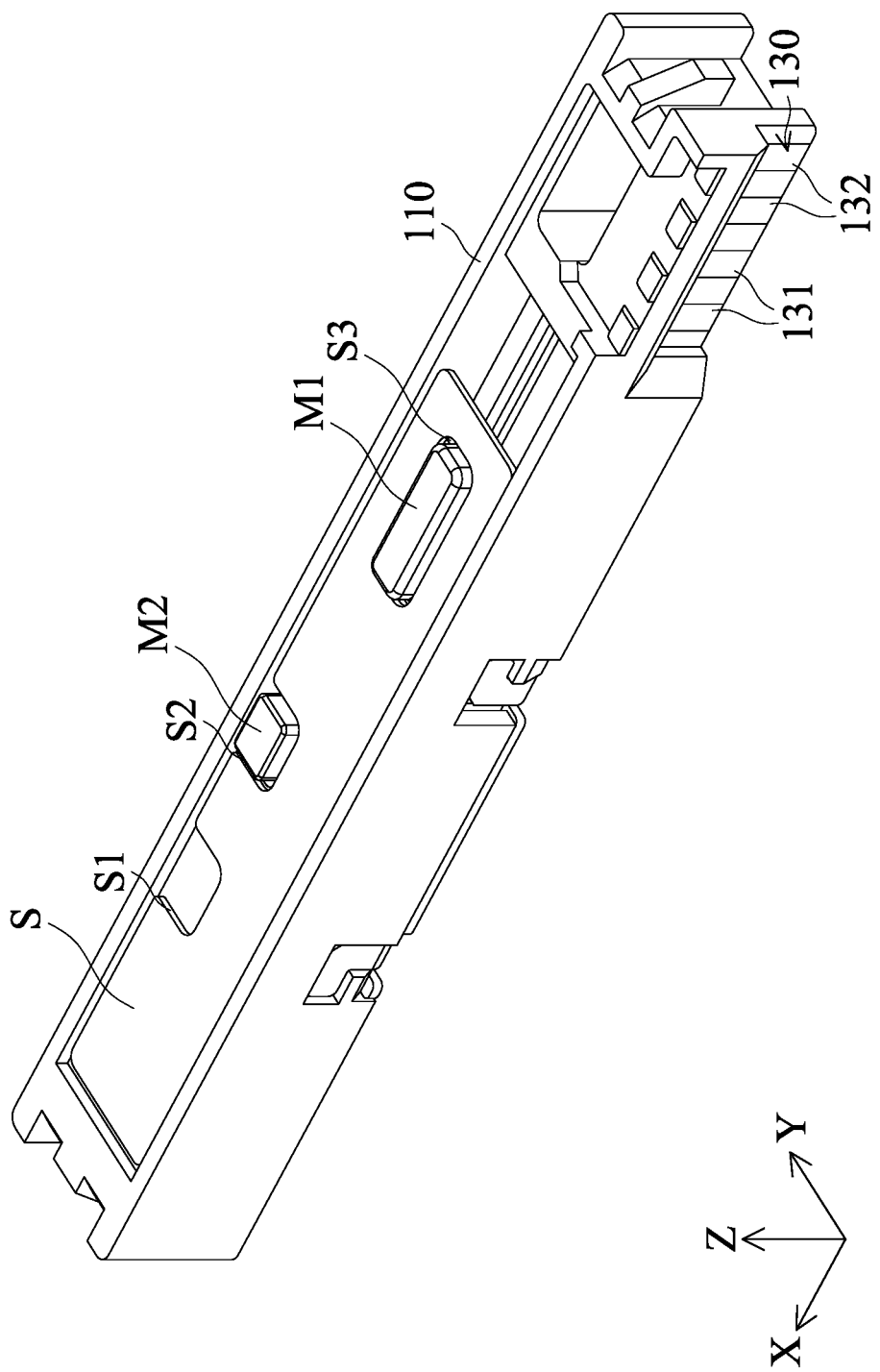
FIG. 36 is a perspective view illustrating the optical member driving mechanism in accordance with some embodiment of the present disclosure.

FIG. 36 is a perspective view illustrating the optical member driving mechanism 4-10 in accordance with some embodiment of the present disclosure. It should be noted that, in order to more clearly illustrate the internal structure of the optical member driving mechanism 4-10, the top cover 4-120 is not shown in this embodiment. As shown in FIG. 36, the optical member driving mechanism 4-10 further includes a circuit assembly 4-130, which is disposed on the fixed portion 4-F (for example, the body 4-110). The circuit assembly 4-130 includes a plurality of first contacts 4-131 and a plurality of second contacts 4-132, wherein the first contacts 4-131 may be electrically connected to the first driving assembly 4-E1, and the second contact 4-132 may be electrically connected to the second driving assembly 4-E2. It should be understood that the configuration of the first contacts 4-131 and the second contacts 4-132 shown in this embodiment is merely an illustrative example. Those skilled in the art may adjust the configuration of the first contacts 4-131 and the second contacts 4-132 as required, and will not be described in detail below. A plurality of insulating materials (not shown) may be respectively disposed on the first contacts 4-131 and the second contacts 4-132 to protect the first contacts 4-131 and the second contacts 4-132. In some embodiments, the insulating material on the first contacts 4-131 and each insulating material on the second contacts 4-132 are separated from each other. In other embodiments, the insulating material on the first contacts 4-131 and the insulating material on the second contacts 4-132 are connected to each other.

Figure 37:
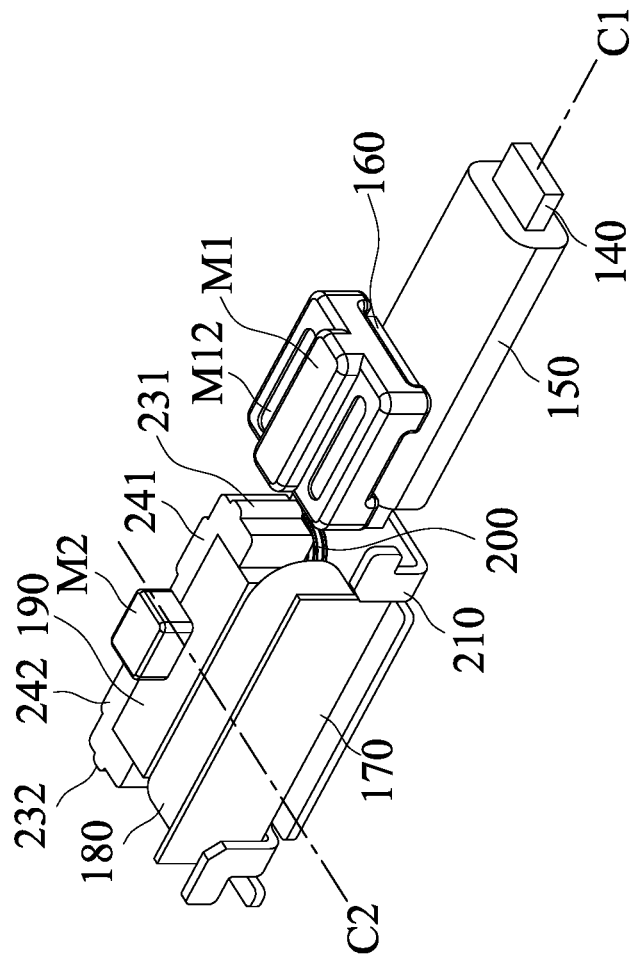
FIG. 37 is a perspective view illustrating the internal structure of the optical member driving mechanism in accordance with some embodiment of the present disclosure.

FIG. 37 is a perspective view illustrating the internal structure of the optical member driving mechanism 4-10 in accordance with some embodiment of the present disclosure. It should be noted that, in order to more clearly describe the internal structure of the optical member driving mechanism 4-10, the body 4-110, the top cover 4-120, and the optical member 4-S are not shown in this embodiment. As shown in FIG. 37, the second winding axis 4-C2 (for example, parallel to the Y axis) of the second coil 4-180 and the first winding axis 4-C1 (for example, parallel to the X axis) of the first coil 4-150 are not parallel. In some embodiments, the second winding axis 4-C2 of the second coil 4-180 is substantially perpendicular to the first winding axis 4-C1 of the first coil 4-150.

In addition, the maximum dimension of the first coil 4-150 in the direction (X-axis) parallel to the first winding axis 4-C1 is different from the maximum dimension of the second coil 4-180 in the direction (Y axis) parallel to the second winding axis 4-C2. In some embodiments, the maximum dimension of the first coil 4-150 in the direction (X axis) parallel to the first winding axis 4-C1 is larger than the maximum dimension of the second coil 4-180 in the direction (Y axis) parallel to the second winding axis 4-C2. In this embodiment, the first winding axis 4-C1 passes through the first magnetic conductor 4-140, and when viewed from a direction (for example, the Z axis) perpendicular to the first winding axis 4-C1, the first coil 4-150 overlaps with the first magnetic conductor 4-140. The second winding axis 4-C2 passes through the second magnetic conductor 4-170, and when viewed from a direction (such as the Z axis) perpendicular to the second winding axis 4-C2, the second coil 4-180 and the second magnetic conductor 4-170 do not overlap.

In some embodiments, the first driving assembly 4-E1 (including the first magnetic conductor 4-140, the first coil 4-150, and the first magnetic element 4-160) is configured to drive the first movable portion 4-M1 moves in the first dimension relative to the fixed portion 4-F. The second driving assembly 4-E2 is configured to drive the second movable portion 4-M2 to move relative to the fixed portion 4-F in the second dimension. The first dimension and the second dimension are different. In some embodiments, the first dimension is movement along the first direction (such as X axis), and the second dimension is movement along the second direction (such as Z axis), and the first direction and the second direction are not parallel. In some embodiments, when viewed along the second direction, the arrangement direction (for example, the Y axis) of the second movable portion 4-M2 and the second driving assembly 4-E2 is different from the first direction. In addition, when viewed along the second direction, the arrangement direction of the second movable portion 4-M2 and the second driving assembly 4-E2 is parallel to the third direction (for example, the Y axis). In some embodiments, the first direction and the second direction are perpendicular to each other, the second direction and the third direction are perpendicular to each other, and the first direction and the third direction are perpendicular to each other.

In some embodiments, when viewed along the second direction (such as the Z axis), the direction of the line connecting the center of the first movable portion 4-M1 and the center of the second movable portion 4-M2 is not parallel to the first direction (for example, the X axis). When viewed along the second direction, the direction of the line connecting between the center of the first movable portion 4-M1 and the center of the second movable portion 4-M2 is not parallel to the third direction (for example, the Y axis). In addition, the first movable portion 4-M1 is provided with at least one groove 4-M12, which may be used to receive an adhesive (not shown), so that the optical member 4-S and the first movable portion 4-M1 are fixedly connected.

Furthermore, a first stop element 4-230 and a second stop element 4-240 are provided on the second movable portion 4-M2. The first stop element 4-230 may be configured to limit the movement range of the second movable portion 4-M2 relative to the fixed portion 4-F in the first direction (for example, the X axis). The first stop element 4-230 includes a plurality of first stop units 4-231, 4-232, wherein the first stop units 4-231, 4-232 are arranged along the first direction. When viewed along the second direction (for example, the Z axis), the line connecting the centers of the first stop units 4-231 and 4-232 does not overlap with the first winding axis 4-C1. In some embodiments, the line connecting the centers of the first stop units 4-231, 4-232 is parallel to the first winding axis 4-C1. The second stop element 4-240 may be used to limit the movement range of the second movable portion 4-M2 relative to the fixed portion 4-F in the third direction (for example, the Y axis). The second stop element 4-240 may include a plurality of second stop units 4-241, 4-242, wherein the second stop units 4-241, 4-242 have a protruding structure extending along a third direction.

FIGS. 38 to 41 are cross-sectional views illustrating the optical member driving mechanism in accordance with some embodiment of the present disclosure. As shown in FIG. 5, the body 4-110 has a first optical hole 4-111, which corresponds to the optical module 4-L. The top cover 4-120 has a second optical hole 4-121 corresponding to the optical module 4-L and the first optical hole 4-111. In some embodiments, the shapes of the first optical hole 4-111 and the second optical hole 4-121 are different. For example, the first optical hole 4-111 has a circular cross-section, and a chamfer is formed on the edge of the first optical hole 4-111 toward the top cover 4-120. The second optical hole 4-121 has a rectangular cross-section and is configured to correspond to a photoelectric converter (such as a photosensitive element, not shown). When viewed along the main axis (for example, substantially parallel to the optical axis 4-O) of the photoelectric converter, the photoelectric converter has a first edge extending along the fifth direction and a second edge extending along the sixth direction. The fifth direction, the sixth direction and the main axis are perpendicular to each other.

Figure 38:
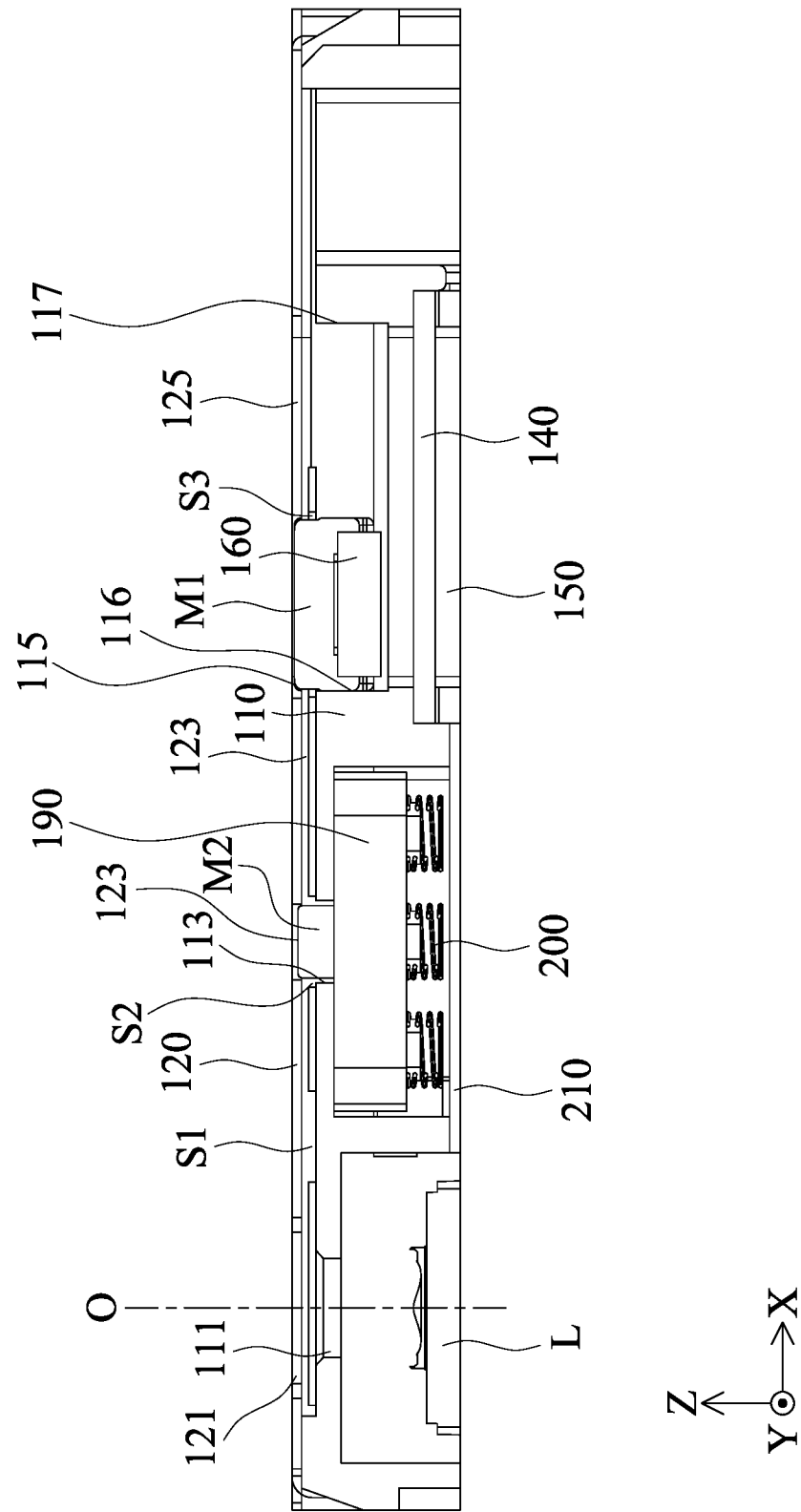
FIGS. 38 to 41 are cross-sectional views illustrating the optical member driving mechanism in accordance with some embodiment of the present disclosure.

In some embodiments, the length and width ratio of the second optical hole 4-121 is the same as the length ratio of the first edge and the second edge of the photoelectric converter. In some embodiments, the second optical hole 4-121 is a rectangle with an aspect ratio of 16:9. Viewed from the traveling direction of the light (for example, parallel to the optical axis 4-O), the area of the first optical hole 4-111 is smaller than the area of the second optical hole 4-121. As shown in FIG. 38, the optical member 4-S is in the second position. At this time, the optical member 4-S completely overlaps the first optical hole 4-111 and the second optical hole 4-121. In this way, the optical member 4-S may block the light and prevent the light from entering the optical module 4-L through the optical axis 4-O.

In addition, the body 4-110 has a first receiving portion 4-113 for receiving the second movable portion 4-M2. The top cover 4-120 has a second receiving portion 4-123 for receiving the second movable portion 4-M2. In this embodiment, the size of the first receiving portion 4-113 is substantially equal to the size of the second receiving portion 4-123. In some embodiments, the size of the first receiving portion 4-113 is smaller than the size of the second receiving portion 4-123. In addition, the optical member 4-S has a third receiving portion 4-S1 and a fourth receiving portion 4-S2, respectively corresponding to the second movable portion 4-M2. When the optical member 4-S is in the second position (that is, when it completely overlaps the first optical hole 4-111 and the second optical hole 4-121), the second movable portion 4-M2 passes through the fourth receiving portion 4-S2.

As shown in FIG. 38, the optical member 4-S is located between the body 4-110 and the top cover 4-120. Viewed from the movement direction of the second movable portion 4-M2 (for example, parallel to the Z axis), the size of the fourth receiving portion 4-S2 is larger than the size of the first receiving portion 4-113 or the size of the second receiving portion 4-123. As a result, the gap between the second movable portion 4-M2 and the optical member 4-S is smaller than the gap between the optical member 4-S and the fixed portion 4-F (for example, the body 4-110, the top cover 4-120). With this configuration, the probability that the second movable portion 4-M2 cannot move normally due to the contact between the second movable portion 4-M2 and the optical member 4-S may be reduced. For example, the first receiving portion 4-113 has a recessed structure to provide a space for the second movable portion 4-M2 to move. For example, the first receiving portion 4-113, the second receiving portion 4-123, the third receiving portion 4-S1, and the fourth receiving portion 4-S2 are rectangular, but the disclosure is not limited thereto. In some embodiments, the first receiving portion 4-113, the second receiving portion 4-123, the third receiving portion 4-S1, and the fourth receiving portion 4-S2 may be any shape corresponding to the second movable portion 4-M2, as long as the second movable portion 4-M2 may be received.

In addition, the body 4-110 has a first opening 4-115 for receiving the first movable portion 4-M1, and the first driving assembly 4-E1 (including the first magnetic conductor 4-140, the first coil 4-150 and the first magnetic element 4-160) drives the first movable portion 4-M1 to move in the first opening 4-115. The top cover 4-120 has a second opening 4-125 for receiving the first movable portion 4-M1, and the first driving assembly 4-E1 drives the first movable portion 4-M1 to move in the second opening 4-125. In some embodiments, the size of the first opening 4-115 is different from the size of the second opening 4-125. In some embodiments, the size of the first opening 4-115 is larger than the size of the second opening 4-125.

The optical member 4-S has a third opening 4-S3 corresponding to the first movable portion 4-M1. In some embodiments, the first movable portion 4-M1 may be disposed in the third opening 4-S3. In some embodiments, the size of the first opening 4-115 is different from the size of the third opening 4-S3. In some embodiments, the size of the first opening 4-115 is larger than the size of the third opening 4-S3. In some embodiments, the size of the second opening 4-125 is different from the size of the third opening 4-S3. In some embodiments, the size of the second opening 4-125 is larger than the size of the third opening 4-S3. Based on FIG. 38, the size of the first opening 4-115 is different from the size of the first receiving portion 4-113. In some embodiments, the size of the first opening 4-115 is larger than the size of the first receiving portion 4-113. The first opening 4-115 has a first sidewall 4-116 and a second sidewall 4-117 opposite to the first sidewall 4-116. When the second movable portion 4-M2 is located at the second position, the first movable portion 4-M1 abuts the first sidewall 4-116.

Since the elastic element 4-200 continues to exert an upward elastic force on the second movable portion 4-M2, the second movable portion 4-M2 may protrude from the first receiving portion 4-113 and the fourth receiving portion 4-S2, such that the optical member 4-S is maintained at the second position to keep blocking the light entering the optical module 4-L through the optical axis 4-O. In this way, the probability of failure of the optical member 4-S due to external impact may be reduced.

Figure 39:
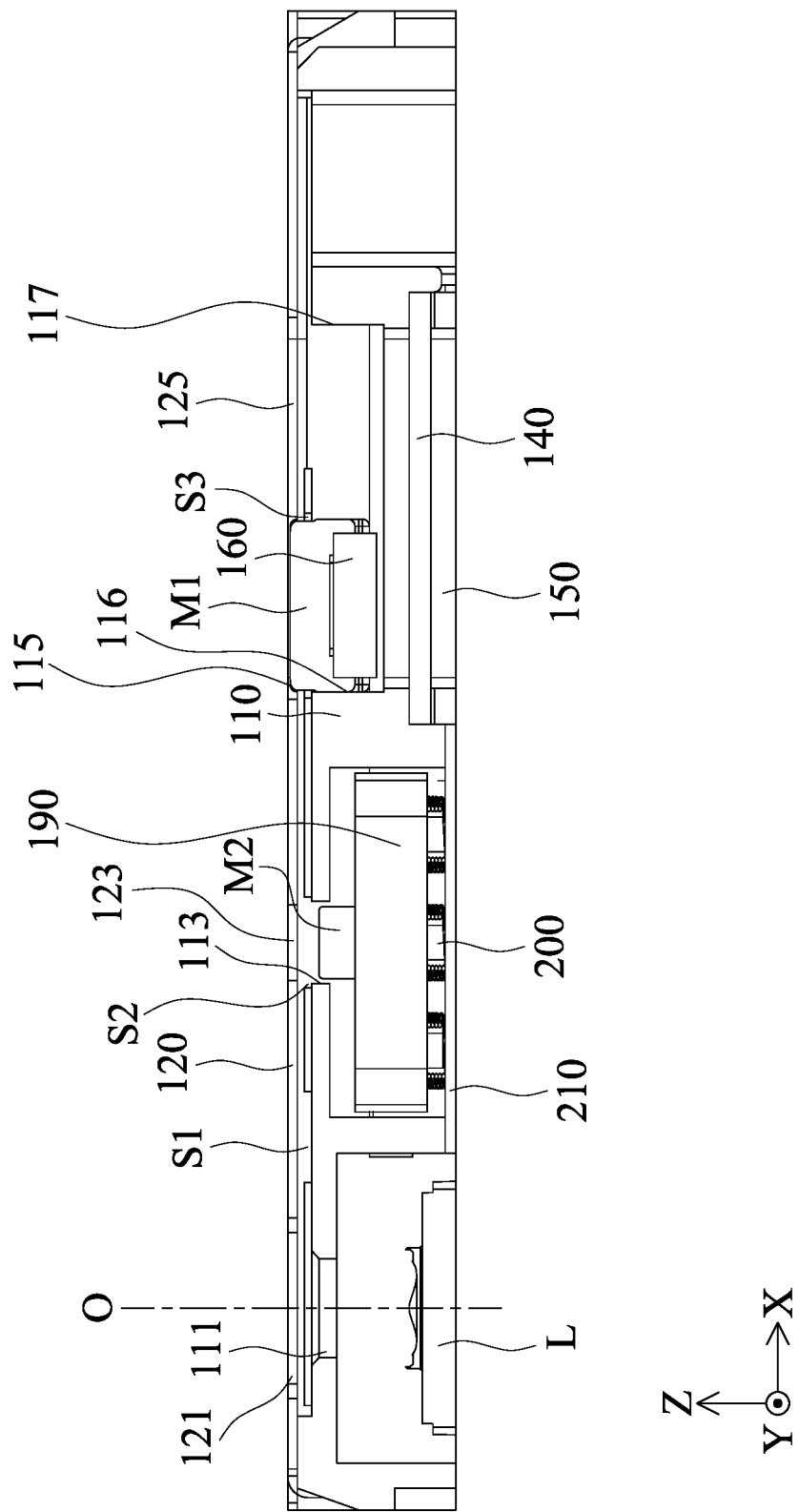

Next, as shown in FIG. 39, the second driving assembly 4-E2 may drive the second movable portion 4-M2 to move downward, so that the second movable portion 4-M2 leaves the fourth receiving portion 4-S2. More specifically, an electrical signal may be transmitted to the second coil 4-180 (as shown in FIG. 37), so that the second magnetic conductor 4-170 generates a magnetic force corresponding to the second magnetic element 4-190. In this way, the second magnetic element 4-170 will generate a downward force with the second magnetic element 4-190, so that the second magnetic element 4-190 may offset the elastic force generated by the elastic element 4-200 and drive the second movable portion 4-M2 to move downward.

Figure 40:
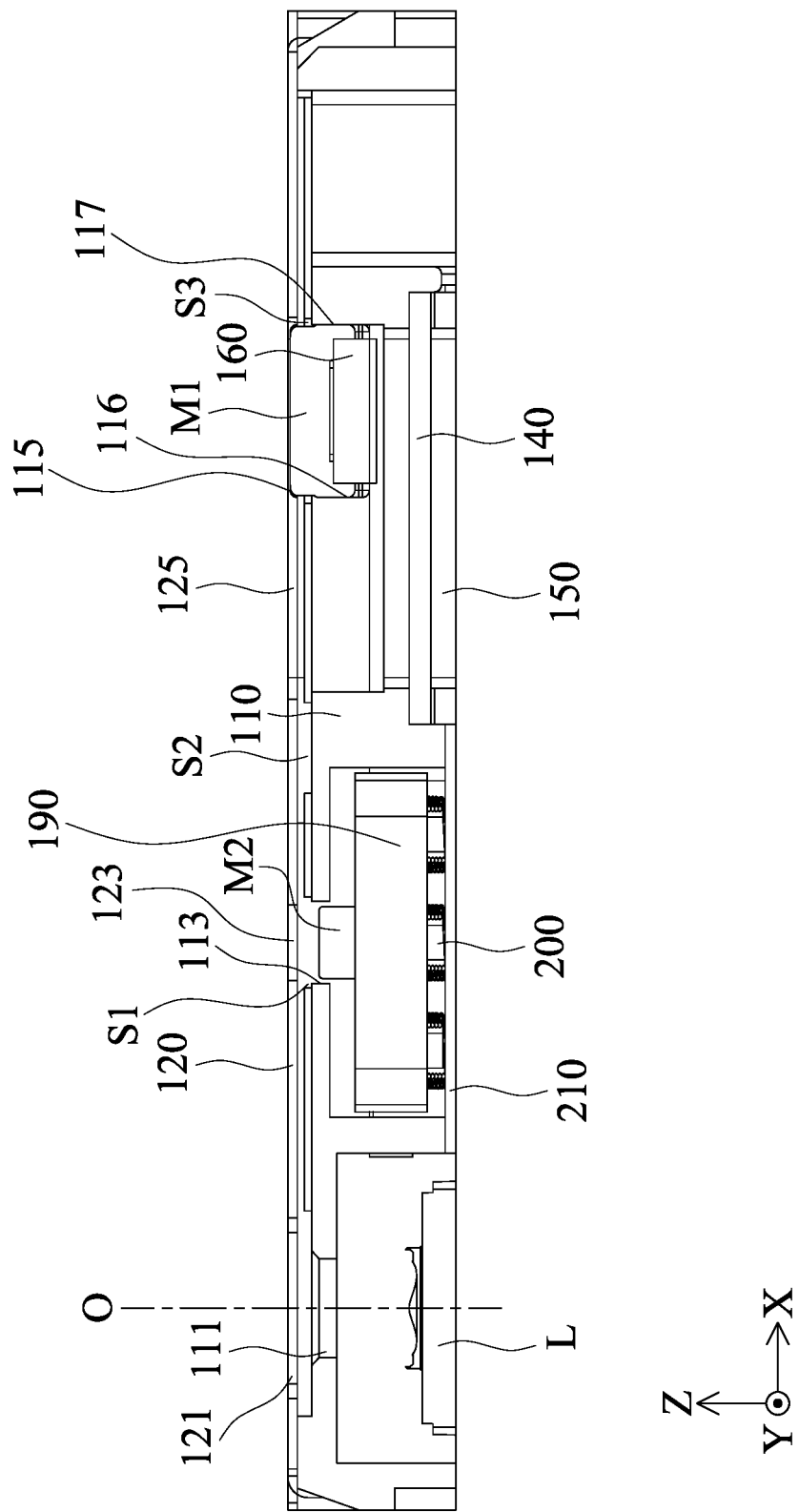

Next, as shown in FIG. 40, the first driving assembly 4-E1 may drive the first movable portion 4-M1 and the optical member 4-S to leave the second position and reach the first position. More specifically, an electrical signal may be transmitted to the first coil 4-150, so that the first magnetic conductor 4-140 generates a magnetic force corresponding to the first magnetic element 4-160. In this way, the first magnetic conductor 4-140 will generate a force with the first magnetic element 4-160 to drive the first movable portion 4-M1 and the optical member 4-S away from the second position. At this time, the optical member 4-S does not overlap the first optical hole 4-111 and the second optical hole 4-121. In this way, light may enter the optical module 4-L through the optical axis 4-O.

In order to ensure that the first movable portion 4-M1 and the optical member 4-S move after the second movable portion 4-M2 leaves the fourth receiving portion 4-S2, the electrical signal may be transmitted to the second coil 4-180 before transmitted to the first coil 4-150. For example, the time difference between transmitting electrical signals to the first coil 4-150 and the second coil 4-180 may be between about 1 ms and about 10 ms, such as about 5 ms, but the disclosure is not limited thereto. With the above design, the probability of damage due to the collision between the second movable portion 4-M2 and the optical member 4-S may be reduced.

Figure 41:
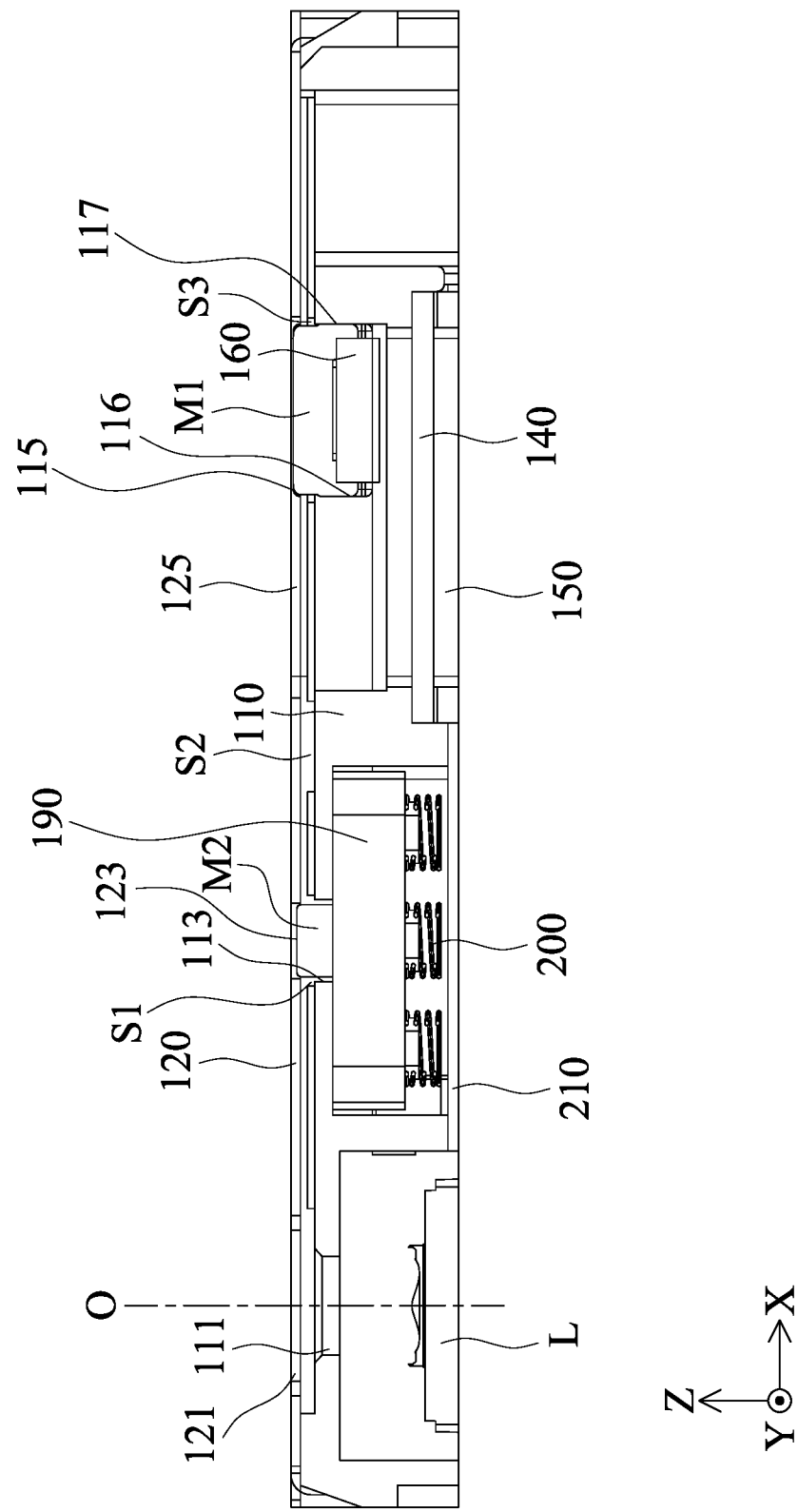

As shown in FIG. 41, after the optical member 4-S reaches the first position (for example, when the first movable portion 4-M1 abuts the second sidewall 4-117), the second driving assembly 4-E2 and/or the elastic element 4-200 may drive the second movable portion 4-M2 to move upward, so that the second movable portion 4-M2 passes through the third receiving portion 4-S1. In some embodiments, the second driving assembly 4-E2 may be closed, so that the elastic force generated by the elastic element 4-200 drives the second movable portion 4-M2 to move upward. In other embodiments, electrical signals may be transmitted to the second coil 4-180 (as shown in FIG. 37), so that the second magnetic conductor 4-170 generates a magnetic force corresponding to the second magnetic element 4-190. As a result, the second magnetic conductor 4-170 and the second magnetic element 4-190 will generate upward force, which may cooperate with the elastic force generated by the elastic element 4-200 to drive the second movable portion 4-M2 moves upward and passes through the third receiving portion 4-S1. Viewed from the movement direction (for example, parallel to the Z axis) of the second movable portion 4-M2, the size of the third receiving portion 4-S1 is larger than the size of the first receiving portion 4-113 or the size of the second receiving portion 4-123.

Similarly, in order to ensure that the second movable portion 4-M2 moves after the first movable portion 4-M1 abuts the second sidewall 4-117, the electrical signal may be transmitted to the first coil 4-150 before transmitted to the second coil 4-180. For example, the time difference between transmitting electrical signals to the first coil 4-150 and the second coil 4-180 may be between about 1 ms and about 10 ms, such as about 5 ms, but the disclosure is not limited thereto. With the above design, the probability of damage due to collision between the second movable portion 4-M2 and the optical member 4-S may also be reduced.

Figure 42:
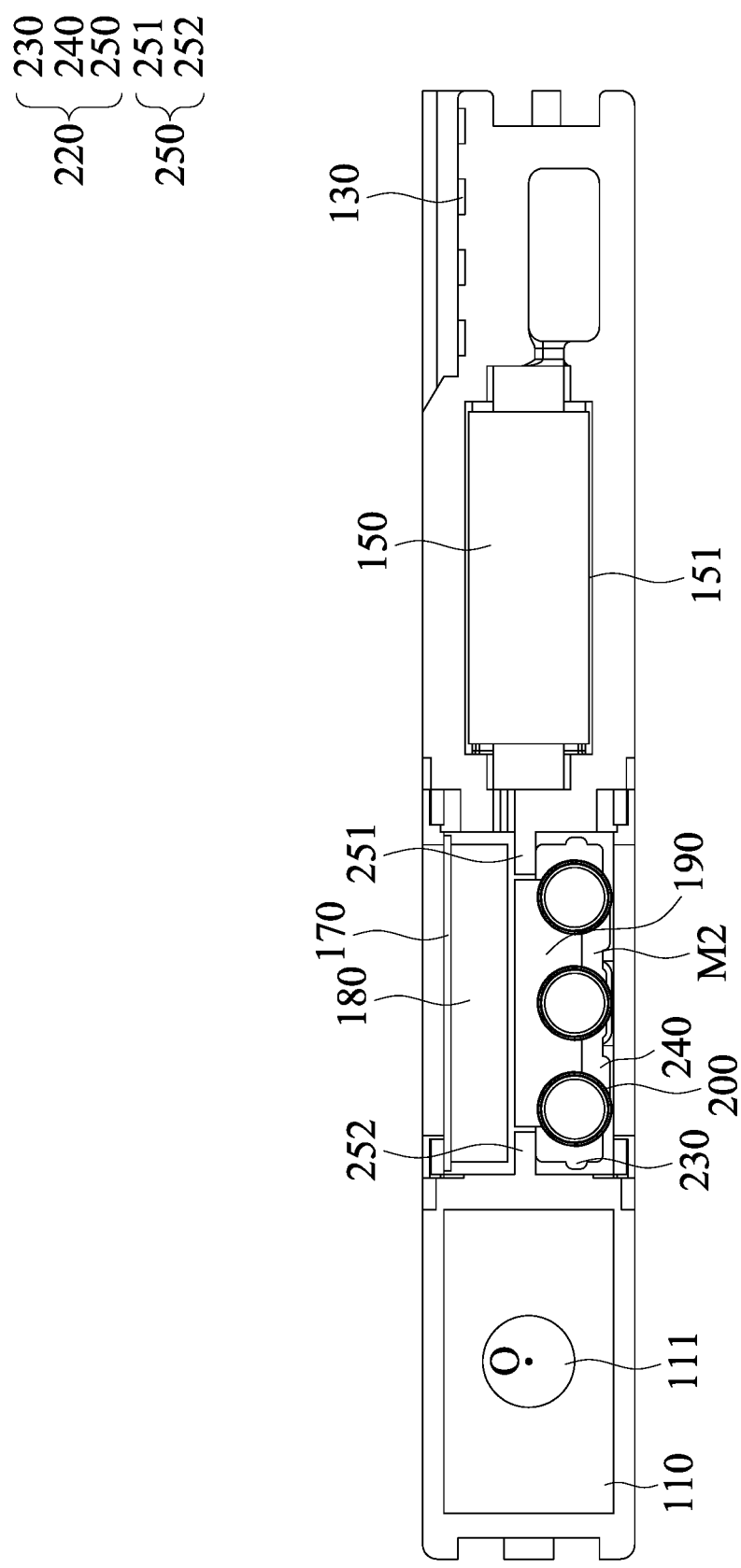
FIG. 42 is a bottom view illustrating the optical member driving mechanism in accordance with some embodiment of the present disclosure.

FIG. 42 is a bottom view illustrating the optical member driving mechanism 4-10 in accordance with some embodiment of the present disclosure. It should be noted that, in order to more clearly illustrate the internal structure of the optical member driving mechanism 4-10, the bottom cover 4-210 and the optical member 4-S are not shown in this embodiment. As shown in FIG. 42, when viewed from the second direction (for example, the Z axis), the elastic element 4-200 and the second coil 4-180 do not overlap. In some embodiments, viewed from a direction perpendicular to the second direction (for example, the Y axis), the elastic element 4-200 and the second coil 4-180 at least partially overlap.

In this embodiment, the elastic element 4-200 may include a plurality of elastic units 4-200 arranged along a first direction (for example, the X axis). In other words, when viewed along the second direction, the elastic units do not overlap each other. The elastic coefficients of the elastic units may be different respectively. In this way, it is easier to control the elastic force of the elastic element 4-200 to drive the second movable portion 4-M2, so that the movement of the second movable portion 4-M2 may be smoother.

In addition, when viewed along the winding axis of the first coil 4-150 (for example, the first winding axis 4-C1), the first coil 4-150 has one side 4-151 extending along the fourth direction (for example, the X axis). The first coil 4-150 has a first lead (not shown) connected to the circuit assembly 4-130, and the second coil 4-180 has a second lead (not shown) connected to the circuit assembly 4-130. When viewed along the direction of the winding axis of the first coil 4-150, the first lead of the first coil 4-150 and the second lead of the second coil 4-180 are located on the same side 4-151. In some embodiments, the second lead directly contacts the first coil 4-150. In some embodiments, when viewed along the third direction (for example, the Y axis), the first lead and second lead at least partially overlap.

In addition, the third stop element 4-250 includes third stop units 4-251, 4-252, which have a protruding structure extending along the first direction (for example, the X axis). The third stop element 4-250 may be configured to limit the movement range of the second movable portion 4-M2 relative to the fixed portion 4-F in the third direction. In some embodiments, the third stop unit 4-250 is fixedly disposed on the fixed portion 4-F (for example, on the body 4-110). When viewed along the second direction (for example, the Z axis), the third stop unit 4-250 is at least partially located between the second movable portion 4-M2 and the second coil 4-180. In this embodiment, the first stop unit 4-230, the second stop unit 4-240, and the third stop unit 4-250 may constitute a stop assembly 4-220 for restricting the second movable portion 4-M2 moves relative to the fixed portion 4-F within a movement range. With the arrangement of the stop assembly 4-220, the second movable portion 4-M2 may move stably relative to the fixed portion 4-F, which helps to reduce the probability of failure of the optical member driving mechanism 4-10.

Figure 43:
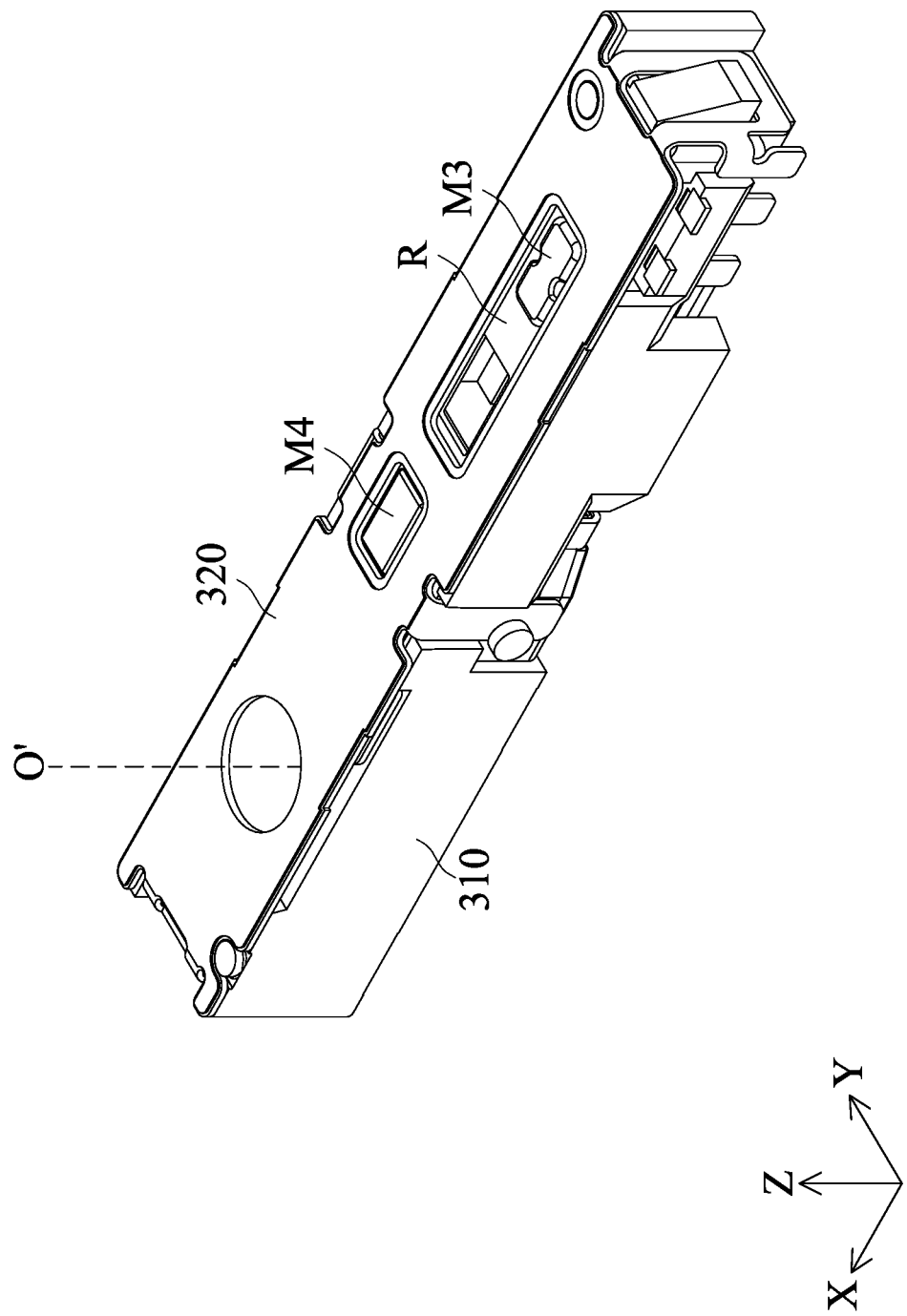
FIG. 43 is a perspective view illustrating the optical member driving mechanism in accordance with some embodiment of the present disclosure.

FIG. 43 is a perspective view illustrating the optical member driving mechanism 4-20 in accordance with some embodiment of the present disclosure. It should be noted that, in this embodiment, the optical member driving mechanism 4-20 is, for example, a shutter mechanism, and may be disposed in an electronic device (not shown) with camera function, and the optical member may be driven by the optical member driving mechanism. By controlling the position of the optical member, light may be passed through or blocked, and the exposure time of the camera module of the electronic device may be controlled.

Figure 44:
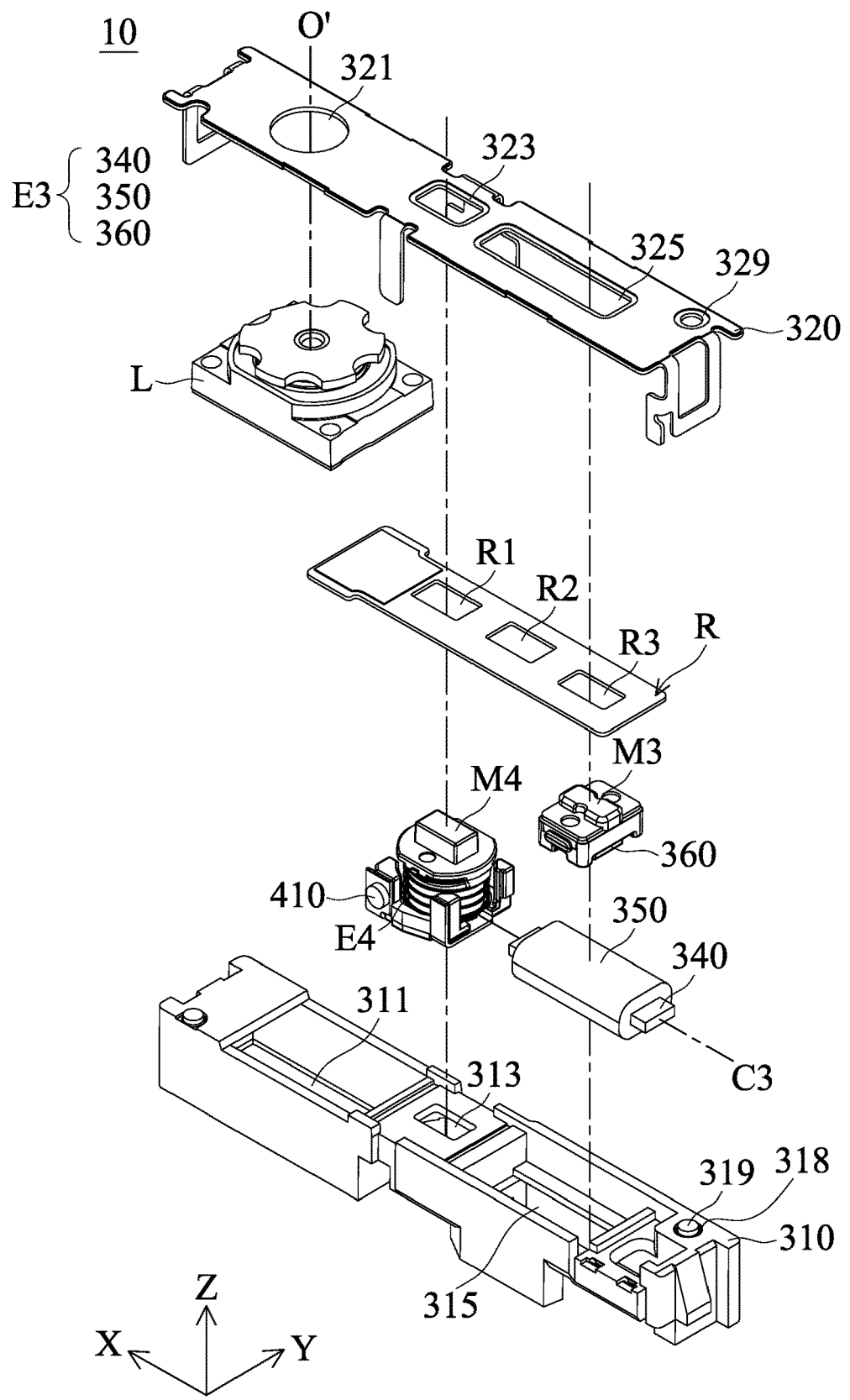
FIG. 44 is an exploded view illustrating the optical member driving mechanism shown in FIG. 43.

FIG. 44 is an exploded view illustrating the optical member driving mechanism 4-20 shown in FIG. 43. As shown in FIG. 44, the optical member driving mechanism 4-20 may include: a first movable portion 4-M3, a fixed portion 4-F, a first driving assembly 4-E3, a second movable portion 4-M4, and a second driving assembly 4-E4. In this embodiment, the fixed portion 4-F includes a body 4-310, a top cover 4-320, and a bottom cover 4-410. The top cover 4-320 and the bottom cover 4-410 are connected to the body 4-310, and the body 4-310 may be located between the top cover 4-320 and the bottom cover 4-410. The body 4-310 may be configured to carry the first movable portion 4-M3 (and the optical member 4-R connected to the first movable portion 4-M3), and is connected to the optical module 4-L.

In some embodiments, the body 4-310 has a recess 4-318 and a protrusion 4-319 protruding from the recess 4-318, and a rounded corner is formed between the protrusion 4-319 and the recess 4-318. In this way, the protrusions 4-319 may be effectively disposed in the positioning holes 4-329 of the top cover 4-320, and the top cover 4-320 may be more accurately disposed on the body 4-310. In some embodiments, the fixing portion 4-F and the optical module 4-L may be fixedly disposed on a substrate (not shown). In some embodiments, the optical member driving mechanism 4-20 does not directly contact the optical module 4-L, but the disclosure is not limited thereto.

In the direction parallel to the optical axis 4-O', the maximum size of the optical member driving mechanism 4-20 is larger than the maximum size of the optical module 4-L. For example, the height of the optical member driving mechanism 4-10 along the optical axis 4-O' is greater than the height of the optical module 4-L along the optical axis 4-O'. In addition, the optical member 4-R may include a baffle plate, which includes SOMA or any other suitable light-shielding material. The optical module 4-L may include a camera module, which includes a lens or any other suitable light-transmitting material to allow light to pass in a direction substantially parallel to the optical axis 4-O' to achieve the function of imaging. However, this disclosure is not limited thereto.

The first movable portion 4-M3 may be used to connect the optical member 4-R, wherein the optical member 4-R may be used to block light (for example, light traveling in a direction substantially parallel to the optical axis 4-O'). The first movable portion 4-M3 is relatively movable along the X axis (that is, the first direction) relative to the fixed portion 4-F. The first driving assembly 4-E3 is used for driving the first movable portion 4-M3 to move substantially along the X axis (that is, the first direction) relative to the fixed portion 4-F. In this embodiment, the first driving assembly 4-E3 includes a first magnetic conductor 4-340, a first coil 4-350, and a first magnetic element 4-360 corresponding to the first coil 4-350. In this embodiment, the first coil 4-350 has a winding axis 4-C3, which is substantially parallel to the X axis.

In some embodiments, the first driving assembly 4-E3 may make the first movable portion 4-M3 (and the connected optical member 4-R) to move between in the first position (also referred to as the first extreme position) and the second position (also referred to as the second extreme position). For example, the first position and the second position may be arranged along the X axis (that is, the line connecting the first position and the second position may be substantially parallel to the X axis). That is, the connection line between the first position and the second position is different from the optical axis 4-O' (Z axis). In some embodiments, the line (for example, the X axis) connecting the first position and the second position is substantially perpendicular to the optical axis 4-O' (for example, the Z axis).

The second movable portion 4-M4 may be used to affix the optical member 4-R at the first position or the second position relative to the fixed portion 4-F. The second driving assembly 4-E4 may be used to drive the second movable portion 4-M4 to move relative to the fixed portion 4-F substantially along the Z axis (that is, the second direction). It is shown that the movement direction of the second movable portion 4-M4 is different from the movement direction of the optical member 4-R. In some embodiments, the movement direction of the second movable portion 4-M4 is substantially perpendicular to the movement direction of the optical member 4-R. In some embodiments, the second movable portion 4-M4 may affix the optical member 4-R at the first position or the second position relative to the fixed portion 4-F. The structure of the second driving assembly 4-E4 will be further described below in accompany with FIGS. 49 and 50.

In this embodiment, the optical member driving mechanism 4-20 further includes an elastic element 4-400 that abuts the second movable portion 4-M4 and may drive the second movable portion 4-M4 to move relative to the fixed portion 4-F. The elastic element 4-400 may be arranged on the bottom cover 4-410. In some embodiments, the elastic element 4-400 may drive the second movable portion 4-M4 to move relative to the fixed portion 4-F in the second direction (for example, parallel to the Z axis). More specifically, the elastic element 4-400 may continuously exert an elastic force that is parallel to the second direction (for example, toward the top cover 4-320) to the second movable portion 4-M4.

Figure 45:
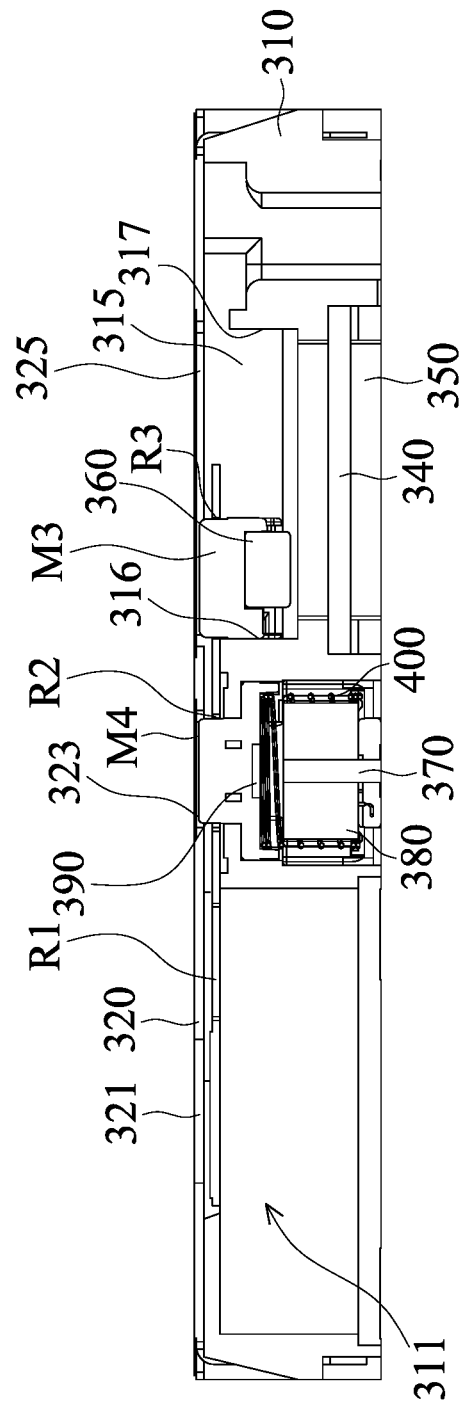
FIGS. 45 to 48 are cross-sectional views illustrating the optical member driving mechanism in accordance with some embodiment of the present disclosure.

FIGS. 45 to 48 are cross-sectional views illustrating the optical member driving mechanism 4-20 in accordance with some embodiment of the present disclosure. As shown in FIG. 45, the body 4-310 has a first optical hole 4-311, which corresponds to the optical module 4-L. The top cover 4-320 has a second optical hole 4-321 corresponding to the optical module 4-L and the first optical hole 4-311. In some embodiments, the shapes of the first optical holes 4-311 and the second optical holes 4-321 are different. As shown in FIG. 45, the optical member 4-R is in the second position. At this time, the optical member 4-R completely overlaps the first optical hole 4-311 and the second optical hole 4-321. In this way, the optical member 4-R may block the light and prevent the light from entering the optical module 4-L via the optical axis 4-O' (as shown in FIG. 44).

In addition, the body 4-310 has a first receiving portion 4-313 for receiving the second movable portion 4-M4. The top cover 4-320 has a second receiving portion 4-323 for receiving the second movable portion 4-M4. In this embodiment, the size of the first receiving portion 4-313 is substantially equal to the size of the second receiving portion 4-323. In some embodiments, the size of the first receiving portion 4-313 is smaller than the size of the second receiving portion 4-323. In addition, the optical member 4-R has a third receiving portion 4-R1 and a fourth receiving portion 4-R2, corresponding to the second movable portion 4-M4, respectively. When the optical member 4-R is located at the second position (that is, when it completely overlaps the first optical hole 4-311 and the second optical hole 321), the second movable portion 4-M4 passes through the fourth receiving portion 4-R2.

As shown in FIG. 45, the optical member 4-R is located between the body 4-310 and the top cover 4-320. Viewed from the movement direction of the second movable portion 4-M4 (for example, parallel to the Z axis), the size of the fourth receiving portion 4-R2 is larger than the size of the first receiving portion 4-313 or the size of the second receiving portion 4-323. As a result, the gap between the second movable portion 4-M4 and the optical member 4-R is smaller than the gap between the optical member 4-R and the fixed portion 4-F (for example, the body 4-310, the top cover 4-320, etc.). With this configuration, the probability that the second movable portion 4-M4 cannot move normally due to the contact between the second movable portion 4-M4 and the optical member 4-R may be reduced. For example, the first receiving portion 4-313 has a recessed structure to provide a space for the second movable portion 4-M4 to move. For example, the first receiving portion 4-313, the second receiving portion 4-323, the third receiving portion 4-R1, and the fourth receiving portion 4-R2 are rectangular, but the disclosure is not limited thereto. In some embodiments, the first receiving portion 4-313, the second receiving portion 4-323, the third receiving portion 4-R1, and the fourth receiving portion 4-R2 may be any shape corresponding to the second movable portion 4-M4, as long as the second movable portion 4-M4 may be received.

In addition, the body 4-310 has a first opening 4-315 for receiving the first movable portion 4-M3, and the first driving assembly 4-E3 (including the first magnetic conductor 4-340, the first coil 4-350 and the first magnetic element 4-360) drives the first movable portion 4-M3 to move in the first opening 4-315. The top cover 4-320 has a second opening 4-325 for receiving the first movable portion 4-M3, and the first driving assembly 4-E3 drives the first movable portion 4-M3 to move in the second opening 4-325. In some embodiments, the size of the first opening 4-315 is different from the size of the second opening 4-325. In some embodiments, the size of the first opening 4-315 is larger than the size of the second opening 4-325.

The optical member 4-R has a third opening 4-R3 corresponding to the first movable portion 4-M3. In some embodiments, the first movable portion 4-M3 may be disposed in the third opening 4-R3. In some embodiments, the size of the first opening 4-315 is different from the size of the third opening 4-R3. In some embodiments, the size of the first opening 4-315 is larger than the size of the third opening 4-R3. In some embodiments, the size of the second opening 4-325 is different from the size of the third opening 4-R3. In some embodiments, the size of the second opening 4-325 is larger than the size of the third opening 4-R3. It is shown in FIG. 45 that the size of the first opening 4-315 is different from the size of the first receiving portion 4-313. In some embodiments, the size of the first opening 4-315 is larger than the size of the first receiving portion 4-313. The first opening 4-315 has a first sidewall 4-316 and a second sidewall 4-317 opposite to the first sidewall 4-316. The first sidewall 4-316 and the second sidewall 4-317 may constitute a stop portion for limiting the movement of the first movable portion 4-M3 relative to the fixed portion 4-F within a range of motion. When the second movable portion 4-M4 is in the second position, the first movable portion 4-M3 abuts the first sidewall 4-316.

As shown in FIG. 45, when the first movable portion 4-M3 is located at the second position, when viewed along the second direction (such as the Z axis), the optical member 4-R completely covers the second optical hole 4-321, so that the first optical hole 4-311 is completely not exposed from the second optical hole 4-321. At this time, the first movable portion 4-M3 may be in contact with the first sidewall 4-316, or the fixed portion 4-F (for example, the body 4-310) may be in contact with the stop structure on the first movable portion 4-M3. When the first movable portion 4-M3 is in direct contact with the fixed portion 4-F, and the optical member 4-R is not in contact with the fixed portion 4-F. In this way, the probability of damage due to the collision of the optical member 4-R and the fixing portion 4-F with each other may be reduced. In this embodiment, the optical member 4-R and the second movable portion 4-M4 have a non-zero gap, that is, the optical member 4-R and the second movable portion 4-M4 are not in direct contact.

Since the elastic element 4-400 continues to exert an upward elastic force on the second movable portion 4-M4, the second movable portion 4-M4 may protrude from the first receiving portion 4-313 and the fourth receiving portion 4-R2, maintaining the optical member 4-R at the second position to keep blocking the light entering the optical module 4-L via the optical axis 4-O'. In this way, the probability of failure of the optical member 4-R due to external impact may be reduced.

Figure 46:
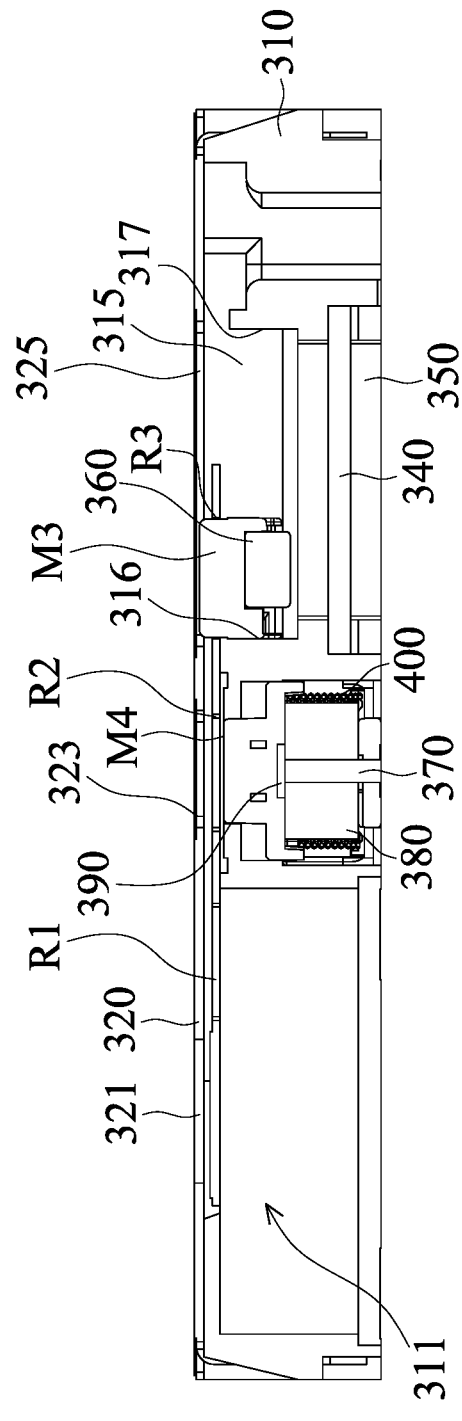

Next, as shown in FIG. 46, the second driving assembly 4-E4 may drive the second movable portion 4-M4 to move downward, so that the second movable portion 4-M4 leaves the fourth receiving portion 4-R2. In this embodiment, the second driving assembly 4-E4 may include a second magnetic conductor 4-370, a second coil 4-380, and a second magnetic element 4-390. The electrical signal may be transmitted to the second coil 4-380, so that the second magnetic conductor 4-370 generates a magnetic force corresponding to the second magnetic element 4-390. In this way, the second magnetic element 4-370 will generate a downward force with the second magnetic element 4-390, so that the second magnetic element 4-390 may offset the elastic force generated by the elastic element 4-400 and drive the second magnetic element 4-400. The second movable portion 4-M4 moves downward. In other words, the maximum driving force generated by the second driving assembly 4-E4 is greater than the elastic force exerted by the elastic element 4-400.

Figure 47:
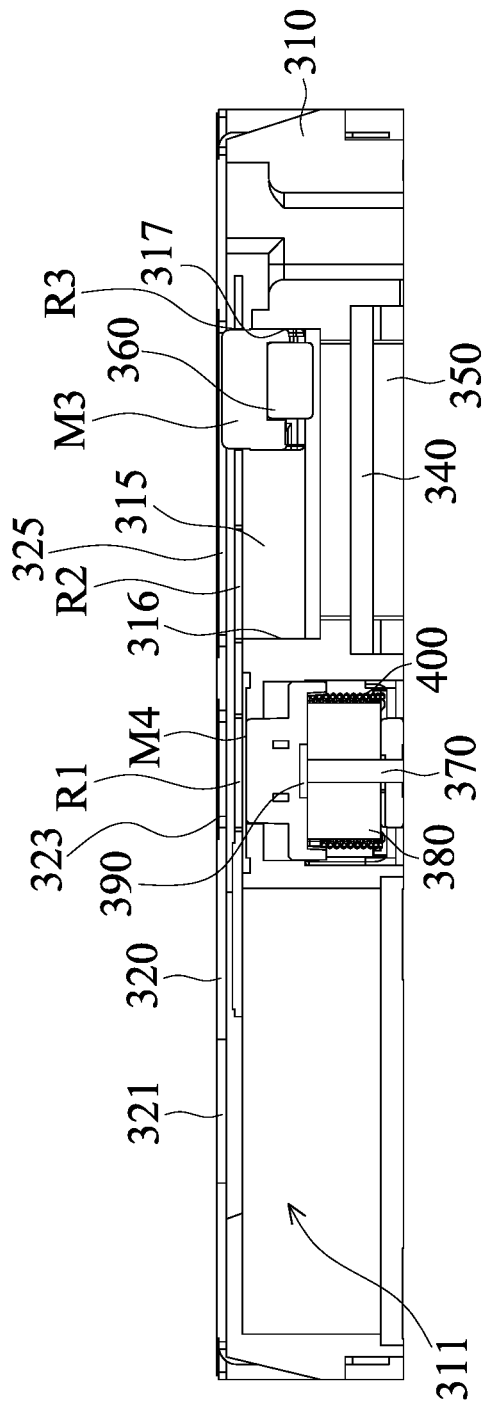

Next, as shown in FIG. 47, the first driving assembly 4-E3 may drive the first movable portion 4-M3 and the optical member 4-R to leave the second position and reach the first position. More specifically, electrical signals may be transmitted to the first coil 4-350, so that the first magnetic conductor 4-340 generates a magnetic force corresponding to the first magnetic element 4-360. In this way, the first magnetic conductor 4-340 generates a force with the first magnetic element 4-360 to drive the first movable portion 4-M3 and the optical member 4-R away from the second position. At this time, the optical member 4-R does not overlap the first optical hole 4-311 and the second optical hole 4-321. In this way, light may enter the optical module 4-L through the optical axis 4-O'. In addition, viewed from a direction perpendicular to the movement direction of the optical member 4-R (for example, the Z axis), the second movable portion 4-M4 partially overlaps the top cover 4-320.

In order to ensure that the first movable portion 4-M3 and the optical member 4-R move after the second movable portion 4-M4 leaves the fourth receiving portion 4-R2, the electrical signal may be transmitted to the first coil 4-350 after transmitted to the second coil 4-380. For example, the time difference between transmitting the electrical signal to the first coil 4-350 and the second coil 4-380 may be between about 1 ms and about 10 ms, such as about 5 ms, but the present disclosure is not limited thereto. With the above design, the probability of damage due to the collision between the second movable portion 4-M4 and the optical member 4-R may be reduced.

Figure 48:
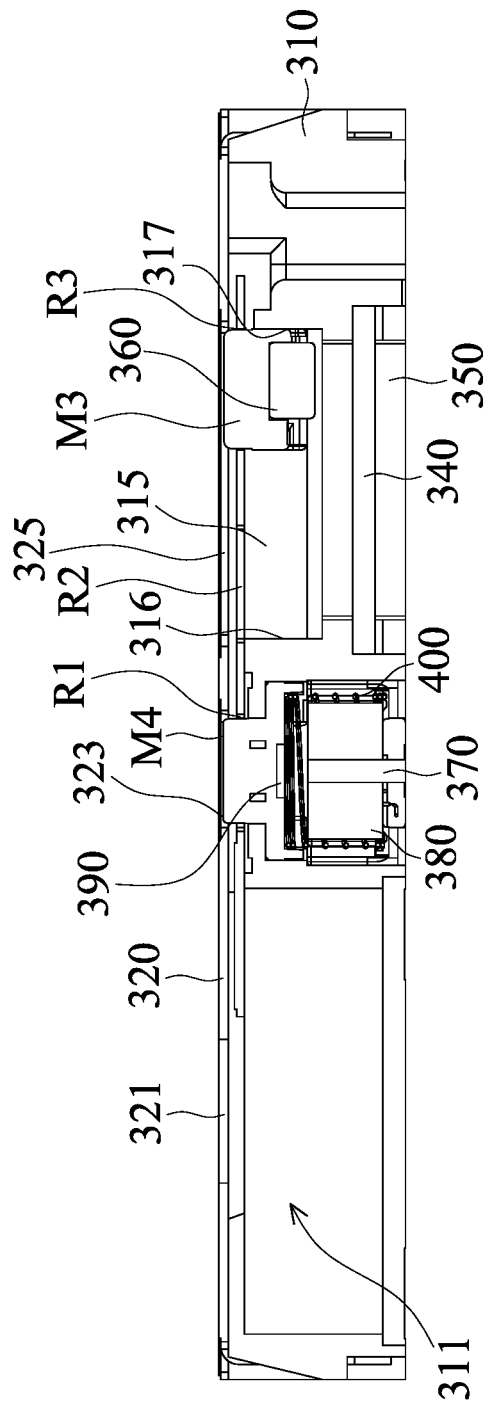

As shown in FIG. 48, after the optical member 4-R reaches the first position (for example, when the first movable portion 4-M3 abuts the second sidewall 4-317), the elastic element 4-400 may drive the second movable portion 4-M4 to move upward, so that the second movable portion 4-M4 passes through the third receiving portion 4-R1. Viewed from the movement direction (for example, parallel to the Z axis) of the second movable portion 4-M4, the size of the third receiving portion 4-R1 is larger than the size of the first receiving portion 4-313 or the size of the second receiving portion 4-323.

Similarly, in order to ensure that the second movable portion 4-M4 moves after the first movable portion 4-M3 abuts the second sidewall 4-317, the electrical signal may be transmitted to the first coil 4-350 after transmitted to the second coil 4-380. For example, the time difference between transmitting the electrical signal to the first coil 4-350 and the second coil 4-380 may be between about 1 ms and about 10 ms, for example, about 5 ms, but the present disclosure is not limited thereto. With the above design, the probability of damage due to the collision between the second movable portion 4-M4 and the optical member 4-R may also be reduced.

As shown in FIG. 48, when the first movable portion 4-M3 is located at the first position, the optical member 4-R does not cover the second optical hole 4-321 at all when viewed along the second direction (for example, the Z axis), so that the first optical hole 4-311 is completely exposed in the second optical hole 4-321. At this time, the first movable portion 4-M3 may be in contact with the second sidewall 4-317, or the fixed portion 4-F (for example, the body 4-310) may be in contact with the stop structure on the first movable portion 4-M3. When viewed along the second direction, the first movable portion 4-M3 is located between the stop structure, wherein the above-mentioned stop structure are arranged along the first direction (for example, the X axis).

Similarly, when the first movable portion 4-M3 is in direct contact with the fixed portion 4-F, the optical member 4-R is not in contact with the fixed portion 4-F. In this way, the probability of damage due to the collision between the optical member 4-R and the fixing portion 4-F may be reduced. In this embodiment, the optical member 4-R and the second movable portion 4-M4 have a non-zero gap, that is, the optical member 4-R and the second movable portion 4-M4 are not in direct contact.

Figure 49:
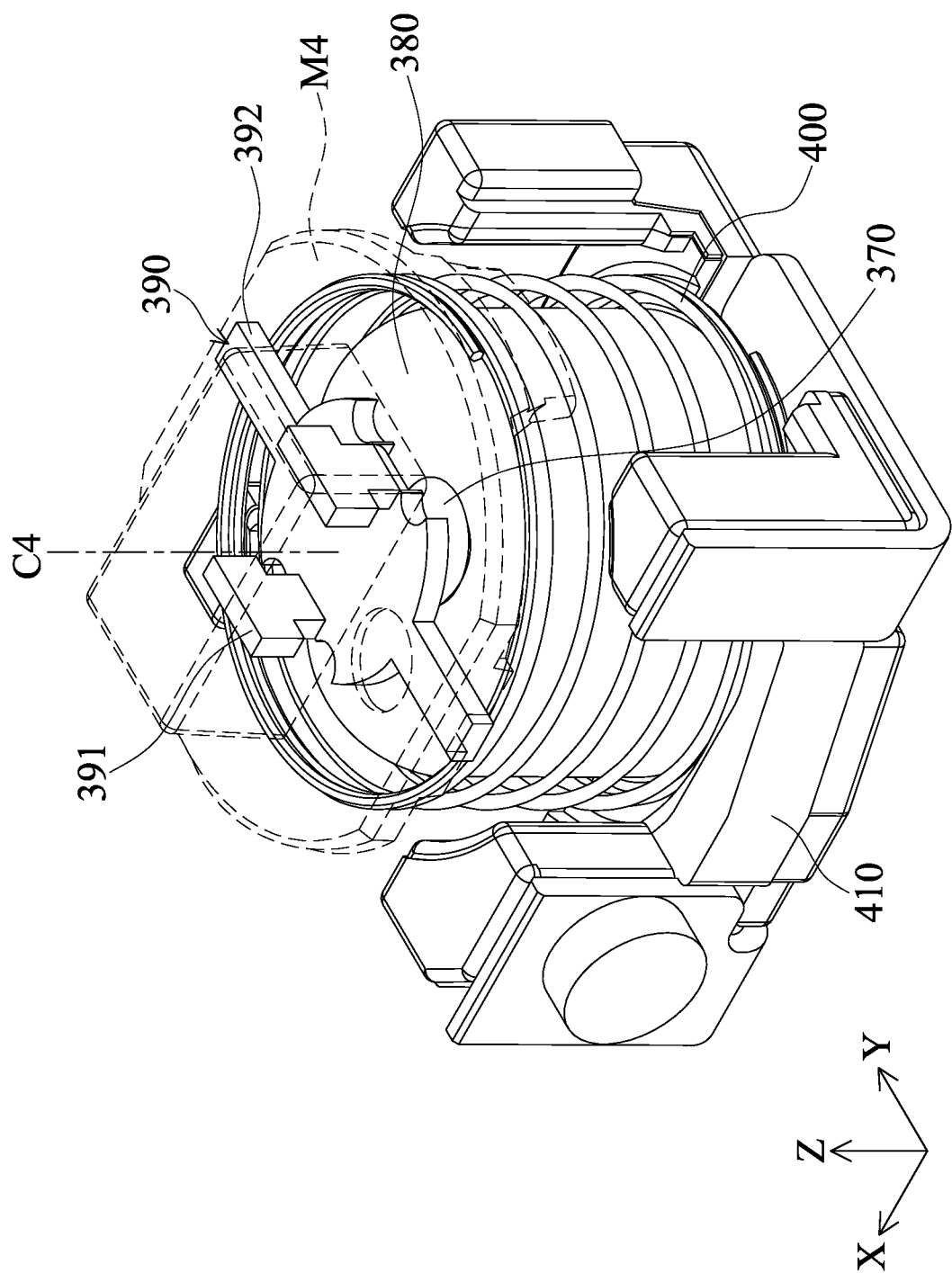
FIG. 49 is a perspective view illustrating the second driving assembly and the bottom cover in accordance with some embodiment of the present disclosure.

FIG. 49 is a perspective view illustrating the second driving assembly 4-E4 and the bottom cover 4-410 in accordance with some embodiment of the present disclosure. It should be noted that, in order to more clearly illustrate the structure of the second driving assembly 4-E4, the second movable portion 4-M4 is drawn with a dotted line in this embodiment. In some embodiments, the second coil 4-380 is adjacent to the second magnetic conductor 4-370. In some embodiments, the second coil 4-380 surrounds the second magnetic conductor 4-370. The second magnetic conductor 4-370 has an elongated structure, and the extension direction (such as the Z axis) of the second magnetic conductor 4-370 is parallel to the winding axis 4-C4 of the second coil. In addition, the second magnetic element 4-390 corresponds to the second coil 4-380. In some embodiments, the second magnetic element 4-390 has a magnetically conductive material. In some embodiments, the second magnetic element 4-390 does not include any permanent magnets. In some embodiments, the second magnetic element 4-390 has a plate-shaped structure, which includes flat plate portions 4-391 and 4-392, which extend in different directions, respectively. The second magnetic element 4-390 is at least partially buried and not exposed in the second movable portion 4-M4 (shown in dashed lines).

Figure 50:
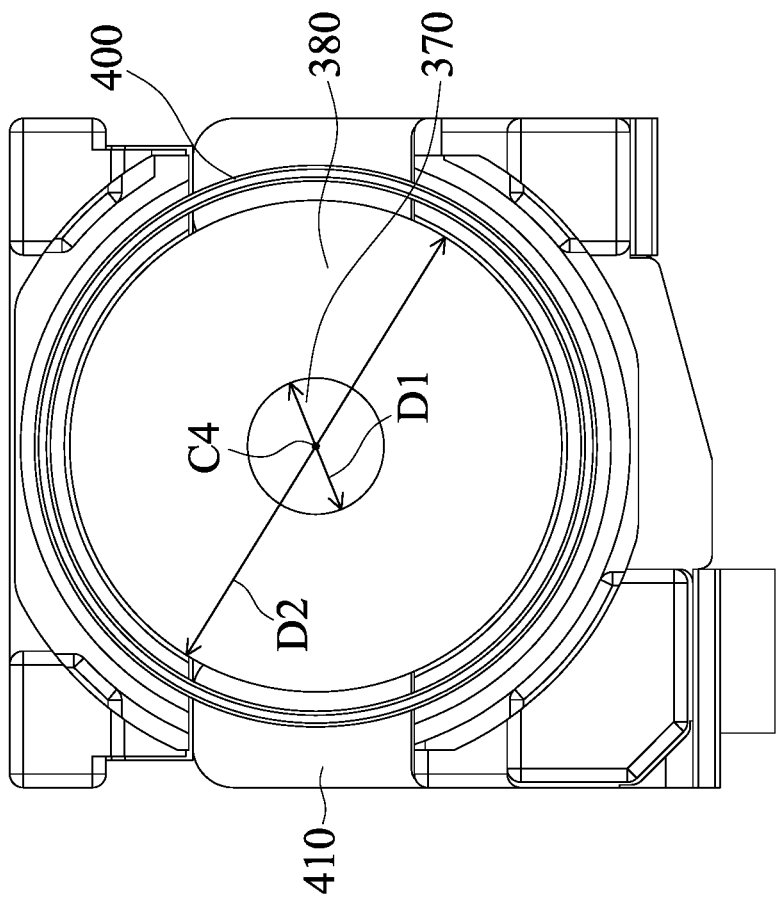
FIG. 50 is a top view illustrating the second driving assembly and the bottom cover in accordance with some embodiment of the present disclosure.

FIG. 50 is a top view illustrating the second driving assembly 4-E4 and the bottom cover 4-410 in accordance with some embodiment of the present disclosure. When viewed along the extension direction of the second magnetic conductor 4-370, in the first direction (such as the X axis), the maximum dimension (such as the diameter 4-D2) of the second coil 4-380 is larger than the maximum size (f such as the diameter 4-D1) of the second magnetic conductor 4-370. In some embodiments, the maximum size of the second coil 4-380 is at least twice the maximum size of the second magnetic conductor 4-370. The elastic element 4-400 surrounds the second coil 4-380. Viewed from the movement direction (such as the Z axis) of the second movable portion 4-M4, the elastic element 4-400 and the second coil 4-380 do not overlap. Viewed from a direction perpendicular to the direction of movement of the second movable portion 4-M4 (for example, the X-Y plane), the elastic element 4-400 and the second coil 4-380 at least partially overlap.

In summary, the embodiment of the present disclosure provides an optical member driving mechanism provided with a movable portion to affix the optical member. By arranging a movable portion with a movement direction different from that of the optical member, the optical member may be fixed in a specific position, which may reduce the probability of failure of the optical member due to external force impact. In addition, the driving time of the movable portion and the driving time of the optical member are designed to have a time difference, which may reduce the probability of damage due to collision between the movable portion and the optical member. In addition, a corresponding stop assembly is provided for the movable portion, so that the movable portion may move stably relative to the fixed portion, which helps to reduce the probability of failure of the optical member driving mechanism.

Fifth Embodiment

Figure 51:
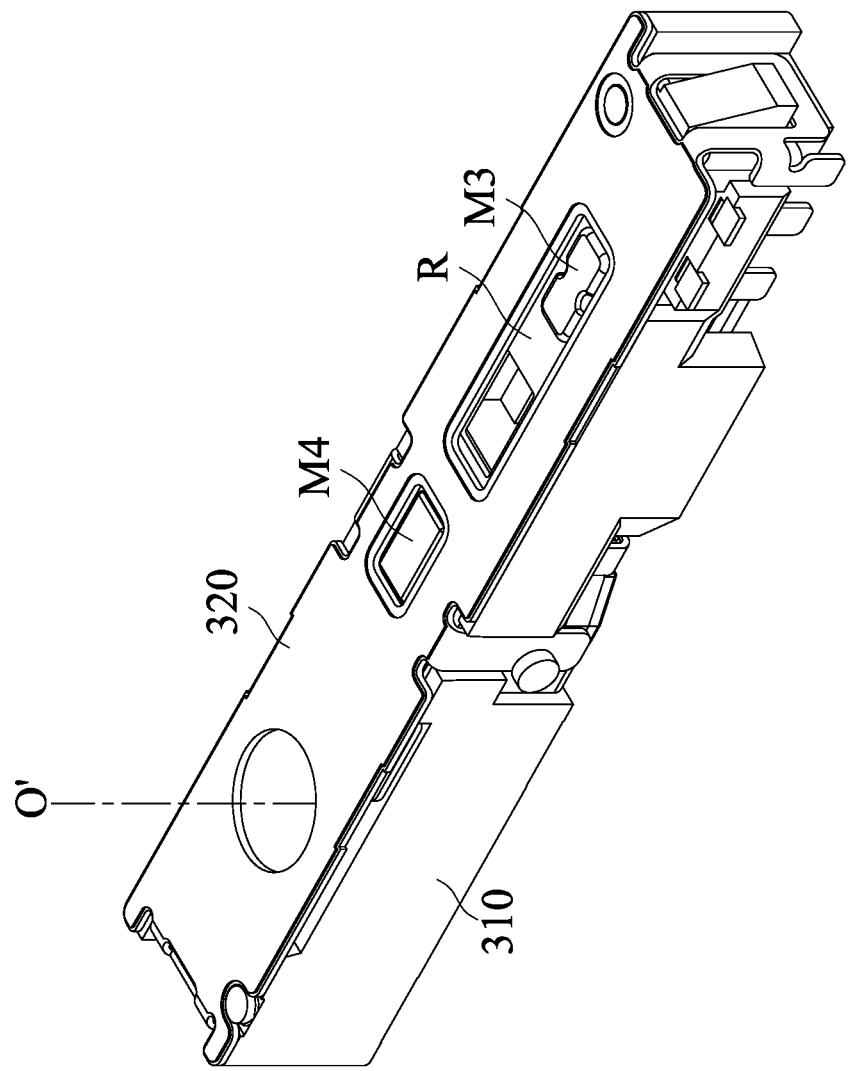
FIG. 51 is a perspective view illustrating the optical member driving mechanism in accordance with some embodiment of the present disclosure.

FIG. 51 is a perspective view illustrating the optical member driving mechanism 5-20 in accordance with some embodiment of the present disclosure. It should be noted that, in this embodiment, the optical member driving mechanism 5-20 is, for example, a shutter mechanism, and may be disposed in an electronic device (not shown) with camera function, and the optical member may be driven by the optical member driving mechanism. By controlling the position of the optical member, light may be passed through or blocked, and the exposure time of the camera module of the electronic device may be controlled.

Figure 52:
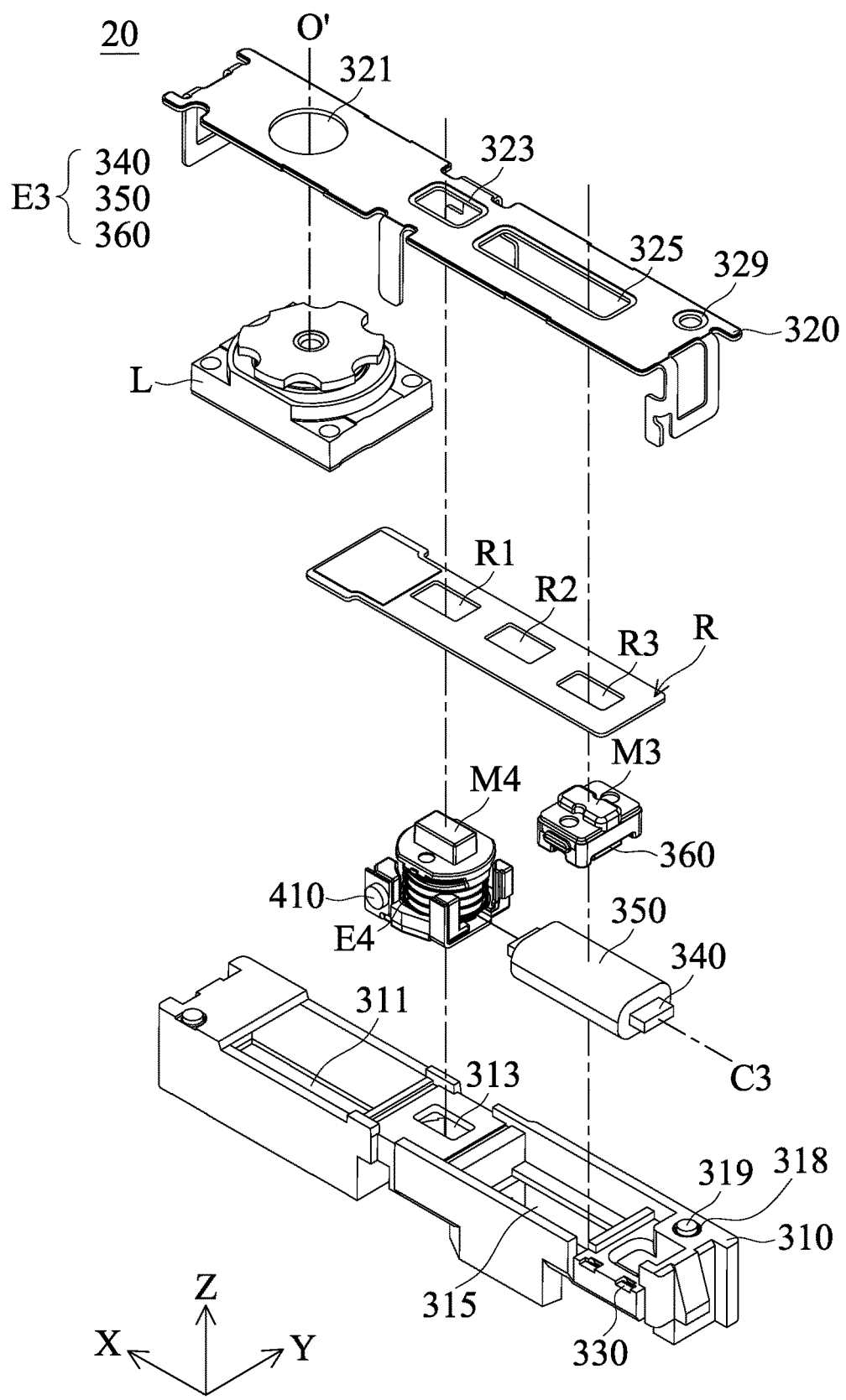
FIG. 52 is an exploded view illustrating the optical member driving mechanism shown in FIG. 51.

FIG. 52 is an exploded view illustrating the optical member driving mechanism 5-20 shown in FIG. 51. As shown in FIG. 52, the optical member driving mechanism 5-20 may include: a holder 5-M3, a fixed portion 5-F, a first driving assembly 5-E3, a positioning assembly 5-M4, and a second driving assembly 5-E4. In this embodiment, the fixed portion 5-F includes a body 5-310, a top cover 5-320, and a bottom cover 5-410. The top cover 5-320 and the bottom cover 5-410 are connected to the body 5-310, and the body 5-310 may be located between the top cover 5-320 and the bottom cover 5-410. The body 5-310 may be configured to carry the holder 5-M3 (the holder 5-M3 and the optical member 5-R may constitute a movable portion), and is connected to the optical module 5-L.

In some embodiments, the body 5-310 has a recess 5-318 and a protrusion 5-319 protruding from the recess 5-318, and a rounded corner is formed between the protrusion 5-319 and the recess 5-318. In this way, the protrusions 5-319 may be effectively disposed in the positioning holes 5-329 of the top cover 5-320, and the top cover 5-320 may be more accurately disposed on the body 5-310. In some embodiments, the fixing portion 5-F and the optical module 5-L may be fixedly disposed on a substrate (not shown). In some embodiments, the optical member driving mechanism 5-20 does not directly contact the optical module 5-L, but the disclosure is not limited thereto.

In the direction parallel to the optical axis 5-O', the maximum size of the optical member driving mechanism 5-20 is larger than the maximum size of the optical module 5-L. For example, the height of the optical member driving mechanism 5-10 along the optical axis 5-O' is greater than the height of the optical module 5-L along the optical axis 5-O'. In addition, the optical member 5-R may include a baffle plate, which includes SOMA or any other suitable light-shielding material. The optical module 5-L may include a camera module, which includes a lens or any other suitable light-transmitting material to allow light to pass in a direction substantially parallel to the optical axis 5-O' to achieve the function of imaging. However, this disclosure is not limited thereto.

The holder 5-M3 may be configured to connect the optical member 5-R, wherein the optical member 5-R may be configured to block light (for example, light traveling in a direction substantially parallel to the optical axis 5-O'). The holder 5-M3 is relatively movable along the X axis (that is, the first direction) relative to the fixed portion 5-F. The first driving assembly 5-E3 is used for driving the holder 5-M3 to move substantially along the X axis (that is, the first direction) relative to the fixed portion 5-F. In this embodiment, the first driving assembly 5-E3 includes a first magnetic conductor 5-340, a first coil 5-350, and a first magnetic element 5-360 corresponding to the first coil 5-350. In this embodiment, the first coil 5-350 has a winding axis 5-C3, which is substantially parallel to the X axis.

In some embodiments, the first driving assembly 5-E3 may make the holder 5-M3 (and the connected optical member 5-R) to move between in the first position (also referred to as the first extreme position) and the second position (also referred to as the second extreme position). For example, the first position and the second position may be arranged along the X axis (that is, the line connecting the first position and the second position may be substantially parallel to the X axis). That is, the connection line between the first position and the second position is different from the optical axis 5-O' (Z axis). In some embodiments, the line (for example, the X axis) connecting the first position and the second position is substantially perpendicular to the optical axis 5-O' (for example, the Z axis).

The positioning assembly 5-M4 may be used to affix the optical member 5-R at the first position or the second position relative to the fixed portion 5-F. The second driving assembly 5-E4 may be used to drive the positioning assembly 5-M4 to move relative to the fixed portion 5-F substantially along the Z axis (that is, the second direction). It is shown that the movement direction of the positioning assembly 5-M4 is different from the movement direction of the optical member 5-R. In some embodiments, the movement direction of the positioning assembly 5-M4 is substantially perpendicular to the movement direction of the optical member 5-R. In some embodiments, the positioning assembly 5-M4 may affix the optical member 5-R at the first position or the second position relative to the fixed portion 5-F.

In this embodiment, the optical member driving mechanism 5-20 further includes an elastic element 5-400 that abuts the positioning assembly 5-M4 and may drive the positioning assembly 5-M4 to move relative to the fixed portion 5-F. The elastic element 5-400 may be arranged on the bottom cover 5-410. In some embodiments, the elastic element 5-400 may drive the positioning assembly 5-M4 to move relative to the fixed portion 5-F in the second direction (for example, parallel to the Z axis). More specifically, the elastic element 5-400 may continuously exert an elastic force that is parallel to the second direction (for example, toward the top cover 5-320) to the positioning assembly 5-M4.

Figure 53:
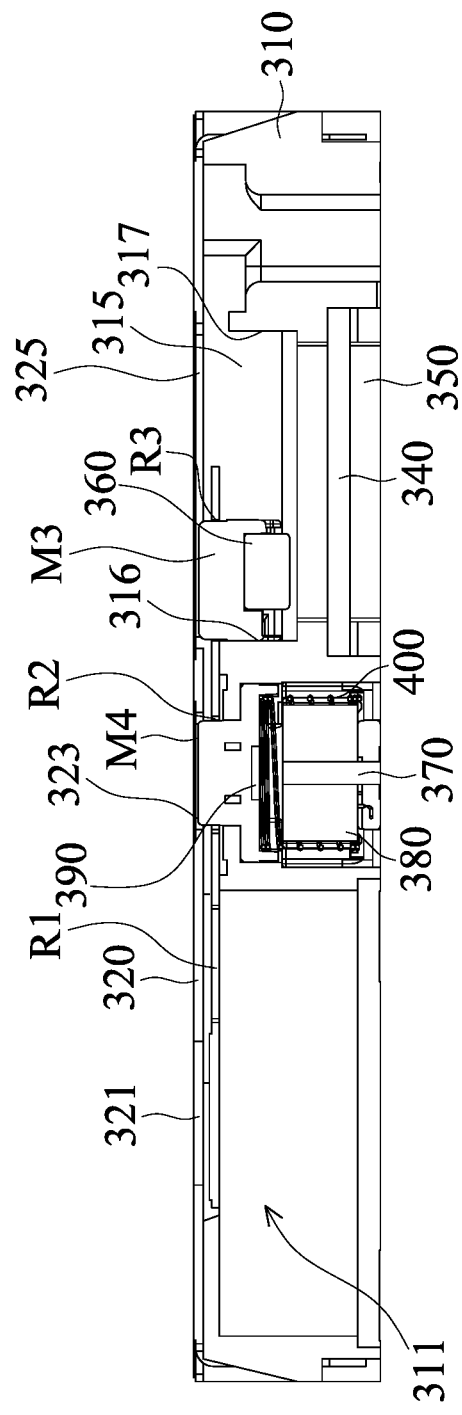
FIGS. 53 to 58 are cross-sectional views illustrating the optical member driving mechanism in accordance with some embodiment of the present disclosure.

FIGS. 53 to 58 are cross-sectional views illustrating the optical member driving mechanism 5-20 in accordance with some embodiment of the present disclosure. As shown in FIG. 53, the body 5-310 has a first optical hole 5-311, which corresponds to the optical module 5-L. The top cover 5-320 has a second optical hole 5-321 corresponding to the optical module 5-L and the first optical hole 5-311. In some embodiments, the shapes of the first optical holes 5-311 and the second optical holes 5-321 are different. As shown in FIG. 53, the optical member 5-R is at the second position. At this time, the optical member 5-R completely overlaps the first optical hole 5-311 and the second optical hole 5-321. In this way, the optical member 5-R may block the light and prevent the light from entering the optical module 5-L via the optical axis 5-O' (as shown in FIG. 52).

In addition, the body 5-310 has a first receiving portion 5-313 for receiving the positioning assembly 5-M4. The top cover 5-320 has a second receiving portion 5-323 for receiving the positioning assembly 5-M4. In this embodiment, the size of the first receiving portion 5-313 is substantially equal to the size of the second receiving portion 5-323. In some embodiments, the size of the first receiving portion 5-313 is smaller than the size of the second receiving portion 5-323. In addition, the optical member 5-R has a third receiving portion 5-R1 and a fourth receiving portion 5-R2, corresponding to the positioning assembly 5-M4, respectively. When the optical member 5-R is located at the second position (that is, when it completely overlaps the first optical hole 5-311 and the second optical hole 321), the positioning assembly 5-M4 passes through the fourth receiving portion 5-R2.

As shown in FIG. 53, the optical member 5-R is located between the body 5-310 and the top cover 5-320. Viewed from the movement direction of the positioning assembly 5-M4 (for example, parallel to the Z axis), the size of the fourth receiving portion 5-R2 is larger than the size of the first receiving portion 5-313 or the size of the second receiving portion 5-323. As a result, the gap between the positioning assembly 5-M4 and the optical member 5-R is smaller than the gap between the optical member 5-R and the fixed portion 5-F (for example, the body 5-310, the top cover 5-320, etc.). With this configuration, the probability that the positioning assembly 5-M4 cannot move normally due to the contact between the positioning assembly 5-M4 and the optical member 5-R may be reduced. For example, the first receiving portion 5-313 has a recessed structure to provide a space for the positioning assembly 5-M4 to move. For example, the first receiving portion 5-313, the second receiving portion 5-323, the third receiving portion 5-R1, and the fourth receiving portion 5-R2 are rectangular, but the disclosure is not limited thereto. In some embodiments, the first receiving portion 5-313, the second receiving portion 5-323, the third receiving portion 5-R1, and the fourth receiving portion 5-R2 may be any shape corresponding to the positioning assembly 5-M4, as long as the positioning assembly 5-M4 may be received.

In addition, the body 5-310 has a first opening 5-315 for receiving the holder 5-M3, and the first driving assembly 5-E3 (including the first magnetic conductor 5-340, the first coil 5-350 and the first magnetic element 5-360) drives the holder 5-M3 to move in the first opening 5-315. The top cover 5-320 has a second opening 5-325 for receiving the holder 5-M3, and the first driving assembly 5-E3 drives the holder 5-M3 to move in the second opening 5-325. In some embodiments, the size of the first opening 5-315 is different from the size of the second opening 5-325. In some embodiments, the size of the first opening 5-315 is larger than the size of the second opening 5-325.

The optical member 5-R has a third opening 5-R3 corresponding to the holder 5-M3. In some embodiments, the holder 5-M3 may be disposed in the third opening 5-R3. In some embodiments, the size of the first opening 5-315 is different from the size of the third opening 5-R3. In some embodiments, the size of the first opening 5-315 is larger than the size of the third opening 5-R3. In some embodiments, the size of the second opening 5-325 is different from the size of the third opening 5-R3. In some embodiments, the size of the second opening 5-325 is larger than the size of the third opening 5-R3. It is shown in FIG. 45 that the size of the first opening 5-315 is different from the size of the first receiving portion 5-313. In some embodiments, the size of the first opening 5-315 is larger than the size of the first receiving portion 5-313. The first opening 5-315 has a first sidewall 5-316 and a second sidewall 5-317 opposite to the first sidewall 5-316. The first sidewall 5-316 and the second sidewall 5-317 may constitute a stop portion for limiting the movement of the holder 5-M3 relative to the fixed portion 5-F within a range of motion. When the positioning assembly 5-M4 is in the second position, the holder 5-M3 abuts the first sidewall 5-316.

As shown in FIG. 53, when the holder 5-M3 is located at the second position, viewed along the second direction (such as the Z axis), the optical member 5-R completely covers the second optical hole 5-321, so that the first optical hole 5-311 is completely not exposed from the second optical hole 5-321. At this time, the holder 5-M3 may be in contact with the first sidewall 5-316, or the fixed portion 5-F (for example, the body 5-310) may be in contact with the stop structure on the holder 5-M3. When the holder 5-M3 is in direct contact with the fixed portion 5-F, and the optical member 5-R is not in contact with the fixed portion 5-F. In this way, the probability of damage due to the collision of the optical member 5-R and the fixing portion 5-F with each other may be reduced. In this embodiment, the optical member 5-R and the positioning assembly 5-M4 have a non-zero gap, that is, the optical member 5-R and the positioning assembly 5-M4 are not in direct contact.

Since the elastic element 5-400 continues to exert an upward elastic force on the positioning assembly 5-M4, the positioning assembly 5-M4 may protrude from the first receiving portion 5-313 and the fourth receiving portion 5-R2, maintaining the optical member 5-R at the second position to keep blocking the light entering the optical module 5-L via the optical axis 5-O'. In this way, the probability of failure of the optical member 5-R due to external impact may be reduced.

Figure 54:
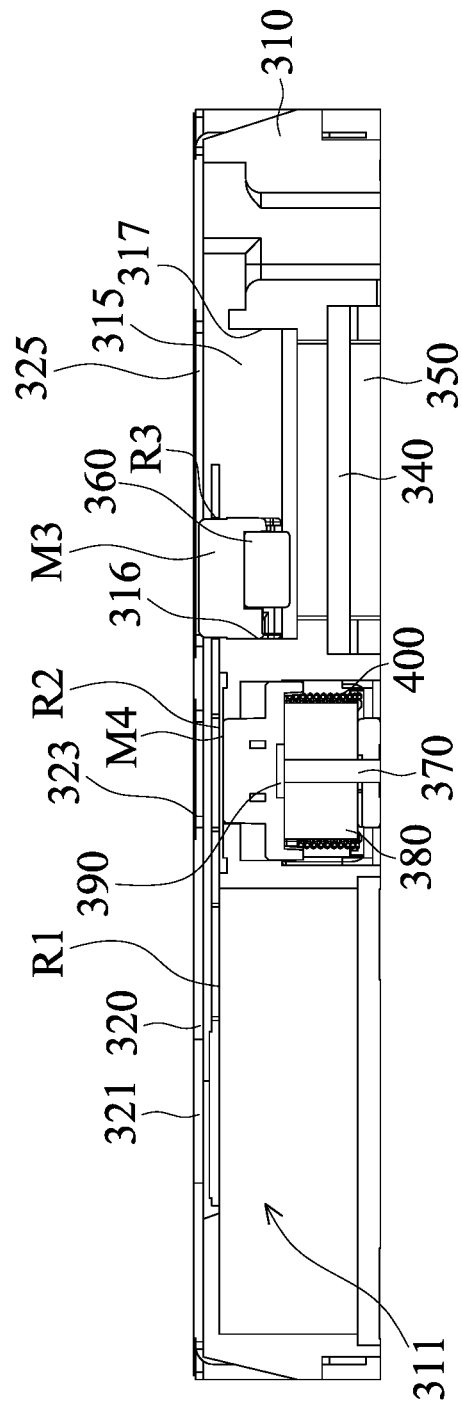

Next, as shown in FIG. 54, the second driving assembly 5-E4 may drive the positioning assembly 5-M4 to move downward, so that the positioning assembly 5-M4 leaves the fourth receiving portion 5-R2. In this embodiment, the second driving assembly 5-E4 may include a second magnetic conductor 5-370, a second coil 5-380, and a second magnetic element 5-390. The electrical signal may be transmitted to the second coil 5-380, so that the second magnetic conductor 5-370 generates a magnetic force corresponding to the second magnetic element 5-390. In this way, the second magnetic element 5-370 will generate a downward force with the second magnetic element 5-390, so that the second magnetic element 5-390 may offset the elastic force generated by the elastic element 5-400 and drive the second magnetic element 5-400. The positioning assembly 5-M4 moves downward. In other words, the maximum driving force generated by the second driving assembly 5-E4 is greater than the elastic force exerted by the elastic element 5-400.

Figure 55:
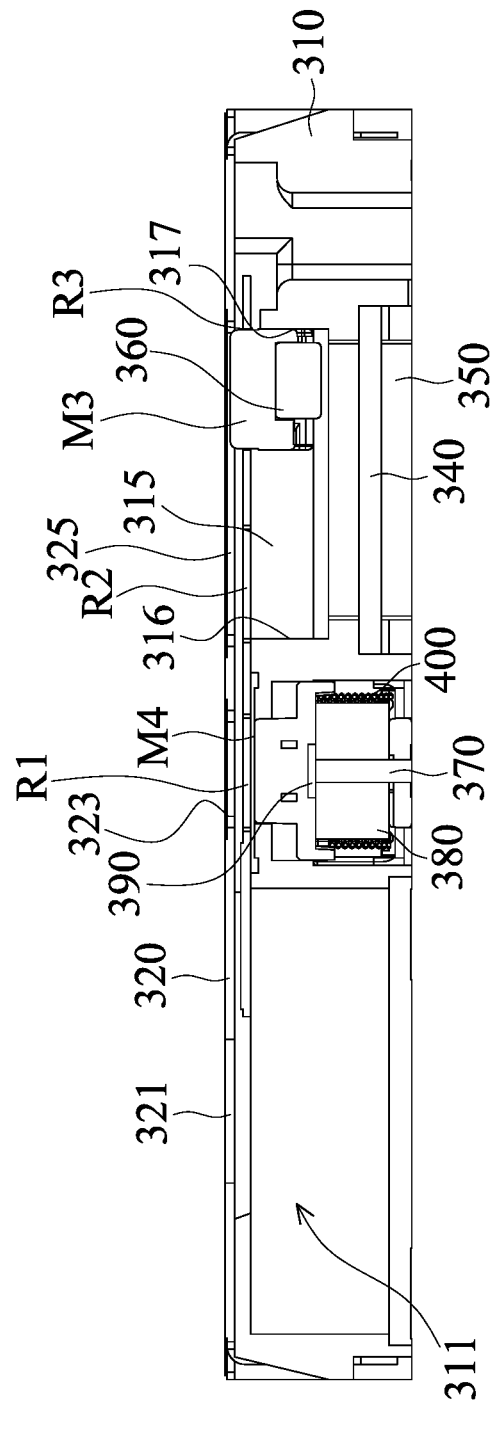

Next, as shown in FIG. 55, the first driving assembly 5-E3 may drive the holder 5-M3 and the optical member 5-R to leave the second position and reach the first position. More specifically, electrical signals may be transmitted to the first coil 5-350, so that the first magnetic conductor 5-340 generates a magnetic force corresponding to the first magnetic element 5-360. In this way, the first magnetic conductor 5-340 generates a force with the first magnetic element 5-360 to drive the holder 5-M3 and the optical member 5-R away from the second position. At this time, the optical member 5-R does not overlap the first optical hole 5-311 and the second optical hole 5-321. In this way, light may enter the optical module 5-L through the optical axis 5-O'. In addition, viewed from a direction perpendicular to the movement direction of the optical member 5-R (for example, the Z axis), the positioning assembly 5-M4 partially overlaps the top cover 5-320.

In order to ensure that the holder 5-M3 and the optical member 5-R move after the positioning assembly 5-M4 leaves the fourth receiving portion 5-R2, the electrical signal may be transmitted to the first coil 5-350 after transmitted to the second coil 5-380. For example, the time difference between transmitting the electrical signal to the first coil 5-350 and the second coil 5-380 may be between about 1 ms and about 10 ms, such as about 5 ms, but the present disclosure is not limited thereto. With the above design, the probability of damage due to the collision between the positioning assembly 5-M4 and the optical member 5-R may be reduced.

Figure 56:
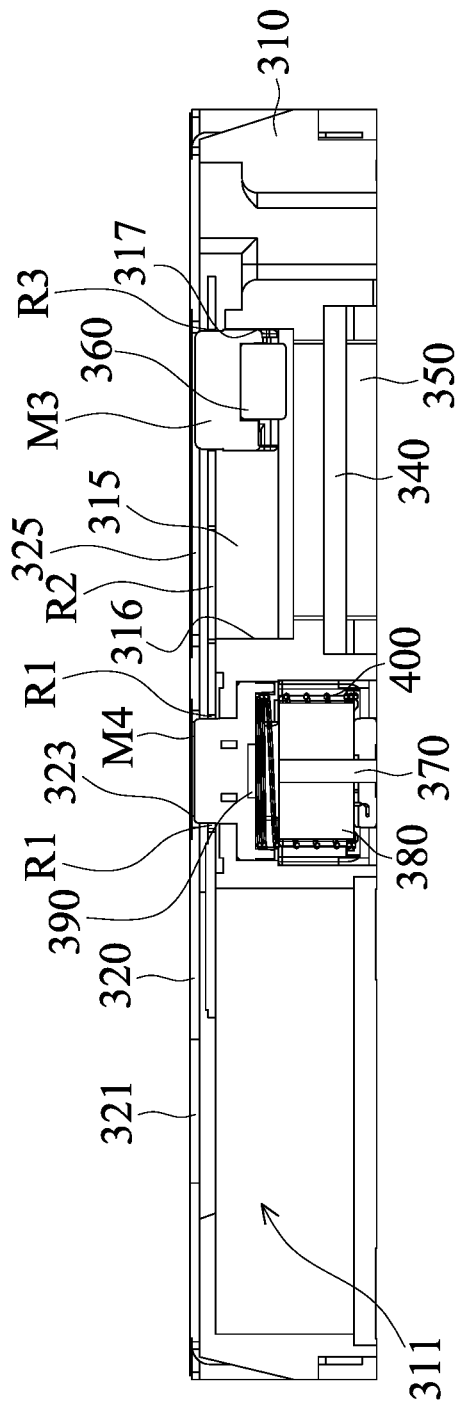

As shown in FIG. 56, after the optical member 5-R reaches the first position (for example, when the holder 5-M3 abuts the second sidewall 5-317), the elastic element 5-400 may drive the positioning assembly 5-M4 to move upward, so that the positioning assembly 5-M4 passes through the third receiving portion 5-R1. Viewed from the movement direction (for example, parallel to the Z axis) of the positioning assembly 5-M4, the size of the third receiving portion 5-R1 is larger than the size of the first receiving portion 5-313 or the size of the second receiving portion 5-323.

Similarly, in order to ensure that the positioning assembly 5-M4 moves after the holder 5-M3 abuts the second sidewall 5-317, the electrical signal may be transmitted to the first coil 5-350 after transmitted to the second coil 5-380. For example, the time difference between transmitting the electrical signal to the first coil 5-350 and the second coil 5-380 may be between about 1 ms and about 10 ms, for example, about 5 ms, but the present disclosure is not limited thereto. With the above design, the probability of damage due to the collision between the positioning assembly 5-M4 and the optical member 5-R may also be reduced.

As shown in FIG. 56, when the holder 5-M3 is located at the first position, the optical member 5-R does not cover the second optical hole 5-321 at all when viewed along the second direction (for example, the Z axis), so that the first optical hole 5-311 is completely exposed in the second optical hole 5-321. At this time, the holder 5-M3 may be in contact with the second sidewall 5-317, or the fixed portion 5-F (for example, the body 5-310) may be in contact with the stop structure on the holder 5-M3. When viewed along the second direction, the holder 5-M3 is located between the stop structure, wherein the above-mentioned stop structure are arranged along the first direction (for example, the X axis).

Similarly, when the holder 5-M3 is in direct contact with the fixed portion 5-F, the optical member 5-R is not in contact with the fixed portion 5-F. In this way, the probability of damage due to the collision between the optical member 5-R and the fixing portion 5-F may be reduced. In this embodiment, the optical member 5-R and the positioning assembly 5-M4 have a non-zero gap, that is, the optical member 5-R and the positioning assembly 5-M4 are not in direct contact.

Figure 57:
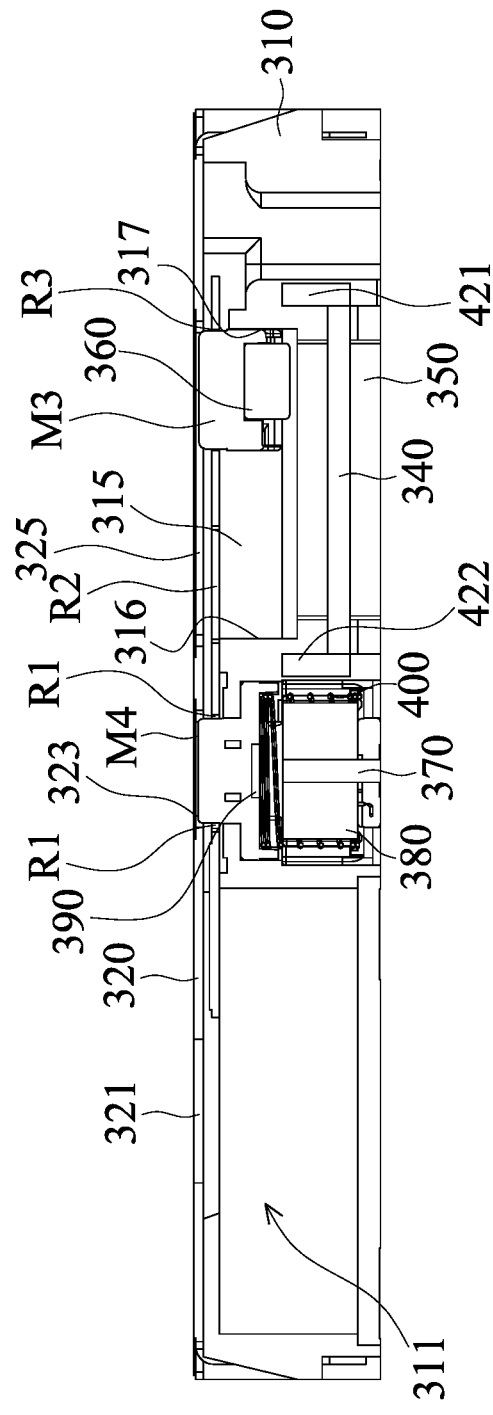

As shown in FIG. 57, the optical member driving mechanism 5-20 further includes a preload assembly 5-420, which may be configured to position the movable portion (including the holder 5-M3 and the optical element 5-R) at the first position or the second position relative to the fixed portion 5-F when the first driving assembly 5-E3 is not operated. In this embodiment, the preload assembly 5-420 further includes a first preload element 5-421 and a second preload element 5-422, both of which are made of magnetically permeable material and correspond to the first magnetic element 5-360. As shown in FIG. 57, when the movable portion is at the first position relative to the fixed portion 5-F, the first preload element 5-421 and the first magnetic element 5-360 generate a first force (for example, a magnetic force) to position the movable portion relative to the fixed portion 5-F at the first position when the first driving assembly 5-E3 is not operating. As such, the abnormal operation of the optical member driving mechanism 5-20 may be avoided.

In some embodiments, the first preload element 5-421 is fixedly connected to the first coil 5-350. In some embodiments, the first preload element 5-421 is fixedly connected to the first magnetic conductor 5-340 and directly contacts the first magnetic conductor 5-340. In some embodiments, the first preload element 5-421 and the first magnetic conductor 5-340 are integrally formed. In some embodiments, the first preload element 5-421 has an elongated structure extending along a second direction (such as the Z axis), where the second direction is different from the first direction (such as the X axis) in which the first magnetic conductor 5-340 extends. In some embodiments, the first direction is perpendicular to the second direction. As shown in FIG. 57, the first preload element 5-421 is not lower than the first coil 5-350 in the second direction. In some embodiments, the first preload element 5-421 is higher than the first coil 5-350 in the second direction. In other words, when viewed along the first direction, the first preload element 5-421 exceeds the contour of the first coil 5-350.

In some embodiments, the center of the first preload element 5-421 and the center of the first magnetic element 5-360 are not located on the same horizontal plane (for example, the X-Y plane). In other words, the line connecting the center of the first preload element 5-421 and the center of the first magnetic element 5-360 is not parallel to the first direction or the second direction, and is not perpendicular to the first direction or the second direction. In this way, the direction of the first force generated by the first preload element 5-421 and the first magnetic element 5-360 (approximately parallel to the line connecting the center of the first preload element 5-421 and the first magnetic element 5-360) is not parallel to the first direction or the second direction, and is not perpendicular to the first direction or the second direction.

When the movable portion is at the first position, a first spacer is located between the first preload element 5-421 and the first magnetic element 5-360, so that the first preload element 5-421 and the first magnetic element 5-360 is not in direct contact. In some embodiments, the holder 5-M3 is at least partially located between the first preload element 5-421 and the first magnetic element 5-360, and the first spacer and the holder 5-M3 have an integral structure. In some embodiments, the first preload element 5-421 may be exposed on the surface of the fixed portion 5-F, and when the movable portion is in the first position, the holder 5-M3 and the first preload element 5-421 may be direct contact.

In addition, the holder 5-M3 may expose the first magnetic element 5-360 at least partially to the first preload element 5-421, thereby enabling the first force generated by the first preload element 5-421 and the first magnetic element 5-360 to position the movable portion in the first position more firmly. When the movable portion is at the first position, there is a first distance between the first preload element 5-421 and the first magnetic element 5-360. When the movable portion is at the first position, there is a second distance between the first preload element 5-421 and the first coil 5-350. In some embodiments, the first distance may be greater than or equal to the second distance. It should be understood that the above-mentioned first distance and second distance are respectively the shortest distances between two elements.

Figure 58:
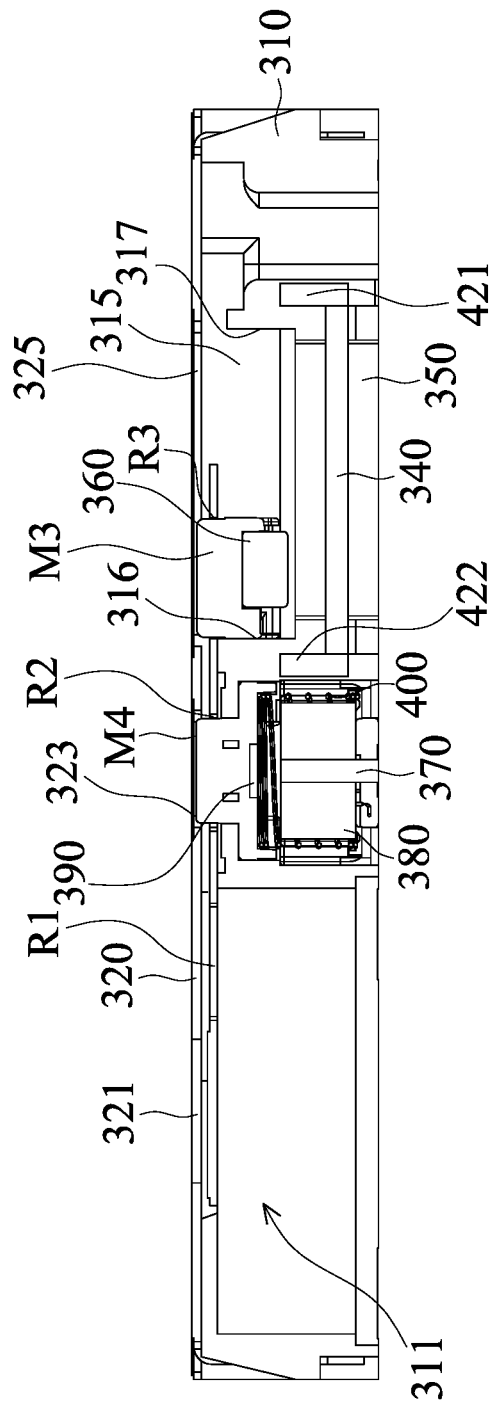

As shown in FIG. 58, when the movable portion is located at the first position relative to the fixed portion 5-F, the second preload element 5-422 and the first magnetic element 5-360 generate a second force (for example, a magnetic force) to position the movable portion at the second position relative to the fixed portion 5-F when the first driving assembly 5-E3 is not operated, thereby avoiding abnormal operation of the optical member driving mechanism 5-20.

The second preload element 5-422 is fixedly connected to the first coil 5-350. In some embodiments, the second preload element 5-422 is fixedly connected to the first magnetic conductor 5-340 and directly contacts the first magnetic conductor 5-340. In some embodiments, the second preload element 5-422 and the first magnetic conductor 5-340 are integrally formed. In some embodiments, the second preload element 5-422 has an elongated structure extending along a second direction (such as the Z axis), where the second direction is the different from the first direction (such as the X axis) in which the first magnetic conductor 5-340 extends. In some embodiments, the first direction is perpendicular to the second direction. As shown in FIG. 58, the second preload element 5-422 is not lower than the first coil 5-350 in the second direction. In some embodiments, the second preload element 5-422 is higher than the first coil 5-350 in the second direction. In other words, when viewed along the first direction, the second preload element 5-422 exceeds the contour of the first coil 5-350.

In some embodiments, the center of the second preload element 5-422 and the center of the first magnetic element 5-360 are not located on the same horizontal plane (for example, the X-Y plane). In other words, the line connecting the center of the second preload element 5-422 and the center of the first magnetic element 5-360 is not parallel to the first direction or the second direction, and is not perpendicular to the first direction or the second direction. In this way, the direction of the second force generated by the second preload element 5-422 and the first magnetic element 5-360 (approximately parallel to the line connecting the center of the second preload element 5-422 and the center of the first magnetic element 5-360) is not parallel to the first direction or the second direction, and is not perpendicular to the first direction or the second direction. In some embodiments, the direction of the first force is different from the direction of the second force. In some embodiments, the direction of the first force is not parallel and not perpendicular to the direction of the second force.

When the movable portion is located at the second position, there may be a second spacer between the second preload element 5-422 and the first magnetic element 5-360, so that the second preload element 5-422 and the first magnetic element 5-360 are not in direct contact. In some embodiments, the holder 5-M3 is at least partially located between the second preload element 5-422 and the first magnetic element 5-360, and the second spacer and the holder 5-M3 have an integrated structure. In some embodiments, the second preload element 5-422 may be exposed on the surface of the fixed portion 5-F, and when the movable portion is at the second position, the holder 5-M3 and the second preload element 5-422 may be direct contact.

In addition, the holder 5-M3 may at least partially expose the first magnetic element 5-360 to the second preload element 5-422, thereby enabling the second force generated by the second preload element 5-422 and the first magnetic element 5-360 to position the movable portion in the second position more firmly. When the movable portion is at the second position, there is a third distance between the second preload element 5-422 and the first magnetic element 5-360. When the movable portion is at the second position, there is a fourth distance between the second preload element 5-422 and the first coil 5-350. In some embodiments, the third distance may be greater than or equal to the fourth distance. It should be understood that the third distance and the fourth distance are the shortest distances between the two elements.

In addition, when the movable portion is located at the first position relative to the fixed portion 5-F, the positioning assembly 5-M4 does not directly contact the optical element 5-R. Since there is a gap between the positioning assembly 5-M4 and the optical element 5-R, it is advantageous to move the positioning assembly 5-M4 relative to the optical element 5-R. In some embodiments, when viewed along the second direction (for example, the Z axis), the first preload element 5-421 is located between the first driving assembly 5-E3 and the second driving assembly 5-E4. In some embodiments, when viewed along the first direction (for example, the X axis), the first driving assembly 5-E3 and the second driving assembly 5-E4 at least partially overlap. In some embodiments, when viewed along the first direction, the second driving assembly 5-E4 at least partially overlaps the first preload element 5-421 and the second preload element 5-422, and the fixing portion 5-F is located between the preload assembly 5-420 and the second drive component 5-E4. With the above configuration, the optical member driving mechanism 5-20 may be miniaturized, or electromagnetic interference between the preload assembly 5-420 and the second driving assembly 5-E4 may be avoided.

Figure 59:
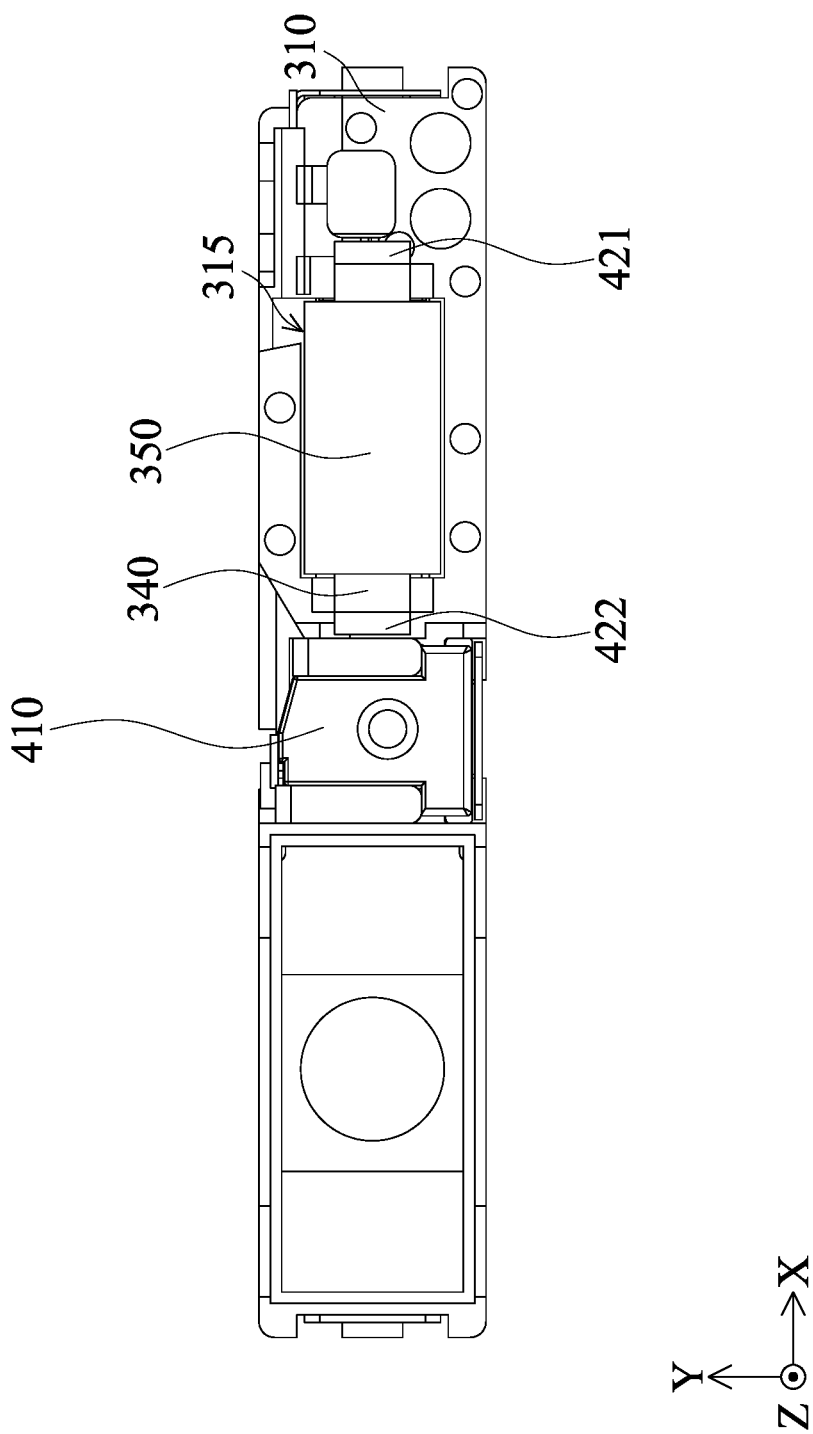
FIG. 59 is a bottom view illustrating the optical member driving mechanism in accordance with some embodiment of the present disclosure.

FIG. 59 is a bottom view illustrating the optical member driving mechanism 5-20 in accordance with some embodiments of the present disclosure. As shown in FIG. 59, when viewed from a direction perpendicular to the first direction (such as the Z axis), the fixing portion 5-F (including the body 5-310 and the bottom cover 5-410) is at least partially expose the first coil 5-350 disposed on the first magnetic conductor 5-340. More specifically, the first opening 5-315 of the body 5-310 may be used to receive the first coil 5-350. In some embodiments, an adhesive (not shown) is provided between the fixing portion 5-F and the first coil 5-350 (for example, in the first opening 5-315) to affix and protect the first coil 5-350. In some embodiments, the first coil 5-350 is located between the first magnetic element 5-360 and the adhesive.

In summary, the embodiment of the present disclosure provides an optical member driving mechanism including a preload assembly. By means of the force (for example, a magnetic force) generated by the preload assembly and the magnetic element, the movable portion may be positioned at a specific position relative to the fixed portion when the first driving assembly is not operated, thereby avoiding abnormal operation of the optical member driving mechanism, which helps to reduce the probability of failure of the optical member driving mechanism. In addition, the driving assembly and the preload assembly are at least partially overlapped, which may achieve the miniaturization of the optical member driving mechanism. The fixed portion is disposed between the preload assembly and the driving assembly to avoid electromagnetic interference between the former two.

Sixth Embodiment

Figure 60:
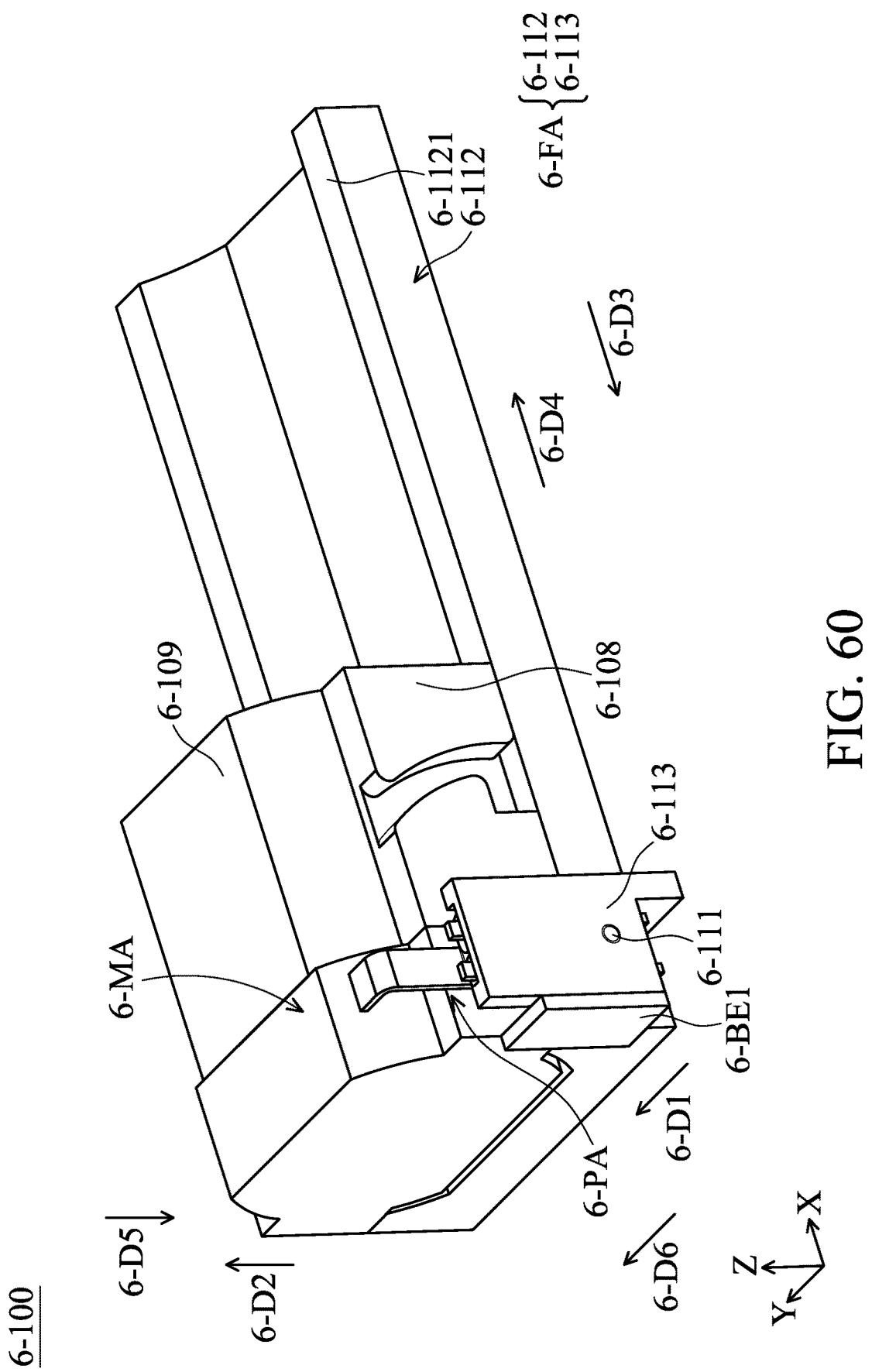
FIG. 60 is a schematic diagram of an optical element driving mechanism 6-100 according to an embodiment of the present disclosure.
Figure 61:
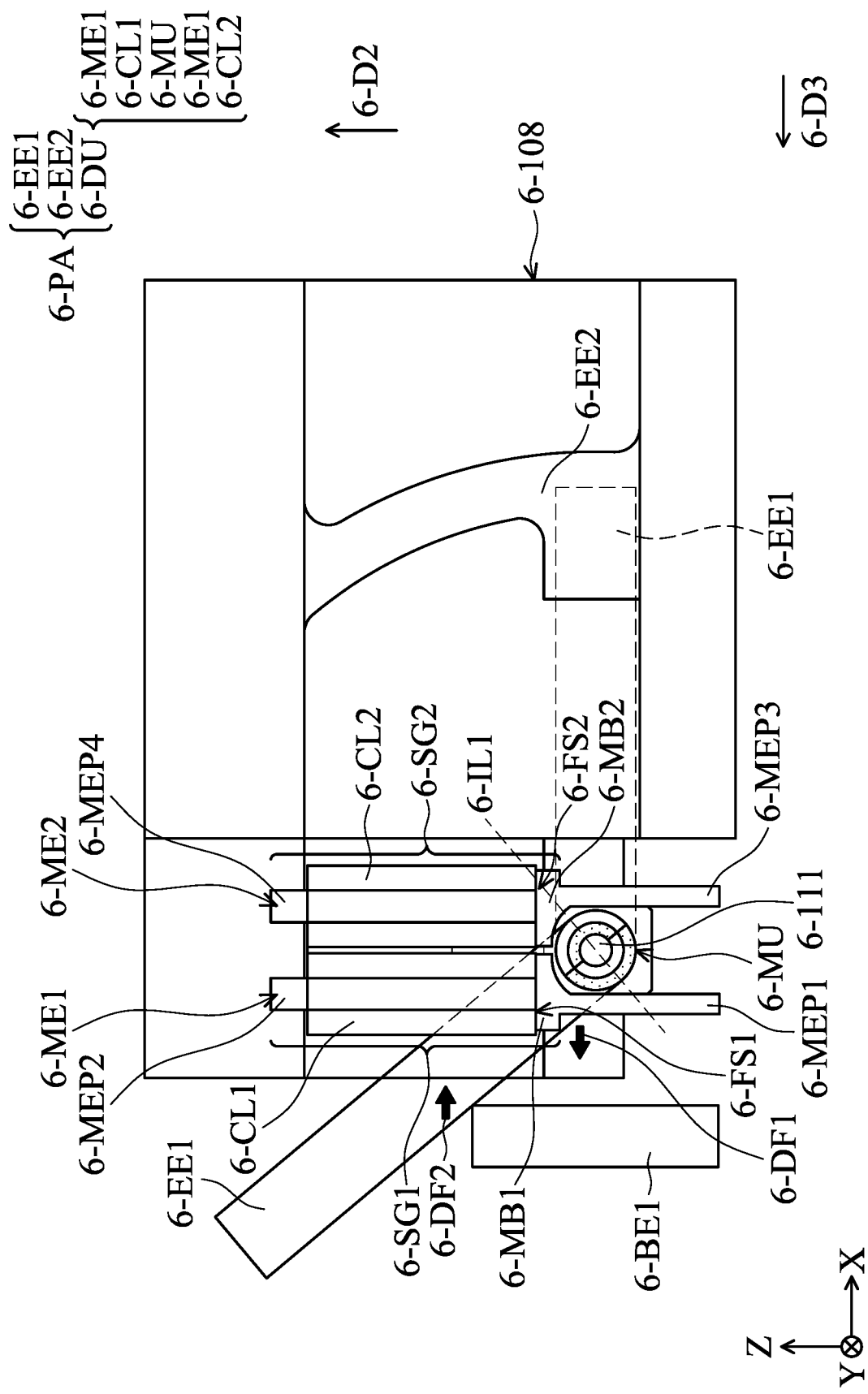
FIG. 61 is a side view of a partial structure of the optical element driving mechanism 6-100 according to the embodiment of the present disclosure.
Figure 62:
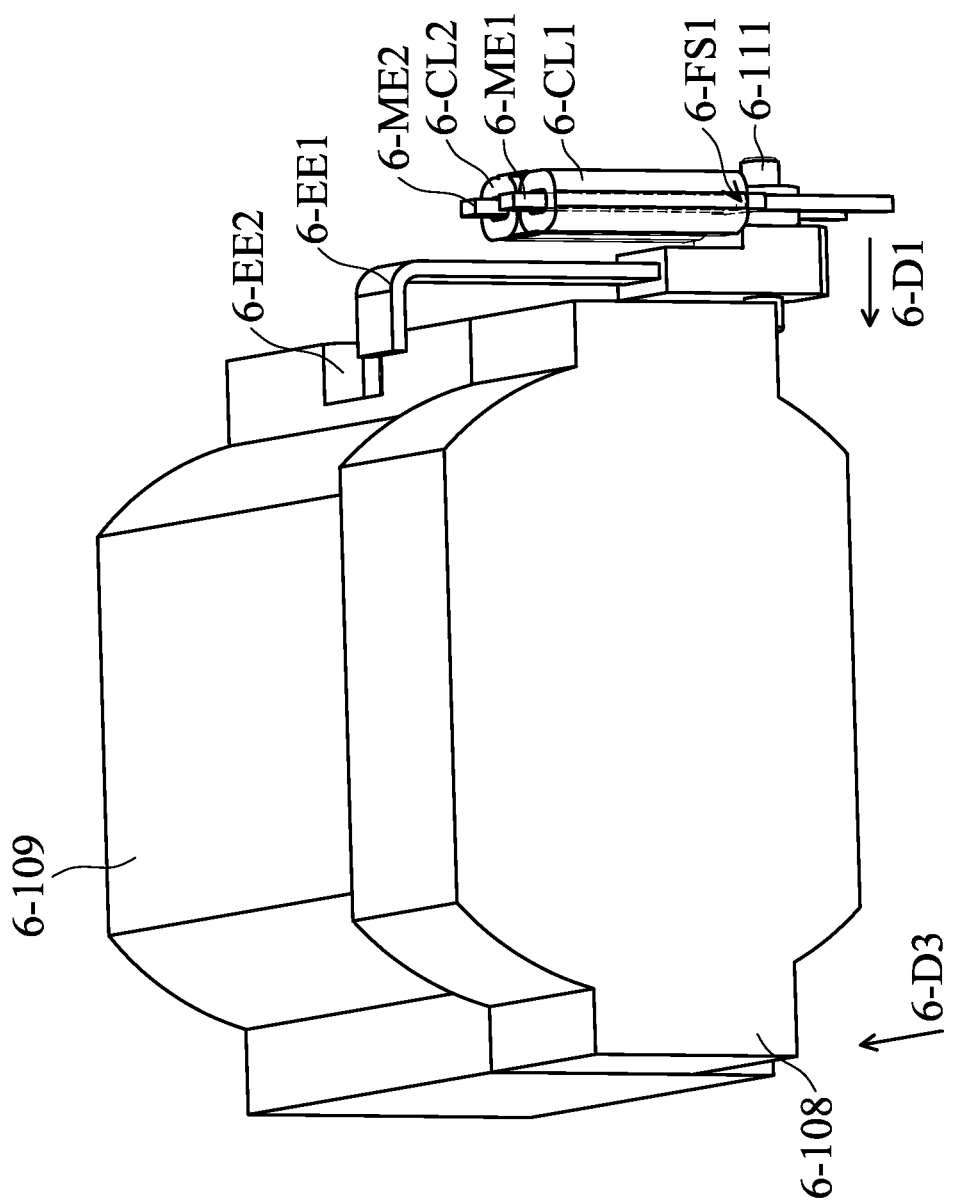
FIG. 62 is a schematic diagram of the optical element driving mechanism 6-100 in another view according to the embodiment of the present disclosure.

Please refer to FIG. 60 to FIG. 62. FIG. 60 is a schematic diagram of an optical element driving mechanism 6-100 according to an embodiment of the present disclosure, FIG. 61 is a side view of a partial structure of the optical element driving mechanism 6-100 according to the embodiment of the present disclosure, and FIG. 62 is a schematic diagram of the optical element driving mechanism 6-100 in another view according to the embodiment of the present disclosure. The optical element driving mechanism 6-100 can be an optical camera system and can be configured to hold and drive an optical element. The optical element driving mechanism 6-100 can be installed in different electronic devices or portable electronic devices, such as a smartphone or a tablet computer, for allowing a user to perform the image capturing function.

In this embodiment, the optical element driving mechanism 6-100 may include a fixed assembly 6-FA, a movable assembly 6-MA, and a driving assembly 6-DA. The movable assembly 6-MA is movably connected to the fixed assembly 6-FA. The driving assembly 6-DA is configured to drive the movable assembly 6-MA to move relative to the fixed assembly 6-FA.

In this embodiment, as shown in FIG. 60, the fixed assembly 6-FA includes a base 6-112, and a track 6-1121 is formed on the base 6-112. The movable assembly 6-MA is disposed on the base 6-112 and includes a holder 6-108 and a lens 6-109. The holder 6-108 is configured to hold the lens 6-109, and the holder 6-108 can also be further connected to other optical elements, such as shutters, apertures, camera lenses, filters, photosensitive elements and other optical elements.

The driving assembly may include a driving coil and a driving magnet (not shown in the figures), which are respectively disposed on the holder 6-108 and the base 6-112. When the driving coil is energized, the driving magnet can be driven to induce an electromagnetic driving force to drive the movable assembly 6-MA to move relative to the fixed assembly 6-FA in a range of motion. Specifically, the holder 6-108 can move along track 6-1121.

The optical element driving mechanism 6-100 may further include a positioning assembly 6-PA configured to position the movable assembly 6-MA at a predetermined position relative to the fixed assembly 6-FA when the driving assembly is not operating. The predetermined position is, for example, the location shown in FIG. 60.

As shown in FIG. 60 and FIG. 61, the positioning assembly 6-PA may include a first engaging element 6-EE1, a second engaging element 6-EE2, and a driving unit 6-DU. The first engaging element 6-EE1 and the second engaging element 6-EE2 are respectively disposed on the movable assembly 6-MA and the fixed assembly 6-FA, but they are not limited thereto. In other embodiments, the positions of the first engaging element 6-EE1 and the second engaging element 6-EE2 can be interchanged. Specifically, in this embodiment, the first engaging element 6-EE1 may be a hook connected to a protruding base 6-113 on the base 6-112, and the second engaging element 6-EE2 can be a groove formed on the holder 6-108.

The driving unit 6-DU is configured to drive the first engaging element 6-EE1 to move relative to the second engaging element 6-EE2. When the driving unit 6-DU drives the first engaging element 6-EE1 to a release position (such as the position in FIG. 61) relative to the second engaging element 6-EE2, the movable assembly 6-MA can move relative to the fixed assembly 6-FA. Furthermore, when the driving unit 6-DU drives the first engaging element 6-EE1 to be at a locked position relative to the second engaging element 6-EE2, for example, the position of the first engaging element 6-EE1 indicated by a dotted line, the movable assembly 6-MA is affixed to the fixed assembly 6-FA.

In this embodiment, the driving unit 6-DU includes a first magnetic conductive element 6-ME1, a first coil 6-CL1, a magnetic unit 6-MU, a second magnetic conductive element 6-ME2, and a second coil 6-CL2. The first magnetic conductive element 6-ME1 is made of a magnetically conductive material, and the first coil 6-CL1 is disposed on the first magnetic conductive element 6-ME1.

Figure 63:
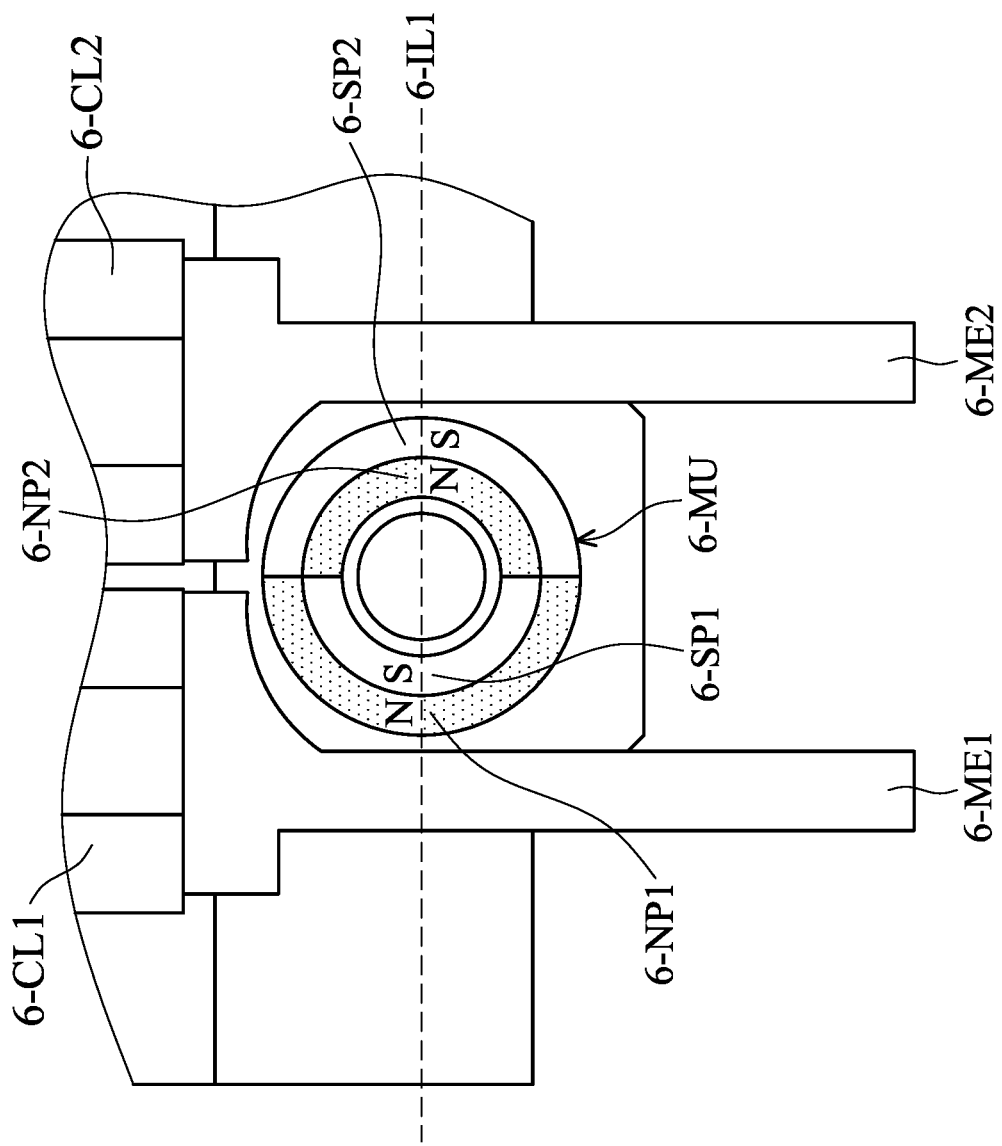
FIG. 63 is an enlarged view of the magnetic unit 6-MU according to an embodiment of the present disclosure.

Please refer to FIG. 60 to FIG. 63. FIG. 63 is an enlarged view of the magnetic unit 6-MU according to an embodiment of the present disclosure. The magnetic unit 6-MU corresponds to the first coil 6-CL1 and has a first N pole 6-NP1 and a first S pole 6-SP1, which are arranged in sequence along a first imaginary line 6-IL1. The magnetic unit 6-MU further includes a second N pole 6-NP2 and a second S pole 6-SP2, which are sequentially arranged along the first imaginary line 6-IL1. The first S pole 6-SP1 is located between the first N pole 6-NP1 and the second N pole 6-NP2. It should be noted that in other embodiments, the positions of the N pole and the S pole can be interchanged.

The second magnetic conductive element 6-ME2 is made of a magnetically conductive material, and the second coil 6-CL2 is disposed on the second magnetic conductive element 6-ME2. Specifically, the first coil 6-CL1 is wound on the first magnetic conductive element 6-ME1, and the second coil 6-CL2 is wound on the second magnetic conductive element 6-ME2.

The first magnetic conductive element 6-ME1 includes a first segment 6-SG1 having a long strip-shaped structure, and the first coil 6-CL1 is wound around the first segment 6-SG1. The first magnetic conductive element 6-ME1 includes a first body 6-MB1, a first end portion 6-MEP1 and a second end portion 6-MEP2, and the first end portion 6-MEP1 and the second end portion 6-MEP2 are located on both sides of the first body 6-MB1. The first segment 6-SG1 is located on the first body 6-MB1.

In this embodiment, the magnetic unit 6-MU is connected to the base 6-112 and the first engaging element 6-EE1 through a rotation shaft 6-111. The driving unit 6-DU is configured to drive the first engaging element 6-EE1 to rotate relative to the second engaging element 6-EE2 around a first direction 6-D1. The first direction 6-D1 is parallel to the rotation shaft 6-111.

As shown in FIG. 61, in a second direction 6-D2, a maximum size of the first magnetic conductive element 6-ME1 is greater than a maximum size of the magnetic unit 6-MU, and the first direction 6-D1 is perpendicular to the second direction 6-D2.

Furthermore, when viewed in a third direction 6-D3, in the second direction 6-D2, the magnetic unit 6-MU does not exceed the first magnetic conductive element 6-ME1. When viewed in the second direction 6-D2, the second end portion 6-MEP2 overlaps at least a portion of the magnetic unit 6-MU. In other embodiments, both the first end portion 6-MEP1 and the second end portion 6-MEP2 overlap at least a portion of the magnetic unit 6-MU.

The first direction 6-D1, the second direction 6-D2, and the third direction 6-D3 are defined by the first engaging element 6-EE1, the second engaging element 6-EE2, and the magnetic unit 6-MU, and the first direction 6-D1, the second direction 6-D2, and the third direction 6-D3 are perpendicular to each other.

The first magnetic conductive element 6-ME1 further includes a first fixed structure 6-FS1 for fixing the first coil 6-CL1. Specifically, as shown in FIG. 61 and FIG. 62, the first fixed structure 6-FS1 may be a protruding structure protruding in a direction that is not parallel to an extending direction of the first segment 6-SG1, such as protruding in the first direction 6-D1. When viewed in the third direction 6-D3, the first fixed structure 6-FS1 is located between the first coil 6-CL1 and the magnetic unit 6-MU.

The second magnetic conductive element 6-ME2 further includes a second body 6-MB2, a third end portion 6-MEP3 and a fourth end portion 6-MEP4, and the third end portion 6-MEP3 and the fourth end portion 6-MEP4 are located on both sides of the second body 6-MB2. When viewed in the second direction 6-D2, the magnetic unit 6-MU is located between the first magnetic conductive element 6-ME1 and the second magnetic conductive element 6-ME2.

The first end portion 6-MEP1 and the third end portion 6-MEP3 are arranged in the third direction 6-D3. When viewed in the second direction 6-D2, there is a gap between the first end portion 6-MEP1 and the third end portion 6-MEP3. When viewed in the first direction 6-D1, the center of the magnetic unit 6-MU is located between the first end portion 6-MEP1 and the third end portion 6-MEP3.

In the second direction 6-D2, a maximum size of the second magnetic conductive element 6-ME2 is greater than a maximum size of the magnetic unit 6-MU. When viewed in the third direction 6-D3, in the second direction 6-D2, the magnetic unit 6-MU does not exceed the second magnetic conductive element 6-ME2.

The second coil 6-CL2 is wound on the second magnetic conductive element 6-ME2. The second magnetic conductive element 6-ME2 includes a second segment 6-SG2 having a long strip-shaped structure, and the second coil 6-CL2 is wound around the second segment 6-SG2. The first segment 6-SG1 and the second segment 6-SG2 extend in the same direction.

The second magnetic conductive element 6-ME2 further includes a second fixed structure 6-FS2 for fixing the second coil 6-CL2. Specifically, the second fixed structure 6-FS2 can be a protruding structure protruding in a direction that is not parallel to an extending direction of the second segment 6-SG2, such as protruding in the first direction 6-D1 or the third direction 6-D3. When viewed in the third direction 6-D3, the second fixed structure 6-FS2 is located between the second coil 6-CL2 and the magnetic unit 6-MU.

In this embodiment, the second end portion 6-MEP2 is separated from the fourth end portion 6-MEP4, but it is not limited thereto. In other embodiments, the second end portion 6-MEP2 can be connected to the fourth end portion 6-MEP4. That is, the first magnetic conductive element 6-ME1 and the second magnetic conductive element 6-ME2 are integrally formed.

When viewed in the third direction 6-D3, a shortest distance between the center of the first coil 6-CL1 and the first end portion 6-MEP1 is different from a shortest distance between the center of the first coil 6-CL1 and the second end portion 6-MEP2. Specifically, when viewed in the third direction 6-D3, the shortest distance between the center of the first coil 6-CL1 and the first end portion 6-MEP1 is greater than the shortest distance between the center of the first coil 6-CL1 and the second end portion 6-MEP2.

When viewed in the third direction 6-D3, a shortest distance between the center of the magnetic unit 6-MU and the first end portion 6-MEP1 is different from the shortest distance between the center of the magnetic unit 6-MU and the second end portion 6-MEP2. Specifically, when viewed in the third direction 6-D3, the shortest distance between the center of the magnetic unit 6-MU and the first end portion 6-MEP1 is less than the shortest distance between the center of the magnetic unit 6-MU and the second end portion 6-MEP2.

In some embodiments of the present disclosure, as shown in FIG. 61, when the driving unit 6-DU does not drive the first engaging element 6-EE1, a first driving force 6-DF1 (that is, the magnetic attraction) between the magnetic unit 6-MU and the first magnetic conductive element 6-ME1 drive the first engaging element 6-EE1 to be located at a first position relative to the second engaging element 6-EE2.

In this embodiment, the first position is the release position, but it is not limited to this. In other embodiments, the first position may be the locked position. Furthermore, the positioning assembly 6-PA may further include a first blocking element 6-BE1 for limiting the movement of the first engaging element 6-EE1 relative to the second engaging element 6-EE2 in a limited range. The limited range is, for example, the range between the locked position and the release position.

Furthermore, when the driving unit 6-DU does not drive the first engaging element 6-EE1, the first blocking element 6-BE1 generates a second driving force 6-DF2 to the first engaging element 6-EEL. The driving force 6-DF1 and the second driving force 6-DF2 position the first engaging element 6-EE1 at the first position relative to the second engaging element 6-EE2.

When the first engaging element 6-EE1 is located at the first position relative to the second engaging element 6-EE2, the first imaginary line 6-IL1 is not parallel to the second direction 6-D2. When the first engaging element 6-EE1 is at the first position relative to the second engaging element 6-EE2 and when viewed in the first direction 6-D1, the first imaginary line 6-IL1 passes through the first magnetic conductive element 6-ME1. When the first engaging element 6-EE1 is located at the first position relative to the second engaging element 6-EE2 and when viewed in the first direction 6-D1, the first imaginary line 6-IL1 passes through the second magnetic conductive element 6-ME2.

Figure 64:
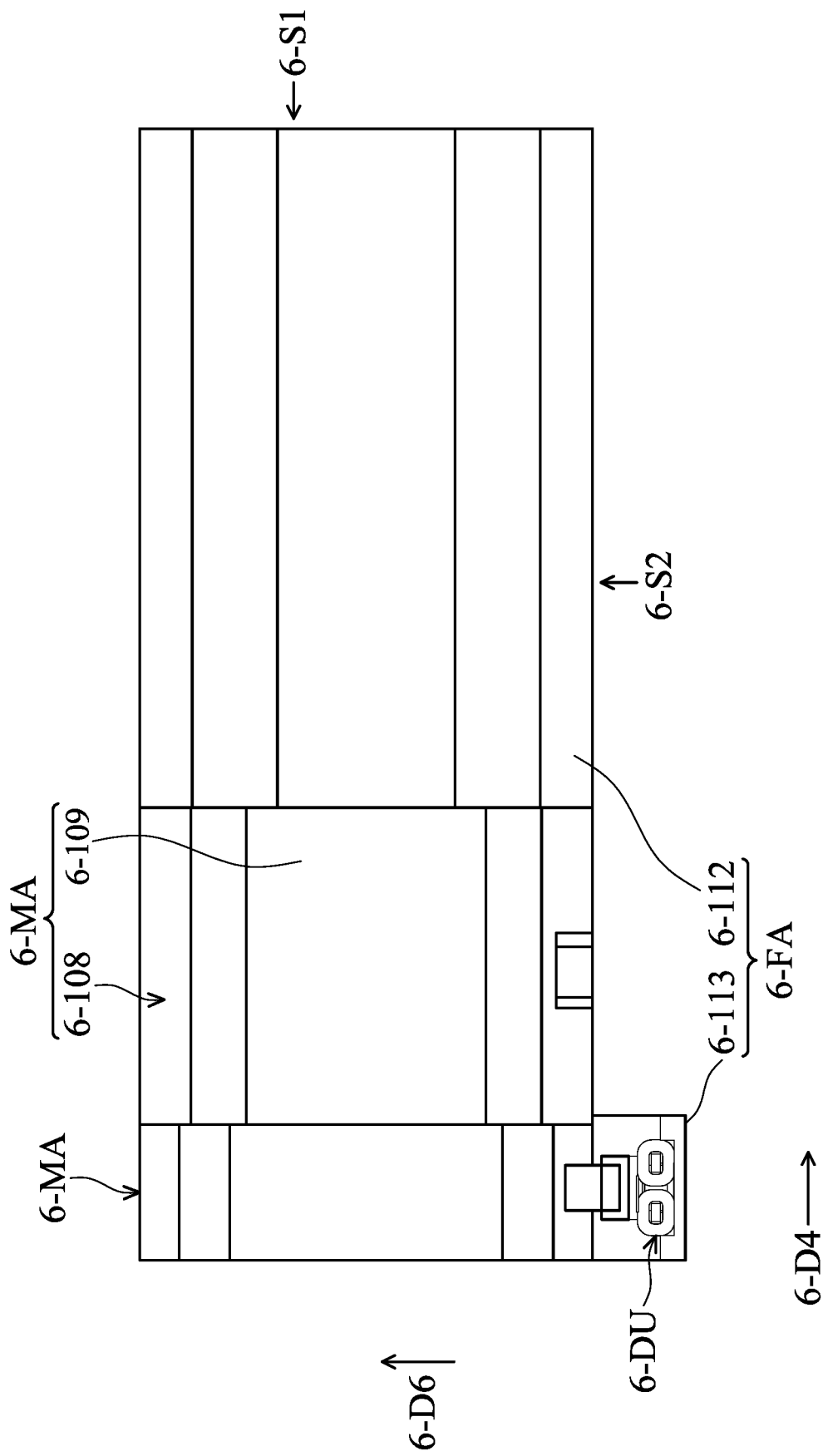
FIG. 64 is a top view of the optical element driving mechanism 6-100 according to an embodiment of the present disclosure.

Next, please refer to FIG. 60 and FIG. 64. FIG. 64 is a top view of the optical element driving mechanism 6-100 according to an embodiment of the present disclosure. As shown in FIG. 64, the driving assembly (not shown) is configured to drive the movable assembly 6-MA to move relative to the fixed assembly 6-FA in a fourth direction 6-D4. When viewed in a fifth direction 6-D5 (the Z-axis), the base 6-112 of the fixed assembly 6-FA has a polygonal structure, such as a rectangular structure.

When viewed in the fifth direction 6-D5, the length of a first side 6-S1 of the fixed assembly 6-FA is different from the length of a second side 6-S2 of the fixed assembly 6-FA. Specifically, when viewed in the fifth direction 6-D5, the length of the first side 6-S1 of the fixed assembly 6-FA is less than the length of the second side 6-S2 of the fixed assembly 6-FA.

The extending directions of the first side 6-S1 and the second side 6-S2 are not parallel. Specifically, the first side 6-S1 extends in a sixth direction 6-D6, and the second side 6-S2 extends in a fourth direction 6-D4. The fourth direction 6-D4, the fifth direction 6-D5, and the sixth direction 6-D6 are perpendicular to each other. When viewed in the fifth direction 6-D5, the driving unit 6-DU is located on the second side 6-S2.

It should be noted that the fourth direction 6-D4, the fifth direction 6-D5, and the sixth direction 6-D6 are defined by the base 6-112, and in this embodiment, the third direction 6-D3 is parallel to the fourth direction 6-D4, and the second direction 6-D2 is parallel to the fifth direction 6-D5.

Figure 65:
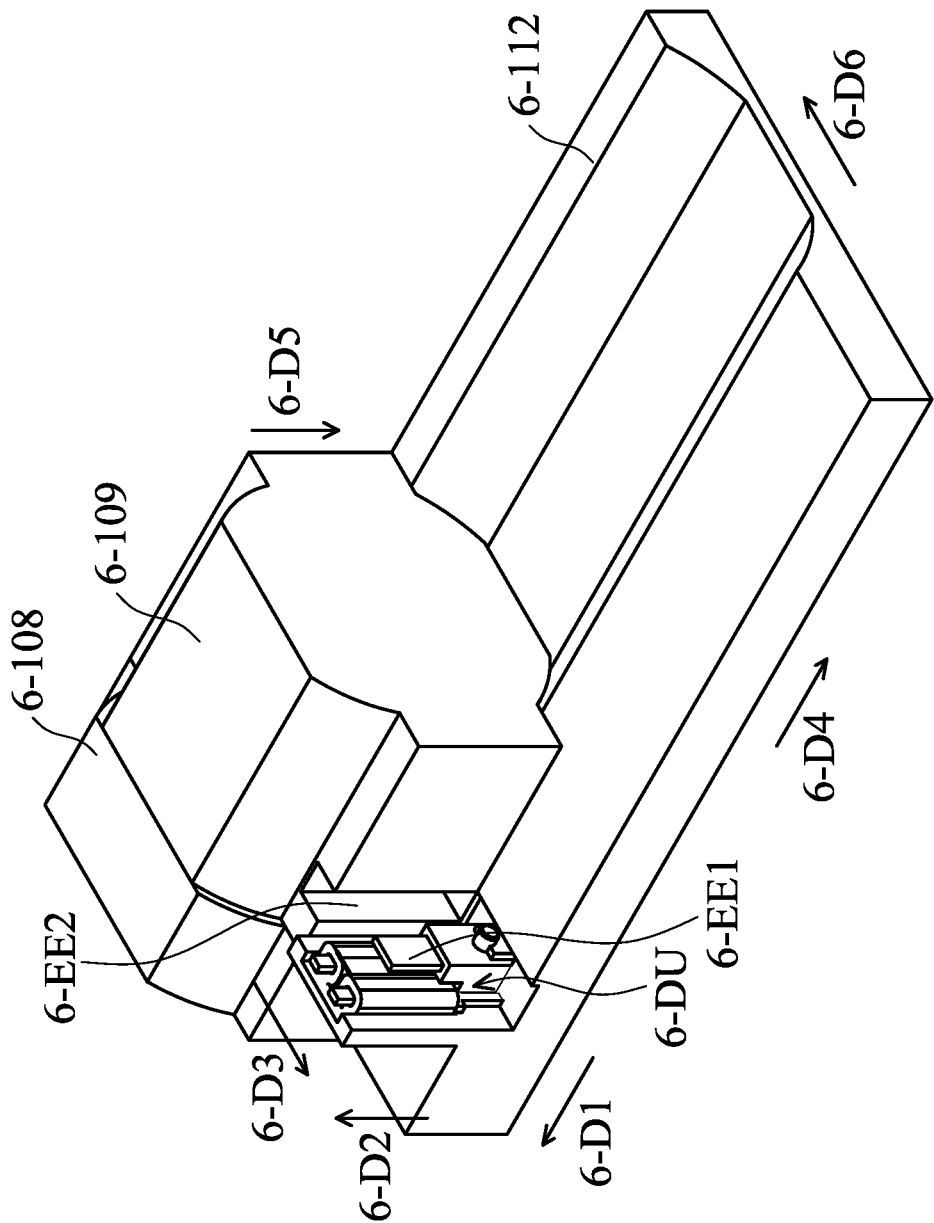
FIG. 65 is a perspective view of the optical element driving mechanism 6-100 according to another embodiment of the present disclosure.

Please refer to FIG. 65, which is a perspective view of the optical element driving mechanism 6-100 according to another embodiment of the present disclosure. In this embodiment, as shown in FIG. 65, the first direction 6-D1 is parallel to the fourth direction 6-D4, the third direction 6-D3 is parallel to the sixth direction 6-D6, and the second direction 6-D2 is parallel to the fifth direction 6-D5. Based on this structural configuration, the first engaging element 6-EE1 can be more securely engaged with the second engaging element 6-EE2.

Figure 66:
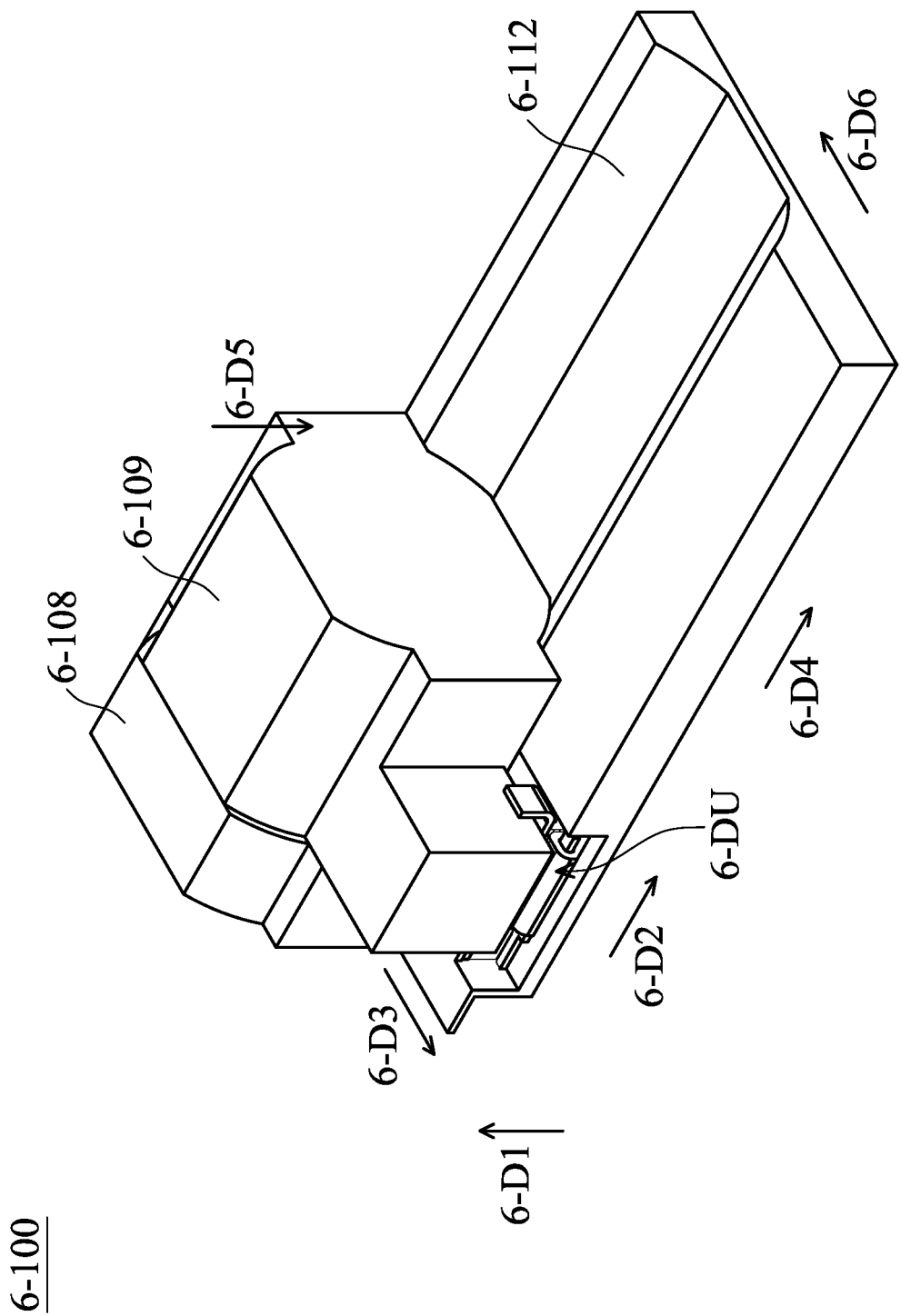
FIG. 66 is a perspective view of the optical element driving mechanism 6-100 according to another embodiment of the present disclosure.

Please refer to FIG. 66, which is a perspective view of the optical element driving mechanism 6-100 according to another embodiment of the present disclosure. In this embodiment, as shown in FIG. 66, the second direction 6-D2 is parallel to the fourth direction 6-D4, the first direction 6-D1 is parallel to the fifth direction 6-D5, and the third direction 6-D3 is parallel to the sixth direction 6-D6. When viewed in the fifth direction 6-D5, the driving unit 6-DU is located at a corner (the first corner) of the base 6-112 of the fixed assembly 6-FA.

Figure 67:
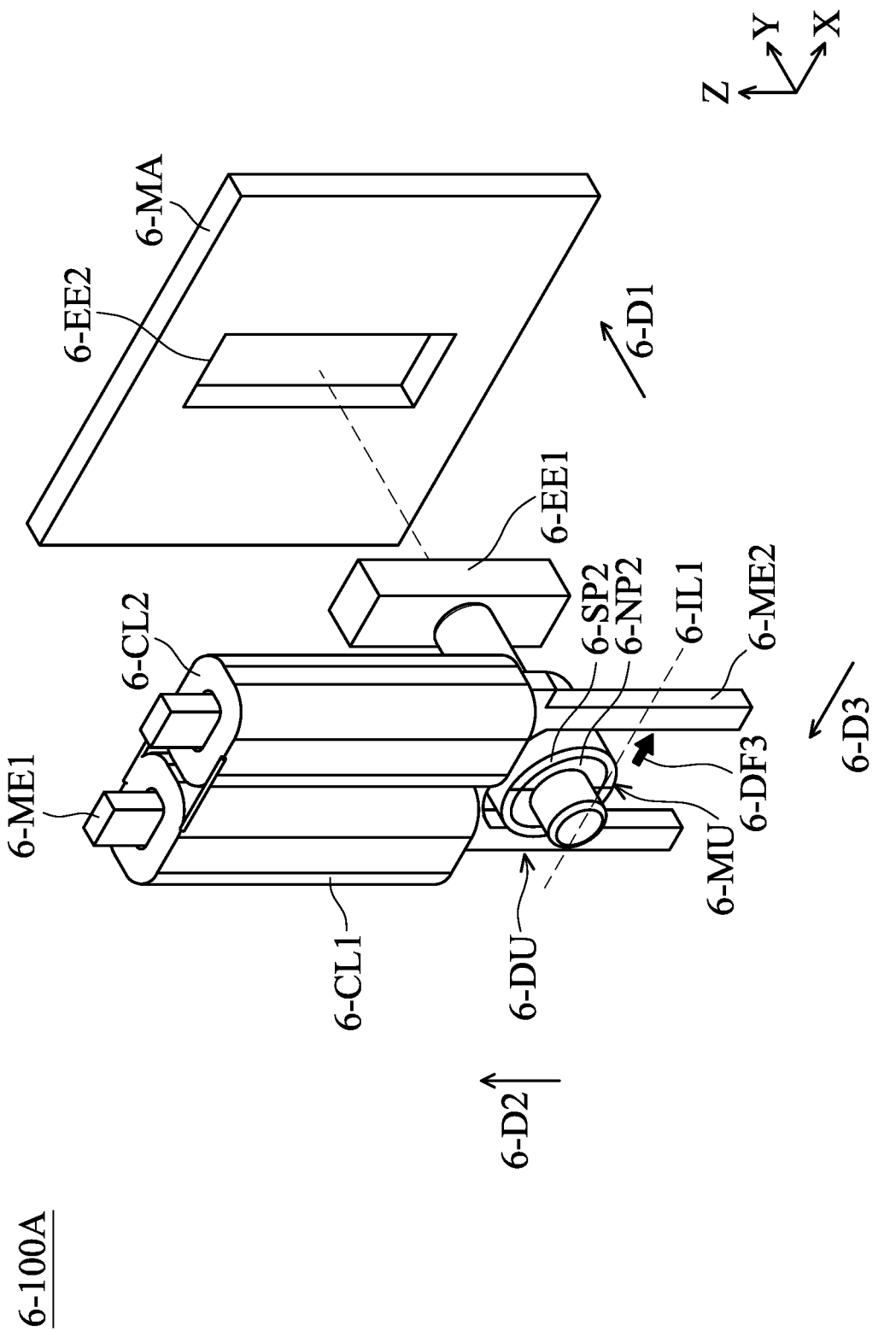
FIG. 67 is a perspective view of a partial structure of an optical element driving mechanism 6-100A according to another embodiment of the present disclosure.

Please continue to refer to FIG. 67 to FIG. 69. FIG. 67 is a perspective view of a partial structure of an optical element driving mechanism 6-100A according to another embodiment of the present disclosure. FIG. 68 and FIG. 69 are diagrams illustrated that the first engaging element 6-EE1 is located at the first position and the second position, respectively. The first engaging element 6-EE1 can be a protruding block, and the second engaging element 6-EE2 can be a corresponding opening. After the first engaging element 6-EE1 passes through the second engaging element 6-EE2, the first coil 6-CL1 and the second coil 6-CL2 of the driving unit 6-DU can stop energizing.

Thus, when the driving unit 6-DU does not drive the first engaging element 6-EE1, a third driving force 6-DF3 between the magnetic unit 6-MU and the second magnetic conductive element 6-ME2 drives the first engaging element 6-EE1 to be located at the second position relative to the second engaging element 6-EE2. As shown in FIG. 68, the second position is the locked position.

Furthermore, the positioning assembly 6-PA may further include a second blocking element 6-BE2 for limiting the movement of the first engaging element 6-EE1 relative to the second engaging element 6-EE2 in a limited range.

As shown in FIG. 67 and FIG. 68, when the driving unit 6-DU does not drive the first engaging element 6-EE1, the second blocking element 6-BE2 generates a fourth driving force 6-DF4 to the first engaging element 6-EEL. The third driving force 6-DF3 and the fourth driving force 6-DF4 position the first engaging element 6-EE1 at the second position relative to the second engaging element 6-EE2.

When the first engaging element 6-EE1 is located at the second position relative to the second engaging element 6-EE2, the first imaginary line 6-IL1 is not parallel to the second direction 6-D2. When the first engaging element 6-EE1 is located at the second position relative to the second engaging element 6-EE2 and when viewed in the first direction 6-D1, the first imaginary line 6-IL1 passes through the first magnetic conductive element 6-ME1. When the first engaging element 6-EE1 is located at the second position relative to the second engaging element 6-EE2 and when viewed in the first direction 6-D1, the first imaginary line 6-IL1 passes through the second magnetic conductive element 6-ME2.

Similarly, when the driving unit 6-DU does not drive the first engaging element 6-EE1, as shown in FIG. 69, the first engaging element 6-EE1 can be located in the first position, and the first position is the locked position. The first position is different from the second position.

In addition, when it is desired to separate the first engaging element 6-EE1 from the second engaging element 6-EE2, as shown in FIG. 67, the driving unit 6-DU can drive the first engaging element 6-EE1 to be located at the release position in FIG. 67. Specifically, when the first engaging element 6-EE1 is located at the release position relative to the second engaging element 6-EE2, the first imaginary line 6-IL1 is parallel to the third direction 6-D3.

Figure 70:
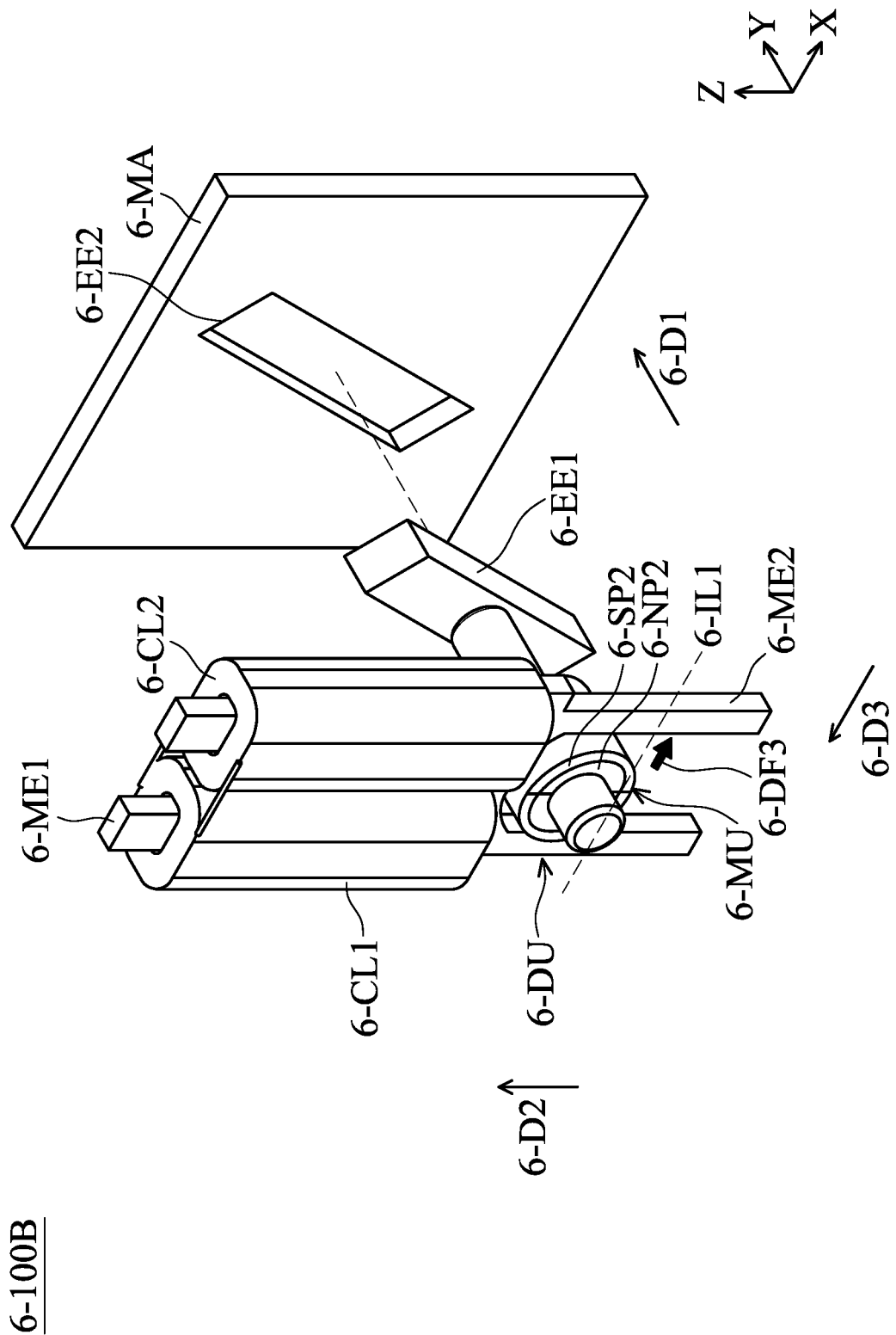
FIG. 70 is a perspective view of a partial structure of an optical element driving mechanism 6-100B according to another embodiment of the disclosure.
Figures 71, 72:
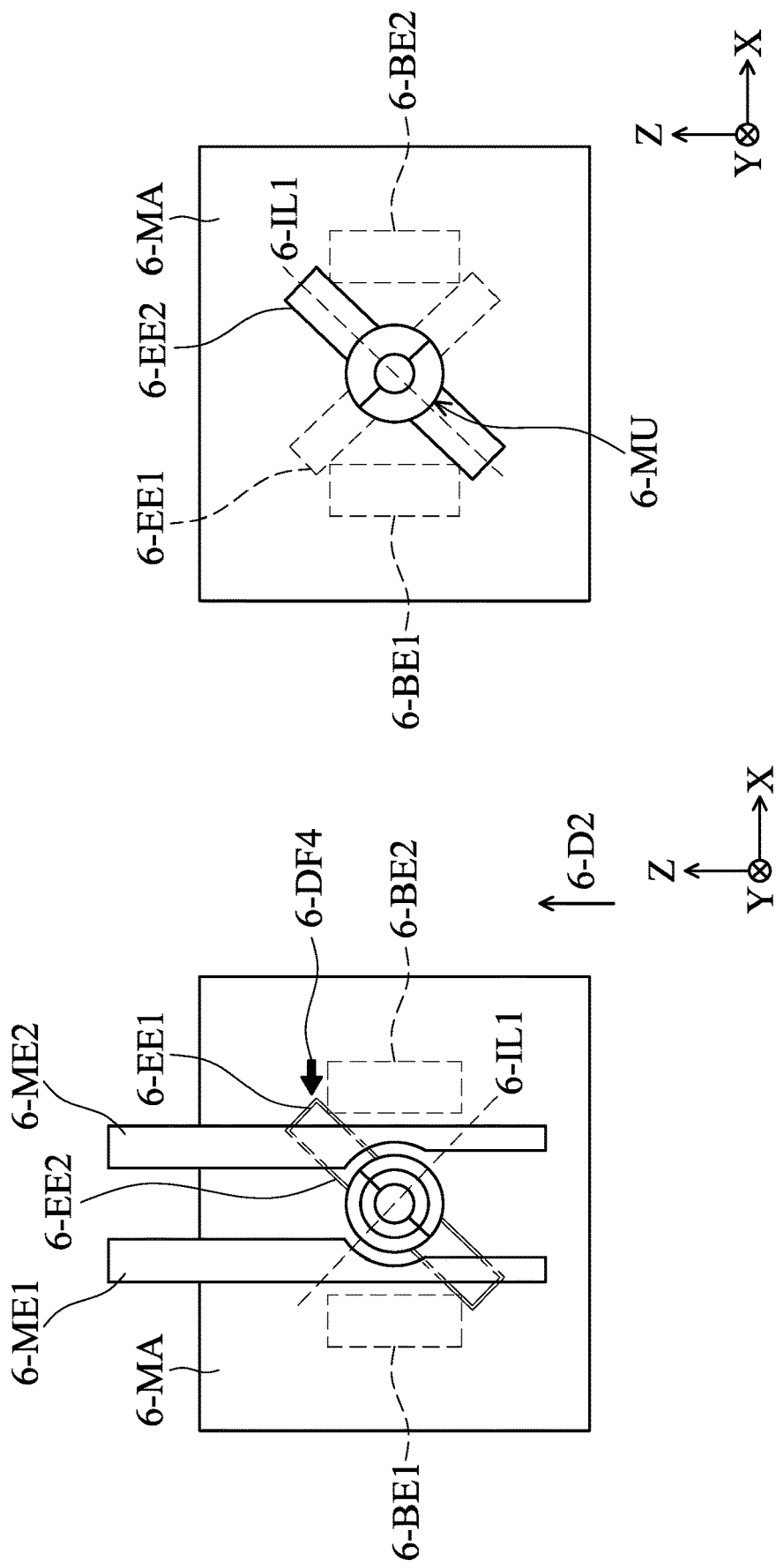
FIG. 71 and FIG. 72 are diagram illustrate that the first engaging element 6-EE1 is located at the first position and the second position, respectively.

Please continue to refer to FIG. 70 to FIG. 72. FIG. 70 is a perspective view of a partial structure of an optical element driving mechanism 6-100B according to another embodiment of the disclosure. FIG. 71 and FIG. 72 are diagram illustrate that the first engaging element 6-EE1 is located at the first position and the second position, respectively. In this embodiment, an extending direction of the second engaging element 6-EE2 is not parallel to the second direction 6-D2 (the Z-axis).

Similar to the foregoing embodiment, when the driving unit 6-DU does not drive the first engaging element 6-EE1, the third driving force 6-DF3 between the magnetic unit 6-MU and the second magnetic conductive element 6-ME2 positions the first engaging element 6-EE1 at the second position relative to the second engaging element 6-EE2, as shown in FIG. 71. In this embodiment, the second position is the release position. That is, the first engaging element 6-EE1 can pass through the second engaging element 6-EE2 or be separated from the second engaging element 6-EE2.

Similarly, the positioning assembly 6-PA includes the second blocking element 6-BE2 for limiting the movement of the first engaging element 6-EE1 relative to the second engaging element 6-EE2 in a limited range. When the driving unit 6-DU does not drive the first engaging element 6-EE1, the second blocking element 6-BE2 generates the fourth driving force 6-DF4 to the first engaging element 6-EE1, and the third driving force 6-DF3 and the fourth driving force 6-DF4 position the first engaging element 6-EE1 at the second position relative to the second engaging element 6-EE2.

As shown in FIG. 71, when the first engaging element 6-EE1 is located at the second position relative to the second engaging element 6-EE2, the first imaginary line 6-IL1 is not parallel to the second direction 6-D2. When the first engaging element 6-EE1 is located at the second position relative to the second engaging element 6-EE2 and when viewed in the first direction 6-D1, the first imaginary line 6-IL1 passes through the first magnetic conductive element 6-ME1. When the first engaging element 6-EE1 is located at the second position relative to the second engaging element 6-EE2 and when viewed in the first direction 6-D1, the first imaginary line 6-IL1 passes through the second magnetic conductive element 6-ME2.

In this embodiment, when it is desired to lock the movable assembly 6-MA, as shown in FIG. 72, the driving unit 6-DU can drive the first engaging element 6-EE1 to rotate counterclockwise to the first position after the first engaging element 6-EE1 passes through the second engaging element 6-EE2 so as to achieve the purpose of locking. The first position is the locked position.

The present disclosure provides an optical element driving mechanism, which includes a movable assembly, a fixed assembly, and a driving assembly. The movable assembly is configured to be connected to an optical element. The movable assembly is movable relative to the fixed assembly. The driving assembly is configured to drive the movable assembly to move relative to the fixed assembly in a range of motion. The optical element driving mechanism further includes a positioning assembly configured to position the movable assembly at a predetermined position relative to the fixed assembly when the driving assembly is not operating.

The positioning assembly may include a first engaging element, a second engaging element, and a driving unit. The first engaging element and the second engaging element can be respectively disposed on the fixed assembly and the movable assembly. The driving unit can control the first engaging element to a locked position relative to the second engaging element. Based on the structural design of the present disclosure, when the optical element driving mechanism is impacted, it can effectively prevent the first engaging element from separating from the second engaging element.

In addition, the structural design of the present disclosure can also save costs and achieve the purpose of miniaturization.

Seventh Embodiment

Figure 73:
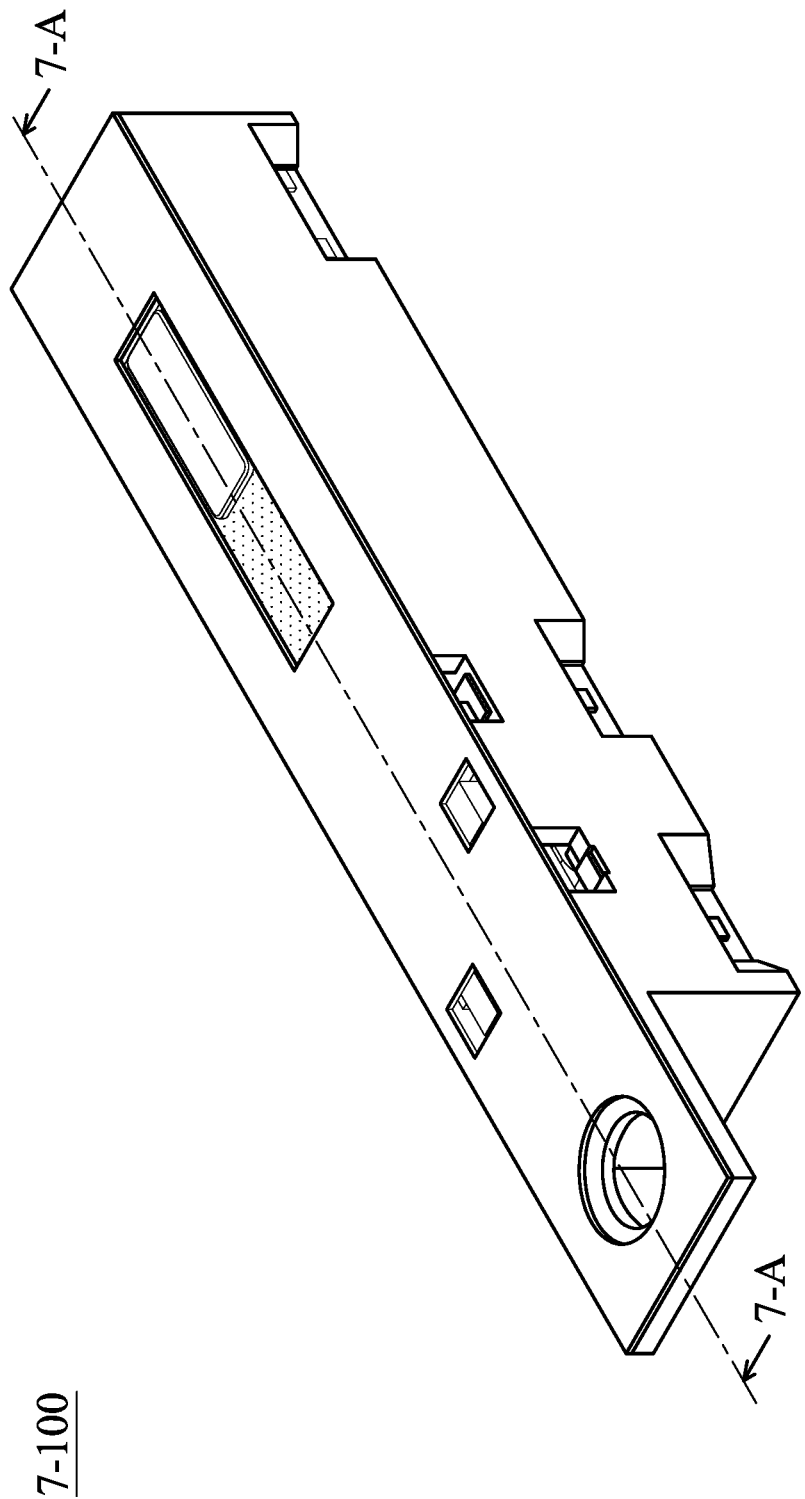
FIG. 73 shows a schematic diagram of an optical element driving mechanism 7-100 according to an embodiment of the present disclosure.
Figure 74:
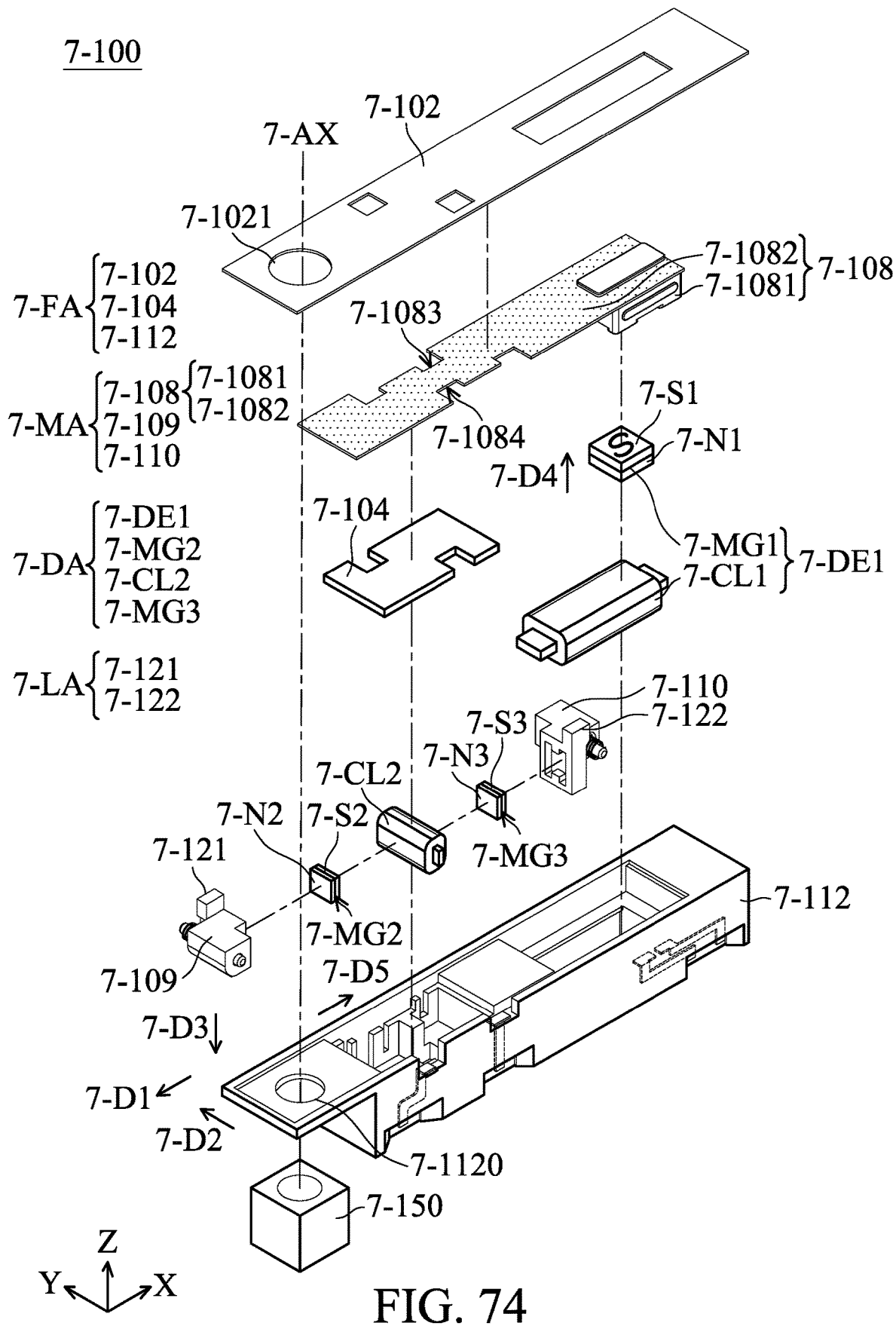
FIG. 74 shows an exploded diagram of the optical element driving mechanism 7-100 according to the embodiment of the present disclosure.
Figure 75:
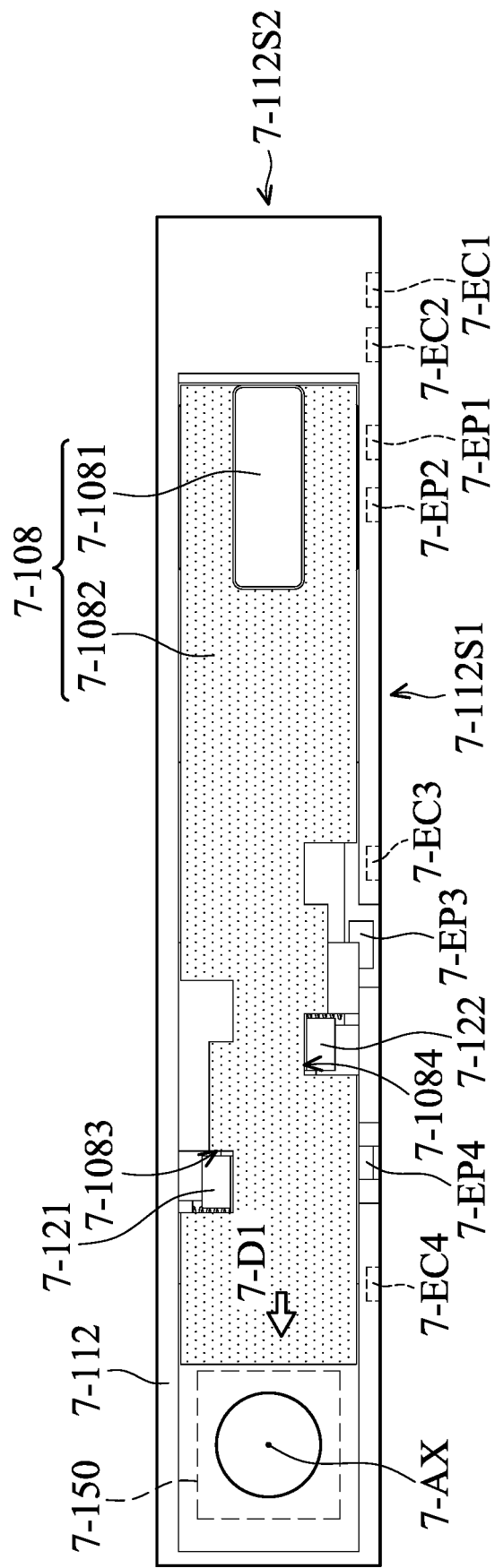
FIG. 75 shows a top view of a partial structure of the optical element driving mechanism 7-100 according to the embodiment of the present disclosure.

Please refer to FIG. 73 to FIG. 75. FIG. 73 shows a schematic diagram of an optical element driving mechanism 7-100 according to an embodiment of the present disclosure, FIG. 74 shows an exploded diagram of the optical element driving mechanism 7-100 according to the embodiment of the present disclosure, and FIG. 75 shows a top view of a partial structure of the optical element driving mechanism 7-100 according to the embodiment of the present disclosure. The optical element driving mechanism 7-100 can be an optical camera system and can be configured to hold and drive an optical element. The optical element driving mechanism 7-100 can be installed in different electronic devices or portable electronic devices, such as a smartphone or a tablet computer, for allowing a user to perform the image capturing function.

In this embodiment, the optical element driving mechanism 7-100 may include a fixed assembly 7-FA, a movable assembly 7-MA, and a driving assembly 7-DA. The movable assembly 7-MA is movably connected to the fixed assembly 7-FA. The driving assembly 7-DA is configured to drive the movable assembly 7-MA to move relative to the fixed assembly 7-FA.

In this embodiment, as shown in FIG. 74, the fixed assembly 7-FA includes a covering body 7-102, a spacer element 7-104 and a base 7-112. The movable assembly 7-MA may include a first movable part 7-108, a second movable part 7-109, and a third movable part 7-110. The first movable part 7-108 may include a holder 7-1081 and a first optical element 7-1082.

The covering body 7-102 is fixedly disposed on the base 7-112 to accommodate the movable assembly 7-MA and the driving assembly 7-DA, and the spacer element 7-104 is disposed between the covering body 7-102 and the base 7-112.

As shown in FIG. 74, the aforementioned covering body 7-102 has a first opening 7-1021, and the base 7-112 has a second opening 7-1120, and the base 7-112 accommodates a photosensitive module 7-150 (the optical module). An external light can travel along a main axis 7-AX, pass through the first opening 7-1021 and the second opening 7-1120, and then be received by the aforementioned photosensitive module 7-150 to generate a digital image signal.

In addition, the optical element driving mechanism 7-100 may further include a locking assembly 7-LA, and when the driving assembly 7-DA does not drive the first movable part 7-108 to move relative to the fixed assembly 7-FA, the locking assembly 7-LA is configured to position the first movable part 7-108 at a first position relative to the fixed assembly 7-FA, such as the position shown in FIG. 75.

In this embodiment, the driving assembly 7-DA includes a first driving element 7-DE1 for driving the first movable part 7-108 to move relative to the fixed assembly 7-FA in a first direction 7-D1. The first driving element 7-DE1 includes a first coil 7-CL1 and a first magnetic unit 7-MG1.

As shown in FIG. 74, the locking assembly 7-LA further includes a first locking element 7-121 and a second locking element 7-122. The first locking element 7-121 corresponds to a first engaging portion 7-1083 of the first optical element 7-1082 of the first movable part 7-108. The second locking element 7-122 corresponds to a second engaging portion 7-1084 of the first optical element 7-1082 of the first movable part 7-108.

Furthermore, the second movable part 7-109 is connected to the first locking element 7-121, and the third movable part 7-110 is connected to the second locking element 7-122. In this embodiment, the second movable part 7-109 and the first locking element 7-121 are integrated formed in one piece, and the third movable part 7-110 and the second locking element 7-122 are integrated formed in one piece.

Figure 76:
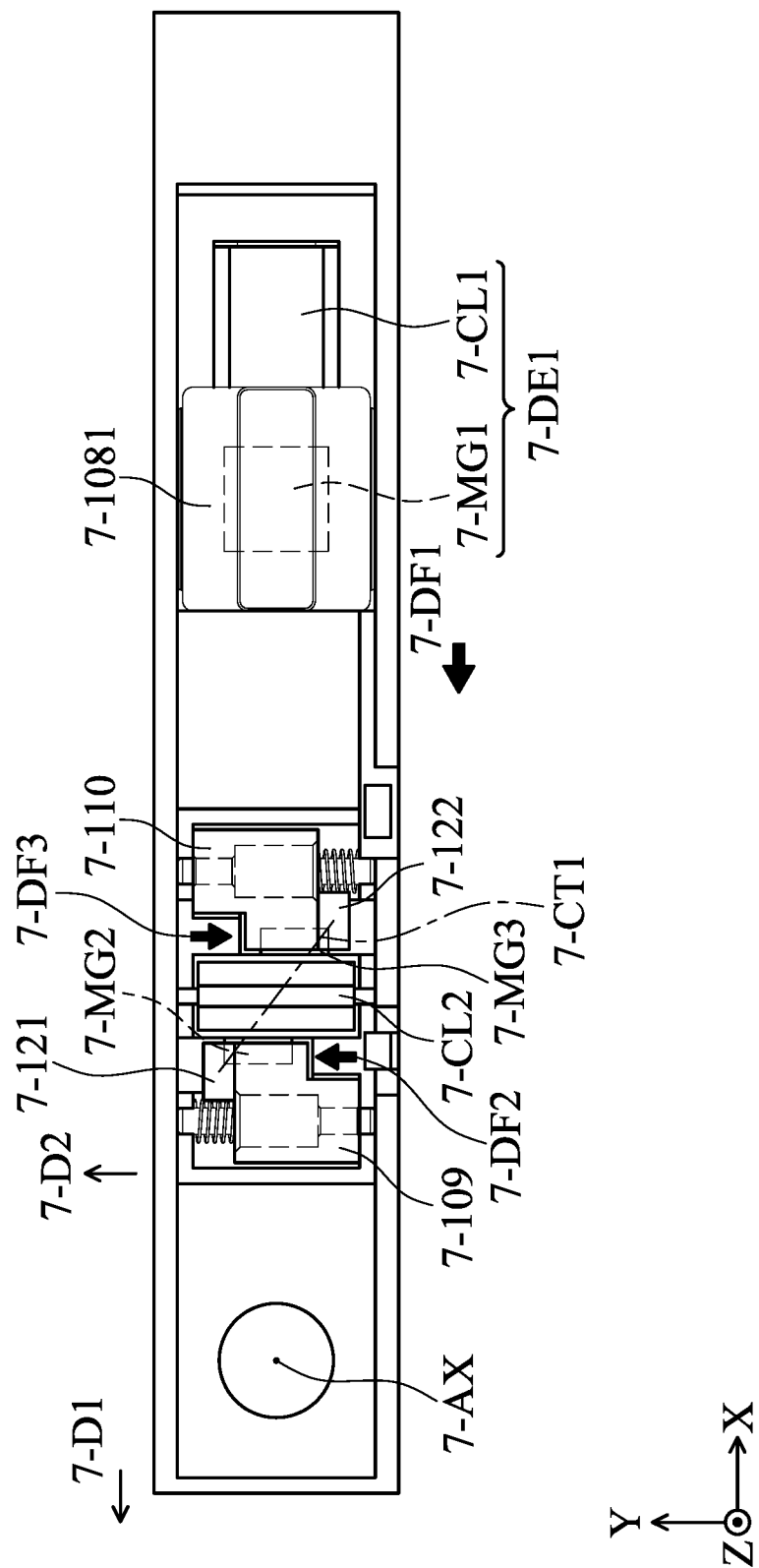
FIG. 76 is a top view of a partial structure of the optical element driving mechanism 7-100 according to an embodiment of the present disclosure.

Please refer to FIG. 74 to FIG. 76. FIG. 76 is a top view of a partial structure of the optical element driving mechanism 7-100 according to an embodiment of the present disclosure. In this embodiment, the driving assembly 7-DA may further include a second driving element for driving the second movable part 7-109 to move relative to the fixed assembly 7-FA. The second driving element may be a second magnetic unit 7-MG2, for example.

The second driving element is used to drive the second movable part 7-109 to move relative to the fixed assembly 7-FA in a second direction 7-D2 (the Y-axis). The second direction 7-D2 is not parallel to the main axis 7-AX. Specifically, the second direction 7-D2 is perpendicular to the main axis 7-AX. The second direction 7-D2 is not parallel to the first direction 7-D1. Specifically, the second direction 7-D2 is perpendicular to the first direction 7-D1.

Furthermore, the driving assembly 7-DA may further include a third driving element for driving the third movable part 7-110 to move relative to the fixed assembly 7-FA. Specifically, the third driving element is used to drive the third movable part 7-110 to move relative to the fixed assembly 7-FA in the second direction 7-D2 (the Y-axis). The third driving element may be a third magnetic unit 7-MG3, for example.

Furthermore, the driving assembly 7-DA may further include a second coil 7-CL2 corresponding to the second magnetic unit 7-MG2, and the second coil 7-CL2 also corresponds to the third magnetic unit 7-MG3. In this embodiment, the second magnetic unit 7-MG2 and the third magnetic unit 7-MG3 are respectively disposed on the second movable part 7-109 and the third movable part 7-110, but it is not limited thereto. In other embodiments, the positions of the magnetic unit and the coil can be exchanged.

As shown in FIG. 76, the first driving element 7-DE1 is used to generate a first driving force 7-DF1 to the holder 7-1081 of the first movable part 7-108, the second driving element is used to generate a second driving force 7-DF2 to the second movable part 7-109, and the third driving element is used to generate a third driving force 7-DF3 to the third movable part 7-110.

The direction of the first driving force 7-DF1 is different from the direction of the second driving force 7-DF2. Specifically, the direction of the first driving force 7-DF1 is perpendicular to the direction of the second driving force 7-DF2. The direction of the second driving force 7-DF2 is different from the direction of the third driving force 7-DF3. Specifically, the direction of the second driving force 7-DF2 is opposite to the direction of the third driving force 7-DF3.

In this embodiment, the second movable part 7-109 is movable relative to the third movable part 7-110. When viewed in a third direction 7-D3 (the Z-axis), as shown in FIG. 76, a central connection line 7-CT1 of the center of the first locking element 7-121 and the center of the second locking element 7-122 is not parallel to the first direction 7-D1. When viewed in the third direction 7-D3, the connection line (the central connection line 7-CT1) of the center of the first locking element 7-121 and the center of the second locking element 7-122 is not parallel to the second direction 7-D2.

The third direction 7-D3 is, for example, parallel to the Z-axis, the second direction 7-D2 is, for example, parallel to the Y-axis, and the first direction 7-D1 is, for example, parallel to the X-axis. The third direction 7-D3, the first direction 7-D1, and the second direction 7-D2 are perpendicular to each other.

Figure 77:
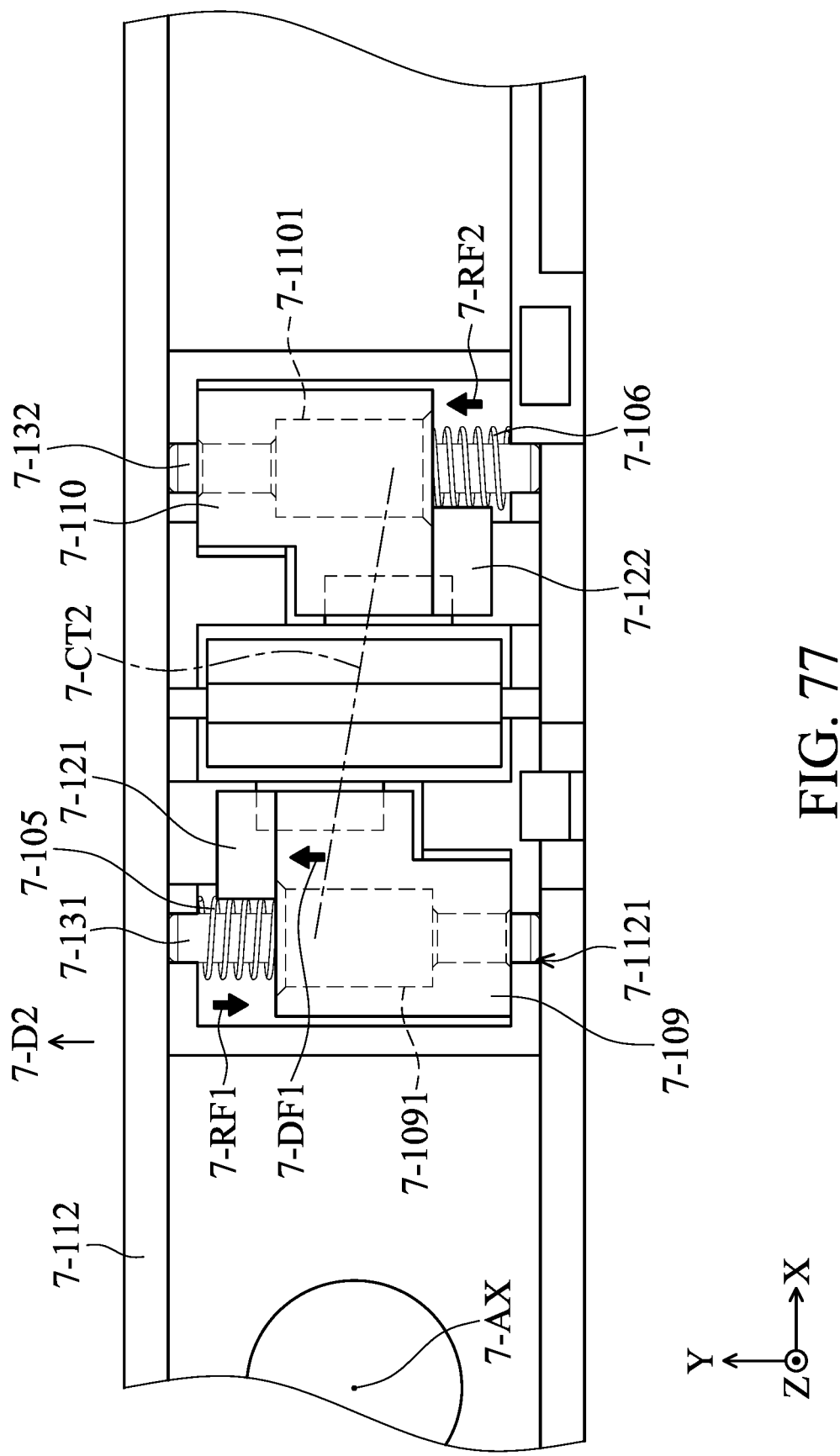
FIG. 77 is an enlarged view of a partial structure of the optical element driving mechanism 7-100 according to an embodiment of the disclosure.

Please refer to FIG. 74 to FIG. 77. FIG. 77 is an enlarged view of a partial structure of the optical element driving mechanism 7-100 according to an embodiment of the disclosure. As shown in FIG. 77, the optical element driving mechanism 7-100 further includes a first elastic element 7-105 and a second elastic element 7-106. The second movable part 7-109 is movably connected to the base 7-112 of the fixed assembly 7-FA via the first elastic element 7-105, and the third movable part 7-110 is movably connected to the base 7-112 of the fixed assembly 7-FA via the second elastic element 7-106.

The first elastic element 7-105 is configured to generate a first prestress 7-RF1 to the second movable part 7-109, and the first prestress 7-RF1 is, for example, elastic force. The second elastic element 7-106 is configured to generate a second prestress 7-RF2 to the third movable part 7-110. The direction of the first prestress 7-RF1 is different from the direction of the second prestress 7-RF2.

Specifically, the direction of the first prestress 7-RF1 is opposite to the direction of the second prestress 7-RF2. Furthermore, the direction of the first prestress 7-RF1 is different from the direction of the first driving force 7-DF1. For example, as shown in FIG. 76 and FIG. 77, the direction of the first prestress 7-RF1 is perpendicular to the direction of the first driving force 7-DF1.

It should be noted that when the driving assembly 7-DA does not drive the first movable part 7-108 to move relative to the fixed assembly 7-FA, the first movable part 7-108 is located in the first position relative to the fixed assembly 7-FA by the first prestress 7-RF1. When the driving assembly 7-DA does not drive the first movable part 7-108 to move relative to the fixed assembly 7-FA, the first movable part 7-108 is located in the first position relative to the fixed assembly 7-FA by the second prestress 7-RF2.

As shown in FIG. 77, the second movable part 7-109 (or the base 7-112 of the fixed assembly 7-FA) may further include a first storage slot 7-1091 for receiving the first elastic element 7-105. In the direction of the first prestress 7-RF1 (for example, the Y-axis), the depth of the first storage slot 7-1091 is at least greater than one-half of the maximum size of the first elastic element 7-105.

Furthermore, the third movable part 7-110 (or the base 7-112 of the fixed assembly 7-FA) may include a second storage slot 7-1101 for receiving the second elastic element 7-106. In the direction of the second prestress 7-RF2 (for example, the Y-axis), the depth of the second storage slot 7-1101 is at least greater than one-half of the maximum size of the second elastic element 7-106.

When viewed along the main axis 7-AX, the connection line 7-CT2 of the center of the first elastic element 7-105 and the center of the second elastic element 7-106 is different from the second direction 7-D2. When viewed along the main axis 7-AX, the connection line 7-CT2 of the center of the first elastic element 7-105 and the center of the second elastic element 7-106 is not perpendicular to the second direction 7-D2. When viewed along the main axis 7-AX, the connection line 7-CT2 of the center of the first elastic element 7-105 and the center of the second elastic element 7-106 is not parallel to the second direction 7-D2.

Please go back to FIG. 74. As shown in FIG. 74, the first magnetic unit 7-MG1 includes a first N pole 7-N1 and a first S pole 7-S1, which are sequentially arranged in a fourth direction 7-D4. The second magnetic unit 7-MG2 includes a second N pole 7-N2 and a second S pole 7-S2, which are sequentially arranged in a fifth direction 7-D5. The third magnetic unit 7-MG3 includes a third N pole 7-N3 and a third S pole 7-S3, which are arranged in sequence in the fifth direction 7-D5.

The fourth direction 7-D4 and the fifth direction 7-D5 are not parallel. Specifically, the fourth direction 7-D4 is perpendicular to the fifth direction 7-D5. The fourth direction 7-D4 is parallel to the third direction 7-D3. The fifth direction 7-D5 is parallel to the first direction 7-D1.

Furthermore, as shown in FIG. 77, the optical element driving mechanism 7-100 may further include a first guiding element 7-131 and a second guiding element 7-132. The first guiding element 7-131 is used to guide the second movable part 7-109 to move relative to the base 7-112 of the fixed assembly 7-FA in the second direction 7-D2, and the second guiding element 7-132 is used to guide the third movable part 7-110 to move relative to the base 7-112 of the fixed assembly 7-FA in the second direction 7-D2.

The first guiding element 7-131 has a long strip structure and extends in the second direction 7-D2. The first guiding element 7-131 is made of metal. The first guiding element 7-131 passes through the first elastic element 7-105. The first guiding element 7-131 passes through the second movable part 7-109.

In addition, the base 7-112 of the fixed assembly 7-FA further has a first positioning groove 7-1121 for setting the first guiding element 7-131. When viewed in a direction perpendicular to the second direction 7-D2 (for example, along the main axis 7-AX), at least a part of the first guiding element 7-131 is located in the first positioning groove 7-1121. As shown in FIG. 77, the first positioning groove 7-1121 forms an opening structure, and the first guiding element 7-131 is exposed by the aforementioned opening structure.

It is worth noting that the second movable part 7-109 and the third movable part 7-110 are rotationally symmetrical (relative to the second coil 7-CL2), so the description of similar structures is omitted here.

Figure 78:
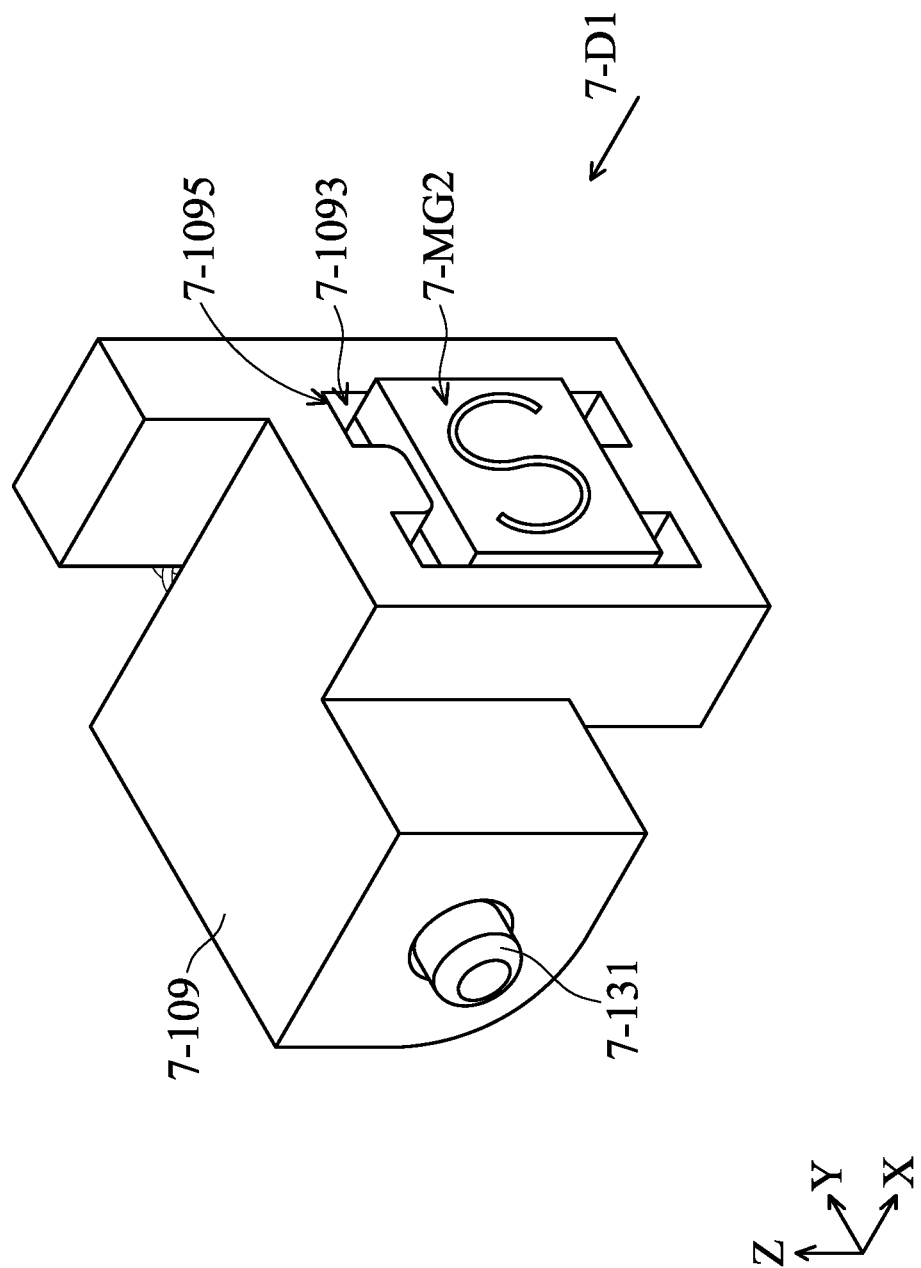
FIG. 78 is a perspective view of the second movable part 7-109, the second magnetic unit 7-MG2, and the first guiding element 7-131 according to an embodiment of the present disclosure.

Please refer to FIG. 78, which is a perspective view of the second movable part 7-109, the second magnetic unit 7-MG2, and the first guiding element 7-131 according to an embodiment of the present disclosure. As shown in FIG. 78, the second movable part 7-109 may further have a first receiving portion 7-1093 for accommodating at least a part of the second magnetic unit 7-MG2.

When viewed in the first direction 7-D1, a first avoiding structure 7-1095 is located at the corner of the first receiving portion 7-1093 which has a polygonal structure. The first receiving portion 7-1093 may be a groove, and the first avoiding structure 7-1095 has a recessed structure corresponding to the corner of the second magnetic unit 7-MG2 which has a polygonal structure.

Figure 79:
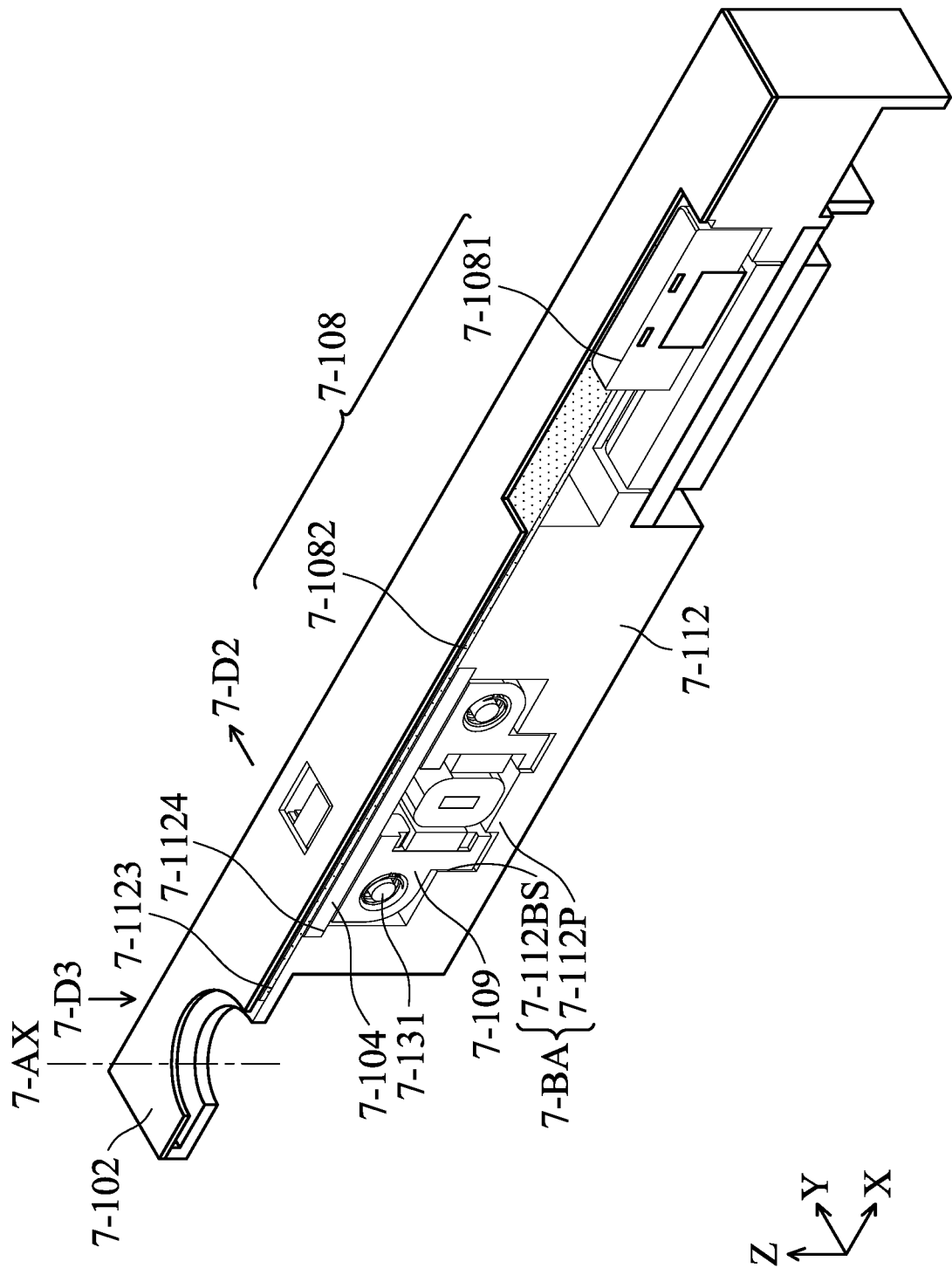
FIG. 79 is a cross-sectional view of the optical element driving mechanism 7-100 along the line 7-A-7-A in FIG. 73 according to an embodiment of the present disclosure.

Please refer to FIG. 79, which is a cross-sectional view of the optical element driving mechanism 7-100 along the line 7-A-7-A in FIG. 73 according to an embodiment of the present disclosure. As shown in FIG. 79, the spacer element 7-104 is located between the first movable part 7-108 and the second movable part 7-109. Furthermore, the base 7-112 of the fixed assembly 7-FA has a fixed assembly surface 7-1123 facing the first optical element 7-1082 of the first movable part 7-108.

When viewed in the third direction 7-D3 (the Z-axis), the fixed assembly surface 7-1123 overlaps at least a part of the first movable part 7-108. In addition, the base 7-112 of the fixed assembly 7-FA further includes a setting groove 7-1124 for accommodating the spacer element 7-104, and the setting groove 7-1124 is formed by the fixed assembly surface 7-1123. As shown in FIG. 79, a shortest distance between the first optical element 7-1082 of the first movable part 7-108 and the fixed assembly surface 7-1123 is shorter than a shortest distance between the first optical element 7-1082 of the first movable part 7-108 and the spacer element 7-104.

In this embodiment, the optical element driving mechanism 7-100 further includes a first anti-twist assembly 7-BA for helping the second movable part 7-109 to move relative to the fixed assembly 7-FA in the second direction 7-D2. Specifically, the first anti-twist assembly 7-BA has a first protruding structure 7-112P extending in the third direction 7-D3. In addition, the first anti-twist assembly 7-BA further has a first blocking surface 7-112BS, which corresponds to the first protruding structure 7-112P.

An extending direction of the first blocking surface 7-112BS is parallel to the third direction 7-D3. When viewed in the third direction 7-D3, the first protruding structure 7-112P does not overlap the first guiding element 7-131. Based on the structural design of the first anti-twist assembly 7-BA, the second movable part 7-109 can be prevented from rotating around the Y-axis.

Figure 80:
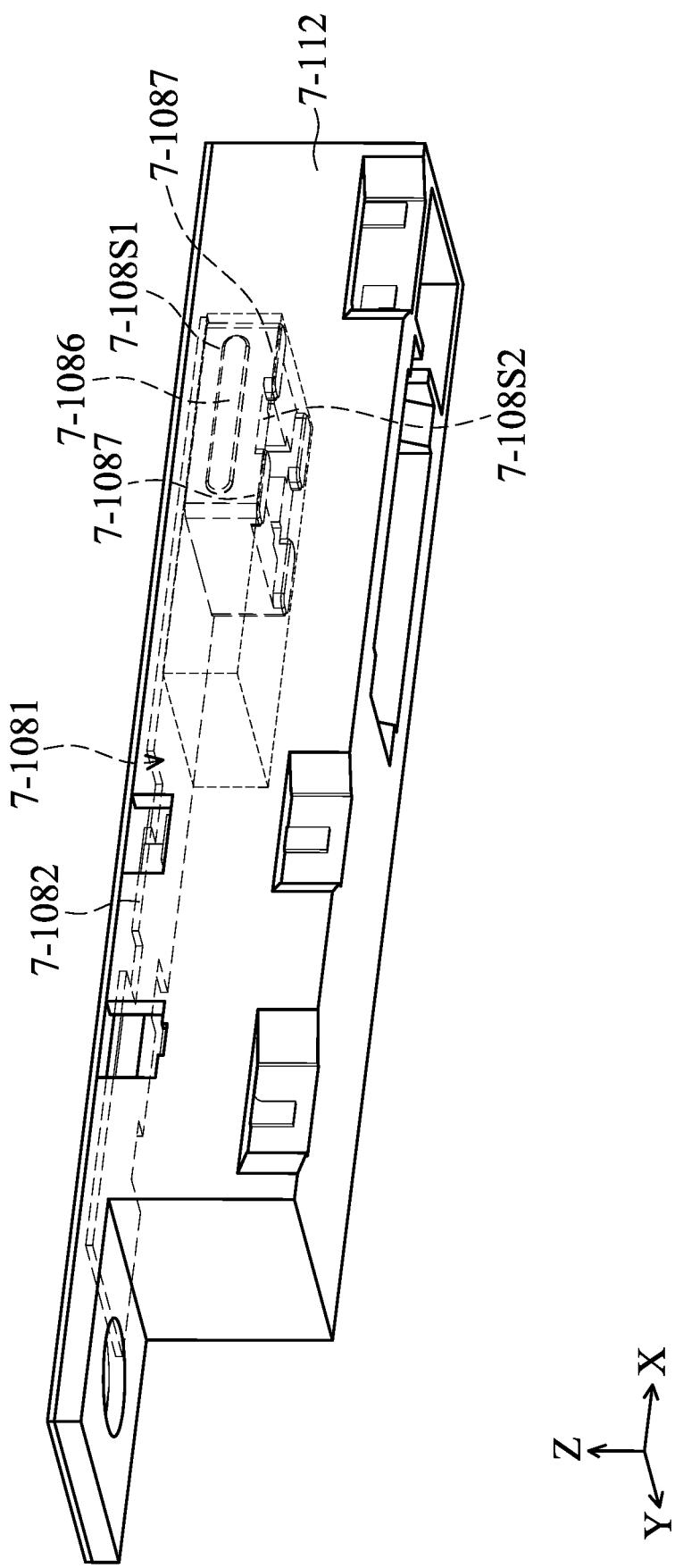
FIG. 80 is a perspective view of the optical element driving mechanism 7-100 in another view according to an embodiment of the present disclosure.

Please refer to FIG. 79 and FIG. 80. FIG. 80 is a perspective view of the optical element driving mechanism 7-100 in another view according to an embodiment of the present disclosure. In this embodiment, the holder 7-1081 is connected to the first optical element 7-1082. Specifically, as shown in FIG. 79, at least a part of the first optical element 7-1082 is buried in and not exposed from the holder 7-1081, for example, by using insert molding technology. In this embodiment, the holder 7-1081 is made of a non-metal material, such as a plastic material, and the first optical element 7-1082 is made of a metal material.

Furthermore, as shown in FIG. 80, the holder 7-1081 has a first guiding portion 7-1086, which corresponds to the base 7-112 of the fixed assembly 7-FA. The first guiding portion 7-1086 may be a protruding structure formed on a first surface 7-10851 of the holder 7-1081. Furthermore, the holder 7-1081 may have one or more second guiding portions 7-1087, corresponding to the base 7-112 of the fixed assembly 7-FA.

The second guiding portion 7-1087 may be a protruding structure formed on a second surface 7-108S2 (the bottom surface) of the holder 7-1081. As shown in FIG. 80, the first guiding portion 7-1086 and the second guiding portion 7-1087 extend in different directions. The first surface 7-10851 and the second surface 7-108S2 are not parallel. Specifically, the first surface 7-108S1 is perpendicular to the second surface 7-108S2, and the first surface 7-108S1 is adjacent to the second surface 7-108S2.

Figure 81:
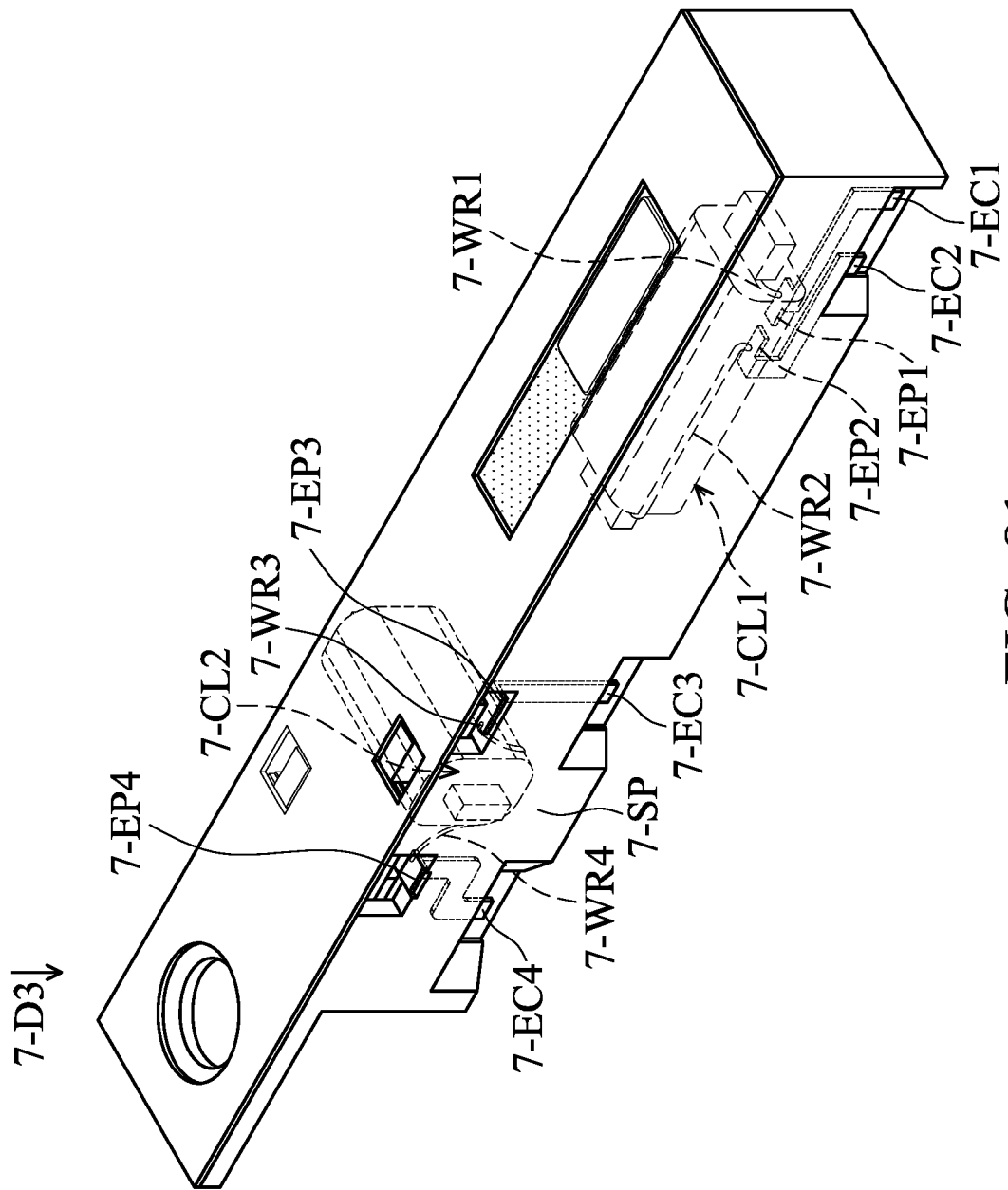
FIG. 81 is a perspective view of the optical element driving mechanism 7-100 in another view according to an embodiment of the present disclosure.
Figure 82:
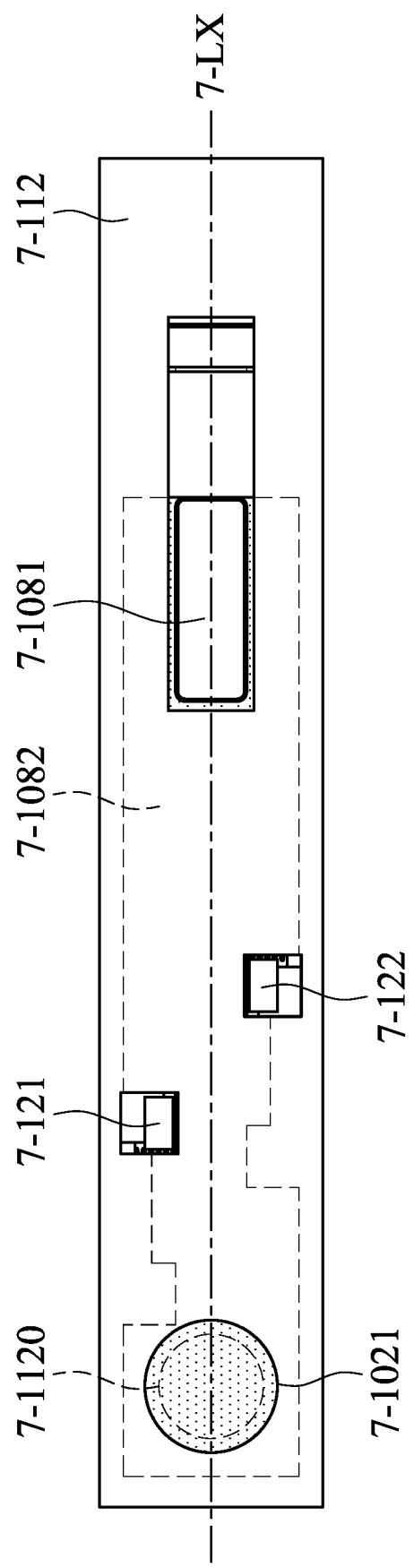
FIG. 82 is a top view illustrated that the first movable part 7-108 moves to a second position according to an embodiment of the present disclosure.

Please refer to FIG. 74 and FIG. 81, and FIG. 81 is a perspective view of the optical element driving mechanism 7-100 in another view according to an embodiment of the present disclosure. In this embodiment, the fixed assembly 7-FA may further include a first electrical connection portion 7-EP1, a second electrical connection portion 7-EP2, a third electrical connection portion 7-EP3, and a fourth electrical connection portion 7-EP4.

The first electrical connection portion 7-EP1 is electrically connected to a first leading wire 7-WR1 of the first coil 7-CL1 of the driving assembly 7-DA, the second electrical connection portion 7-EP2 is electrically connected to a second leading wire 7-WR2 of the first coil 7-CL1 of the driving assembly 7-DA, the third electrical connection portion 7-EP3 is electrically connected to a third leading wire 7-WR3 of the second coil 7-CL2 of the driving assembly 7-DA, and the fourth electrical connection portion 7-EP4 is electrically connected to a fourth leading wire 7-WR4 of the second coil 7-CL2 of the driving assembly 7-DA.

The fixed assembly 7-FA may further include an insulating portion 7-SP, a first external contact 7-EC1, a second external contact 7-EC2, a third external contact 7-EC3, and a fourth external contact 7-EC4. The insulating portion 7-SP has a protruding structure which is located between the third electrical connection portion 7-EP3 and the fourth electrical connection portion 7-EP4.

The first external contact 7-EC1 is electrically connected to the first electrical connection portion 7-EP1, the second external contact 7-EC2 is electrically connected to the second electrical connection portion 7-EP2, the third external contact 7-EC3 is electrically connected to the third electrical connection portion 7-EP3, and the fourth external contact 7-EC4 is electrically connected to the fourth electrical connection portion 7-EP4.

Please refer to FIG. 75 and FIG. 81 together. When viewed in the third direction 7-D3, the base 7-112 of the fixed assembly 7-FA has a polygonal structure, such as a rectangular structure. The first electrical connection portion 7-EP1 and the second electrical connection portion 7-EP2 are located on a first side 7-112S1 of the base 7-112 of the fixed assembly 7-FA.

When viewed in the third direction 7-D3, the third electrical connection portion 7-EP3 and the fourth electrical connection portion 7-EP4 are located on the first side 7-112S1 of the base 7-112 of the fixed assembly 7-FA. When viewed in the third direction 7-D3, the base 7-112 of the fixed assembly 7-FA further includes a second side 7-112S2, and the first side 7-112S1 is greater than the second side 7-112S2.

Furthermore, when viewed in the third direction 7-D3, the first external contact 7-EC1 and the second external contact 7-EC2 are located on the first side 7-112S1. When viewed in the third direction 7-D3, the third external contact 7-EC3 and the fourth external contact 7-EC4 are located on the first side 7-112S1.

For example, please refer to FIG. 75, FIG. 76, FIG. 77 and FIG. 82, and FIG. 82 is a top view illustrated that the first movable part 7-108 moves to a second position according to an embodiment of the present disclosure. The optical element driving mechanism 7-100 of the present disclosure can serves as a shutter to adjust the light entering the photosensitive module 7-150.

When it is desired to close the first opening 7-1021 to prevent the light from entering the photosensitive module 7-150, as shown in FIG. 76, the second coil 7-CL2 is energized to generate the second driving force 7-DF2 and the third driving force 7-DF3, so that the first locking element 7-121 and the second locking element 7-122 release the first optical element 7-1082. Next, the first coil 7-CL1 and the first magnetic unit 7-MG1 generate the first driving force 7-DF1 to drive the first movable part 7-108 to move to the second position in FIG. 82.

Finally, the first coil 7-CL1 and the second coil 7-CL2 stop being energized, the first prestress 7-RF1 of the first elastic element 7-105 and the second prestress 7-RF2 of the second elastic element 7-106 respectively drive the first locking element 7-121 and the second locking element 7-122 to lock the first optical element 7-1082 and fix it at the second position so as to achieve the purpose of closing the first opening 7-1021 and the second opening 7-1120. The steps of opening the first opening 7-1021 and the second opening 7-1120 are similar to the closing steps, so they are not be omitted herein.

In this embodiment, the first locking element 7-121 and the second locking element 7-122 move toward a central axis 7-LX of the fixed assembly 7-FA to lock the first optical element 7-1082. In other embodiments, the first engaging portion 7-1083 and the second engaging portion 7-1084 are formed in a direction away from the central axis 7-LX, and the first locking element 7-121 and the second locking element 7-122 move away from the central axis 7-LX to respectively engage with the first engaging portion 7-1083 and the second engaging portion 7-1084 so as to lock the first optical element 7-1082.

The present disclosure provides an optical element driving mechanism, which includes a first movable part, a fixed assembly, a driving assembly and a locking assembly. The first movable part is movable relative to the fixed assembly. The driving assembly is configured to drive the first movable part to move relative to the fixed assembly. The locking assembly is configured to position the first movable part at a first position or a second position relative to the fixed assembly.

In some embodiments, the locking assembly 7-LA includes a first locking element 7-121 and a second locking element 7-122, which are configured to be respectively engaged with the first engaging portion 7-1083 and the second engaging portion 7-1084 so as to lock the first optical element 7-1082. Based on this structural design, the first optical element 7-1082 can be locked firmly. When the optical element driving mechanism is impacted, it can effectively prevent the locking assembly 7-LA from separating from the first optical element 7-1082.

In addition, the optical element driving mechanism can be miniaturized through a special space configuration, and the special combination of different materials for the elements can achieve lightweight, and at the same time, it is more energy-saving and can strengthen the overall mechanical strength. Furthermore, the special configuration of the light-quantity adjustment elements can ensure that when the optical element driving mechanism is subject to a strong impact, the first opening can still be shielded to ensure the privacy of information.

Eighth Embodiment

Figure 83:
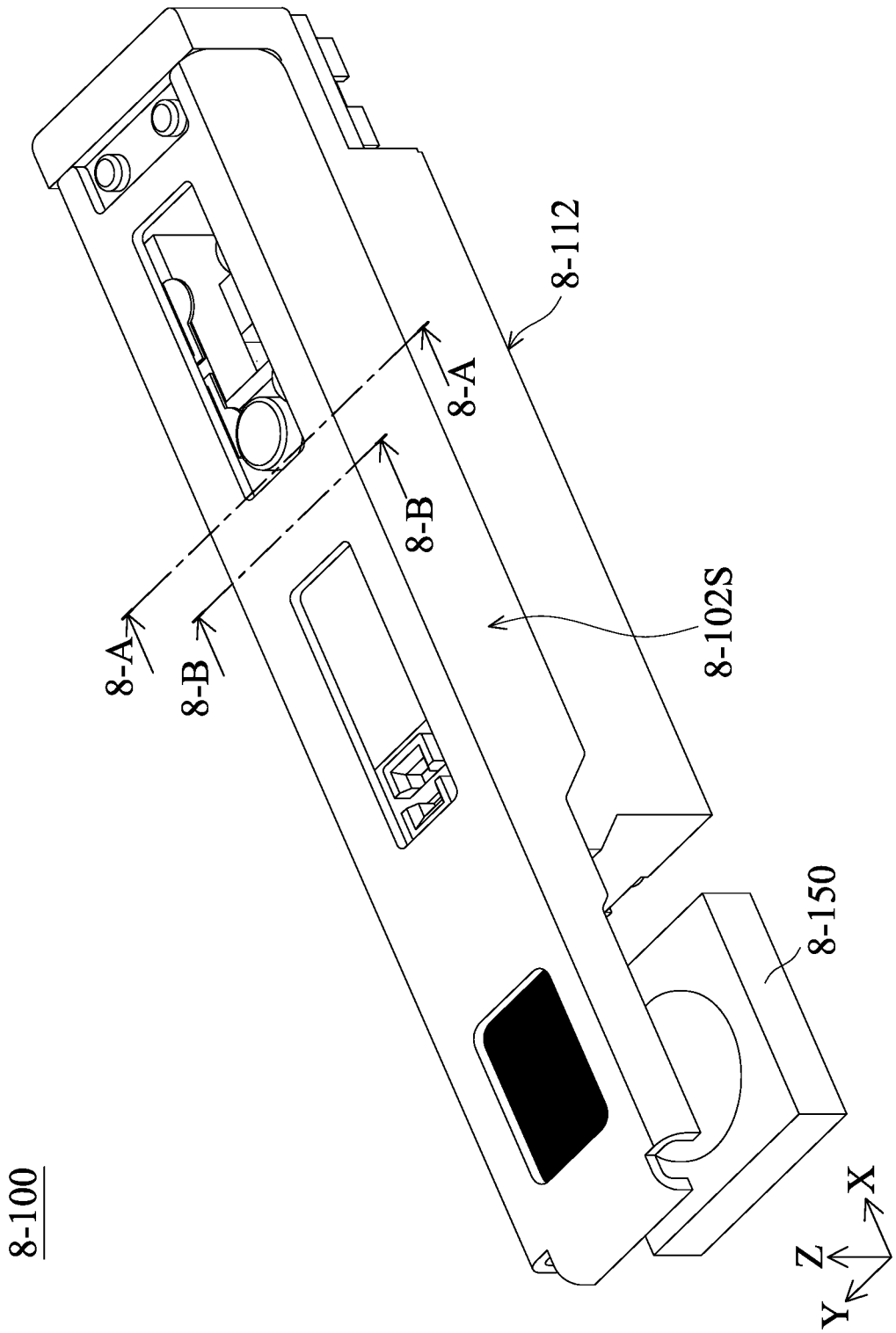
FIG. 83 shows a schematic diagram of an optical element driving mechanism 8-100 according to an embodiment of the present disclosure.
Figure 84:
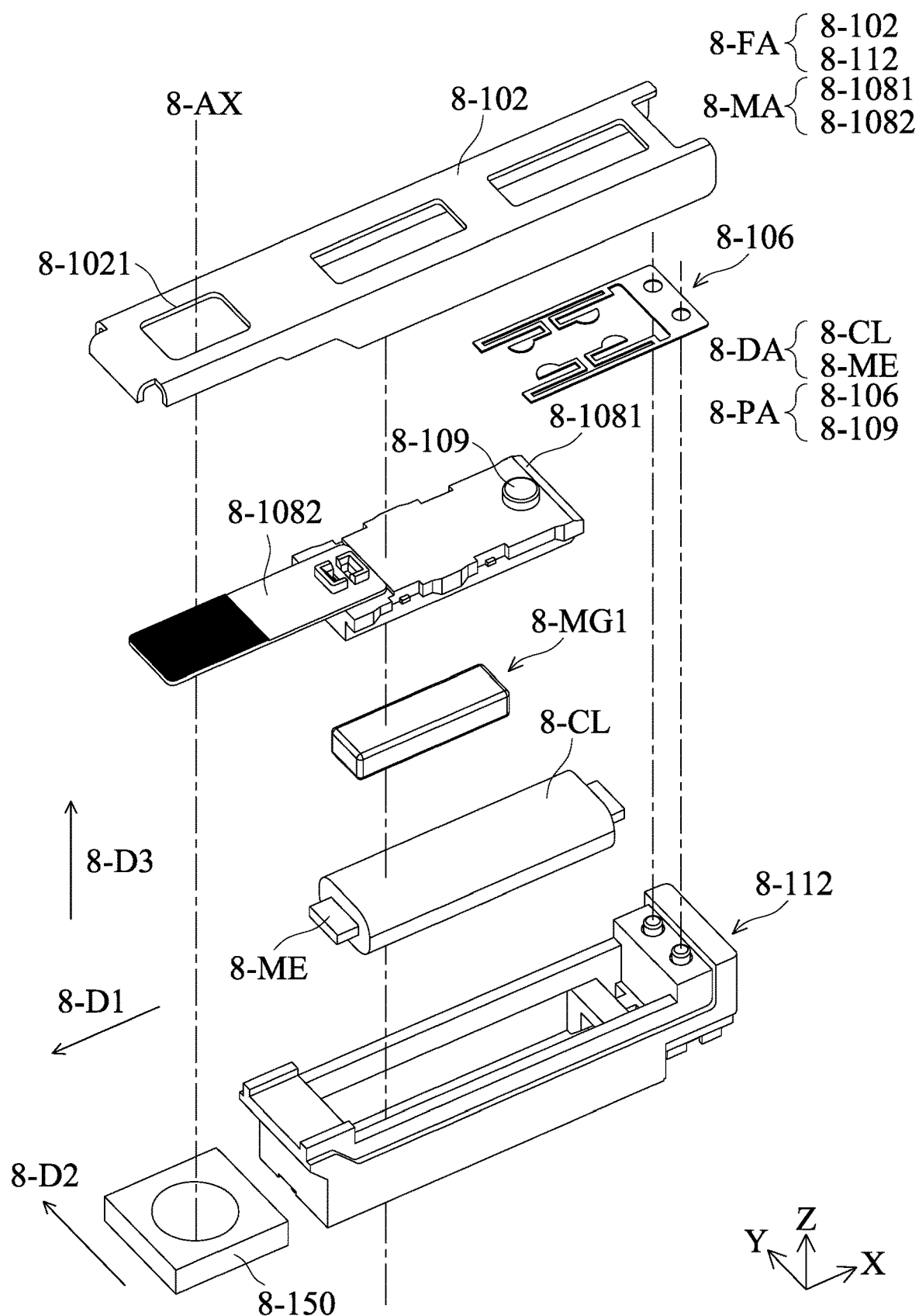
FIG. 84 shows an exploded diagram of the optical element driving mechanism 8-100 according to the embodiment of the present disclosure.
Figure 85:
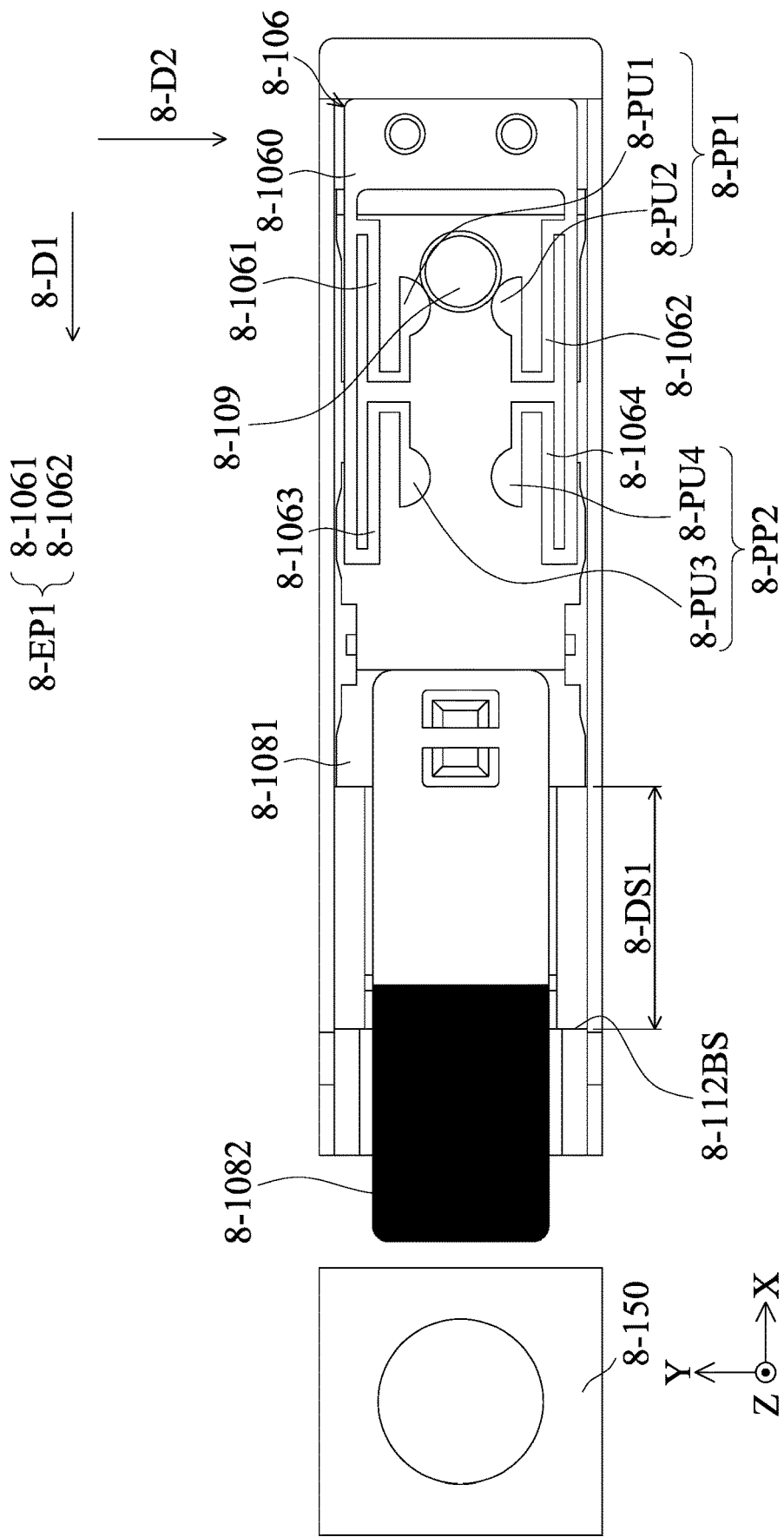
FIG. 85 shows a top view of a partial structure of the optical element driving mechanism 8-100 according to the embodiment of the present disclosure.

Please refer to FIG. 83 to FIG. 85. FIG. 83 shows a schematic diagram of an optical element driving mechanism 8-100 according to an embodiment of the present disclosure, FIG. 84 shows an exploded diagram of the optical element driving mechanism 8-100 according to the embodiment of the present disclosure, and FIG. 85 shows a top view of a partial structure of the optical element driving mechanism 8-100 according to the embodiment of the present disclosure. The optical element driving mechanism 8-100 can be an optical camera system and can be configured to hold and drive an optical element. The optical element driving mechanism 8-100 can be installed in different electronic devices or portable electronic devices, such as a smartphone or a tablet computer, for allowing a user to perform the image capturing function.

In this embodiment, the optical element driving mechanism 8-100 may include a fixed assembly 8-FA, a movable assembly 8-MA, and a driving assembly 8-DA. The movable assembly 8-MA is movably connected to the fixed assembly 8-FA. The driving assembly 8-DA is configured to drive the movable assembly 8-MA to move relative to the fixed assembly 8-FA.

In this embodiment, as shown in FIG. 84, the fixed assembly 8-FA includes a covering body 8-102 and a base 8-112. The covering body 8-102 is fixedly disposed on the base 8-112 to accommodate the movable assembly 8-MA and the driving assembly 8-DA.

As shown in FIG. 84, the aforementioned covering body 8-102 has a first opening 8-1021, and an optical module 8-150 is disposed on a side of the base 8-112. The external light can travel along a main axis 8-AX, enter the first opening 8-1021, and then be received by the optical module 8-150 to generate a digital image signal.

The movable assembly 8-MA has a holder 8-1081 and a light quantity adjustment element 8-1082, and the light quantity adjustment element 8-1082 is connected to the holder 8-1081. The driving assembly 8-DA has a coil 8-CL, a magnetic conductive element 8-ME and a first magnetic element 8-MG1. The coil 8-CL is wound on the magnetic conductive element 8-ME, and the first magnetic element 8-MG1 is affixed to the holder 8-1081. The coil 8-CL can act with the first magnetic element 8-MG1 to generate an electromagnetic driving force to drive the holder 8-1081 of the movable assembly 8-MA to move relative to the fixed assembly 8-FA between a first position (FIG. 85) and a second position (FIG. 86), so that the light quantity adjustment element 8-1082 adjusts the luminous flux of a light entering the optical module 8-150.

The optical element driving mechanism 8-100 further includes a positioning assembly 8-PA for positioning the movable assembly 8-MA at the first position or the second position relative to the fixed assembly 8-FA when the driving assembly 8-DA is not operating. The first and second positions are arranged in a first direction 8-D1.

Figure 86:
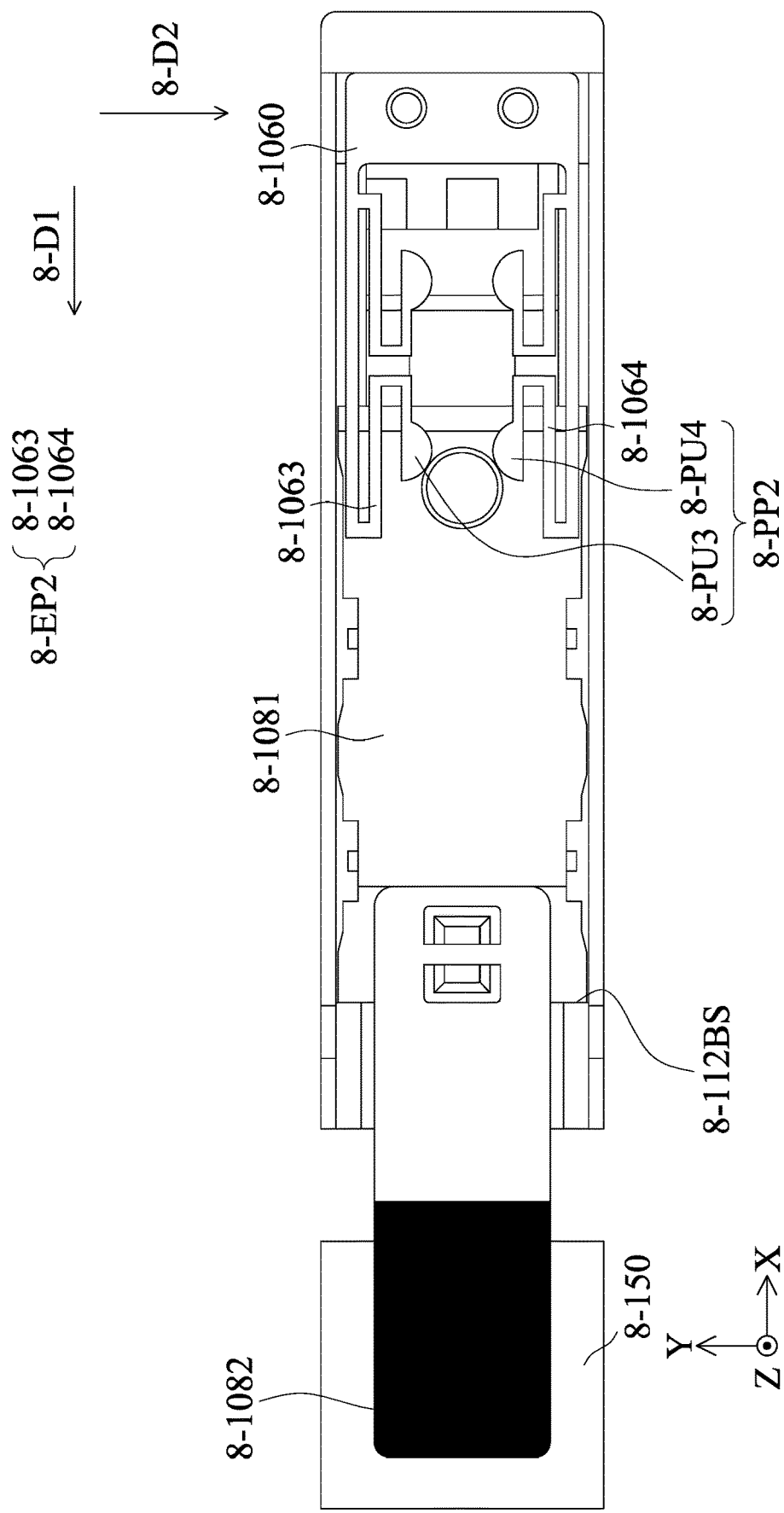
FIG. 86 is a top view of a part of the structure of the holder 8-108 according to an embodiment of the present disclosure.

Please refer to FIG. 84 to FIG. 86. FIG. 86 is a top view of a part of the structure of the holder 8-108 according to an embodiment of the present disclosure. In this embodiment, the positioning assembly 8-PA may include a first elastic element 8-106 and a positioning element 8-109, and the first elastic element 8-106 includes a positioning base 8-1060, a first positioning portion 8-PP1 and a first elastic portion 8-EP1.

The positioning base 8-1060 is fixedly disposed on the base 8-112 of the fixed assembly 8-FA, but it is not limited thereto. In other embodiments, the positioning base 8-1060 can be disposed on the movable assembly 8-MA. The first positioning portion 8-PP1 is movable relative to the positioning base 8-1060. The positioning element 8-109 corresponds to the first positioning portion 8-PP1, so that the movable assembly 8-MA is located at the first position in FIG. 85 relative to the fixed assembly 8-FA.

The first elastic portion 8-EP1 is made of an elastic material, and the first positioning portion 8-PP1 is movably connected to the positioning base 8-1060 via the first elastic portion 8-EP1. As shown in FIG. 85, when the movable assembly 8-MA is located at the first position, the positioning element 8-109 is in direct contact with the first positioning portion 8-PP1.

The first positioning portion 8-PP1 further includes a first positioning unit 8-PU1 and a second positioning unit 8-PU2 which are arranged in a second direction 8-D2, and the first direction 8-D1 is not parallel to the second direction 8-D2.

Specifically, the first direction 8-D1 and the second direction 8-D2 are perpendicular to each other.

The first elastic portion 8-EP1 includes a first elastic unit 8-1061 and a second elastic unit 8-1062. The first positioning unit 8-PU1 and the second positioning unit 8-PU2 are movably connected to the positioning base 8-1060 respectively via the first elastic unit 8-1061 and the second elastic unit 8-1062.

The positioning base 8-1060, the first positioning portion 8-PP1, and the first elastic portion 8-EP1 are all located on the first elastic element 8-106 having an integrally formed structure. The elastic coefficient of the first elastic element 8-106 in the first direction 8-D1 is different from the elastic coefficient of the first elastic element 8-106 in the second direction 8-D2. Specifically, the elastic coefficient of the first elastic element 8-106 in the first direction 8-D1 is greater than the elastic coefficient of the first elastic element 8-106 in the second direction 8-D2.

In addition, the elastic coefficient of the first elastic element 8-106 in a third direction 8-D3 (the Z-axis) is less than the elastic coefficient of the first elastic element 8-106 in the first direction 8-D1 and the first elastic coefficient of the elastic element 8-106 in the second direction 8-D2. The third direction 8-D3 is perpendicular to the first direction 8-D1. The third direction 8-D3 is perpendicular to the second direction 8-D2.

Based on the above-mentioned structural design of the first elastic element 8-106, the positioning element 8-109 can be stably separated from the first position and moved toward the second position in the first direction 8-D1.

It should be noted that the optical element driving mechanism 8-100 of the present disclosure does not have any driving means for actively driving the first positioning portion 8-PP1 to move relative to the positioning base 8-1060. That is, when the positioning element 8-109 does not push the first positioning portion 8-PP1, the first positioning portion 8-PP1 does not move by itself relative to the positioning base 8-1060.

In this embodiment, the first elastic element 8-106 may have a plate-shaped structure. The first elastic element 8-106 may be made of a metal material. The positioning element 8-109 may be made of a metal material. Thereby, the problem of particles or debris generated by the friction between the positioning element 8-109 and the first elastic element 8-106 can be avoided.

As shown in FIG. 86, the positioning assembly 8-PA further includes a second positioning portion 8-PP2 corresponding to the first positioning portion 8-PP1, so that the movable assembly 8-MA is located at the second position relative to the fixed assembly 8-FA. The second positioning portion 8-PP2 includes a third positioning unit 8-PU3 and a fourth positioning unit 8-PU4 which are arranged in the second direction 8-D2.

The positioning assembly 8-PA further includes a second elastic portion 8-EP2 which is made of an elastic material, and the second positioning portion 8-PP2 is movably connected to the positioning base 8-1060 via the second elastic portion 8-EP2.

The second elastic portion 8-EP2 further includes a third elastic unit 8-1063 and a fourth elastic unit 8-1064, and the third positioning unit 8-PU3 and the fourth positioning unit 8-PU4 are movably connected to the positioning base 8-1060 respectively via the third elastic unit 8-1063 and the fourth elastic unit 8-1064.

As shown in FIG. 85 and FIG. 86, when the movable assembly 8-MA moves from the first position to the second position, the holder 8-1081 is in contact with a blocking surface 8-112BS of the base 8-112, and a distance between the first position and the second position is substantially equal to a moving distance 8-DS1.

Furthermore, when the driving assembly 8-DA is not operating to drive the movable assembly 8-MA, the positioning assembly 8-PA positions the movable assembly 8-MA at the first position or the second position relative to the fixed assembly 8-FA, and at this time, the movable assembly 8-MA is movable relative to the fixed assembly 8-FA in an extremely small range. This extremely small range is less than or equal to 1 mm and less than the distance between the first position and the second position. Based on the above structural design, the problem of elastic fatigue caused by continuous compression of the first elastic element 8-106 can be avoided.

Figure 87:
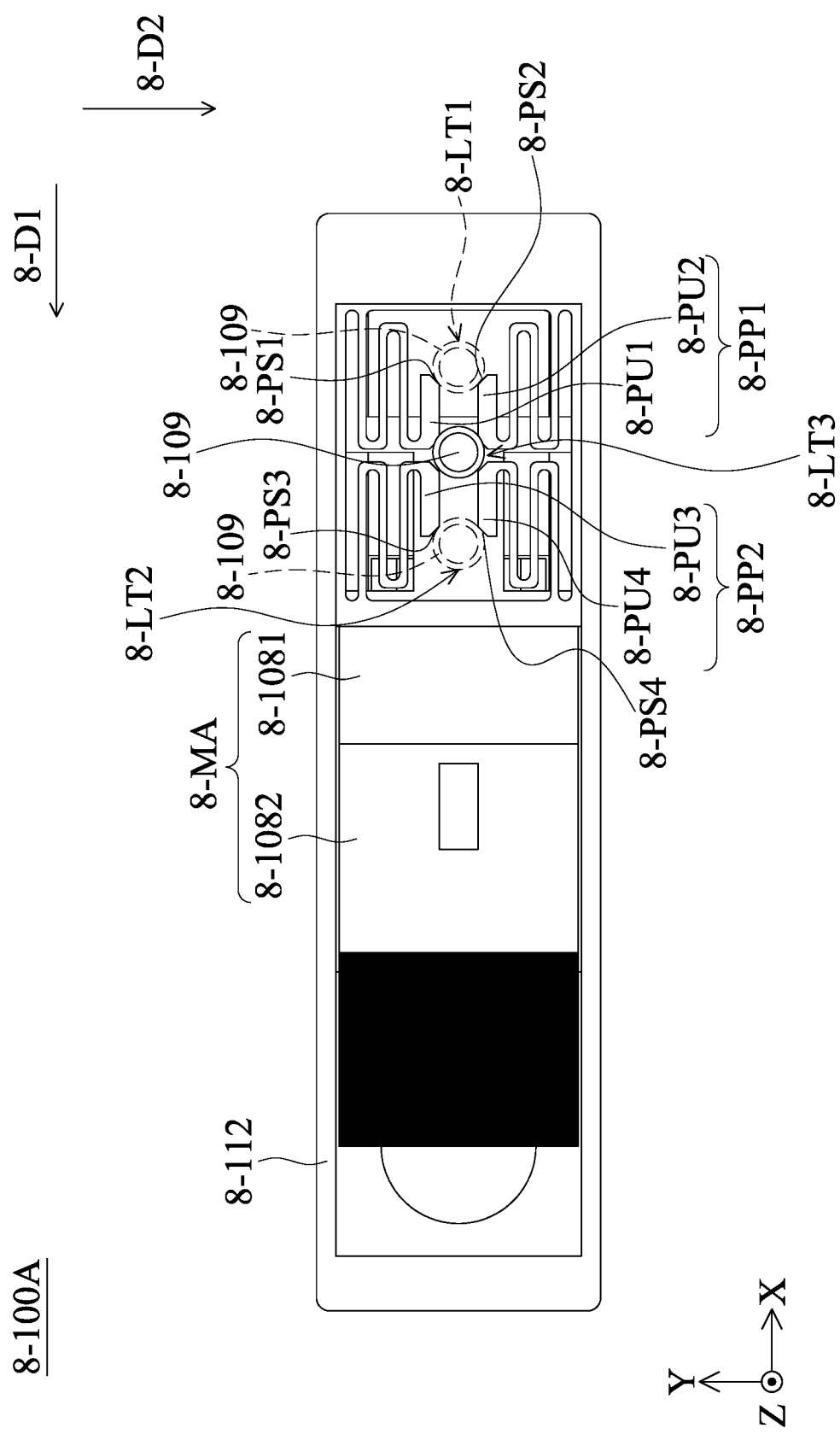
FIG. 87 is a top view of a partial structure of an optical element driving mechanism 8-100A according to another embodiment of the present disclosure.

Next, please refer to FIG. 87, which is a top view of a partial structure of an optical element driving mechanism 8-100A according to another embodiment of the present disclosure. In this embodiment, when the driving assembly 8-DA is not operating, the positioning assembly 8-PA is configured to position the positioning element 8-109 on the movable assembly 8-MA at a third position 8-LT3 relative to the base 8-112 of the fixed assembly 8-FA.

The third position 8-LT3 is located between the first position 8-LT1 and the second position 8-LT2. Based on this design, the optical element driving mechanism 8-100A can implement functions such as aperture or filter.

Furthermore, as shown in FIG. 87, the first positioning portion 8-PP1 further includes a first positioning surface 8-PS1, and when the movable assembly 8-MA and the positioning element 8-109 are located at the first position 8-LT1, the first positioning surface 8-PS1 faces the positioning element 8-109. The first positioning surface 8-PS1 is not parallel to the first direction 8-D1. The first positioning surface 8-PS1 is not parallel to the second direction 8-D2. The first positioning surface 8-PS1 is located at the first positioning unit 8-PU1.

Furthermore, the first positioning portion 8-PP1 further includes a second positioning surface 8-PS2, and when the movable assembly 8-MA and the positioning element 8-109 are located at the first position 8-LT1, the second positioning surface 8-PS2 faces the positioning element 8-109. The second positioning surface 8-PS2 is not parallel to the first direction 8-D1. The second positioning surface 8-PS2 is not parallel to the second direction 8-D2. The second positioning surface 8-PS2 is located at the second positioning unit 8-PU2.

The second positioning portion 8-PP2 further includes a third positioning surface 8-PS3, and when the movable assembly 8-MA and the positioning element 8-109 are located at the second position 8-LT2, the third positioning surface 8-PS3 faces the positioning element 8-109. The third positioning surface 8-PS3 is not parallel to the first direction 8-D1. The third positioning surface 8-PS3 is not parallel to the second direction 8-D2. The third positioning surface 8-PS3 is located at the third positioning unit 8-PU3.

The third positioning surface 8-PS3 is not parallel to the first positioning surface 8-PS1. The third positioning surface 8-PS3 and the second positioning surface 8-PS2 face different directions. The third positioning surface 8-PS3 is parallel to the second positioning surface 8-PS2.

The second positioning portion 8-PP2 further includes a fourth positioning surface 8-PS4, and when the movable assembly 8-MA and the positioning element 8-109 are located at the second position 8-LT2, the fourth positioning surface 8-PS4 faces the positioning element 8-109. The fourth positioning surface 8-PS4 is not parallel to the first direction 8-D1. The fourth positioning surface 8-PS4 is not parallel to the second direction 8-D2. The fourth positioning surface 8-PS4 is located at the fourth positioning unit 8-PU4.

The fourth positioning surface 8-PS4 and the first positioning surface 8-PS1 face different directions. The fourth positioning surface 8-PS4 and the second positioning surface 8-PS2 are not parallel. The fourth positioning surface 8-PS4 is parallel to the first positioning surface 8-PS1.

Figure 88:
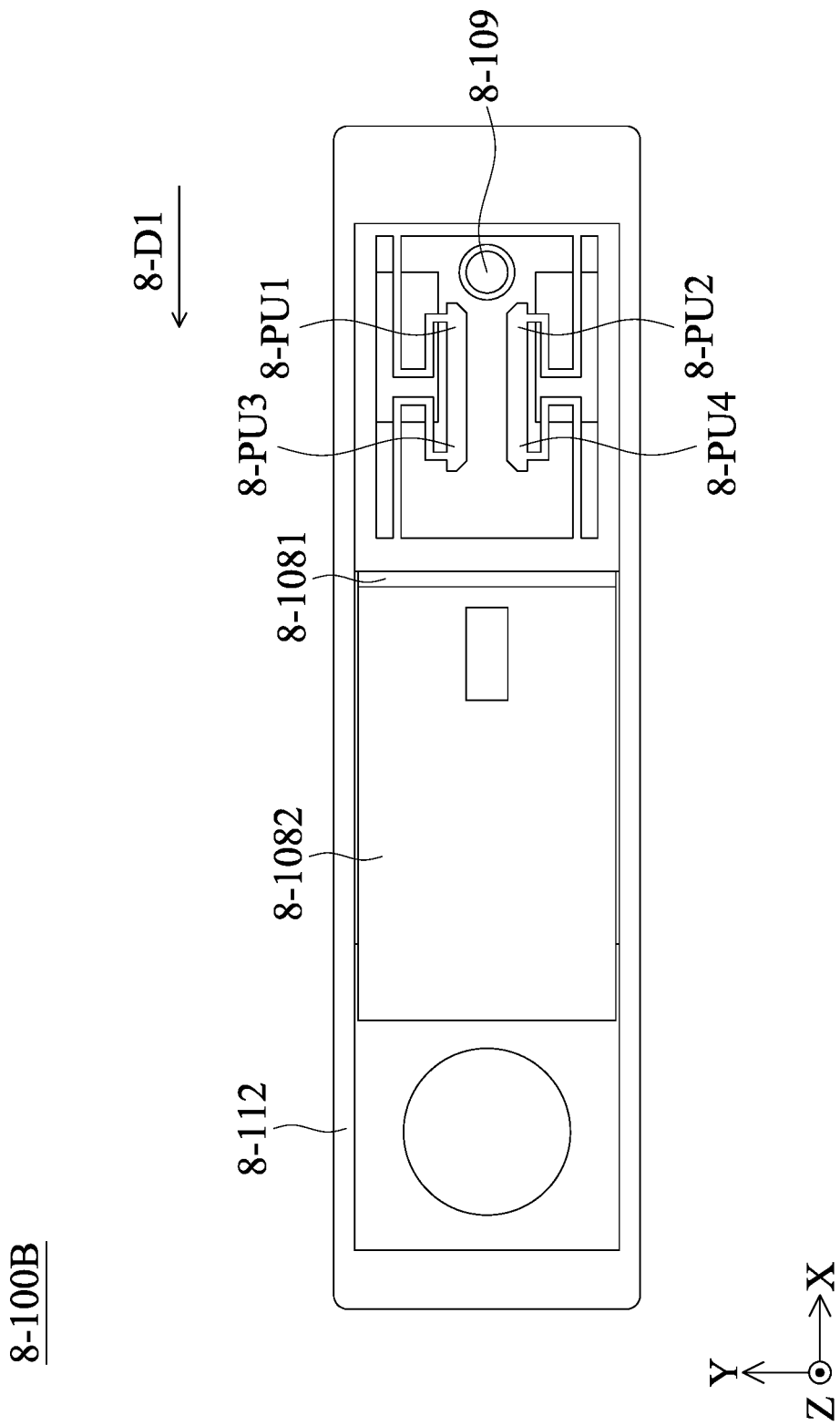
FIG. 88 is a top view of a partial structure of an optical element driving mechanism 8-100B according to another embodiment of the present disclosure.

Please refer to FIG. 88, which is a top view of a partial structure of an optical element driving mechanism 8-100B according to another embodiment of the present disclosure. In this embodiment, the first positioning unit 8-PU1 and the third positioning unit 8-PU3 are integrated formed in one piece, and the second positioning unit 8-PU2 and the fourth positioning unit 8-PU4 are integrated formed in one piece. Based on this structural design, the positioning element 8-109 can be more stable when moving in the first direction 8-D1.

Figure 89:
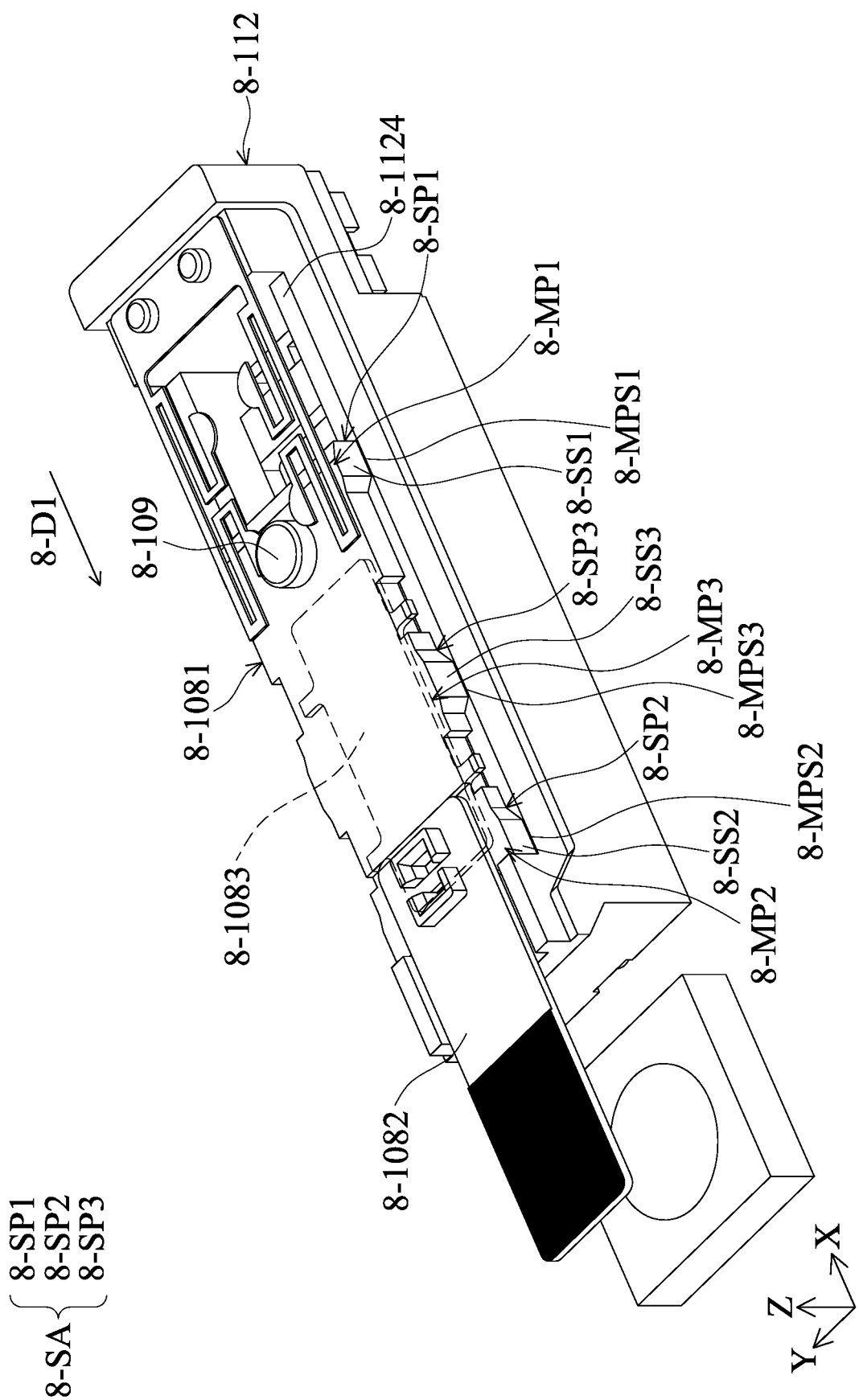
FIG. 89 is a perspective view of a partial structure of the optical element driving mechanism 8-100 according to an embodiment of the present disclosure.
Figure 90:
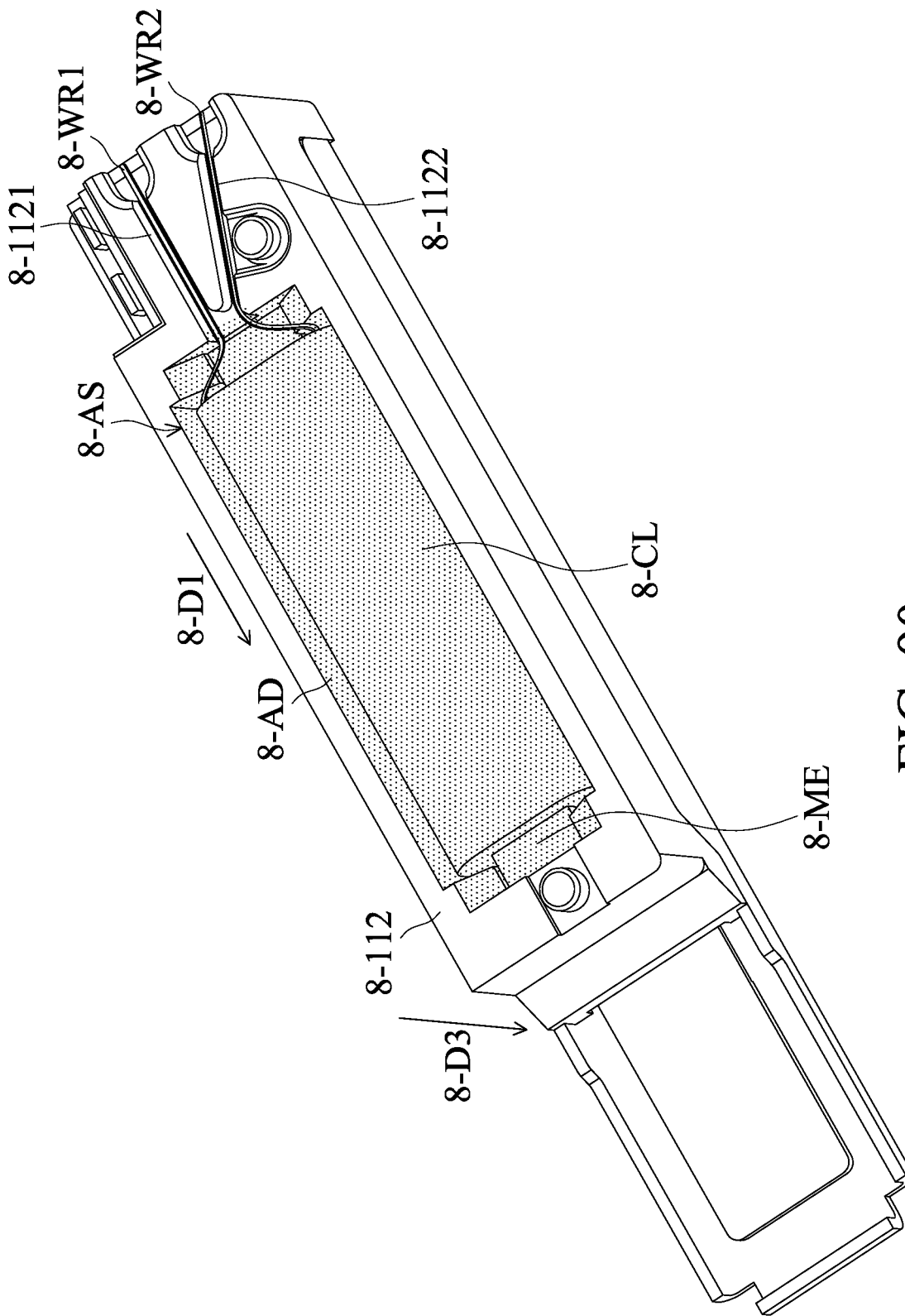
FIG. 90 is a perspective view of the optical element driving mechanism 8-100 in another view according to an embodiment of the present disclosure.

Please refer to FIG. 89 and FIG. 90. FIG. 89 is a perspective view of a partial structure of the optical element driving mechanism 8-100 according to an embodiment of the present disclosure, and FIG. 90 is a perspective view of the optical element driving mechanism 8-100 in another view according to an embodiment of the present disclosure.

In this embodiment, the holder 8-1081 has a non-metallic material and is configured to hold the light quantity adjustment element 8-1082. The movable assembly 8-MA can further include a strengthening element 8-1083, which is made of a metal material and is disposed in the holder 8-1081. Specifically, at least a part of strengthening element 8-1083 is buried in and not exposed from the holder 8-1081. The strengthening element 8-1083 may have a magnetically conductive material.

In addition, the positioning element 8-109 is fixedly disposed on the holder 8-1081, for example, by insert molding technology. Similarly, the light quantity adjustment element 8-1082 can also be connected to the holder 8-1081 by insert molding technology.

As shown in FIG. 90, the base 8-112 has an accommodation space 8-AS for accommodating the driving assembly 8-DA. Specifically, the accommodation space 8-AS has a perforated structure, and an adhesive element 8-AD (such as glue) can directly contact the perforated structure and the driving assembly 8-DA, so that the driving assembly 8-DA can be affixed in the accommodation space 8-AS. When viewed in the third direction 8-D3, the adhesive element 8-AD completely covers the perforated structure.

In this embodiment, the magnetic conductive element 8-ME has a magnetically conductive material and is configured to correspond to the first magnetic element 8-MG1 (FIG. 84), and the base 8-112 further includes a first groove 8-1121 for accommodating a first leading wire 8-WR1 of the coil 8-CL. The base 8-112 may further include a second groove 8-1122 for accommodating a second leading wire 8-WR2 of the coil 8-CL.

An extending direction of the first groove 8-1121 is parallel to the first direction 8-D1. The first groove 8-1121 and the second groove 8-1122 extend in different directions. In this embodiment, the coil 8-CL and the first magnetic element 8-MG1 are respectively disposed on the fixed assembly 8-FA and the movable assembly 8-MA, but it is not limited thereto. In other embodiments, the positions of the coil 8-CL and the first magnetic element 8-MG1 can be interchanged.

As shown in FIG. 89, the base 8-112 has a track 8-1124 corresponding to the holder 8-1081, so that the holder 8-1081 can move in the first direction 8-D1. The holder

8-1081 may further include a first sliding portion 8-MP1, a second sliding portion 8-MP2, and a third sliding portion 8-MP3.

The first sliding portion 8-MP1 corresponds to the track 8-1124, and the first sliding portion 8-MP1 has a first sliding surface 8-MPS1 facing the track 8-1124. The second sliding portion 8-MP2 corresponds to the track 8-1124, and the second sliding portion 8-MP2 has a second sliding surface 8-MPS2 facing the track 8-1124. The third sliding portion 8-MP3 corresponds to the track 8-1124, and the third sliding portion 8-MP3 has a third sliding surface 8-MPS3 facing the track 8-1124.

The first sliding portion 8-MP1 and the second sliding portion 8-MP2 are arranged in the first direction 8-D1, and the third sliding portion 8-MP3 is located between the first sliding portion 8-MP1 and the second sliding portion 8-MP2.

Furthermore, in other embodiments, the first sliding portion 8-MP1 and the second sliding portion 8-MP2 may have a metal material, and the first sliding portion 8-MP1 (and/or the second sliding portion 8-MP2) and the strengthening element 8-1083 are integrated formed in one piece. Correspondingly, the track 8-1124 can be made of a metal material, and a lubricating element (not shown, for example, the lubricating oil) can be disposed between the first sliding portion 8-MP1 (and/or the second sliding portion 8-MP2) and the track 8-1124, so that the holder 8-1081 can slide smoothly along track 8-1124.

Figure 91:
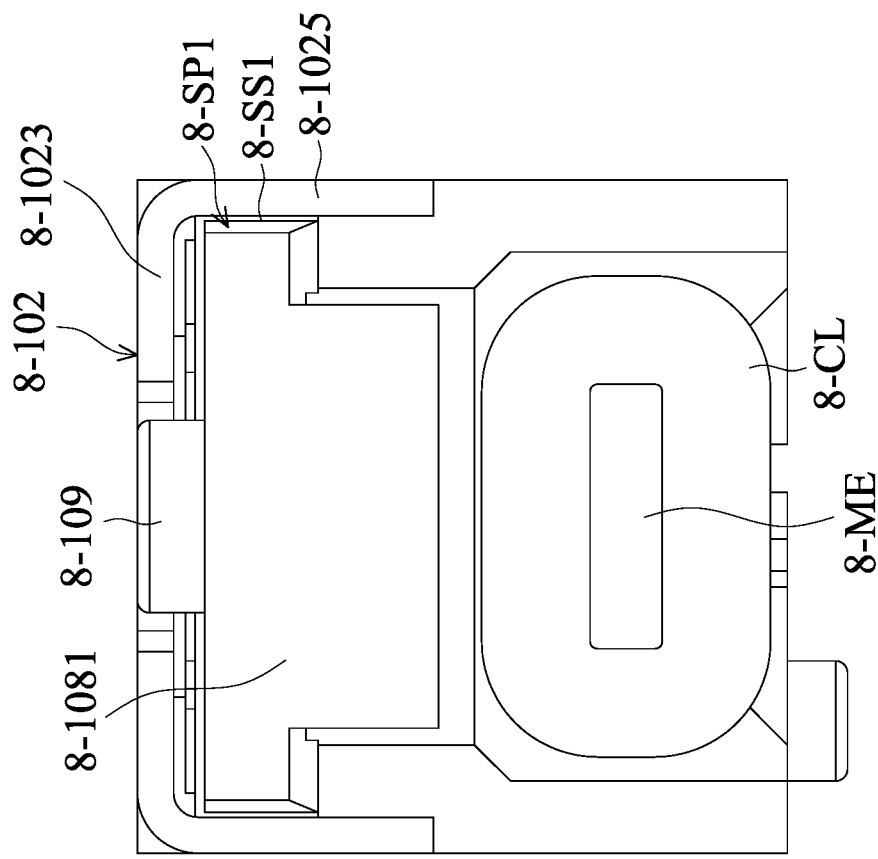
FIG. 91 is a cross-sectional view of the optical element driving mechanism 8-100 along the line 8-A-8-A in FIG. 83 according to an embodiment of the present disclosure.

Please refer to FIG. 83, FIG. 89, and FIG. 91. FIG. 91 is a cross-sectional view of the optical element driving mechanism 8-100 along the line 8-A-8-A in FIG. 83 according to an embodiment of the present disclosure. In this embodiment, the covering body 8-102 is fixedly connected to the base 8-112. The covering body 8-102 includes a top wall 8-1023 having a plate-shaped structure. The covering body 8-102 includes a side wall 8-1025 extending from the edge of the top wall 8-1023.

Furthermore, the holder 8-1081 has a stop assembly 8-SA configured to limit the range of movement of the holder 8-1081 relative to covering body 8-102. The stop assembly 8-SA includes a first stop portion 8-SP1, a second stop portion 8-SP2, and a third stop portion 8-SP3.

As shown in FIG. 89 and FIG. 91, the first stop portion 8-SP1 has a first stop surface 8-SS1 facing the side wall 8-1025. Similarly, the second stop portion 8-SP2 has a second stop surface 8-SS2 facing the side wall 8-1025. The third stop portion 8-SP3 has a third stop surface 8-SS3 facing the side wall 8-1025.

In this embodiment, the first sliding portion 8-MP1 and the first stop portion 8-SP1 are integrally formed in one piece. The first stop surface 8-SS1 is adjacent to the first sliding surface 8-MPS1. The first stop surface 8-SS1 is not parallel to the first sliding surface 8-MPS1. The second sliding portion 8-MP2 and the second stop portion 8-SP2 are integrally formed in one piece. The second stop surface 8-SS2 is adjacent to the second sliding surface 8-MPS2. The second stop surface 8-SS2 is not parallel to the second sliding surface 8-MPS2. The third sliding portion 8-MP3 and the third stop portion 8-SP3 are integrally formed in one piece. The third stop surface 8-SS3 is adjacent to the third sliding surface 8-MPS3. The third stop surface 8-SS3 is not parallel to the third sliding surface 8-MPS3.

Based on the above structural design, the holder 8-1081 can be smoothly moved in the first direction 8-D1.

Figure 92:
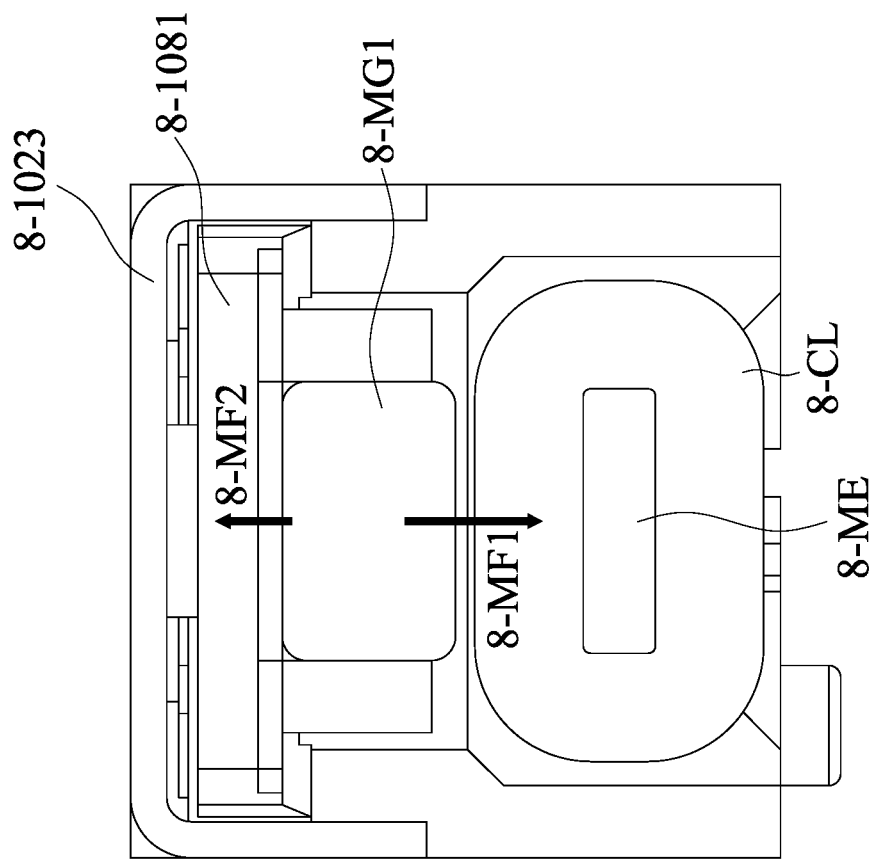
FIG. 92 is a cross-sectional view of the optical element driving mechanism 8-100 along the line 8-B-8-B in FIG. 83 according to an embodiment of the present disclosure.

Please continue to refer to FIG. 92, which is a cross-sectional view of the optical element driving mechanism 8-100 along the line 8-B-8-B in FIG. 83 according to an embodiment of the present disclosure. As shown in FIG. 92, the magnetic conductive element 8-ME and the first magnetic element 8-MG1 generate a first magnetic attraction force 8-MF1 to stabilize the movable assembly 8-MA. In this embodiment, the top wall 8-1023 is made of a magnetic material, and the top wall 8-1023 and the first magnetic element 8-MG1 generate a second magnetic attraction force 8-MF2 to stabilize the movable assembly 8-MA.

The directions of the first magnetic attraction force 8-MF1 and the second magnetic attraction force 8-MF2 are different. The directions of the first magnetic attraction force 8-MF1 and the second magnetic attraction force 8-MF2 are opposite. The magnitude of the first magnetic attraction force 8-MF1 and the magnitude of the second magnetic attraction force 8-MF2 are different. The magnitude of the first magnetic attraction force 8-MF1 is greater than the magnitude of the second magnetic attraction force 8-MF2.

Figure 93:
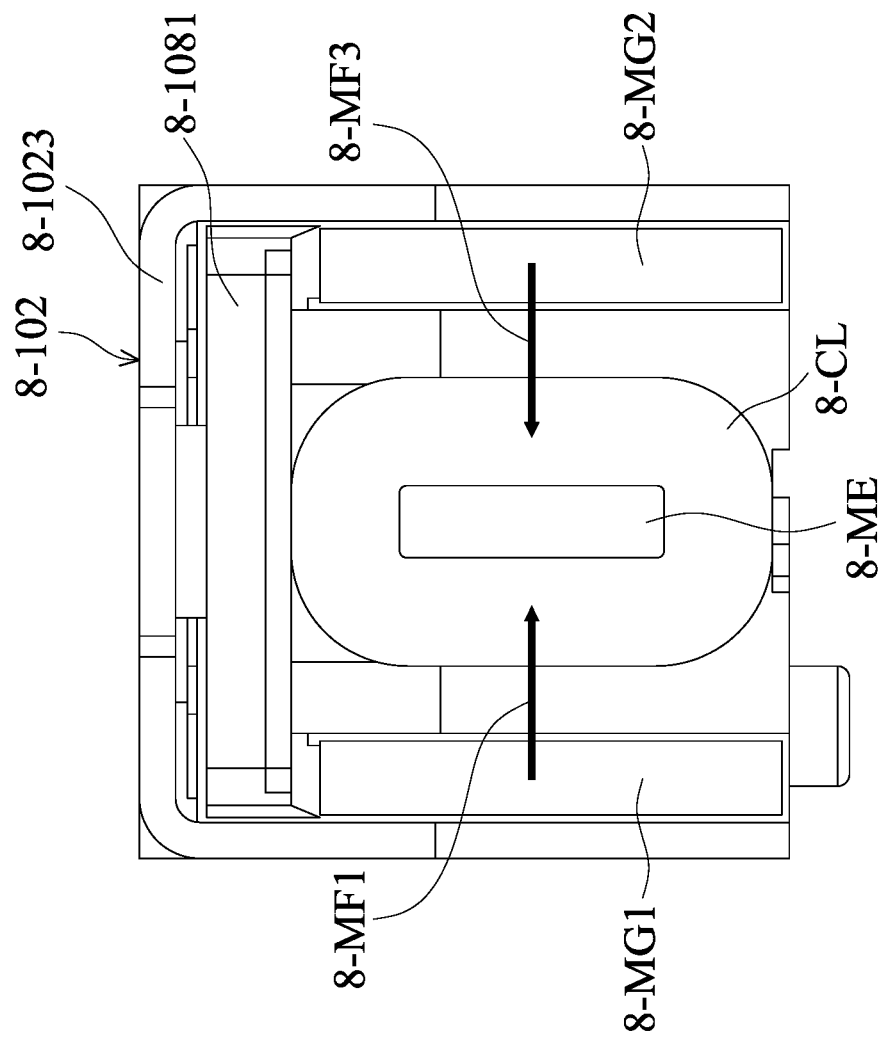
FIG. 93 is a cross-sectional view of the optical element driving mechanism 8-100 according to another embodiment of the present disclosure.

Please refer to FIG. 93, which is a cross-sectional view of the optical element driving mechanism 8-100 according to another embodiment of the present disclosure. As shown in FIG. 93, in this embodiment, the driving assembly 8-DA includes a first magnetic element 8-MG1 and a second magnetic element 8-MG2 which correspond to the coil 8-CL.

The magnetic conductive element 8-ME and the second magnetic element 8-MG2 generate a third magnetic attraction force 8-MF3 for stabilizing the movable assembly 8-MA. The directions of the first magnetic attraction force 8-MF1 and the third magnetic attraction force 8-MF3 are different. The directions of the first magnetic attraction force 8-MF1 and the third magnetic attraction force 8-MF3 are opposite. The first magnetic attraction force 8-MF1 and the third magnetic attraction force 8-MF3 have the same magnitude. The coil 8-CL is located between the first magnetic element 8-MG1 and the second magnetic element 8-MG2. As a result, the holder 8-1081 of the movable assembly 8-MA can be more stable when moving.

The present disclosure provides an optical element driving mechanism, which includes a movable assembly 8-MA, a fixed assembly 8-FA, and a driving assembly 8-DA. The movable assembly 8-MA has a light quantity adjustment element 8-1082 for adjusting the luminous flux of a light entering an optical module 8-150. The movable assembly 8-MA is movable relative to the fixed assembly 8-FA. The driving assembly 8-DA is configured to drive the movable assembly 8-MA to move between a first position and a second position relative to the fixed assembly. The optical element driving mechanism further includes a positioning assembly 8-PA for positioning the movable assembly 8-MA at the first position or the second position relative to the fixed assembly 8-FA when the driving assembly 8-DA is not operating The positioning assembly 8-PA includes a first positioning portion 8-PP1, a second positioning portion 8-PP2, and a positioning element 8-109. The positioning element 8-109 is fixedly connected to the movable assembly 8-MA and can be engaged with the first positioning portion 8-PP1 or the second positioning portion 8-PP2. Based on the above-mentioned structural design of the present disclosure, the movable assembly 8-MA can be effectively and stably positioned at the first position or the second position. In addition, cost can be saved and the purpose of miniaturization can be achieved.

Ninth Embodiment

Figure 94:
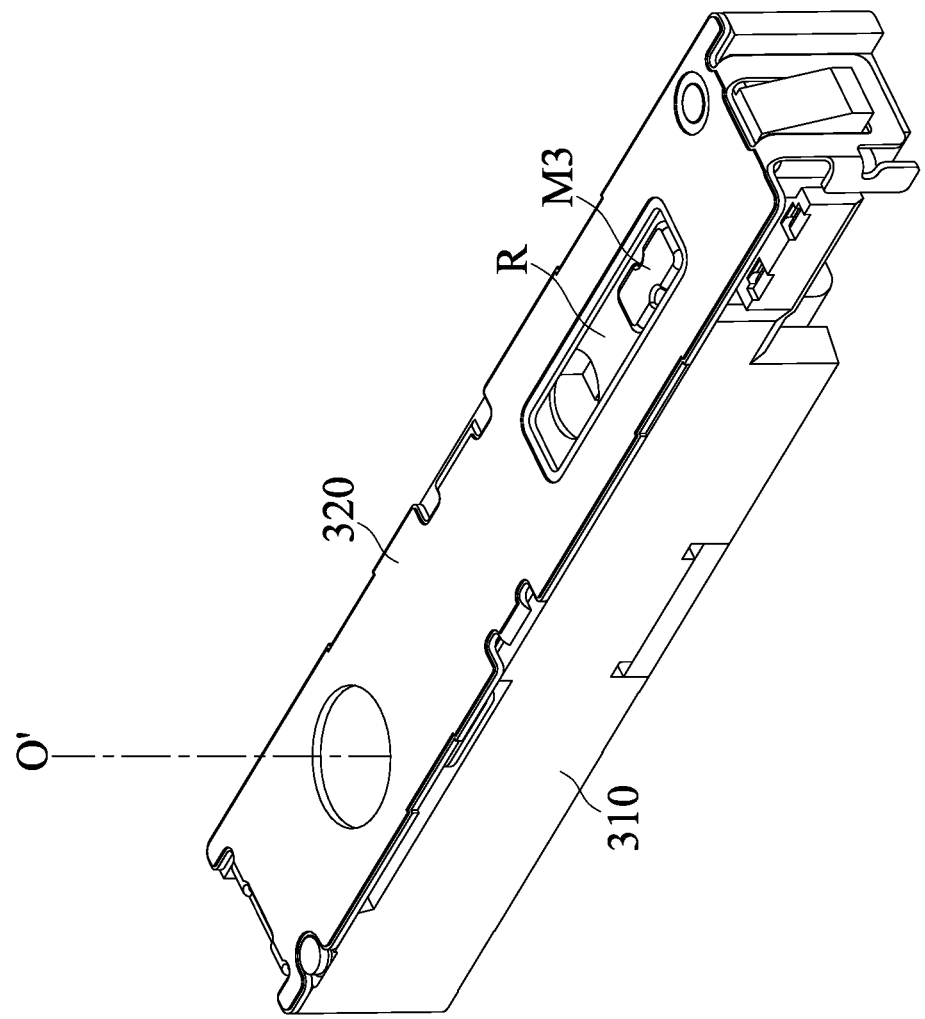
FIG. 94 is a perspective view illustrating the optical member driving mechanism in accordance with some embodiment of the present disclosure.

FIG. 94 is a perspective view illustrating the optical member driving mechanism 9-20 in accordance with some embodiment of the present disclosure. It should be noted that, in this embodiment, the optical member driving mechanism 9-20 is, for example, a shutter mechanism, and may be disposed in an electronic device (not shown) with camera function, and the optical member may be driven by the optical member driving mechanism. By controlling the position of the optical member, light may be passed through or blocked, and the exposure time of the camera module of the electronic device may be controlled.

Figure 95:
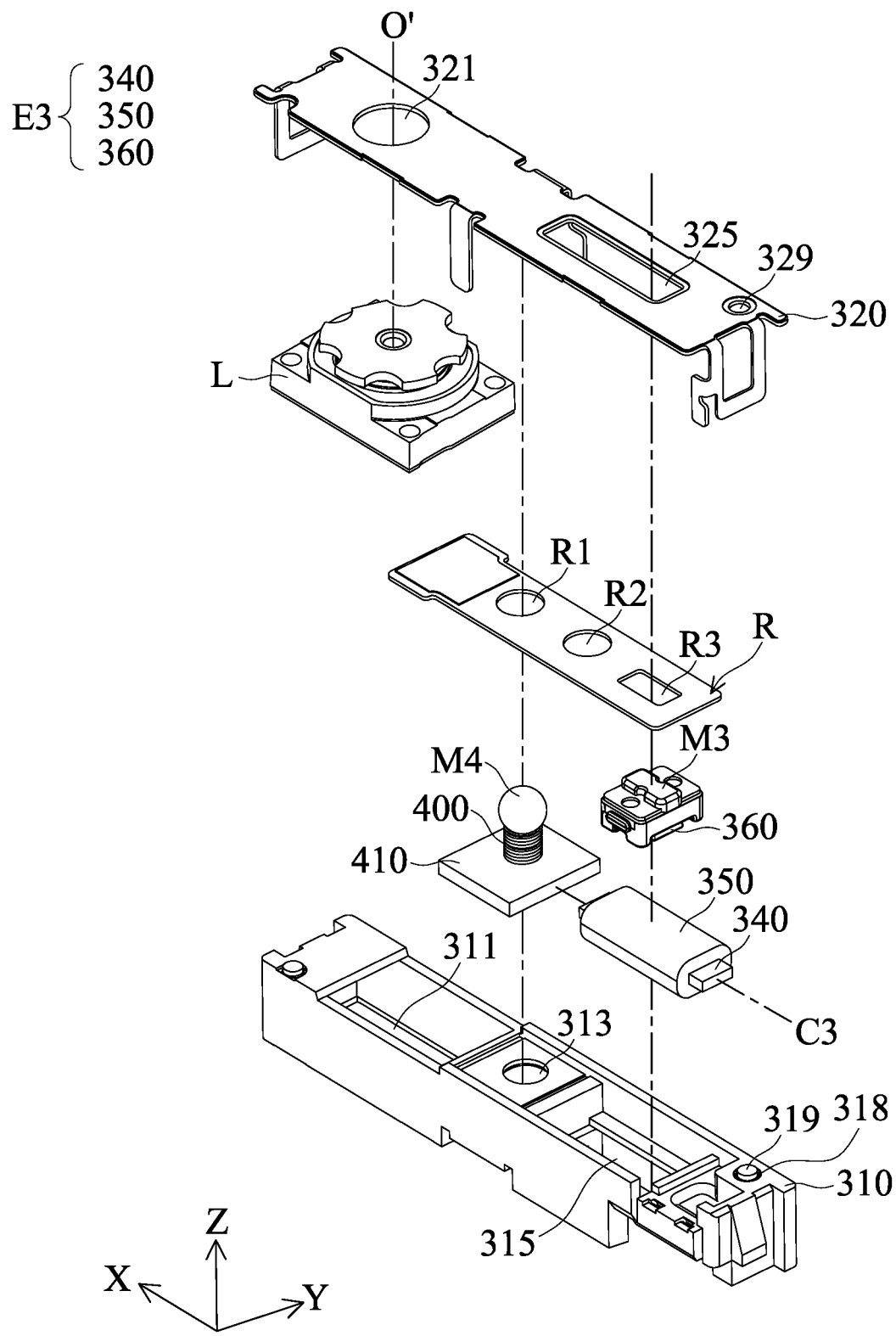
FIG. 95 is an exploded view illustrating the optical member driving mechanism shown in FIG. 94.

FIG. 95 is an exploded view illustrating the optical member driving mechanism 9-20 shown in FIG. 94. As shown in FIG. 95, the optical member driving mechanism 9-20 may include: a holder 9-M3, a fixed portion 9-F, a driving assembly 9-E3, and a positioning assembly 9-M4. In this embodiment, the fixed portion 9-F includes a body 9-310, a top cover 9-320, and a bottom cover 9-410. The top cover 9-320 and the bottom cover 9-410 are connected to the body 9-310, and the body 9-310 may be located between the top cover 9-320 and the bottom cover 9-410. The body 9-310 may be configured to carry the holder 9-M3 (the holder 9-M3 and the optical member 9-R may constitute a movable portion), and is connected to the optical module 9-L. The top cover 9-320 has a plate-shaped structure, and the extending direction of the plate-shaped structure (for example, parallel to the X-Y plane) is perpendicular to a main axis (for example, parallel to the optical axis 9-O').

In some embodiments, the body 9-310 has a recess 9-318 and a protrusion 9-319 protruding from the recess 9-318, and a rounded corner is formed between the protrusion 9-319 and the recess 9-318. In this way, the protrusions 9-319 may be effectively disposed in the positioning holes 9-329 of the top cover 9-320, and the top cover 9-320 may be more accurately disposed on the body 9-310. In some embodiments, the fixed portion 9-F and the optical module 9-L may be fixedly disposed on a substrate (not shown). In some embodiments, the optical member driving mechanism 9-20 does not directly contact the optical module 9-L, but the disclosure is not limited thereto.

In the direction parallel to the optical axis 9-O', the maximum size of the optical member driving mechanism 9-20 is larger than the maximum size of the optical module 9-L. For example, the height of the optical member driving mechanism 9-10 along the optical axis 9-O' is greater than the height of the optical module 9-L along the optical axis 9-O'. In addition, the optical member 9-R may include a baffle plate, which includes SOMA or any other suitable light-shielding material. The optical module 9-L may include a camera module, which includes a lens or any other suitable light-transmitting material to allow light to pass in a direction substantially parallel to the optical axis 9-O' to achieve the function of imaging. However, this disclosure is not limited thereto.

The holder 9-M3 may be configured to connect the optical member 9-R, wherein the optical member 9-R may be configured to block light (for example, light traveling in a direction substantially parallel to the optical axis 9-O'). The holder 9-M3 is relatively movable along the X axis (that is, the first direction) relative to the fixed portion 9-F. The driving assembly 9-E3 is used for driving the holder 9-M3 to move substantially along the X axis (that is, the first direction) relative to the fixed portion 9-F. In this embodiment, the driving assembly 9-E3 includes a first magnetic conductor 9-340, a first coil 9-350, and a first magnetic element 9-360 corresponding to the first coil 9-350. The first coil 9-350 has a winding axis 9-C3, which is substantially parallel to the first direction.

In some embodiments, the driving assembly 9-E3 may make the holder 9-M3 (and the connected optical member 9-R) to move between in the first position and the second position. For example, the first position and the second position may be arranged along the X axis (that is, the line connecting the first position and the second position may be substantially parallel to the X axis). That is, the line connecting the first position and the second position is different from the optical axis 9-O' (Z axis). In some embodiments, the line (for example, the X axis) connecting the first position and the second position is substantially perpendicular to the optical axis 9-O' (for example, the Z axis).

The positioning assembly 9-M4 may be used to affix the optical member 9-R at the first position or the second position relative to the fixed portion 9-F. The second driving assembly 9-E4 may be used to drive the positioning assembly 9-M4 to move relative to the fixed portion 9-F substantially along the Z axis (that is, the second direction). It is shown that the movement direction of the positioning assembly 9-M4 is different from the movement direction of the optical member 9-R. In some embodiments, the movement direction of the positioning assembly 9-M4 is substantially perpendicular to the movement direction of the optical member 9-R. In some embodiments, the positioning assembly 9-M4 may affix the optical member 9-R at the first position or the second position relative to the fixed portion 9-F.

In this embodiment, the optical member driving mechanism 9-20 further includes a force-exerting assembly 9-400 that abuts the positioning assembly M4 and exerts a force to the positioning assembly M4. In this embodiment, the force-exerting assembly 9-400 includes an elastic element, and the force is a contact force. In some embodiments, the force-exerting assembly 9-400 does not include any active driving means for driving the positioning assembly 9-M4. The force-exerting assembly 9-400 may be disposed on the bottom cover 9-410. In some embodiments, the force-exerting assembly 9-400 may drive the positioning assembly 9-M4 to move relative to the fixed portion 9-F in a second direction (for example, parallel to the Z axis). More specifically, the force-exerting assembly 9-400 may continuously exert an elastic force that is parallel to the second direction (for example, toward the top cover 9-320) to the positioning assembly 9-M4. The movement direction (the first direction) of the movable portion is different from the direction (the second direction) of exerting force. In some embodiments, the direction in which the movable portion moves is perpendicular to the direction in which the force is exerted.

In some other embodiments, the force-exerting assembly may include an electromagnet to exert an over-distance force (for example, a magnetic force) to the positioning assembly 9-M4. In addition, the force-exerting assembly may also change the direction in which the above-mentioned force is exerted to the positioning assembly 9-M4, so as to actively drive the positioning assembly 9-M4. More specifically, the positioning assembly 9-M4 may have a magnetically conductive material.

Figure 96:
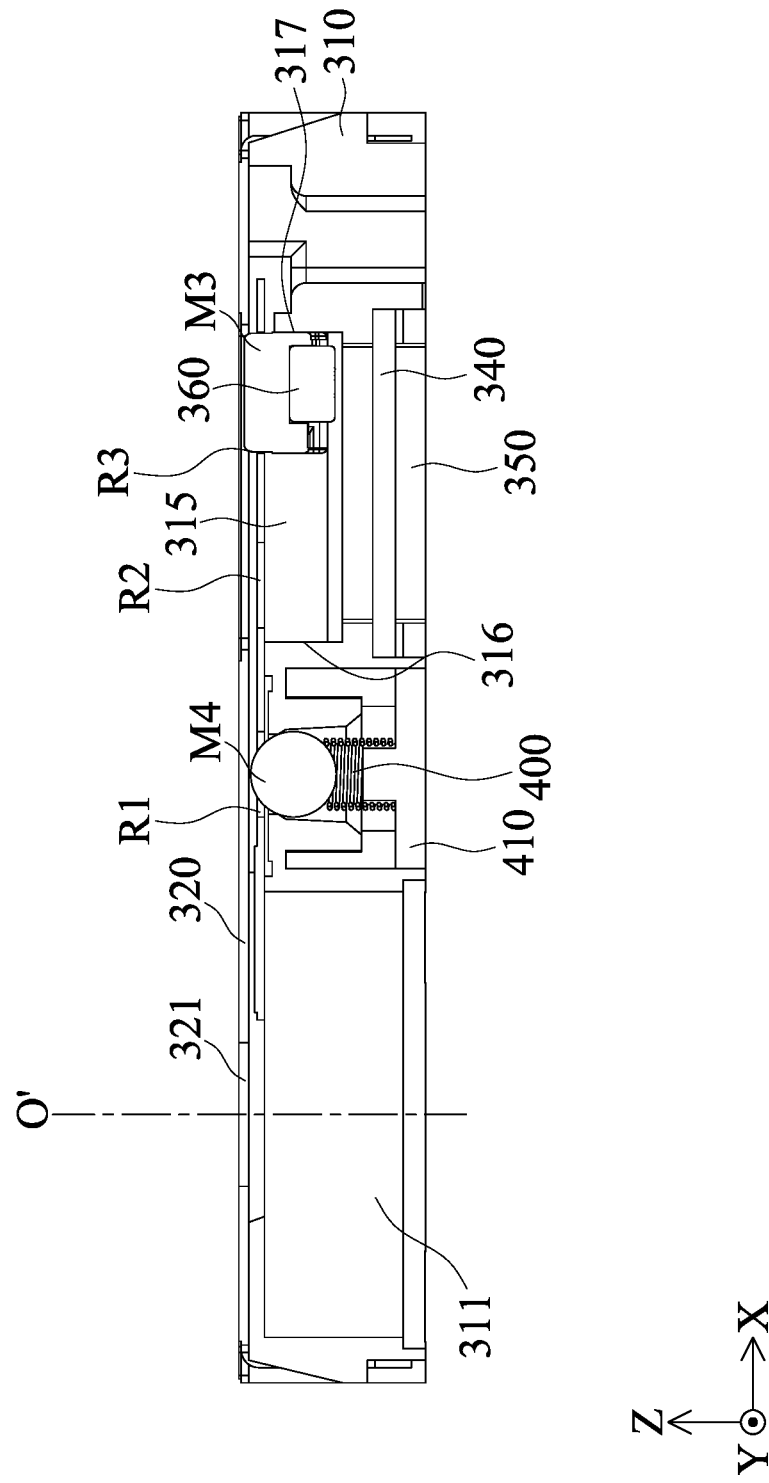
FIGS. 96 to 98 are cross-sectional views illustrating the optical member driving mechanism in accordance with some embodiment of the present disclosure.
Figure 97:
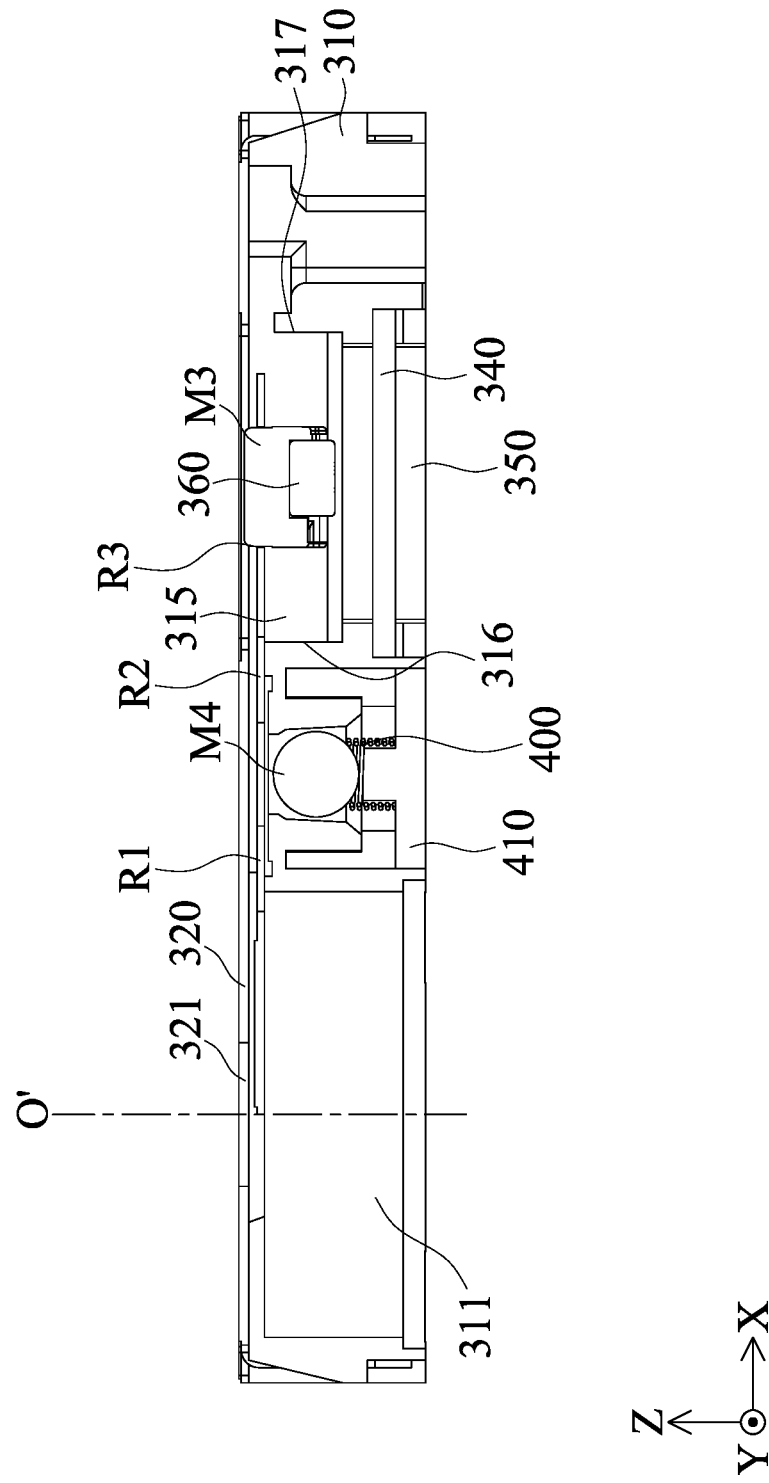
Figure 98:
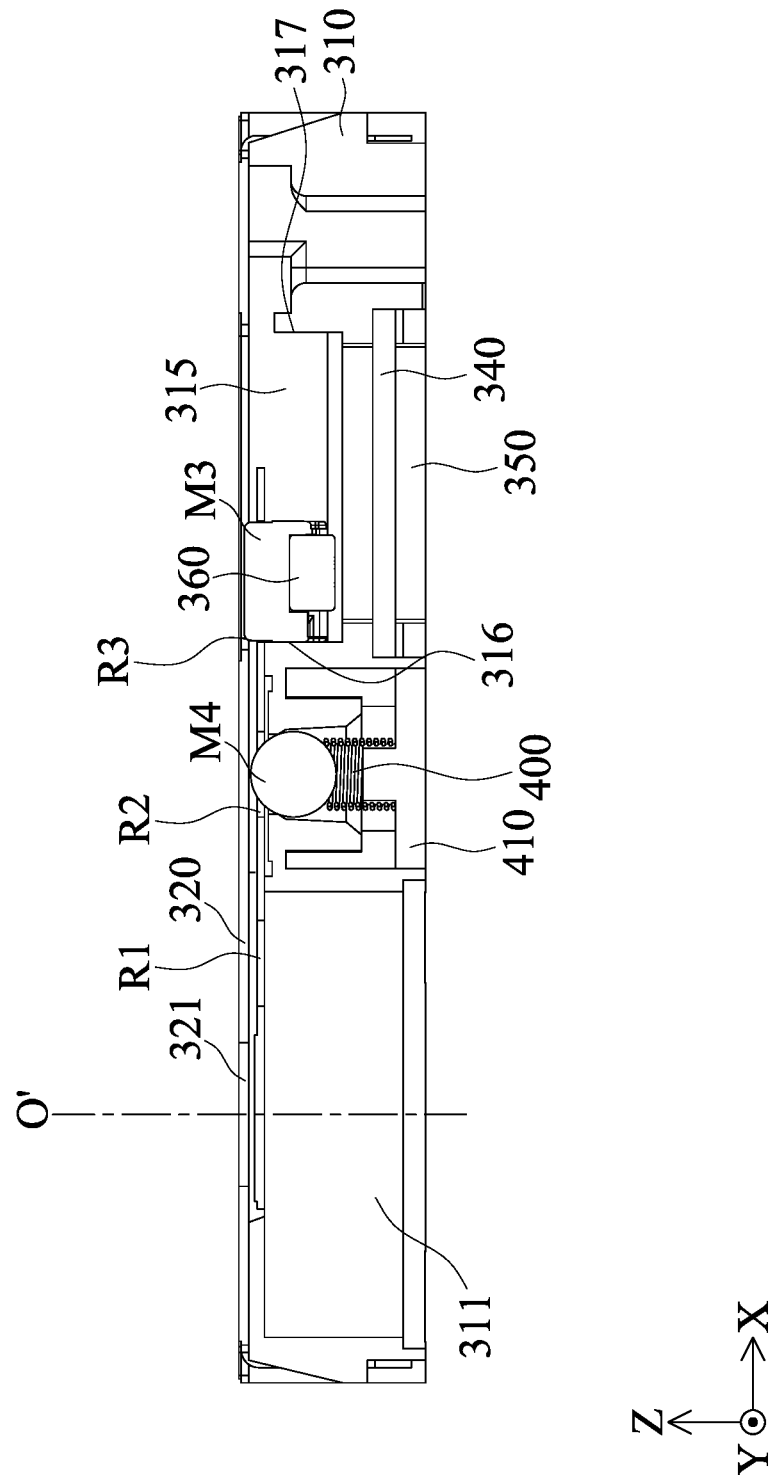

FIGS. 96 to 98 are cross-sectional views of the optical member driving mechanism 9-20 in accordance with some embodiments of the present disclosure. As shown in FIG. 96, the body 9-310 has a first optical hole 9-311, which corresponds to the optical module 9-L (as shown in FIG. 95). The top cover 9-320 has a second optical hole 9-321 corresponding to the optical module 9-L and the first optical hole 9-311. In some embodiments, the shapes of the first optical hole 9-311 and the second optical hole 9-321 are different. As shown in FIG. 96, the optical member 9-R is in the first position. At this time, when viewed along the second direction (such as the Z axis), the optical member 9-R does not cover the second optical hole 9-321 at all, so that the first optical hole 9-311 is completely exposed in the second optical hole 9-321.

In addition, the body 9-310 has a first through hole 9-313 for receiving the positioning assembly 9-M4. In addition, the optical member 9-R has a second through hole 9-R1 and a third through hole 9-R2, respectively corresponding to the positioning assembly 9-M4. When the optical member 9-R is at the first position (that is, when the second optical hole 9-321 is not covered), the force-exerting assembly 9-400 continues to exert upward elastic force on the positioning assembly 9-M4, so that the positioning assembly 9-M4 may protrude from the first through hole 9-313 and the second through hole 9-R1 to affix the optical member 9-R at the first position. With the above configuration, the movable portion may be positioned at the first position relative to the fixed portion 9-F when the driving assembly 9-E3 is not operated, so that the optical member 9-R is prevented from being displaced due to collision, which may cause the optical member driving mechanism 9-20 to lose its original function.

In addition, the body 9-310 has a first opening 9-315 for accommodating the holder 9-M3, and the driving assembly 9-E3 (including the first magnetic conductor 9-340, the first coil 9-350 and the first magnetic element 9-360) drives the holder 9-M3 to move in the first opening 9-315. The optical member 9-R has a third opening 9-R3, which corresponds to the holder 9-M3. In some embodiments, the holder 9-M3 may be disposed in the third opening 9-R3. In some embodiments, the size of the first opening 9-315 is different from the size of the third opening 9-R3. In some embodiments, the size of the first opening 9-315 is larger than the size of the third opening 9-R3. The first opening 9-315 has a first positioning surface 9-316 and a second positioning surface 9-317 opposite to the first positioning surface 9-316. The first positioning surface 9-316 and the second positioning surface 9-317 may constitute a stop portion for limiting the movement of the holder 9-M3 relative to the fixed portion 9-F within a range of motion. When the positioning assembly 9-M4 is in the first position, the holder 9-M3 abuts the second positioning surface 9-317.

Next, as shown in FIG. 97, the driving assembly 9-E3 may drive the holder 9-M3 and the optical member 9-R to leave the first position. More specifically, an electrical signal may be transmitted to the first coil 9-350, so that the first magnetic conductor 9-340 generates a magnetic force corresponding to the first magnetic element 9-360. In this way, the first magnetic conductor 9-340 will generate a force with the first magnetic element 9-360 to drive the holder 9-M3 and the optical member 9-R away from the first position. At this time, the optical member 9-R will cover the arc surface of the positioning assembly 9-M4 exposed in the first through hole 9-313, and press the positioning assembly 9-M4 downward. At this time, the positioning assembly 9-M4 will leave the second through hole 9-R1. In some embodiments, the top cover 9-320 has a guiding structure (not shown) for guiding the movable portion (for example, the optical member 9-R) to move relative to the fixed portion 9-F. In some embodiments, the aforementioned guiding structure may protrude from the top cover 9-320 toward the optical member 9-R, thereby allowing the movable portion to move more smoothly. With the above configuration, the driving assembly 9-E3 may directly drive the optical assembly 9-R through the positioning assembly 9-M4, avoiding the optical assembly 9-R from being stuck due to the failure of the positioning assembly 9-M4.

In some embodiments, the hardness of the positioning assembly 9-M4 may be greater than or equal to the hardness of the optical member 9-R. For example, the positioning assembly 9-M4 is made of metal or ceramic material, and the optical member 9-R is made of metal, but the disclosure is not limited thereto. With this configuration, the probability that the positioning assembly 9-M4 is damaged by the impact of the optical member 9-R may be reduced, and the optical member 9-R may be prevented from hitting the damage of the positioning assembly 9-M4 and reduce the smoothness of its movement. In this embodiment, the positioning assembly 9-M4 has a spherical structure. In other embodiments, the positioning assembly 9-M4 may have a flat surface, which is arranged to face the force-exerting assembly 9-400. In this way, the difficulty of arranging the positioning assembly 9-M4 on the force-exerting assembly 9-400 may be reduced.

As shown in FIG. 98, after the optical member 9-R reaches the second position (for example, when the holder 9-M3 abuts the first positioning surface 9-316), the force-exerting assembly 9-400 may drives the positioning assembly 9-M4 to move upward via the exerted elastic force, so that the positioning assembly 9-M4 passes through the third through hole 9-R2. When the holder 9-M3 is located in the second position, when viewed along the second direction (for example, the Z axis), the optical member 9-R completely covers the second optical hole 9-321, so that the first optical hole 9-311 is completely not exposed in the second optical hole 9-321. In this way, the optical member 9-R may block the light and prevent the light from entering the optical module 9-L via the optical axis 9-O' (as shown in FIG. 95).

Figure 99:
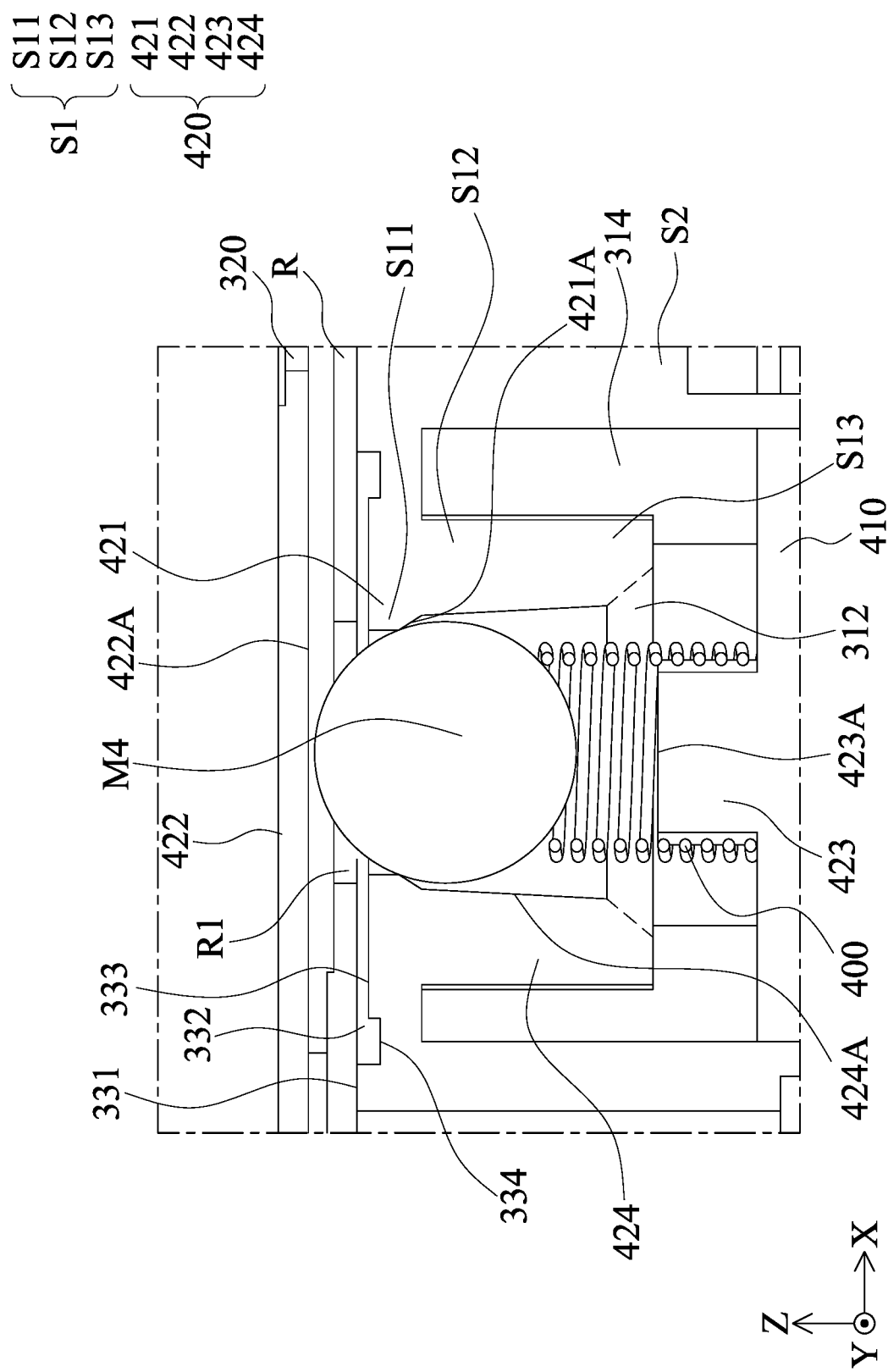
FIG. 99 is a partial enlarged cross-sectional view illustrating the optical member driving mechanism in accordance with some embodiment of the present disclosure.

FIG. 99 is a partial enlarged cross-sectional view illustrating the optical member driving mechanism 9-20 in accordance with some embodiments of the present disclosure. As shown in FIG. 99, the body 9-310 has a first sidewall 9-S1 and a second sidewall 9-S2. The first sidewall 9-S1 corresponds to the positioning assembly 9-M4, and the second sidewall 9-S2 corresponds to the first sidewall 9-S1. The first sidewall 9-S1 forms a first groove 9-312 for receiving at least part of the positioning assembly 9-M4. In some embodiments, the force-exerting assembly 9-400 is at least partially contained in the first groove 9-312. The second sidewall 9-S2 forms a second groove 9-314, and the first groove 9-312 is located in the second groove 9-314. In some embodiments, there is a non-zero gap between the first sidewall 9-S1 and the second sidewall 9-S2 (for example, part of the second groove 9-314).

In some embodiments, the width of the first groove 9-312 in the first direction (for example, the X axis) is not completely the same. The width of the first groove 9-312 is gradually reduced along the second direction (for example, the Z axis). The first sidewall 9-S1 has a first section 9-S11, a second section 9-S12, and a third section 9-S13. The second section 9-S12 is located between the first section 9-S11 and the third section 9-S11. When viewed from the second direction, the maximum width of the first section 9-S11 is smaller than the maximum width of the positioning assembly 9-M4, and the maximum width of the second section 9-S12 may be greater than or equal to the maximum width of the positioning assembly 9-M4. The maximum width of the third section 9-S13 is greater than the maximum width of the positioning assembly 9-M4. In addition, the third section 9-S13 may have a chamfer. With the above configuration, the positioning assembly 9-M4 may be more easily disposed in the first groove 9-312, and the positioning assembly 9-M4 may be disposed in an appropriate position.

In addition, the body 9-310 further has a first surface 9-331 facing the movable portion (such as the optical member 9-R) and arranged to be perpendicular to the second direction (such as the Z axis). The body 9-310 further has a recess 9-332 located on the first surface 9-331. In this embodiment, the positioning assembly 9-M4 is at least partially located in the recess 9-332. The body 9-310 further has a second surface 9-333, which faces the movable portion and is perpendicular to the second direction. In some embodiments, the first surface 9-331 is substantially parallel to the second surface 9-333. The shortest distance between the first surface 9-331 and the movable portion is different from the shortest distance between the second surface 9-333 and the movable portion. In some embodiments, the shortest distance between the first surface 9-331 and the movable portion is smaller than the shortest distance between the second surface 9-333 and the movable portion. The body 9-310 further has a groove 9-334 on the second surface 9-333. The groove 9-334 is located around the positioning assembly 9-M4. When viewed along the second direction, the second surface 9-333 is at least partially located between the groove 9-334 and the positioning assembly 9-M4, and the second surface 9-333 at least partially overlaps the positioning assembly 9-M4. The second surface 9-334 may be located between the movable portion and the first sidewall 9-S1. With the above configuration, the friction between the fixed portion 9-F and the optical member 9-R may be reduced, or the debris generated by the friction between the fixed portion 9-F and the optical member 9-R may be accommodated, so as to prevent the friction from affecting the operation of the optical member driving mechanism 9-20.

In addition, the optical member driving mechanism 9-20 further includes a limiting assembly 9-420 for limiting the positioning assembly 9-M4 relative to the fixed portion 9-F to move within a limited range. The limiting assembly 9-420 further includes: a first limiting element 9-421, a second limiting element 9-422, a third limiting element 9-423, and a fourth limiting element 9-424. The first limiting element 9-421 may be configured to limit the movement of the positioning assembly 9-M4 relative to the fixed portion 9-F in the third direction (for example, the Z axis). More specifically, the first limiting element 9-421 is located on the first sidewall 9-S1. The first limiting element 9-421 has a first limiting surface 9-421A facing the positioning assembly 9-M4. The first limiting surface 9-421A is not parallel to the bottom surface of the groove 9-334. Viewed from the second direction (such as the Z axis), the first limiting surface 9-421A does not overlap the groove 9-334. Viewed from the first direction (for example, the X axis), the first limiting surface 9-421A and the groove 9-334 do not overlap. In some embodiments, the first limiting surface 9-421A is not parallel to the third direction and not perpendicular to the third direction. The third direction is different from the first direction. In some embodiments, the third direction is perpendicular to the first direction.

The second limiting element 9-422 may be used to limit the movement of the positioning assembly 9-M4 relative to the fixed portion 9-F in the third direction (for example, the positive Z axis). More specifically, the second limiting element 9-422 is located on the top cover 9-320. The second limiting element 9-422 has a second limiting surface 9-422A facing the positioning assembly 9-M4. The second limiting surface 9-422A and the first limiting surface 9-421A are not parallel and may be perpendicular to the third direction, where the third direction is the same as the second direction. When the positioning assembly 9-M4 is in contact with the first limiting surface 9-421A, the positioning assembly 9-M4 and the second limiting surface 9-422A have a non-zero gap.

The third limiting element 9-423 may be used to limit the movement of the positioning assembly 9-M4 relative to the fixed portion 9-F in the fourth direction (for example, the negative Z axis). In some embodiments, the third direction is parallel and opposite to the fourth direction. The third limiting element 9-423 has a third limiting surface 9-423A facing the positioning assembly 9-M4. The third limiting surface 9-423A is not parallel to the first limiting surface 9-421A, the third limiting surface 9-423A is parallel to the second limiting surface 9-422A, and the third limiting surface 9-423A is perpendicular to the fourth direction. The third limiting element 9-423 is located on the bottom cover 9-410. In some embodiments, the third limiting element 9-423 and the bottom cover 9-410 are integrally formed. The third limiting element 9-423 has a structure protruding toward the positioning assembly 9-M4. In some embodiments, the force-exerting assembly 9-400 may be disposed around the third limiting element 9-423. The force-exerting assembly 9-400 may directly contact the third limiting element 9-423.

The fourth limiting element 9-424 may be used to limit the movement of the positioning assembly 9-M4 relative to the fixed portion 9-F in the fifth direction (for example, the X-Y plane). The fourth limiting element 9-424 is located on the first sidewall 9-S1. The fifth direction is not parallel to the third and fourth directions. The fourth limiting element 9-424 has a fourth limiting surface 9-424A facing the positioning assembly 9-M4. The fourth limiting surface 9-424A is not parallel to the first limiting surface 9-421A, the fourth limiting surface 9-424A is not parallel to the second limiting surface 9-422A, and the fourth limiting surface 9-424A is not parallel to and not perpendicular to the second limiting surface 9-422A. In some embodiments, the first sidewall 9-S1 further includes an inclined surface corresponding to the positioning structure 9-M4. The foregoing inclined surface is connected to the fourth limiting surface 9-424A, and the foregoing inclined surface is connected to the first limiting surface 9-421A, the second limiting surface 9-422A, the third limiting surface 9-423A, and the fourth limiting surface 9-424A is not parallel.

In addition, viewed from the second direction (for example, the Z axis), the width of the second through hole 9-R1 is greater than the minimum width of the first limiting element 9-421. When the positioning assembly 9-M4 abuts the first limiting assembly 9-421, there is a non-zero gap between the edge of the second through hole 9-R1 and the positioning assembly 9-M4. In some embodiments, the second through hole 9-R1 may have a rounded corner, and the radius of the rounded corner may be between about 0.01 mm and about 0.1 mm. In some embodiments, when viewed along the second direction, the second through hole 9-R1 may be greater than or equal to the first through hole 9-313.

Figure 100:
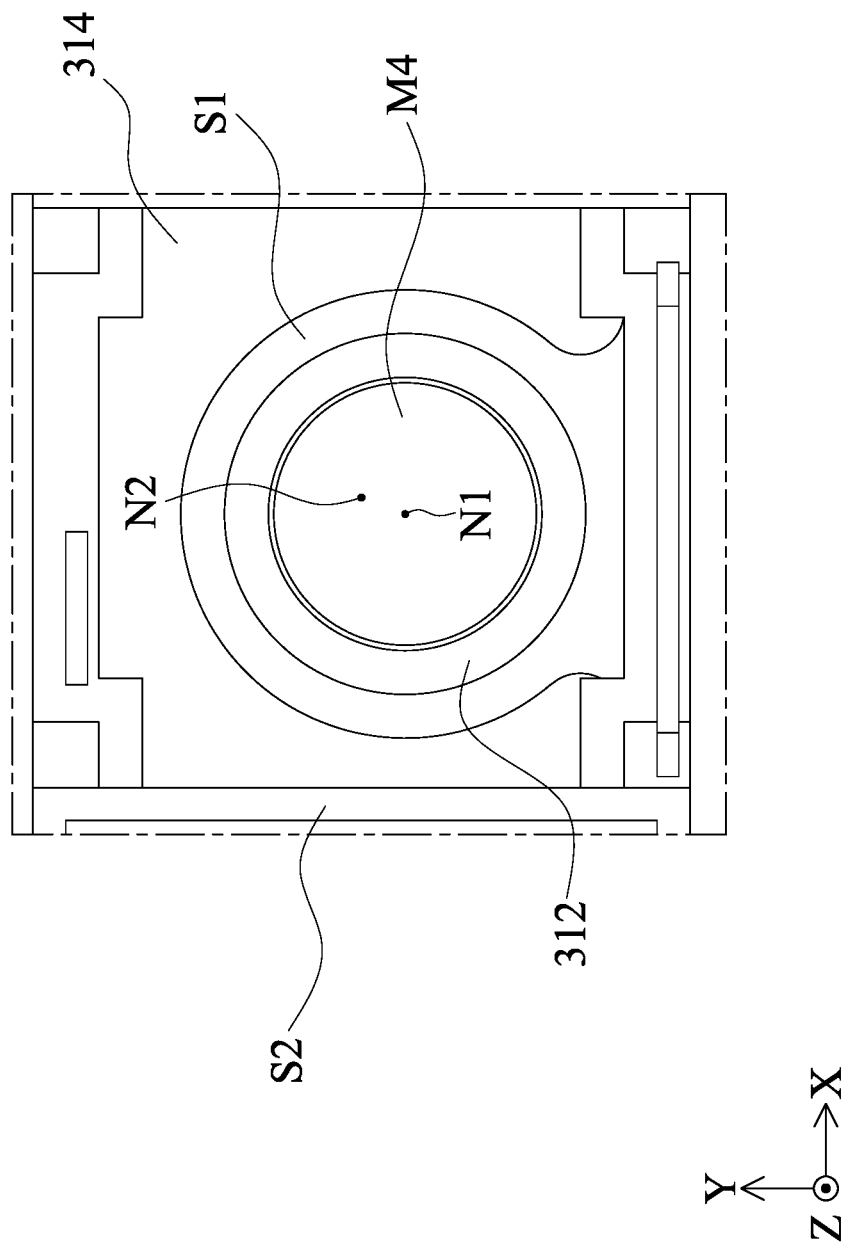
FIG. 100 is a partial bottom view illustrating the optical member driving mechanism in accordance with some embodiment of the present disclosure.

FIG. 100 is a partial bottom view of the optical member driving mechanism 9-20 in accordance with some embodiments of the present disclosure. As shown in FIG. 100, when viewed from the second direction, the distance between the center 9-N1 of the first groove 9-312 and the center 9-N2 of the second groove 9-314 is not zero. In some embodiments, the width of the gap between the first sidewall 9-312 and the second sidewall 9-314 is not completely the same. In other words, the width of the gap around the positioning assembly 9-M4 may be different. With the arrangement of the first groove 9-312 and the second groove 9-314, the body 9-310 may be formed more easily, and the influence due to tolerances of various elements may be reduced.

Figure 101:
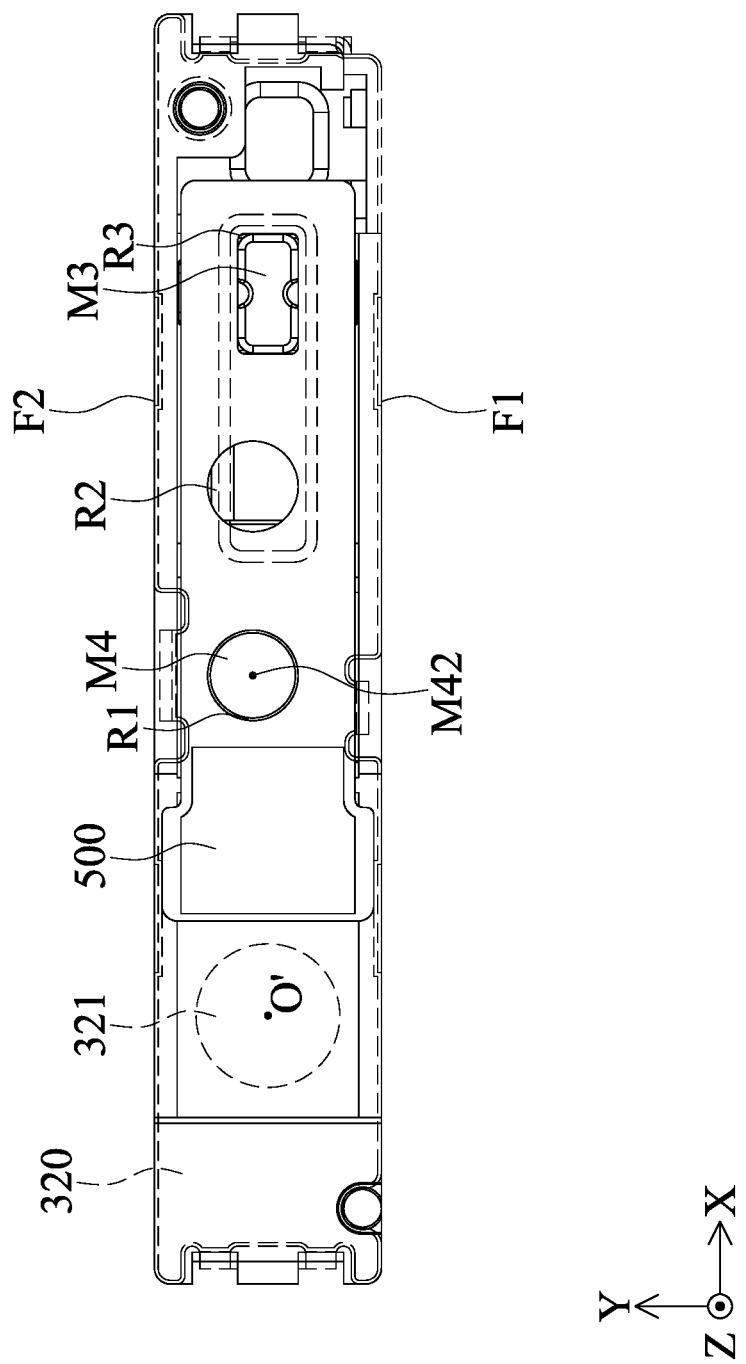
FIG. 101 is a top view illustrating the optical member driving mechanism in accordance with some embodiment of the present disclosure.

FIG. 101 is a top view illustrating an optical member driving mechanism 9-20 in accordance with some embodiments of the present disclosure. As shown in FIG. 101, when viewed along the second direction (such as the Z axis), the line connecting the center of the second optical hole 9-321 (such as the position shown by the optical axis 9-O') and the center 9-M42 of the positioning structure 9-M4 is not parallel or perpendicular to the first direction (for example, the X axis). In this embodiment, the body 9-310 has a first side surface 9-F1 and a second side surface 9-F2, which are respectively located on opposite sides of the positioning assembly 9-M4, and the first side surface 9-F1 and the second side surface 9-F2 are parallel to the first direction. When viewed along the second direction, the shortest distance between the first side surface 9-F1 and the center 9-M42 of the positioning structure 9-M4 is different from the shortest distance between the second side surface 9-F2 and the center 9-M42 of the positioning structure 9-M4. The marking element 9-500 may be provided on the optical member 9-R, which may facilitate the assembly of the optical member 9-R. In some embodiments, the thickness of the optical member 9-R in the second direction is not completely consistent.

In summary, the embodiments of the present disclosure provide an optical member driving mechanism including a positioning assembly with a curved surface. Since the positioning assembly is located at a specific position and has a curved surface, the driving assembly may directly drive the optical member through the positioning assembly, so as to prevent the optical assembly from being stuck due to the failure of the positioning assembly. In this way, the movable portion may move stably relative to the fixed portion, which helps to reduce the probability of failure of the optical member driving mechanism. In addition, the fixed portion is also provided with a limiting assembly corresponding to the positioning assembly, thereby ensuring that the positioning assembly is located in a proper position.

Tenth Embodiment

Figure 102:
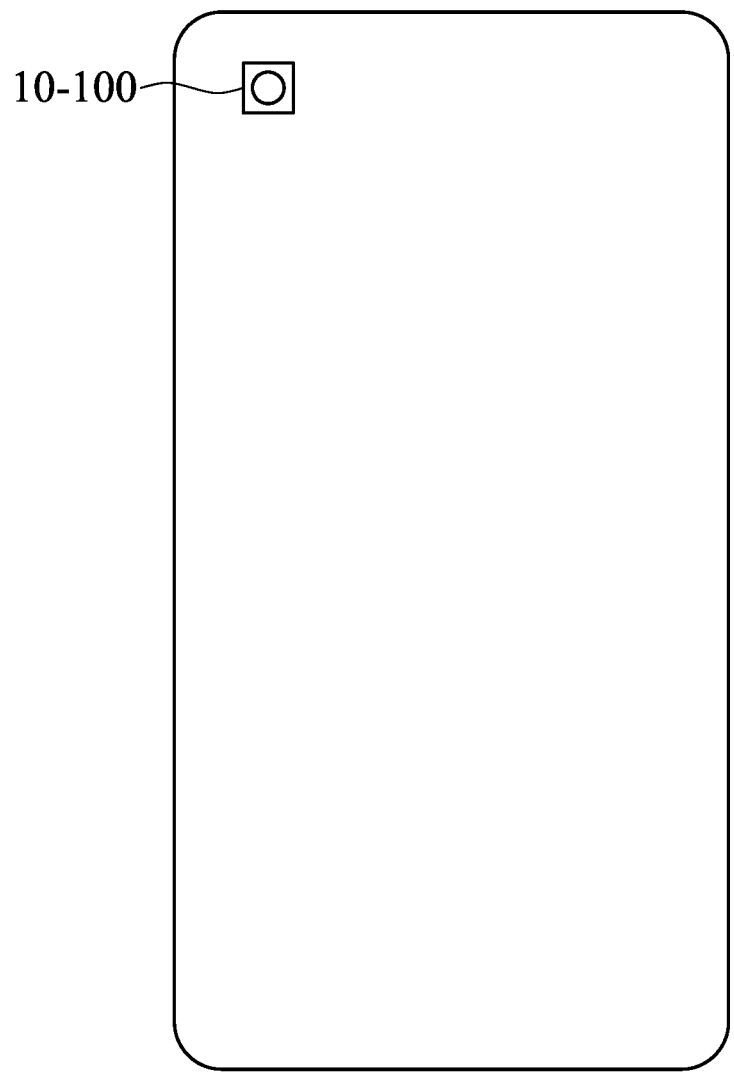
FIG. 102 shows a schematic view of an electrical device with an optical element driving mechanism according to an embodiment of the present disclosure.

Firstly, please refer to FIG. 102, an optical element driving mechanism 10-100 of an embodiment of the present disclosure may be mounted in an electrical device 10-1 for taking photos or videos, wherein the aforementioned electrical device 10-1 may, for example, be a smartphone or a digital camera, but the present disclosure is not limited to these. It should be noted that the position and the size between the optical element driving mechanism 10-100 and the electrical device 10-1 shown in FIG. 102 are only an example, which is not for limiting the position and the size between the optical element driving mechanism 10-100 and the electrical device 10-1. In fact, according to different needs, the optical element driving mechanism 10-100 may be mounted at different positions in the electrical device 10-1.

Figure 103:
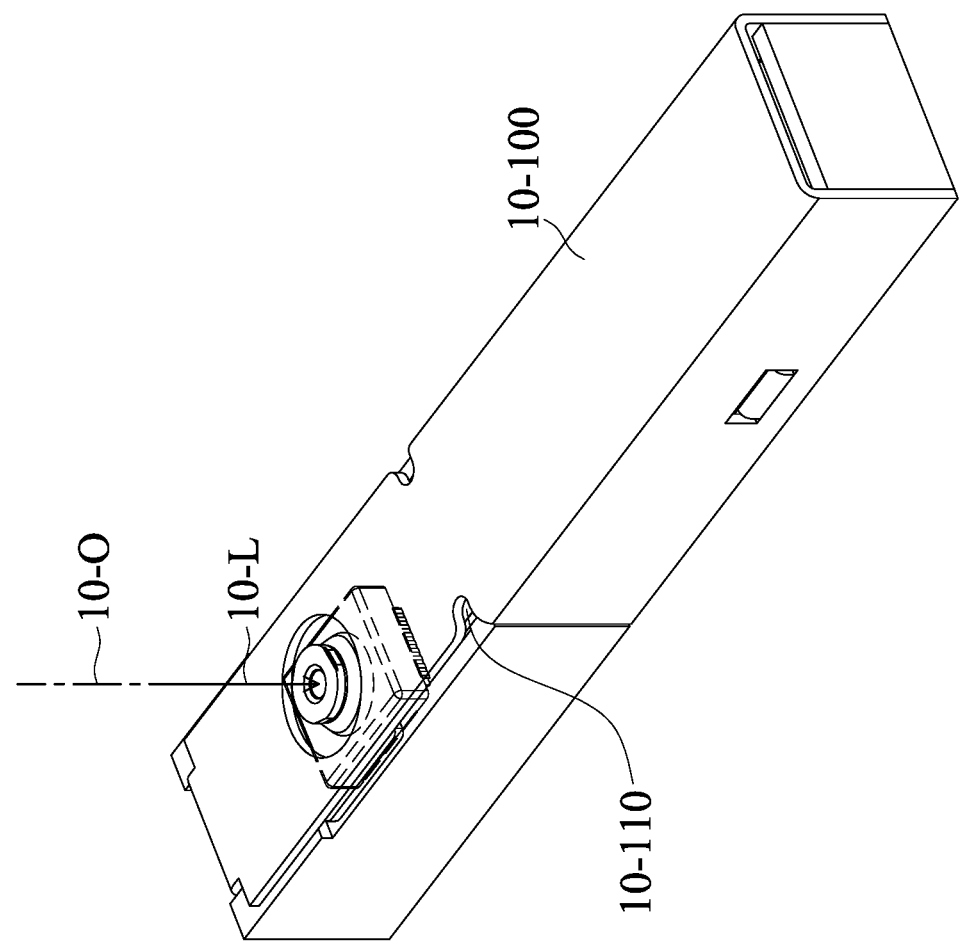
FIG. 103 shows a schematic view of the optical element driving mechanism and an optical element according to an embodiment of the present disclosure.

Please refer to FIG. 103, the optical element driving mechanism 10-100 carries an optical element 10-110. A sensing module may be disposed inside or outside of the optical element driving mechanism 10-100. The sensing module may be located downstream of the light entry of the optical element driving mechanism 10-100. A light 10-L incident and passes the optical element 10-110 of the optical element driving mechanism 10-100 along an optical axis 10-O, and then reaches the sensing module for imaging.

Figure 104:
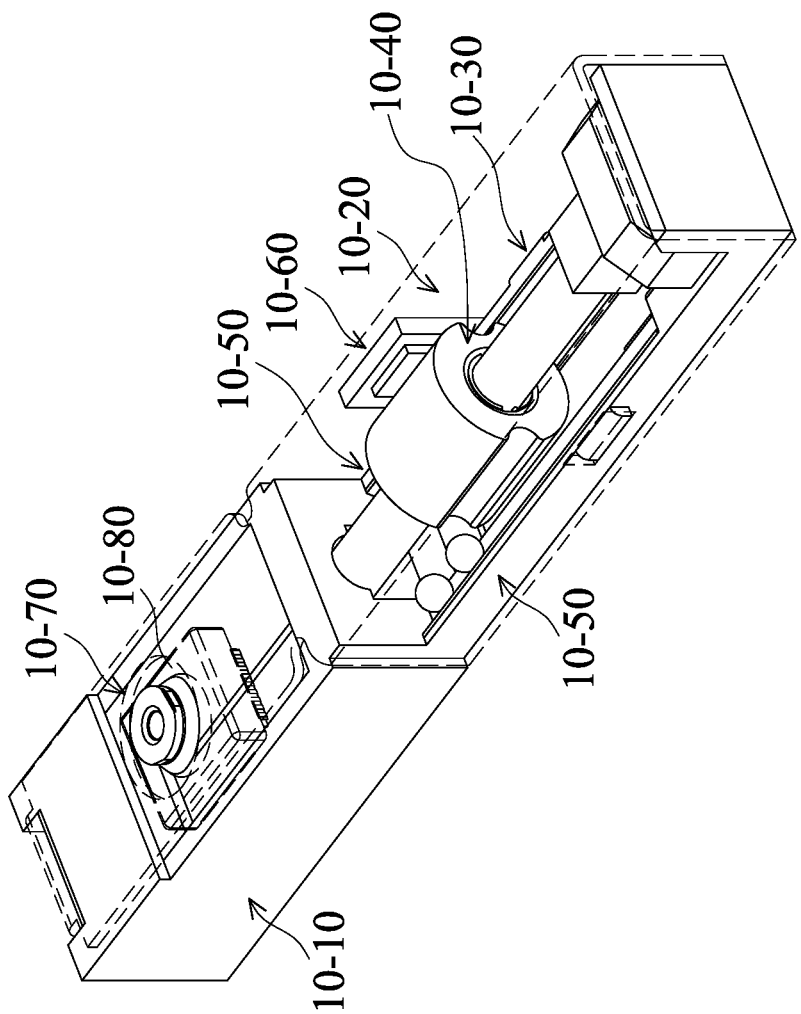
FIG. 104 shows a perspective view of the optical element driving mechanism and the optical element according to an embodiment of the present disclosure, wherein an outer frame is shown as a dashed line.
Figure 105:
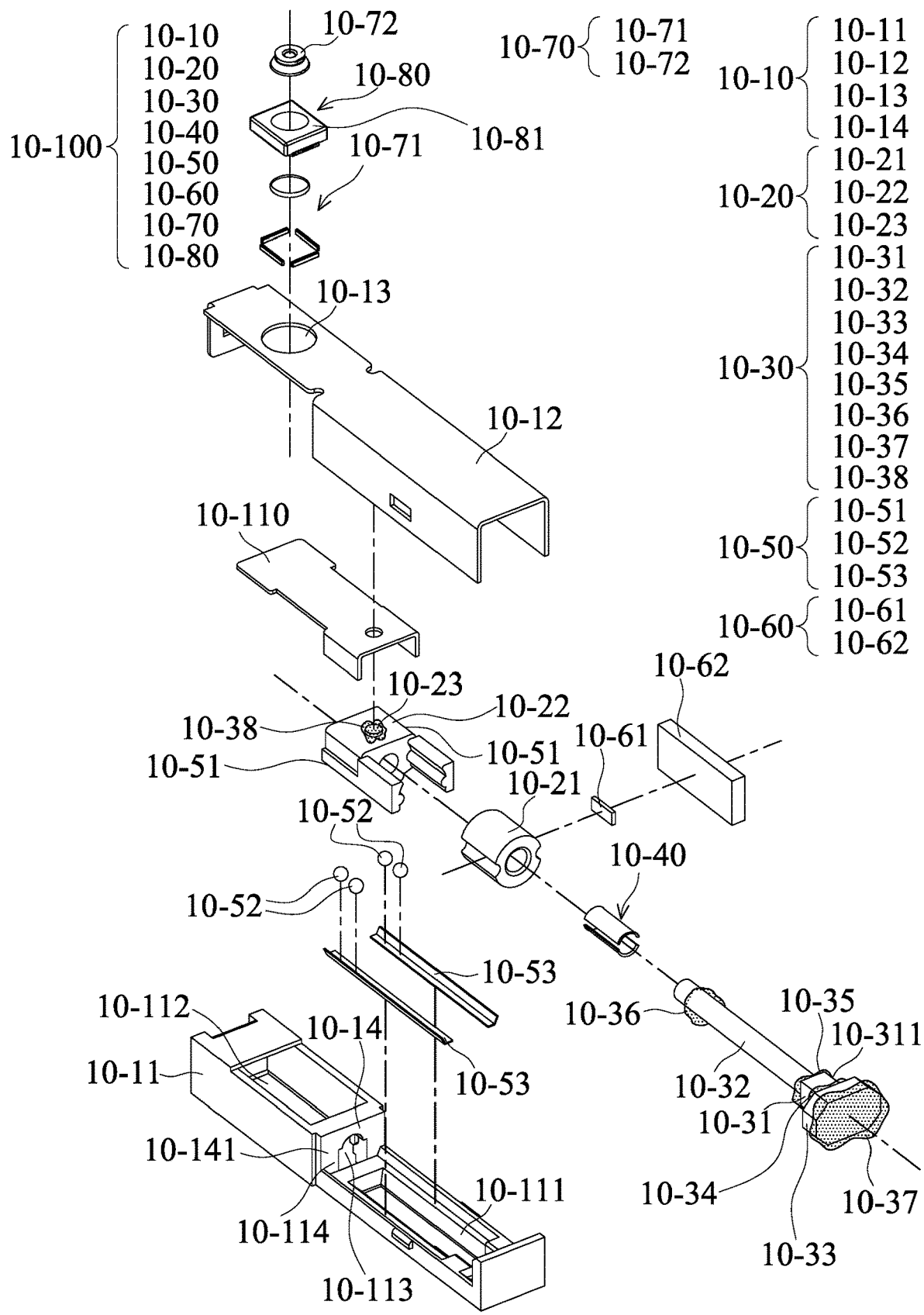
FIG. 105 shows an exploded view of the optical element driving mechanism and the optical element according to an embodiment of the present disclosure.

Please refer to FIG. 104 and FIG. 105, the optical element driving mechanism 10-100 may include a fixed part 10-10, a movable part 10-20, a driving assembly 10-30, a contacting assembly 10-40, two guiding assemblies 10-50, a position sensing assembly 10-60, an optical module 10-70, and a camera module 10-80.

Figure 106:
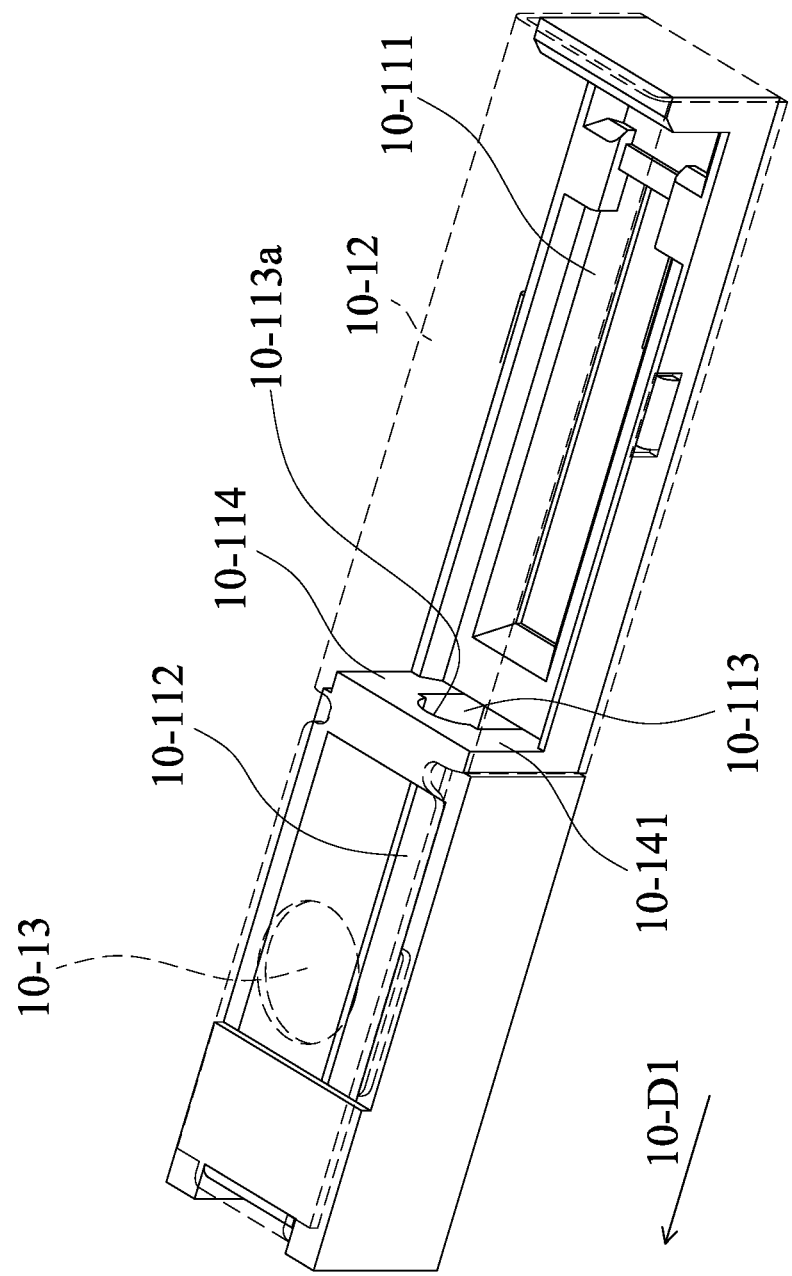
FIG. 106 shows a perspective view of the outer frame and a base of the optical element driving mechanism according to an embodiment of the present disclosure, wherein the outer frame is shown as a dashed line.
Figure 107:
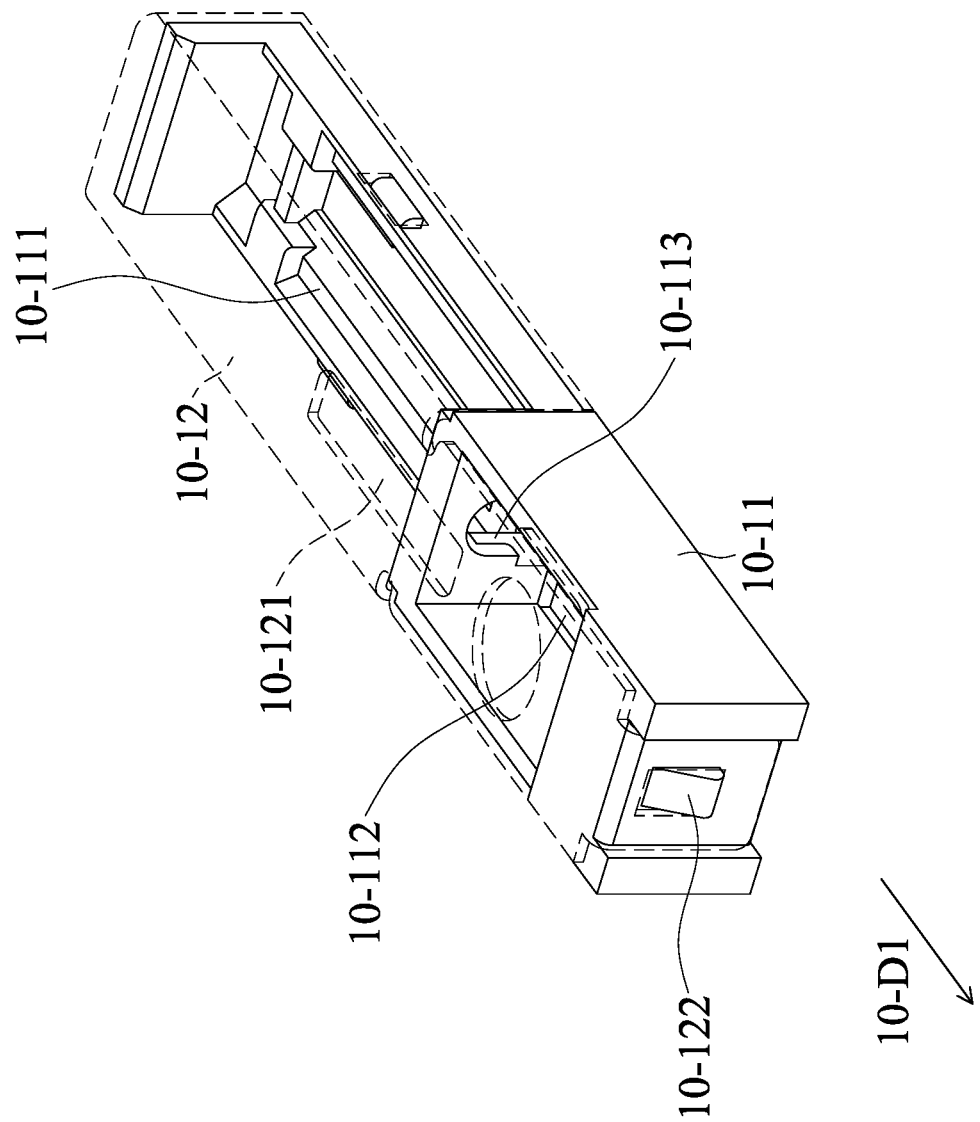
FIG. 107 shows a perspective view of the outer frame and a base of the optical element driving mechanism according to an embodiment of the present disclosure in another angle, wherein the outer frame is shown as a dashed line.

Please refer to FIG. 106 and FIG. 107, the fixed part 10-10 may include a base 10-11, an outer frame 10-12, an emergent opening 10-13, and a stopping structure 10-14.

The base 10-11 may include a first accommodating space 10-111, a second accommodating space 10-112, a third accommodating space 10-113, and a base blocking wall 10-114. The first accommodating space 10-111 if for accommodating the driving assembly 10-30. The second accommodating space 10-112 for accommodating the optical module 10-70. The third accommodating space 10-113 is located on the base blocking wall 10-114. The third accommodating space 10-113 has a third accommodating surface 10-113a. The third accommodating surface 10-113a is parallel to a first direction 10-D1. The base blocking wall 10-114 is located between the first accommodating space 10-111 and the second accommodating space 10-112.

The outer frame 10-12 is fixedly connected to the base 10-11. The outer frame 10-12 may include a design around 10-121, and a strengthened fixing structure 10-122. The strengthened fixing structure 10-122 has a protruded-recessed structure that is arranged in the first direction 10-D1. The strengthened fixing structure 10-122 may prevent the avoided the base 10-11 from separating from the outer frame 10-12, so that the structure of the optical element driving mechanism 10-100 is more solid.

The emergent opening 10-13 is configured to correspond to the optical module 10-70, and the emergent opening 10-13 allows the light 10-L to pass through (Please refer to FIG. 103). The stopping structure 10-14 is located on the base blocking wall 10-114, and the stopping structure 10-14 limits the range of movement of the movable part 10-20 relative to the fixed part 10-10. The stopping structure 10-14 has a stopping surface 10-141. The stopping surface 10-141 is not parallel to the first direction 10-D1. The stopping surface 10-141 is perpendicular to the first direction 10-D1. The stopping surface 10-141 abut the third accommodating surface 10-113a. The stopping surface 10-141 is not parallel to the third accommodating surface 10-113a. Thus, the number of the elements of the optical element driving mechanism 10-100 is reduced, and the effect of miniaturization of the optical element driving mechanism 10-100 is achieved.

Figure 108:
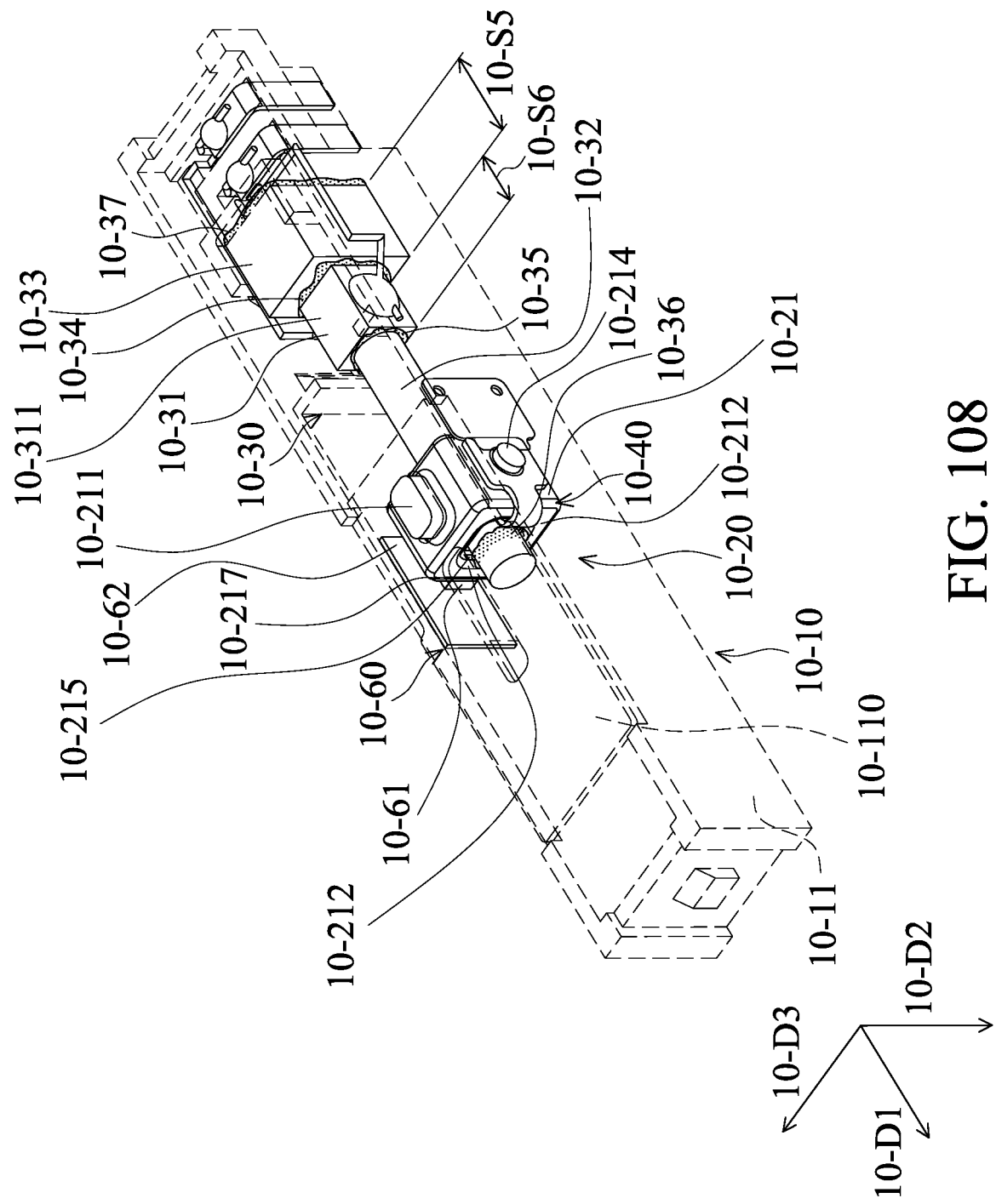
FIG. 108 shows a perspective view of the optical element driving mechanism according to an embodiment of the present disclosure, wherein the outer frame is shown as a dashed line, and the base is omitted.
Figure 109:
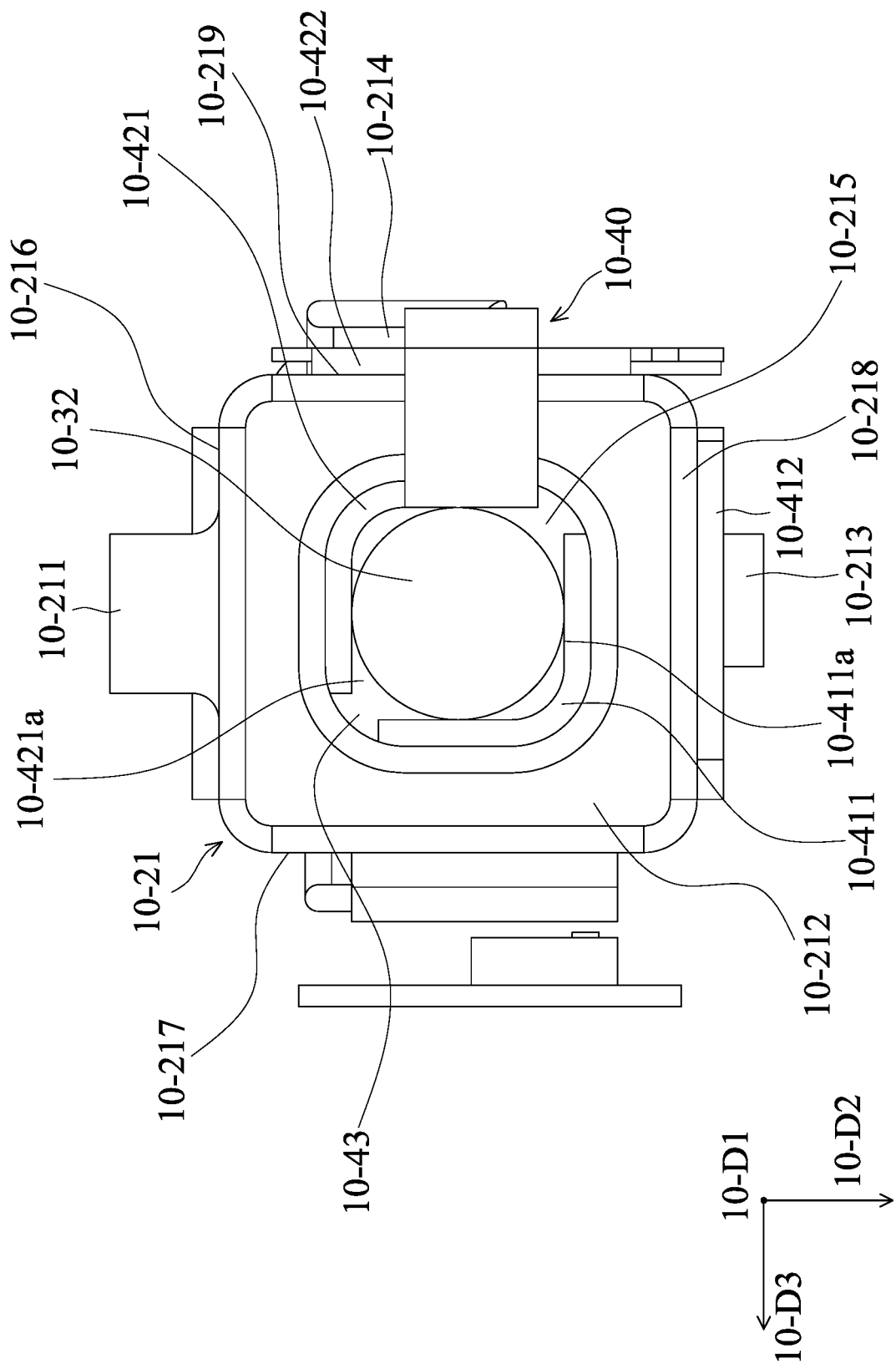
FIG. 109 shows a schematic view of an elastic element, a transmission element, and a contacting assembly according to an embodiment of the present disclosure.

Please refer to FIG. 108 and FIG. 109, the movable part 10-20 is connected to the optical element 10-110, and the movable part 10-20 is movable relative to the fixed part 10-10. Specifically, the movable part 10-20 is settled on the fixed part 10-10 via frictional force (i.e., the movable part 10-20 abuts against or stay on the fixed part 10-10 via frictional force). In one embodiment, the movable part 10-20 may include an elastic element 10-21.

The elastic element 10-21 may include an elastic element connecting structure 10-211, an elastic element stopping assembly 10-212, a first positioning element 10-213, a second positioning element 10-214, an elastic element opening 10-215, a first side 10-216, a second side 10-217, a third side 10-218, and a fourth side 10-219.

The elastic element 10-21 is made of non-metallic materials. Specifically, the elastic element 10-21 has a plastic material or a resin material. The elastic element 10-21 has a substantially polygonal structure when viewed in the first direction 10-D1. The design around 10-121 of the outer frame 10-12 is corresponding to the elastic element connecting structure 10-211 (may refer to FIG. 117). The elastic element connecting structure 10-211 has a protruding structure, and the elastic element connecting structure 10-211 connects to the optical element 10-110. The elastic element stopping assembly 10-212 limits the range of movement of the movable part 10-20 relative the fixed part 10-10. The first positioning element 10-213 has a protruding structure, and the second positioning element 10-214 also has a protruding structure. The extending directions of the protruding structure of the first positioning element 10-213 and the protruding structure of the second positioning element 10-214 are different. Specifically, the extending directions of the protruding structure of the first positioning element 10-213 and the protruding structure of the second positioning element 10-214 are perpendicular to each other. Thus, the weight of elastic element 10-21 may be distributed more evenly, so that the optical element driving mechanism 10-100 is more stable.

The first side 10-216, the second side 10-217, the third side 10-218, and the fourth side 10-219 surround the elastic element opening 10-215. The first side 10-216 is not parallel to the second side 10-217. The second side 10-217 is not parallel to the third side 10-218. The first side 10-216 and the third side 10-218 are parallel to each other. The second side 10-217 and the fourth side 10-219 are parallel to each other.

The elastic element connecting structure 10-211 is located on the first side 10-216 of the elastic element 10-21 when viewed in the first direction 10-D1. The elastic element stopping assembly 10-212 is located on the second side 10-217 of the elastic element 10-21 when viewed in the first direction 10-D1. Thus, the weight of elastic element 10-21 may be distributed more evenly, so that the optical element driving mechanism 10-100 is more stable.

Figure 110:
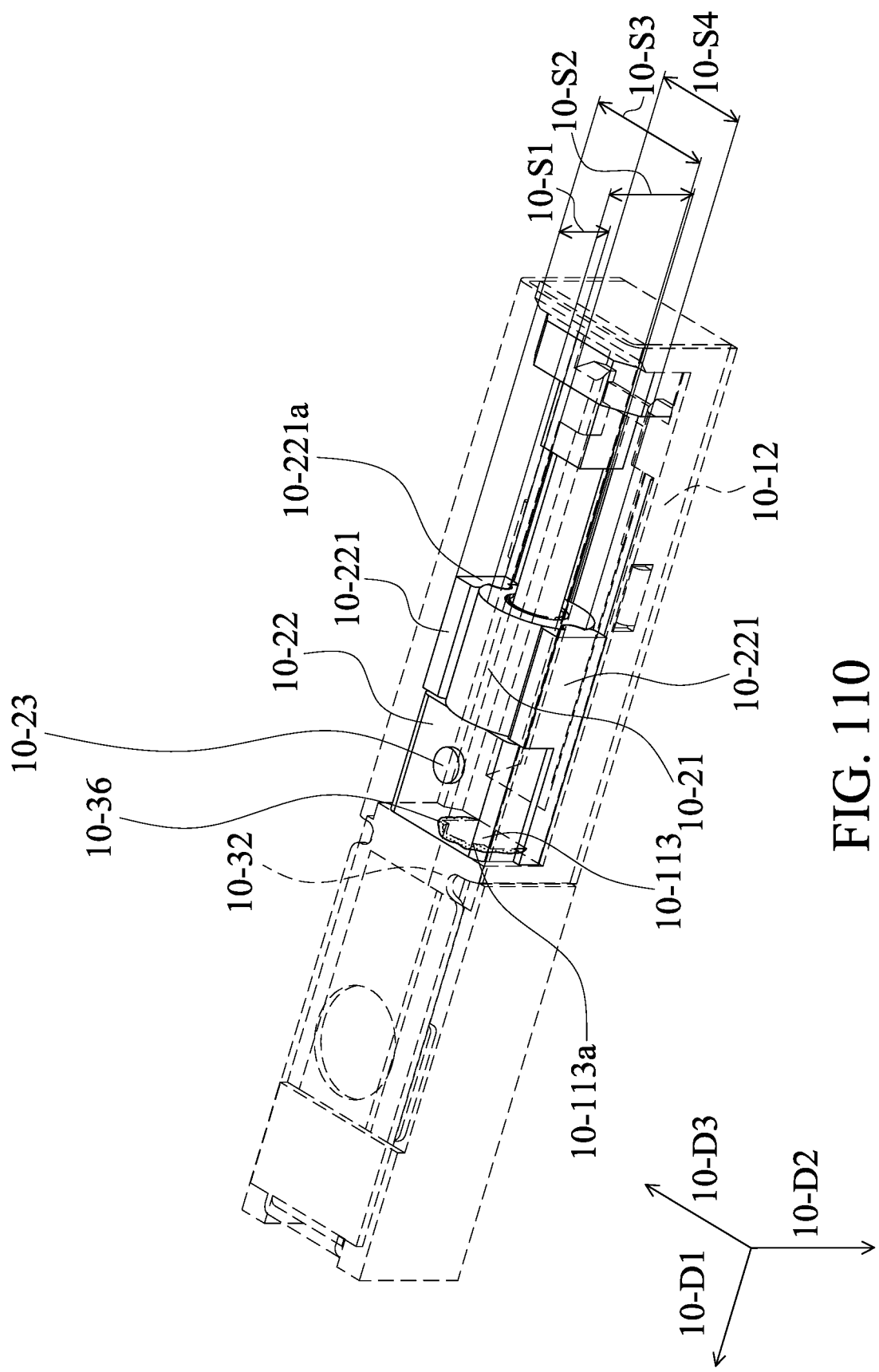
FIG. 110 shows a perspective view of the optical element driving mechanism according to an embodiment of the present disclosure, wherein the outer frame is shown as a dashed line.

Please refer to FIG. 110, in one embodiment, the movable part 10-20 may further include a holder 10-22, and an movable part connecting structure 10-23. The holder 10-22 may be connected to the optical element 10-110 (not shown). The holder 10-22 has a non-metallic material. Specifically, the holder 10-22 has a plastic material. The elastic element 10-21 may be disposed on the holder 10-22. The Young's modulus of the holder 10-22 may be different from the Young's modulus of the elastic element 10-21. Specifically, the Young's modulus of the holder 10-22 may be greater than the Young's modulus of the elastic element 10-21.

The holder 10-22 may include a holder extended portion 10-221. The holder extending portion 10-221 may extend in the first direction 10-D1. The holder extended portion 10-221 corresponds to the elastic element 10-21. The holder extended portion 10-221 may have a protruding structure 10-221*a* that is protruded toward the elastic element 10-21, so as to hold the elastic element 10-21 more stably.

The elastic element 10-21 may be at least partially exposed to the holder 10-22 when viewed in a second direction 10-D2, wherein the second direction 10-D2 is different from the first direction 10-D1. In the second direction 10-D2, a maximum size 10-S1 of the holder 10-22 may be smaller than a maximum size 10-S2 of the elastic element 10-21. In a third direction 10-D3 (which is not parallel to the first direction 10-D1 or the second direction 10-D2), a maximum size 10-S3 of the holder 10-22 may be greater than a maximum size 10-S4 of the elastic element 10-21. The first direction 10-D1, the second direction 10-D2, and the third direction 10-D3 are not parallel to each other. The first direction 10-D1, the second direction 10-D2, and the third direction 10-D3 may be perpendicular to each other.

The movable part connecting structure 10-23 may have a protruding structure. The movable part connecting structure 10-23 is configured to be connected to the optical element 10-110 (not shown). The outer frame 10-12 is at least partially overlapped the movable part connecting structure 10-23 when viewed in the second direction 10-D2.

Please refer to FIG. 108, the driving assembly 10-30 drives the movable part 10-20 to move relative to the fixed part 10-10. Furthermore, the driving assembly 10-30 may be at least partially exposed to the base 10-11 when viewed in the second direction 10-D2 (may refer to FIG. 110 at the same time). The driving assembly 10-30 may include an electromechanical converting element 10-31, a transmission element 10-32, a weight element 10-33, a first connecting element 10-34, a second connecting element 10-35, a third connecting element 10-36, a fourth connecting element 10-37, and a fifth connecting element 10-38. The electromechanical converting element 10-31 may include a piezoelectric element 10-311.

The electromechanical converting element 10-31 enhances the driving force. This driving force drives the optical element 10-110. The transmission element 10-32 has an elongated structure, and the transmission element 10-32 extends in the first direction 10-D1.

Please refer to FIG. 108 and FIG. 109, the elastic element 10-21 surrounds the contacting assembly 10-40, and the contacting assembly 10-40 surrounds the transmission element 10-32. The transmission element 10-32 also pass through the elastic element opening 10-215 of the elastic element 10-21. Moreover, the elastic element 10-21 generates pressure so that the contacting assembly 10-40 makes direct contact with the transmission element 10-32.

The electromechanical converting element 10-31 is disposed on the weight element 10-33. The electromechanical converting element 10-31 is disposed on the weight element 10-33 via the first connecting element 10-34. The transmission element 10-32 is disposed on the electromechanical converting element 10-31. The transmission element 10-32 is disposed on the electromechanical converting element 10-31 via the second connecting element 10-35. The transmission element 10-32 may be disposed on the fixed part 10-10 or the movable part 10-20 via the third connecting element 10-36 (please refer to FIG. 108 or FIG. 110).

Please refer to FIG. 110, the third accommodating space 10-113 is for accommodating at least a portion of the transmission element 10-32. The third accommodating surface 10-113*a* of the third accommodating space 10-113 faces the transmission element 10-32. The transfer element 10-32 may be disposed on the fixed part 10-10 via the third connecting element 10-36. The third connecting element 10-36 is in direct contact with the third accommodating surface 10-113*a*.

Please refer to FIG. 108, the weight element 10-33 may be disposed on the fixed part 10-10 via the fourth connecting element 10-37 or the movable part 10-20. The third connecting element 10-36 is not in direct contact with the stopping surface 10-141. The weight element 10-33 is disposed on the fixed part 10-10 via the fourth connecting element 10-37. The fourth connecting element 10-37 is not in direct contact with the electromechanical converting element 10-31. Thus, the optical element driving mechanism 10-100 may be more stable.

The Young's modulus of the first connecting element 10-34 may be different from the Young's modulus of the second connecting element 10-35. The Young's modulus of the first connecting element 10-34 may be greater than the Young's modulus of the second connecting element 10-35.

The Young's modulus of the third connecting element 10-36 may be different from the Young's modulus of the fourth connecting element 10-37. The Young's modulus of the third connecting element 10-36 may be less than the Young's modulus of the fourth connecting element 10-37. The Young's modulus of the third connecting element 10-36 may be less than the Young's modulus of the first connecting element 10-34. The Young's modulus of the third connecting element 10-36 may be less than the Young's modulus of the second connecting element 10-35. Thus, the internal elements of the optical element driving mechanism 10-100 may be prevented from separating from each other.

Please refer to FIG. 108, the protruding area of the weight element 10-33 may be greater than the protruding area of the electromechanical converting element 10-31 when viewed in the first direction 10-D1. The protruding area of the weight element 10-33 may be several times (for example, may be 1 time, 2 times, 3 times, 4 times, 5 times, 6 times, 7 times, 8 times, 9 times, or 10 times) greater than the protruding area of the electromechanical converting element 10-31 when viewed in the first direction 10-D1. In the first direction 10-D1, a maximum size 10-S5 of the weight element 10-33 may be smaller than a maximum size 10-S6 of the electromechanical converting element 10-31. Thus, when the electromechanical converting element 10-31 receives a current and deforms, the optical member driving mechanism 10-100 may be prevent from generating vibrations or movements, thereby the optical element driving mechanism 10-100 is more stable.

Figure 111:
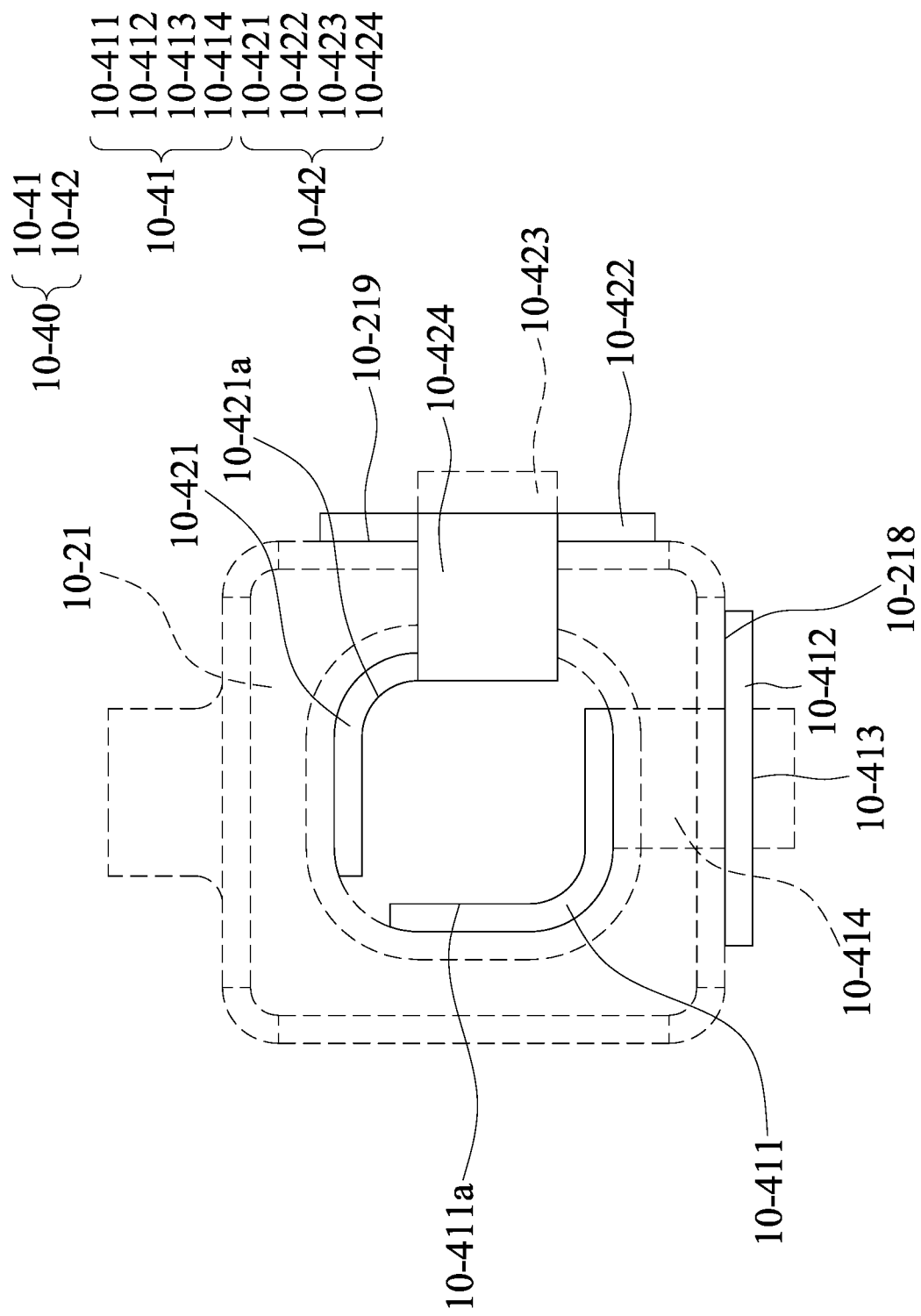
FIG. 111 shows a schematic view of the elastic element and the transmission element according to an embodiment of the present disclosure, wherein the elastic element is shown as a dashed line.

Please refer to FIG. 8 and FIG. 111, the contacting assembly 10-40 directly contacts the transmission element 10-32, and the contacting assembly 10-40 is made of metal. In one embodiment, the contacting assembly 10-40 may include a first contacting portion 10-41, a second contacting portion 10-42, a first gap 10-43. The first gap 10-43 extends in the first direction 10-D1. The first contacting portion 10-41 and the second contacting portion 10-42 are separate structures. The first gap 10-43 is located between the first contacting portion 10-41 and the second contacting portion 10-42. In one embodiment, the first contacting portion 10-41 and the second contacting portion 10-42 are formed as an integrated structure.

The first contacting portion 10-41 may include a first contacting member 10-411, a first fixing member 10-412, a first positioning member 10-413, a first connecting member 10-414. The second contacting portion 10-42 may include a second contacting member 10-421, a second fixing member 10-422, a second positioning member 10-423, and a second connecting member 10-424.

The first contacting member 10-411 may have a first contact surface 10-411*a*. The first contact surface 10-411*a* is in direct contact with the transmission element 10-32. The elastic element 10-21 is at least partially located between the first contacting member 10-411 and the first fixing member 10-412. The first contacting member 10-411 is connected to the first fixing member 10-412 via the first connecting member 10-414. The first fixing member 10-412 is affixed to the elastic element 10-21 is. The first positioning member 10-413 has an opening or a groove structure. The first positioning member 10-413 is corresponding to the first positioning element 10-213 of the elastic element 10-21. The first connecting member 10-414 may have a curved structure. The first contacting member 10-411, the first fixing member 10-412 and the first connecting member 10-414 may all have plate-like structures. The thickness of the first connecting member 10-414 may be less than the thickness of the first contacting member 10-411. The thickness of the first connecting member 10-414 thickness may be less than the thickness of the first fixing member 10-412. Thus, the first contacting portion 10-41 may be affixed to the elastic element 10-21 more easily, and the effect of miniaturization may be achieved.

The second contacting member 10-421 may have a second contact surface 10-421*a*. The second contact surface 10-421*a* is in direct contact with the transmission element 10-32. The elastic element 10-21 is at least partially located between the second contacting member 10-421 and the second fixing member 10-422. The second contacting member 10-421 is connected to the second fixing member 10-422 via the second connecting member 10-424. The second fixing member 10-422 is affixed to the elastic element 10-21. The second positioning member 10-423 has an opening or a groove structure. The second positioning member 10-423 is corresponding to the second positioning element 10-214 of the elastic element 10-21. The second connecting member 10-424 may have a curved structure. The second contacting member 10-421, the second fixing member 10-422 and the second connecting member 10-424 may all have plate-like structures. The thickness of the second connecting member 10-424 may be less than the thickness of the second contacting member 10-421. The thickness of the second connecting member 10-424 may be less than the thickness of the second fixing member 10-422. Thus, the second contacting portion 10-42 may be affixed to the elastic element 10-21 more easily, and the effect of miniaturization may be achieved.

The first contact surface 10-411*a* and the second contact surface 10-421*a* may be not parallel to each other. The bending directions of the first contact surface 10-411*a* and the second connecting member 10-424 may be different. The bending directions of the first contact surface 10-411*a* and the second connecting member 10-424 may be opposite to each other. The first connecting member 10-414 is located on the third side 10-218 of the elastic element 10-21 when viewed in the first direction 10-D1. The second connecting member 10-424 is located on the fourth side 10-219 of the elastic element 10-21 when viewed in the first direction 10-D1. Thus, the contacting assembly 10-40 may receive the pressure from the elastic element 10-21 more evenly, so that the optical element driving mechanism 10-100 is more stable.

Figure 112:
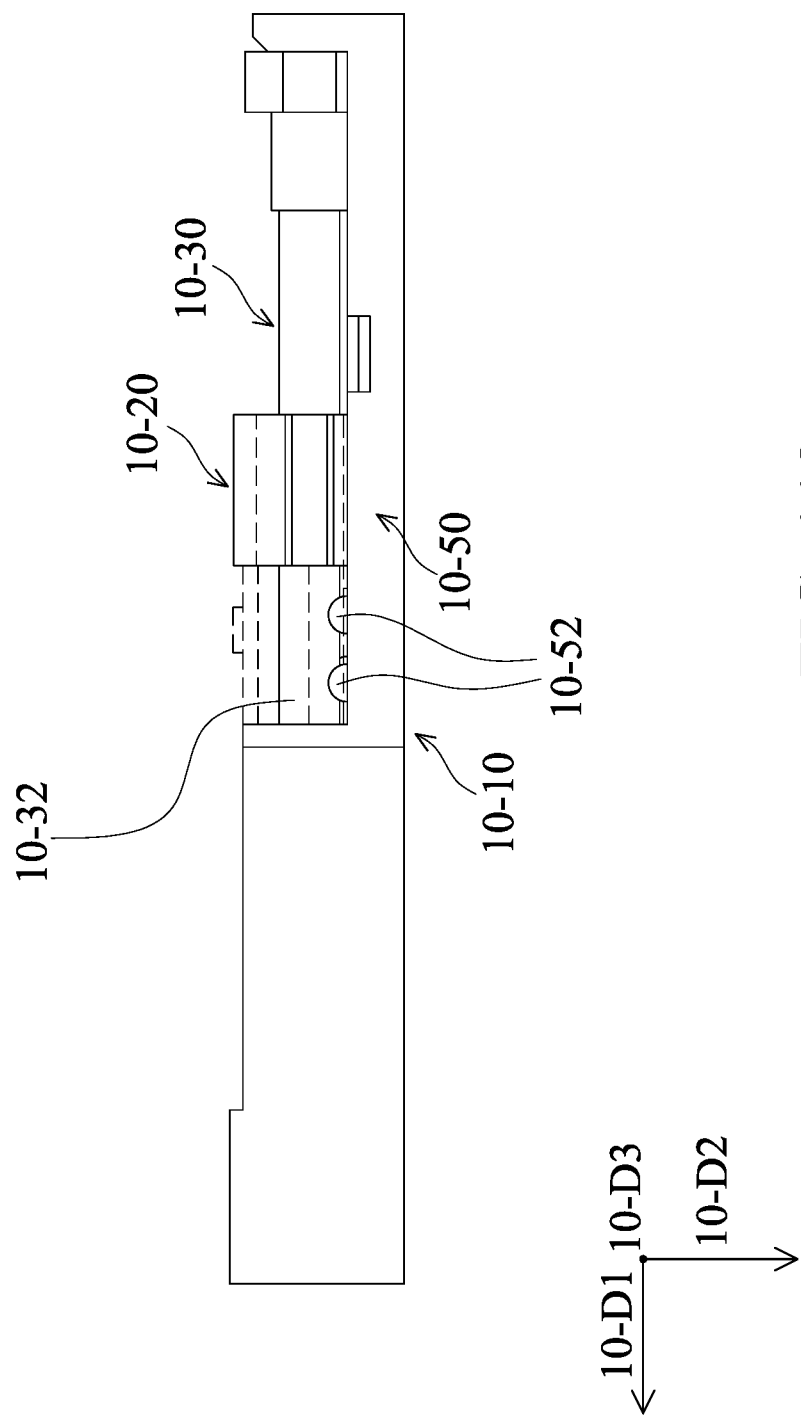
FIG. 112 shows a perspective view of the optical element driving mechanism according to an embodiment of the present disclosure, wherein the outer frame is omitted.
Figure 113:
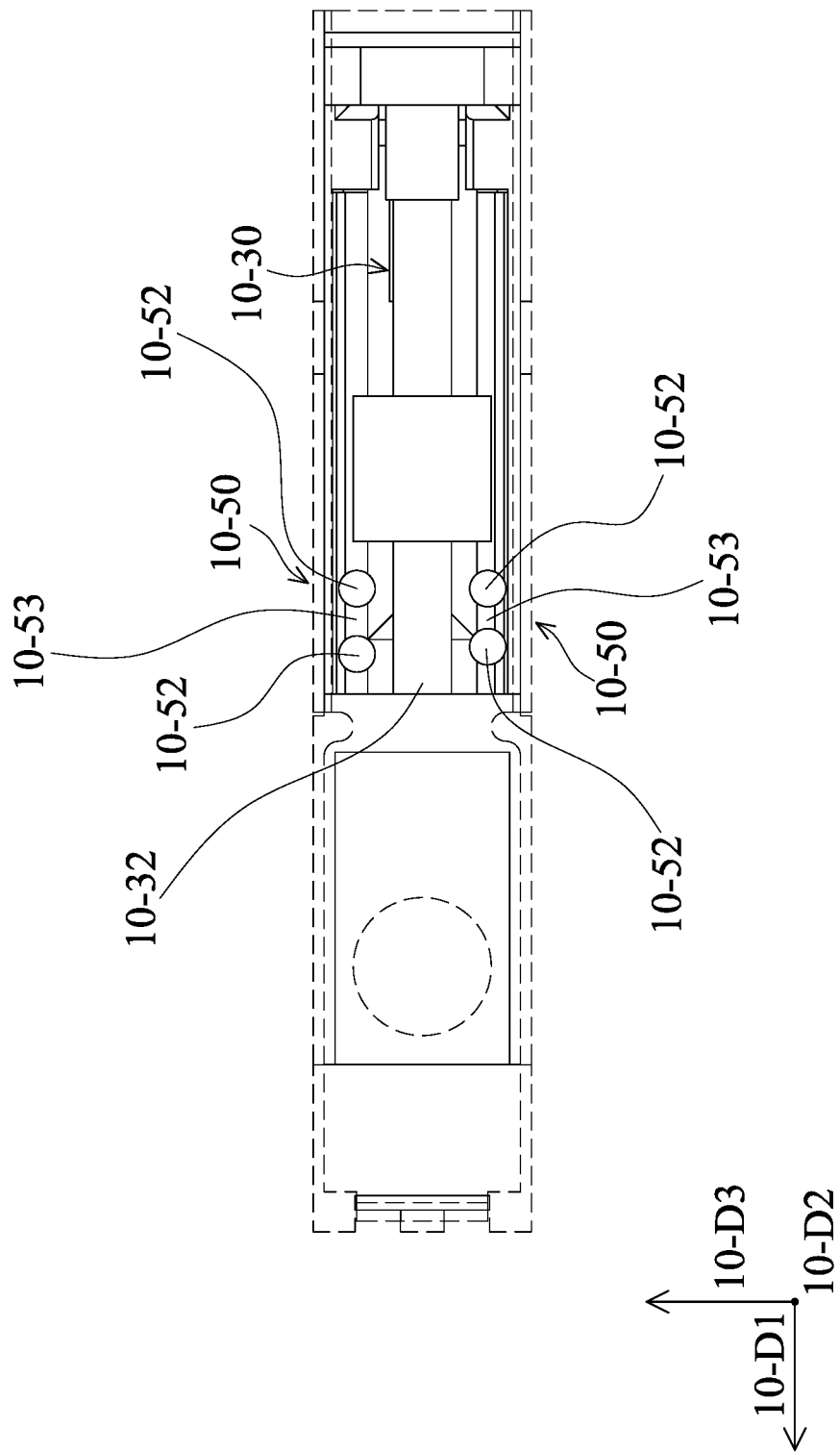
FIG. 113 shows a perspective view of the optical element driving mechanism according to an embodiment of the present disclosure, wherein the outer frame is shown as a dashed line.

Please refer to FIG. 112 and FIG. 113, the guiding assembly 10-50 limits the moving mode of the movable part 10-20 relative to the fixed part 10-10. The guiding assemblies 10-50 are arranged along the third direction 10-D3. The guiding assembly 10-50 at least partially overlaps the driving assembly 10-30 when viewed in the third direction 10-D3. The guiding assembly 10-50 does not overlap the driving assembly 10-30 when viewed in the second direction 10-D2. Thus, the size of optical element driving mechanism 10-100 in the second direction 10-D2 may be reduced, thereby the effect of miniaturization of the optical element driving mechanism 10-100 may be achieved.

Figure 114:
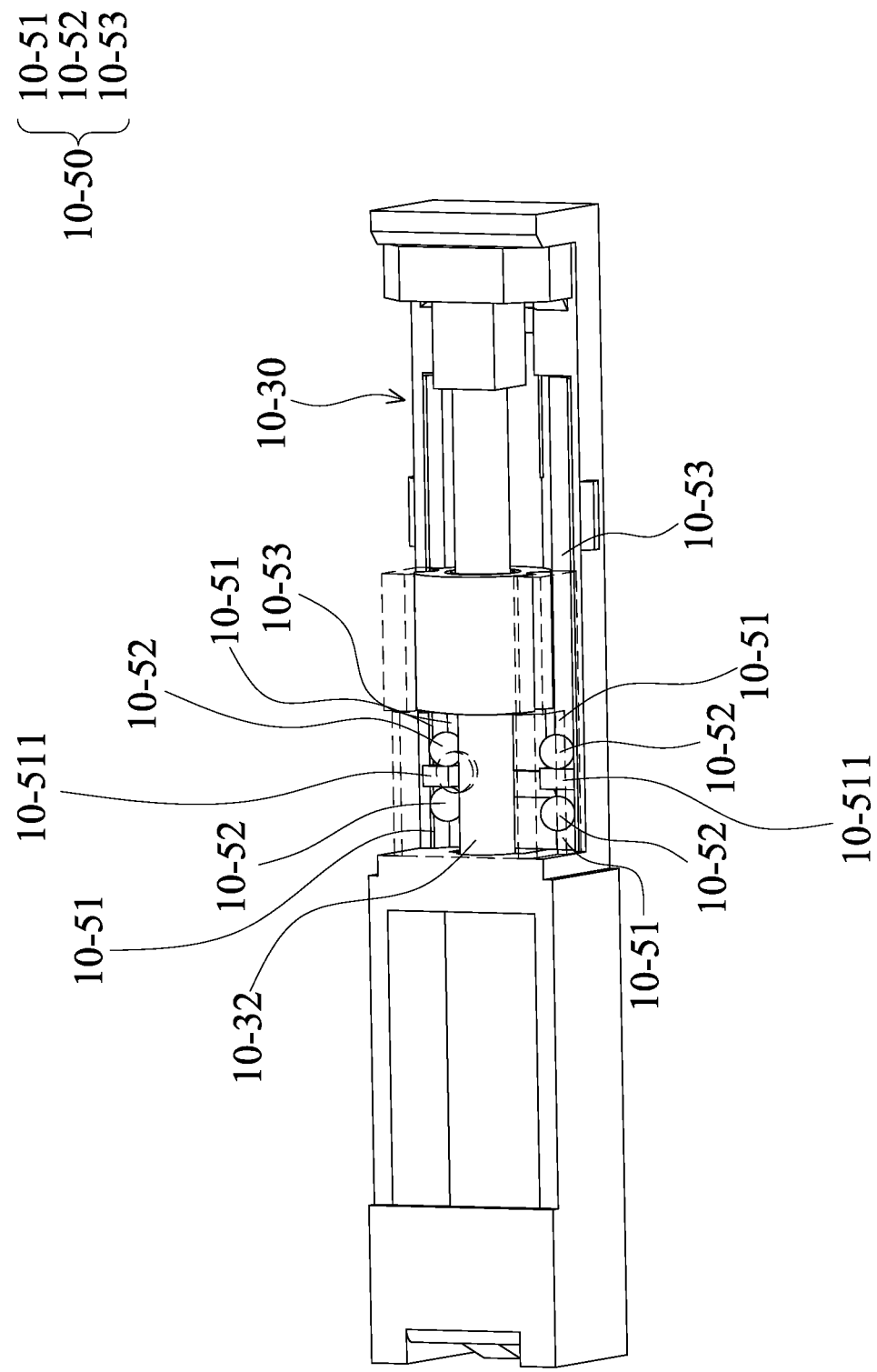
FIG. 114 shows a perspective view of the optical element driving mechanism according to an embodiment of the present disclosure, wherein the outer frame is shown as a dashed line.

Please refer to FIG. 114, the guiding assembly 10-50 includes a plurality of first guiding elements 10-51, a plurality of intermediate elements 10-52, and a plurality of second guiding elements 10-53. The first guiding element 10-51 includes a spacing barrier wall 10-511. The spacing barrier wall 10-511 is disposed between the intermediate elements 10-52. Therefore, the intermediate elements 10-52 are not in direct contact with each other. Thus, the damage of the intermediate elements 10-52 caused by rubbing with each other is prevented.

The first guiding element 10-51 has a metal material. The first guiding element 10-51 is fixedly disposed on the movable part 10-20. The first guiding element 10-51 is movable relative to the intermediate element 10-52. The intermediate element 10-52 is corresponding to the first guiding element 10-51. The second guiding element 10-53 is fixedly disposed on the fixed part 10-10, and the second guiding element 10-53 is configured to correspond to the intermediate element 10-52. The intermediate element 10-52 is movable relative to the second guiding element 10-53. The second guiding element 10-53 has a metal material. The second guiding element 10-53 has a groove structure that extends in the first direction 10-D1.

Please refer to FIG. 108, the position sensing assembly 10-60 is for sensing the movement of the movable part 10-20 relative to the fixed part 10-10. The position sensing assembly 10-60 may be located on the second side 10-217 when viewed in the first direction 10-D1. The position sensing assembly 10-60 may include a position sensing magnet 10-61, and a position sensing sensor 10-62. In the present embodiment, the position sensing magnet 10-61 is disposed on the elastic element 10-21, and the position sensing sensor 10-62 is disposed on the fixed part 10-10. The position sensing sensor 10-62 may sense the change of the magnetic force of the position sensing magnet 10-61 to get the location of the elastic element 10-21 when the elastic element 10-21 is moving relative to the fixed part 10-10 movement. In another embodiment, the position of the position sensing magnet 10-61 and the position of the position sensing sensor 10-62 may be exchanged (not shown).

Figure 115:
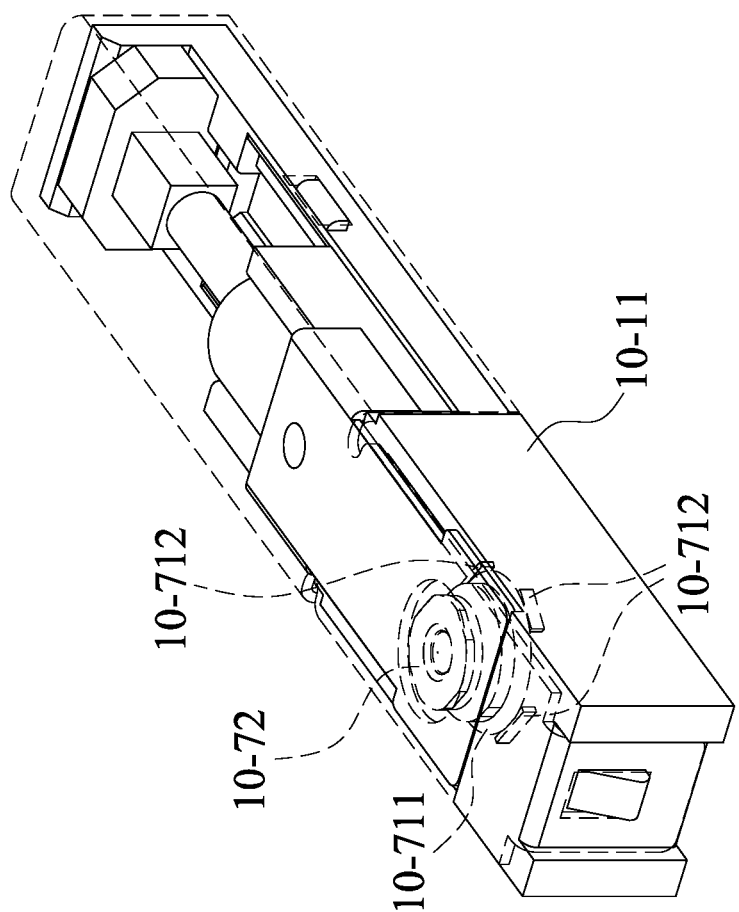
FIG. 115 shows a perspective view of the optical element driving mechanism according to an embodiment of the present disclosure, wherein the outer frame is shown as a dashed line.

Please refer to FIG. 115, the optical module 10-70 includes a driving system 10-71, and a lens 10-72. The driving system 10-71 is for driving the lens 10-72 to move relative to the base 10-11. The driving system 10-71 includes a driving coil 10-711, and a driving magnet 10-712. The driving coil 10-711 is wound around the lens 10-72, and the lens 10-72 may be disposed in the camera module 10-80 (not shown). The driving coil 10-711 corresponds to the driving magnet 10-712. The driving coil 10-711 may interact with the magnetic field of the driving magnet 10-712 and generate electromagnetic driving force to drive the lens 10-72 to move relative to the base 10-11.

Figure 116:
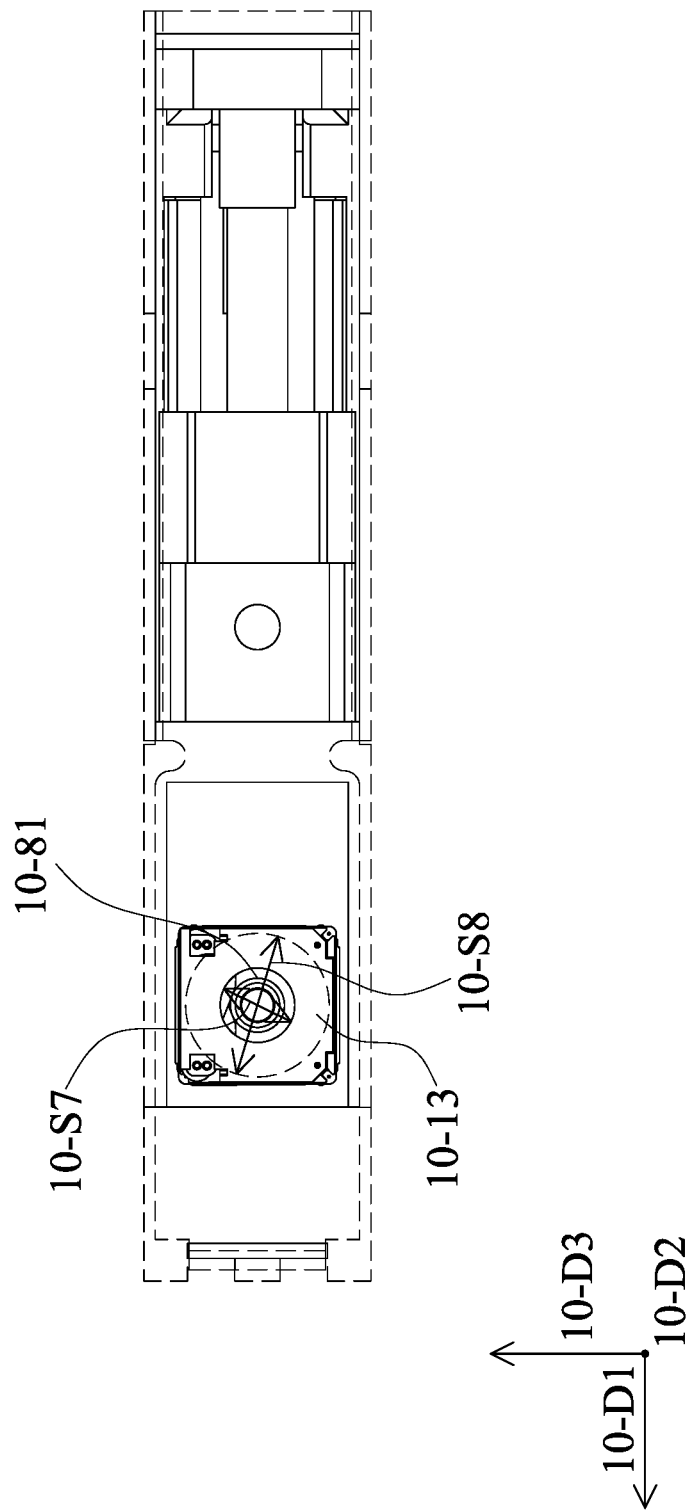
FIG. 116 shows a perspective view of the optical element driving mechanism according to an embodiment of the present disclosure, wherein the outer frame is shown as a dashed line.

Please refer to FIG. 116, the camera module 10-80 may include an accommodating opening 10-81. A maximum size 10-S7 of the accommodating opening 10-81 may be different from a maximum size 10-S8 of the emergent opening 10-13 when viewed in the traveling direction of the light 10-L (may be parallel to the second direction 10-D2). The maximum size 10-S7 of the accommodating opening 10-81 may be smaller than the maximum size 10-S8 of the emergent opening 10-13 when viewed in the traveling direction of the light 10-L (may be parallel to the second direction 10-D2). Thus, the amount of the light incident to the camera module 10-80 may be effectively controlled.

Figure 117:
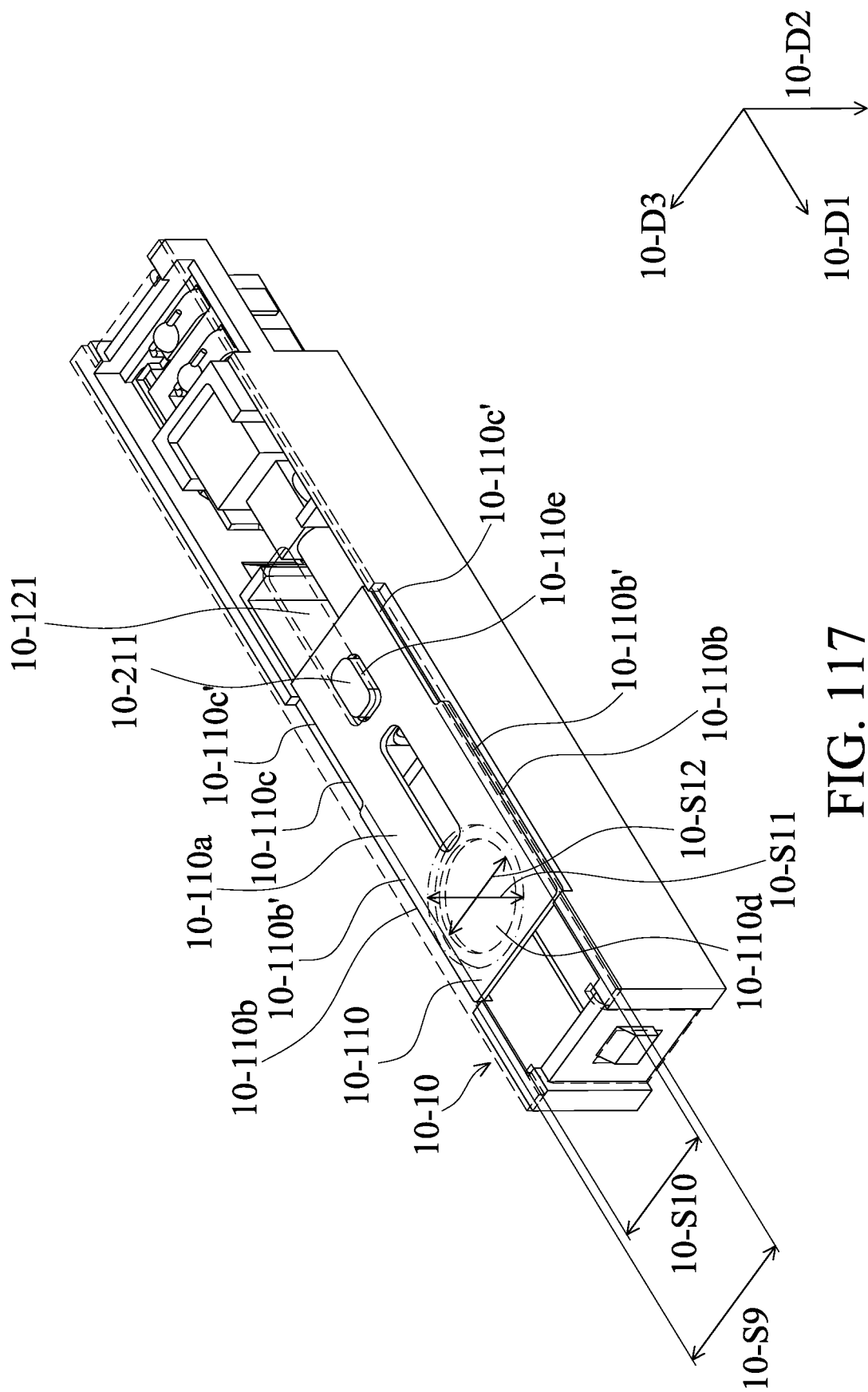
FIG. 117 shows a perspective view of the optical element driving mechanism and the optical element according to an embodiment of the present disclosure, wherein the outer frame is shown as a dashed line.

Please refer to FIG. 117, the optical element 10-110 may include an optical element body 10-110*a*, a first guiding structure 10-110*b*, a second guiding structure 10-110*c*, an entrance opening 10-110*d*, and a fixing structure 10-110*e*.

The first guiding structure 10-110*b* is for limiting the movement mode of the movable part 10-20 relative to the fixed part 10-10. The first guiding structure 10-110*b* limits the movable part 10-20, so that the movable part 10-20 does not easily move in the second direction 10-D2. The first guiding structure 10-110*b* has a first guiding surface 10-110*b*'. The first guiding surface 10-110*b*' faces the fixed part 10-10. The first guiding surface 10-110*b*' is not parallel to the second direction 10-D2. The first guiding surface 10-110*b*' is perpendicular to the second direction 10-D2.

The second guiding structure 10-110*c* is for limiting the movement mode of the movable part 10-20 relative to the fixed part 10-10. The second guiding structure 10-110*c* limits the movable part 10-20, so that the movable part 10-20 does not easily move in the third direction 10-D3. The second guiding structure 10-110*c* has a second guiding surface 10-110*c*'. The second guiding surface 10-110*c*' faces the fixed part 10-10. The second guiding surface 10-110*c*' is not parallel to the third direction 10-D3. The second guiding surface 10-110*c*' is perpendicular to the third direction 10-D3.

The first guiding structure 10-110*b* and the second guiding structure 10-110*c* are arranged in the first direction 10-D1. In the third direction 10-D3, a maximum size 10-S9 of the first guiding structure 10-110*b* may be different from a maximum size 10-S10 of the second guiding structure 10-110*c*. In the third direction 10-D3, the maximum size 10-S9 of the first guiding structure 10-110*b* may be larger than the maximum size 10-S10 of the second guiding structure 10-110*c*.

The entrance opening 10-110*d* is for allowing light 10-L to pass through. A maximum size 10-S11 of the entrance opening 10-110*d* may be different from a maximum size 10-S12 of the emergent opening 10-13 when viewed in the traveling direction of the light 10-L (may be parallel to the second direction 10-D2). The maximum size 10-S11 of the entrance opening 10-110*d* may be larger than the maximum size 10-S12 of the emergent opening 10-13 when viewed in the traveling direction of the light 10-L.

The fixing structure 10-110*e* has an opening or a concave structure. The fixing structure 10-110*e* is for corresponding to the elastic element connecting structure 10-211. The fixing structure 10-110*e* is also corresponding to the movable part connecting structure 10-23. In one embodiment, the elastic element connecting structure 10-211 may be at least partially greater than the fixing structure 10-110*e* when viewed in the protruding direction of the elastic element connecting structure 10-211.

As shown in FIG. 118, the movable part connecting structure 10-23 may be smaller than the fixing structure 10-110*e* when viewed in the protruding direction of the movable part connecting structure 10-23. The movable part connecting structure 10-23 is fixedly connected to the fixing structure 10-110*e* via the fifth connecting element 10-38. The fifth connecting element 10-38 is at least partially located between the movable part connecting structure 10-23 and the fixing structure 10-110*e*.

Please refer to FIG. 118, in one embodiment, the optical element 10-110 may further include a structural reinforcement portion 10-110*f*. The structural reinforcement portion 10-110*f* may extend in a direction that is not parallel to the first direction 10-D1. The structural reinforcement portion 10-110*f* may extend in a direction that is not parallel to the third direction 10-D3. The structural reinforcement portion 10-110*f* may extend toward the second direction 10-D2. The structural reinforcement portion 10-110*f* may strengthen the structure of the optical element 10-110, thereby the optical element 10-110 is not easily to be damaged or separated from the other elements in the optical element driving mechanism 10-100.

In general, based on the optical element driving mechanism 10-100 of the present disclosure, the movable part 10-20 is driven by the driving assembly 10-30 to move relative to the fixed part 10-10. Thus, the movable part 10-20 may move relative to the fixed part 10-10 more rapidly and efficiently. Moreover, the amount of the light incident to the camera module 10-80 is quickly and effectively controlled by driving the optical element 10-110 that is connected to the movable part 10-20. Furthermore, the optical element driving mechanism 10-100 of the present disclosure has the advantages of miniaturization and stabilization, which is helpful to minimize electronic devices.

Eleventh Embodiment

Figure 119:
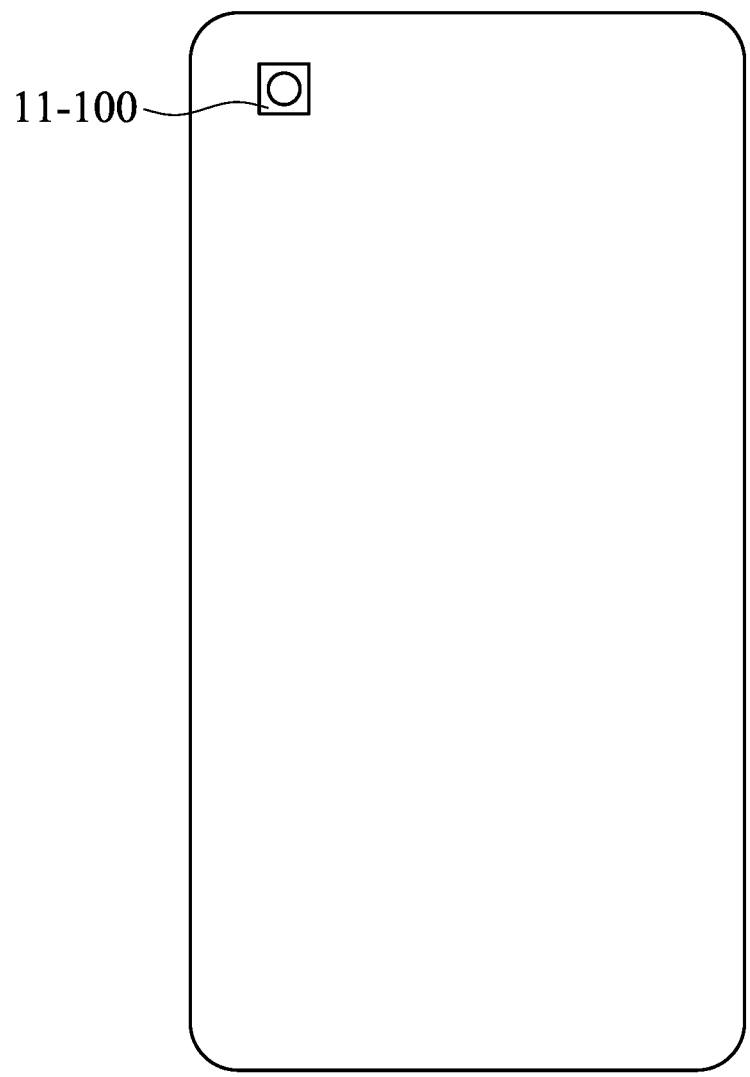
FIG. 119 shows a schematic view of an electrical device with an optical element driving mechanism according to an embodiment of the present disclosure.

Firstly, please refer to FIG. 119, an optical element driving mechanism 11-100 of an embodiment of the present disclosure may be mounted in an electrical device 11-1 for taking photos or videos, wherein the aforementioned electrical device 11-1 may, for example, be a smartphone or a digital camera, but the present disclosure is not limited to these. It should be noted that the position and the size between the optical element driving mechanism 11-100 and the electrical device 11-1 shown in FIG. 119 are only an example, which is not for limiting the position and the size between the optical element driving mechanism 11-100 and the electrical device 11-1. In fact, according to different needs, the optical element driving mechanism 11-100 may be mounted at different positions in the electrical device 11-1.

Figure 120:
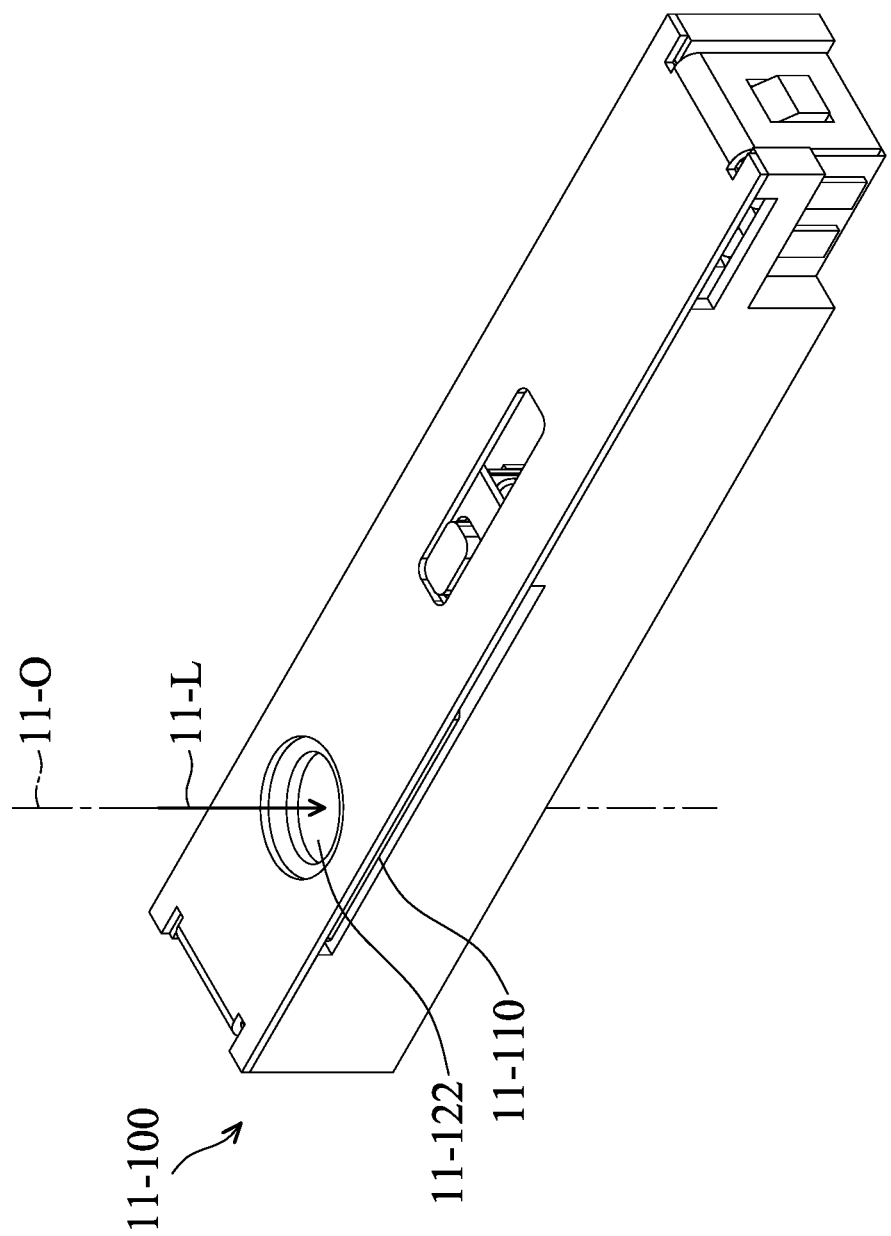
FIG. 120 shows a schematic view of the optical element driving mechanism and an optical element according to an embodiment of the present disclosure.

Please refer to FIG. 120, the optical element driving mechanism 11-100 carries an optical element 11-110. A sensing module may be disposed inside or outside of the optical element driving mechanism 11-100. The sensing module may be located at the downstream of the light entry of the optical element driving mechanism 11-100. A light 11-L incident and passes the optical element 11-110 in the optical element driving mechanism 11-100 along an optical axis 11-O, and then reaches the sensing module for imaging.

Figure 121:
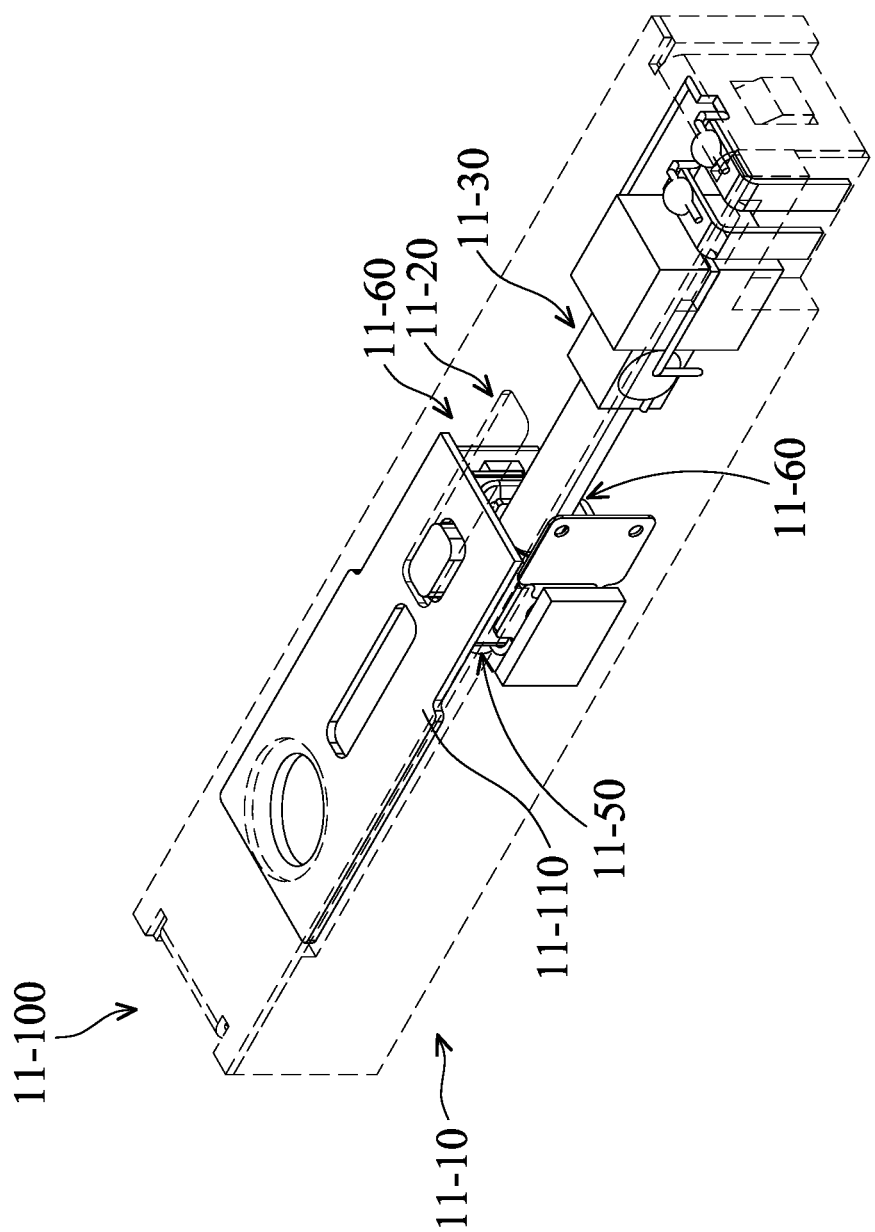
FIG. 121 shows a perspective view of the optical element driving mechanism and the optical element according to an embodiment of the present disclosure, wherein an outer frame is shown as a dashed line.
Figure 122:
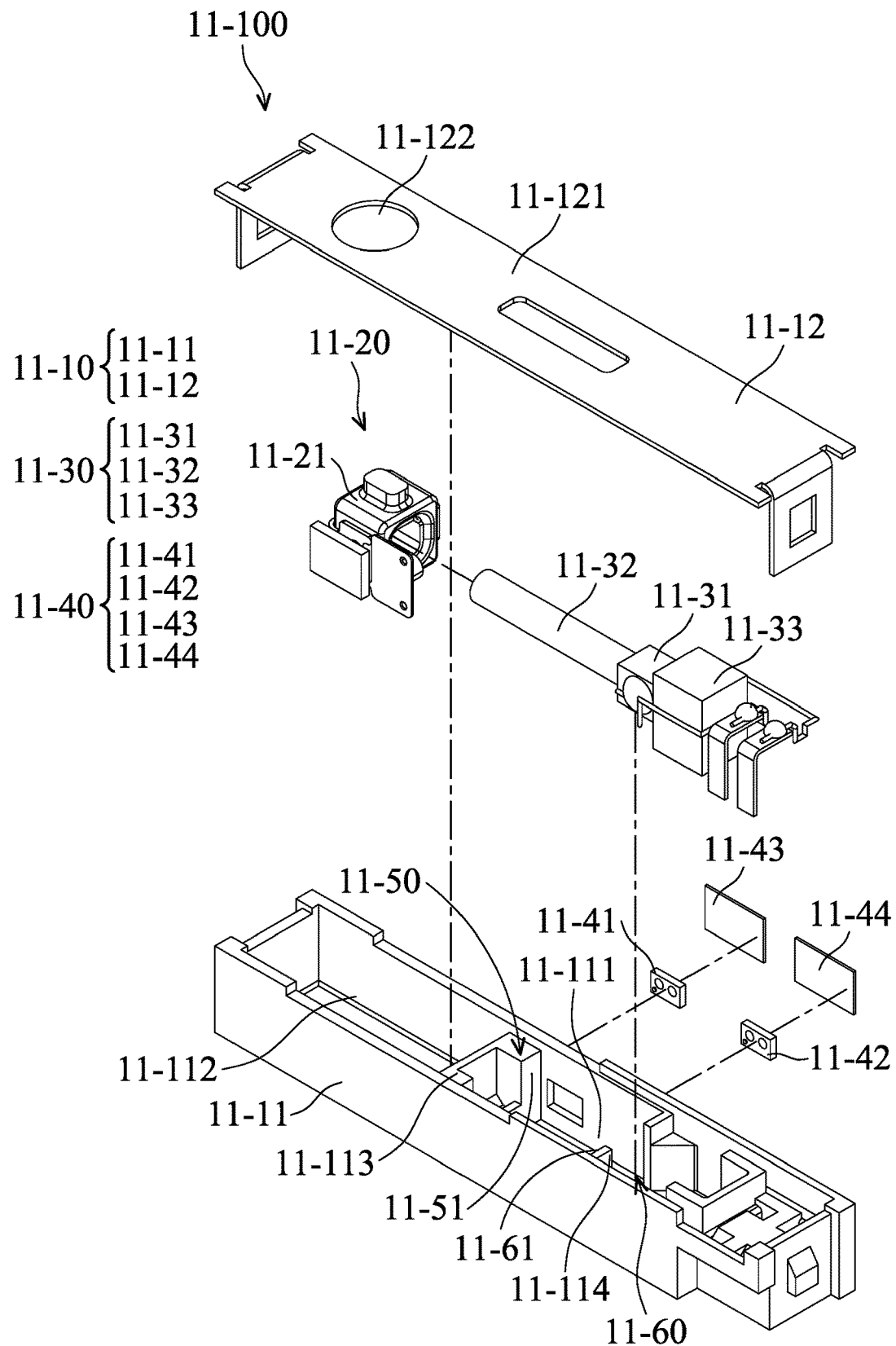
FIG. 122 shows an exploded view of the optical element driving mechanism according to an embodiment of the present disclosure.

Please refer to FIG. 121 and FIG. 122, the optical element driving mechanism 11-100 may include a fixed part 11-10, a movable part 11-20, a driving assembly 11-30, a position sensing assembly 11-40, a first stopping assembly 11-50, a second stopping assembly 11-60, and a control assembly 11-70 (not shown in FIG. 121 and FIG. 122).

Figure 123:
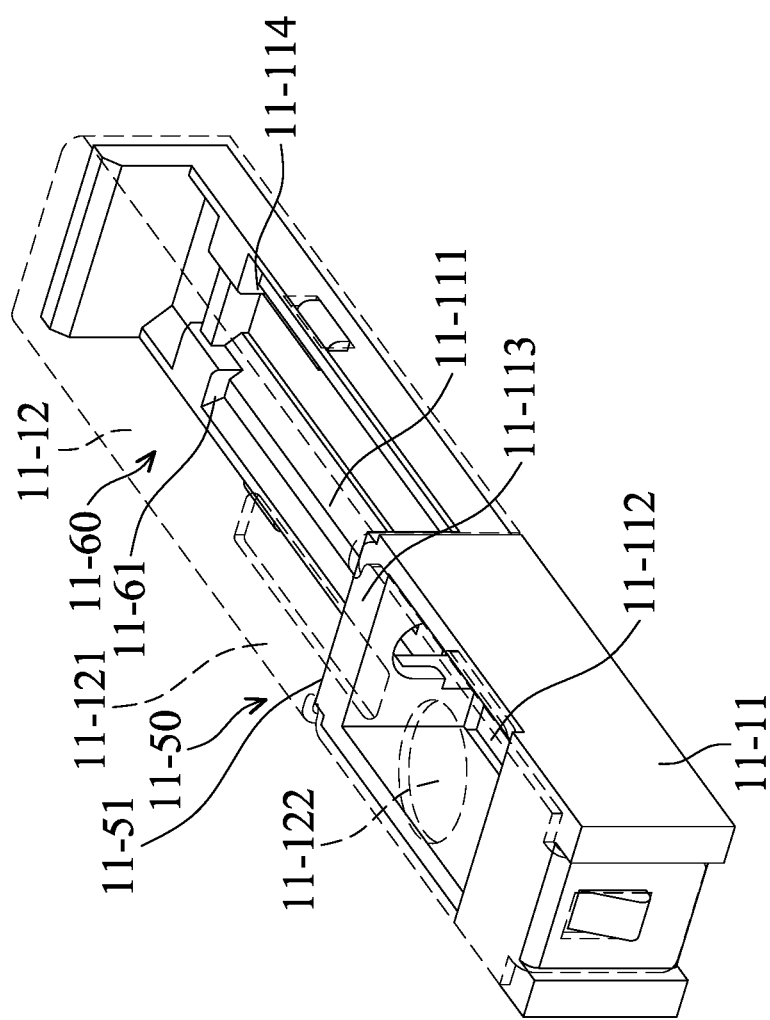
FIG. 123 shows a perspective view of the outer frame, a base, a first stopping assembly, and a second stopping assembly of the optical element driving mechanism according to an embodiment of the present disclosure, wherein the outer frame is shown as a dashed line.

Please refer FIG. 123, the fixed part 11-10 may include a base 11-11, and an outer frame 11-12.

The base 11-11 may include a first accommodating space 11-111, a second accommodating space 11-112, a first base blocking wall 11-113, and a second base blocking wall 11-114. The first accommodating space 11-111 is located between the first base blocking wall 11-113 and the second base blocking wall 11-114. The first accommodating space 11-111 is for accommodating the driving assembly 11-30. The second accommodating space 11-112 may accommodate external optical modules. The first base blocking wall 11-113 is located between the first accommodating space 11-111 and the second accommodating space 11-112. The first base blocking wall 11-113 and second base blocking wall 11-114 may be opposed to each other.

The outer frame 11-12 may be fixedly connected to the base 11-11 by a fixed structure. The outer frame 11-12 may include an outer frame body 11-121, and a light receiving opening 11-122. The light receiving opening 11-122 is disposed on the outer frame body 11-121. The light receiving opening 11-122 may be a hole that penetrates the outer frame body 11-121. The light receiving opening 11-122 may be a circular shape opening. The light receiving opening 11-122 may be configured to receive light 11-L (please refer to FIG. 120).

Figure 124:
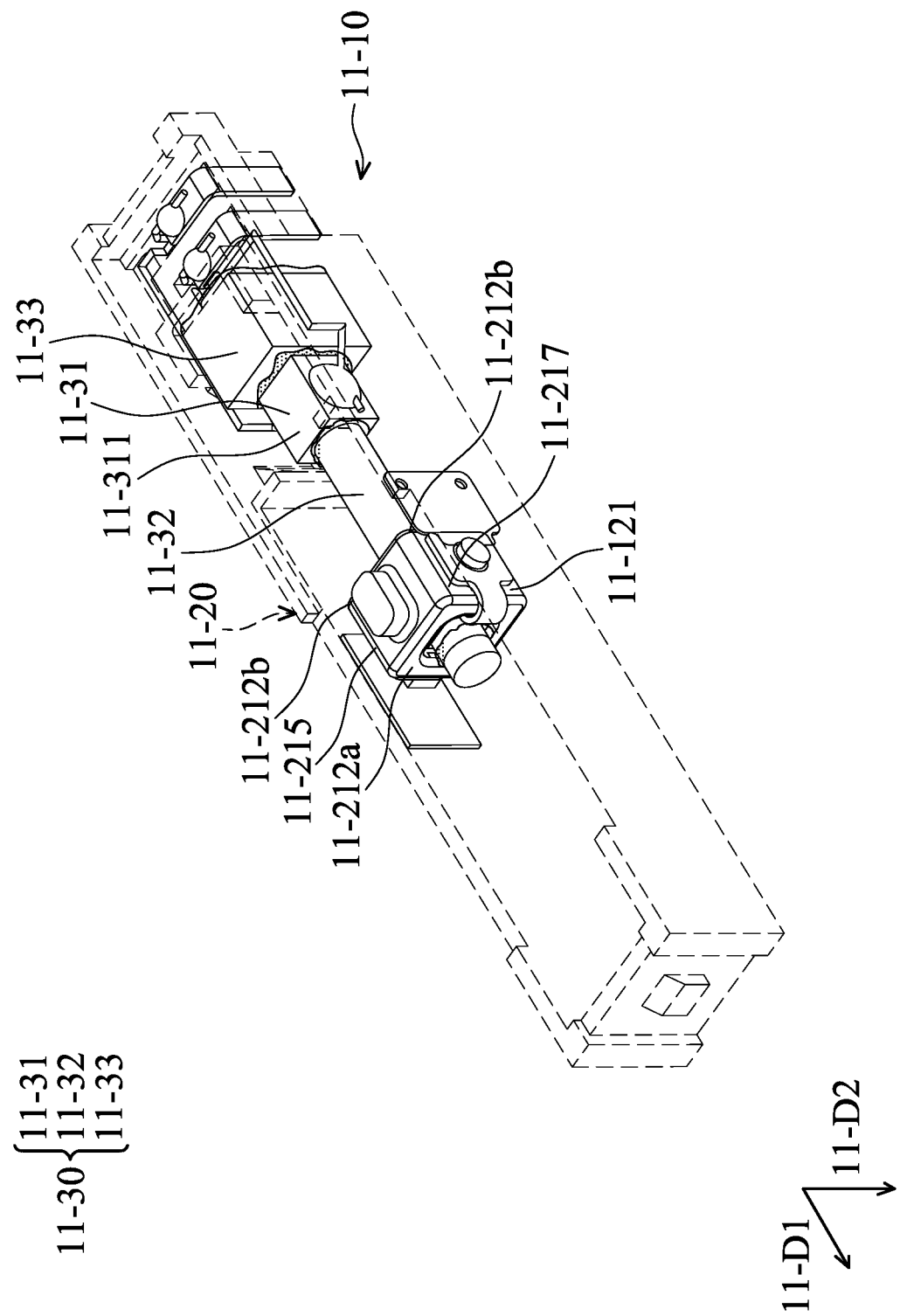
FIG. 124 shows a perspective view of the optical element driving mechanism according to an embodiment of the present disclosure, wherein the base is shown as a dashed line, and the outer frame is omitted.

Please refer to FIG. 124, the movable part 11-20 is movable relative to the fixed part 11-10, and the movable part 11-20 may be connected to the optical element 11-110 (not shown). The optical element 11-110 may be an element that is relevant to the optical element, such as a SOMA (a cover plate, a shutter, an aperture), a prism, lenses, a camera module, optical sensor, or the like. In one embodiment, the movable part 11-20 may include an elastic element 11-21.

Figure 125:
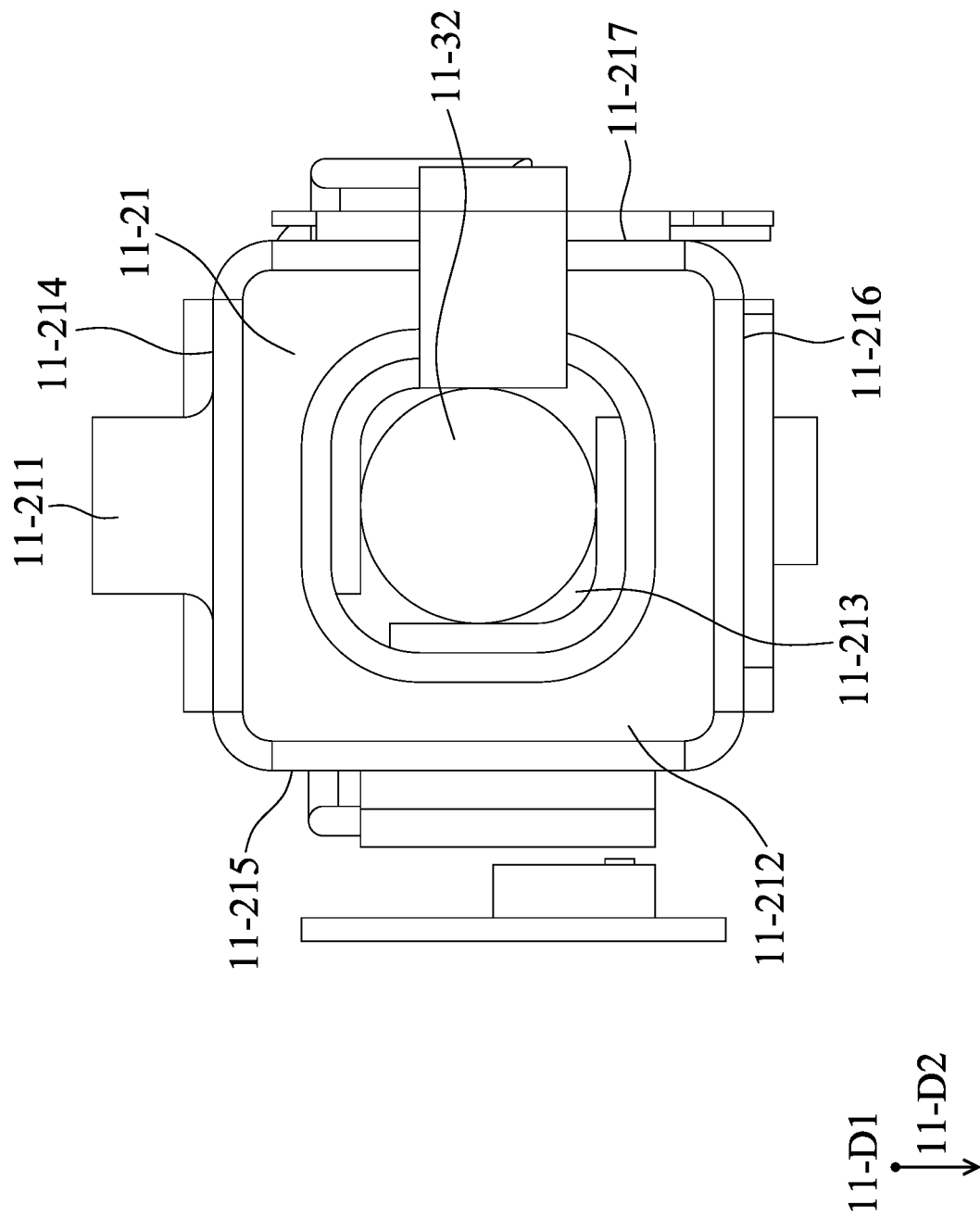
FIG. 125 shows a schematic view of an elastic element, and a transmission element according to an embodiment of the present disclosure.

Please refer to FIG. 125, the elastic element 11-21 may include an elastic element connecting structure 11-211, an elastic element stopping assembly 11-212, an elastic element opening 11-213, a first side 11-214, a second side 11-215, a third side 11-216, and a fourth side 11-217.

The elastic element 11-21 has a non-metallic material. Specifically, the elastic element 11-21 has a plastic material or a resin material. The elastic element 11-21 has a substantially polygonal structure when viewed along the first direction 11-D1.

The elastic element connecting structure 11-211 is for connecting the optical element 11-110 (not shown). The elastic element opening 11-213 may be a hole that penetrates the elastic element 11-21, and the elastic element opening 11-213 may have any suitable shape.

The first side 11-214 is not parallel to the second side 11-215. The elastic element stopping assembly 11-212 is for limiting the range of movement of the movable part 11-20 relative to the fixed part 11-10. Please refer to FIG. 124, the elastic element stopping assembly 11-212 may include a first elastic element stopping surface 11-212a, and two second elastic element stopping surfaces 11-212b.

Please refer to FIG. 124 and FIG. 125, the elastic element connecting structure 11-211 is located at the first side 11-214 of the elastic element 11-21 when viewed along the first direction 11-D1. The first elastic element stopping surface 11-212a may be located at the second side 11-215 of the elastic element 11-21 when viewed along the first direction 11-D1. The two second elastic element stopping surfaces 11-212b may be respectively located at the second side 11-215 and the fourth side 11-217 of the elastic element 11-21. Thus, the weight of the elastic element 11-21 is distributed more evenly, so that the optical element driving mechanism 11-100 is more stable.

Please refer to FIG. 125, the first side 11-214, the second side 11-215, the third side 11-216, and the fourth side 11-217 surround the elastic element opening 11-213. The first side 11-214 is not parallel to the second side 11-215. The second side 11-215 is not parallel to the third side 11-216. The first side 11-214 and the third side 11-216 are parallel to each other. The second side 11-215 and fourth side 11-217 are parallel to each other.

Please refer to FIG. 124, the driving assembly 11-30 drives the movable part 11-20 to move relative to the fixed part 11-10 along a first dimension. The first dimension may be the direction that is parallel to the first direction 11-D1 or the rotation that rotates about a second direction 11-D2 that is perpendicular to the first direction 11-D1.

The driving assembly 11-30 may include an electromechanical converting element 11-31, a transmission element 11-32, a weight element 11-33. The electromechanical converting element 11-31 may include a piezoelectric element 11-311. The piezoelectric element 11-311 may stretch or compress after receiving a current. The transmission element 11-32 has an elongated structure, and the transmission element 11-32 extends along the first direction 11-D1.

The transmission element 11-32 penetrates the elastic element opening 11-215 of the elastic element 11-21. The electromechanical converting element 11-31 is disposed on the weight element 11-33. The transmission element 11-32 is disposed on the electromechanical converting element 11-31. The weight element 11-33 may be disposed on the fixed part 11-10.

The position sensing assembly 11-40 is for sensing the movement of the movable part 11-20 relative to the fixed part 11-10, and the position sensing assembly 11-40 outputs a sensing information 11-40a.

Figure 126:
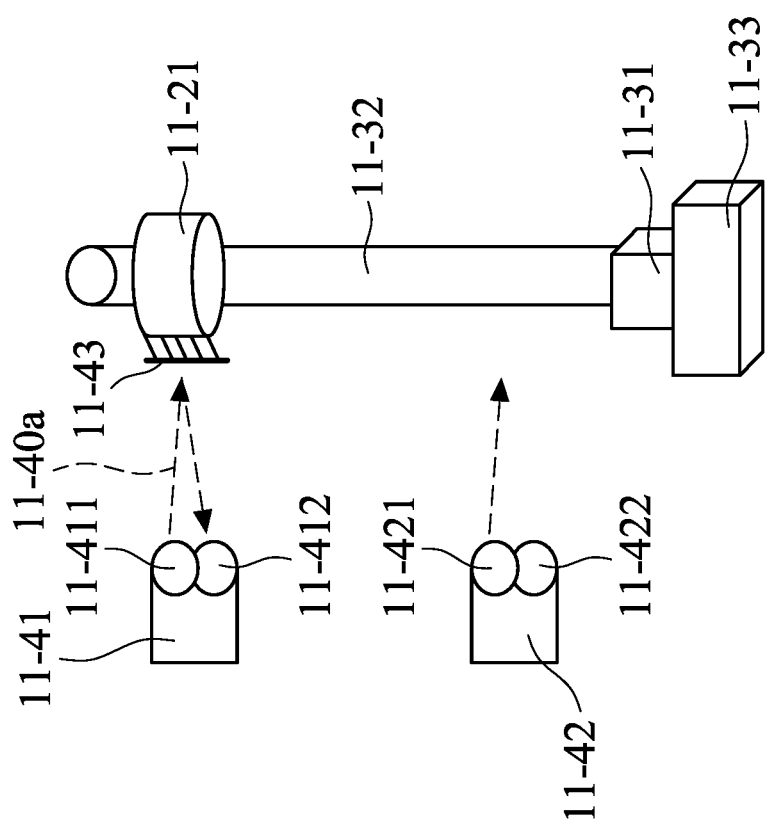
FIG. 126 shows a schematic view of a driving assembly, and a position sensing assembly of the optical element driving mechanism according to an embodiment of the present disclosure.
Figure 127:
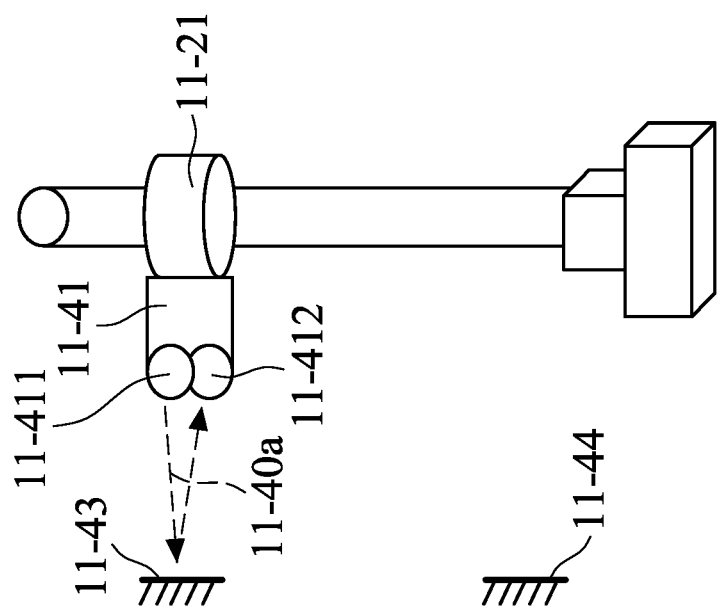
FIG. 127 shows a schematic view of the driving assembly, and the position sensing assembly of the optical element driving mechanism according to an embodiment of the present disclosure.

Please refer to FIG. 126 and FIG. 127, the position sensing assembly 11-40 may include a first sensing element 11-41, a second sensing element 11-42, a first sensed object 11-43, and a second sensed object 11-44.

As shown in FIG. 126, in one embodiment, the second sensed object 11-44 may be omitted. The first sensing element 11-41 and the second sensing element 11-42 may be disposed on the fixed part 11-10 (not shown). The first sensed object 11-43 may be disposed on the elastic element 11-21 of the movable part 11-20. The first sensed object 11-43 may be reflectors or magnetic elements, and the first sensed object 11-43 is configured to correspond to the first sensing element 11-41 and the second sensing element 11-42. The first sensed object 11-43 is movable relative to the first sensing element 11-41 and the second sensing element 11-42.

As shown in FIG. 127, in one embodiment, the second sensing element 11-42 may be omitted. The first sensing element 11-41 may be disposed on the elastic element 11-21 of the movable part 11-20. The first sensed object 11-43 may be disposed on the fixed part 11-10 (not shown). The first sensed object 11-43 and the second sensed object 11-44 may be reflectors or magnetic elements, and the first sensed object 11-43 and the second sensed object 11-44 is configured to correspond to the first sensing element 11-41. The first sensed object 11-43 and the second sensed object 11-44 is movable relative to the first sensing element 11-41.

Figure 128:
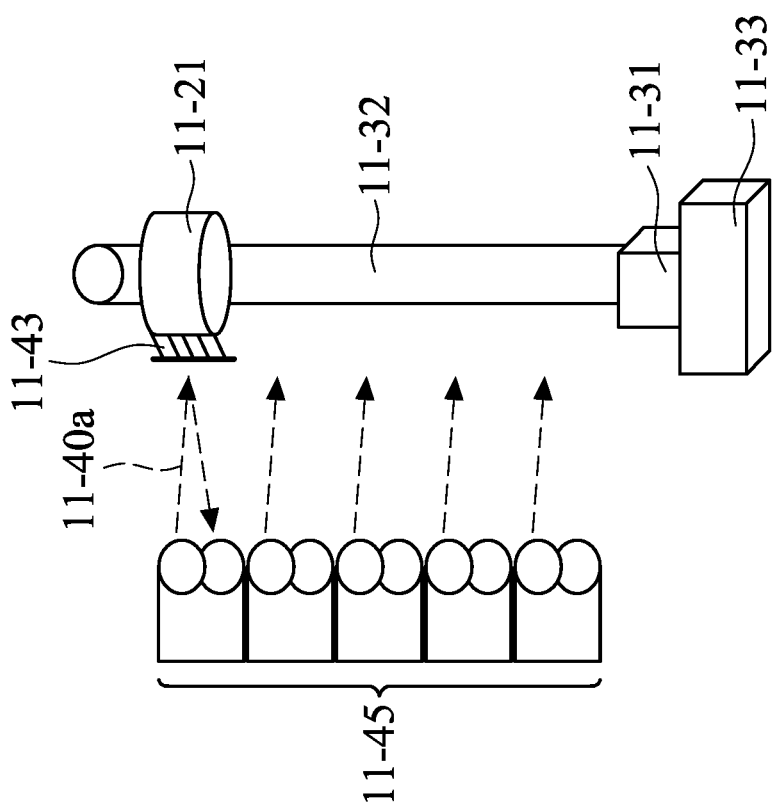
FIG. 128 shows a schematic view of the driving assembly, and the position sensing assembly of the optical element driving mechanism according to an embodiment of the present disclosure.

As shown in FIG. 128, the position sensing assembly 11-40 may further include a plurality of sensing elements 11-45 to sense the position of the sensed object more accurately.

Please refer to FIG. 126 and FIG. 127, the first sensing element 11-41 may include a first sensing information transmitter 11-411, and a first sensing information receiver 11-412. The first sensing information transmitter 11-411 may transmit the sensing information 11-40a, and the sensing information 11-40a is reflected by the first sensed object 11-43 or the second sensed object 11-44. Then, the sensing information 11-40a may be received by the first sensing information receiver 11-412. Thereafter, the sensing information 11-40a is transferred to the control assembly 11-70. The first sensing information receiver 11-412 may be disposed adjacent to the first sensing information transmitter 11-411. In one embodiment, the first sensing information receiver 11-412 may be disposed against the first sensing information transmitter 11-411. Thus, the first sensing information receiver 11-412 may receive the sensing information 11-40a that is transmitted by the first sensing information transmitter 11-411 more quickly, and the sensing error is reduced.

Please refer to FIG. 126, the first second sensing element 11-42 may include a second sensing information transmitter 11-421, and a second sensing information receiver 11-422. The second sensing information transmitter 11-421 may transmit the sensing information 11-40a, and the sensing information 11-40a is reflected by the first sensed object 11-43 or the second sensed object 11-44 (not shown in FIG. 126). Then, the sensing information 11-40a may be received by the second sensing information receiver 11-422. Thereafter, the sensing information 11-40a is transferred to the control assembly 11-70. The second sensing information receiver 11-422 may be disposed adjacent to the second sensing information transmitter 11-421. In one embodiment, the second sensing information receiver 11-422 may be disposed against the second sensing information transmitter 11-421. Thus, the second sensing information receiver 11-422 may receive the sensing information 11-40a that is transmitted by the second sensing information transmitter 11-421 more quickly, and the sensing error is reduced.

Please refer to FIG. 128, the sensing element 11-45 also transmit the sensing information 11-40a, and the sensing element 11-45 receives the reflected sensing information 11-40a. Thereafter, the sensing element 11-45 may transfer the sensing information 11-40a to the control assembly 11-70.

Please refer to FIG. 123, the first stopping assembly 11-50 is disposed on the fixed part 11-10, and the first stopping assembly 11-50 is for limiting the range of movement of the movable part 11-20 relative to the fixed part 11-10. The first stopping assembly 11-50 may be located on the first base blocking wall 11-113.

The first stopping assembly 11-50 has a first stopping surface 11-51. The first a stopping surface 11-51 be in contact with the first elastic element stopping surface 11-212a, so as to limit the range of movement of the elastic element 11-21 of the movable part 11-20.

The second stopping assembly 11-60 is disposed on the fixed part 11-10, and the second stopping assembly 11-60 is for limiting the range of movement of the movable part 11-20 relative to the fixed part 11-10. The second stopping assembly 11-60 may be located on the second base blocking wall 11-114.

The second stopping assembly 11-60 has a second stopping surface 11-61. The second stopping surface 11-61 may be in contact with the second elastic element stopping surface 11-21b, so as to limit the range of movement of the elastic element 11-21 of the movable part 11-20.

The first stopping surface 11-51 and the second stopping surface 11-61 face toward different directions. Specifically, the first stopping surface 11-51 and the second stopping surface 11-61 may be opposed to each other.

Figure 129:
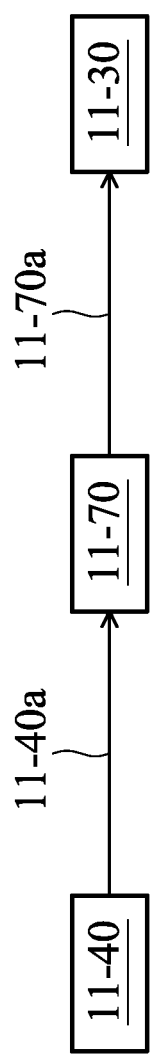
FIG. 129 shows a schematic view of transferring a sensing information, and a driving signal of the optical element driving mechanism according to an embodiment of the present disclosure.

Please refer to FIG. 129, the control assembly 11-70 may output a driving signal 11-70a based on the sensing information 11-40a, or an external command, so as to drive the driving assembly 11-30. That is, the control assembly 11-70 may refer to the sensing information 11-40a and then outputs the driving signal 11-70a to the driving assembly 11-30.

Figure 130:
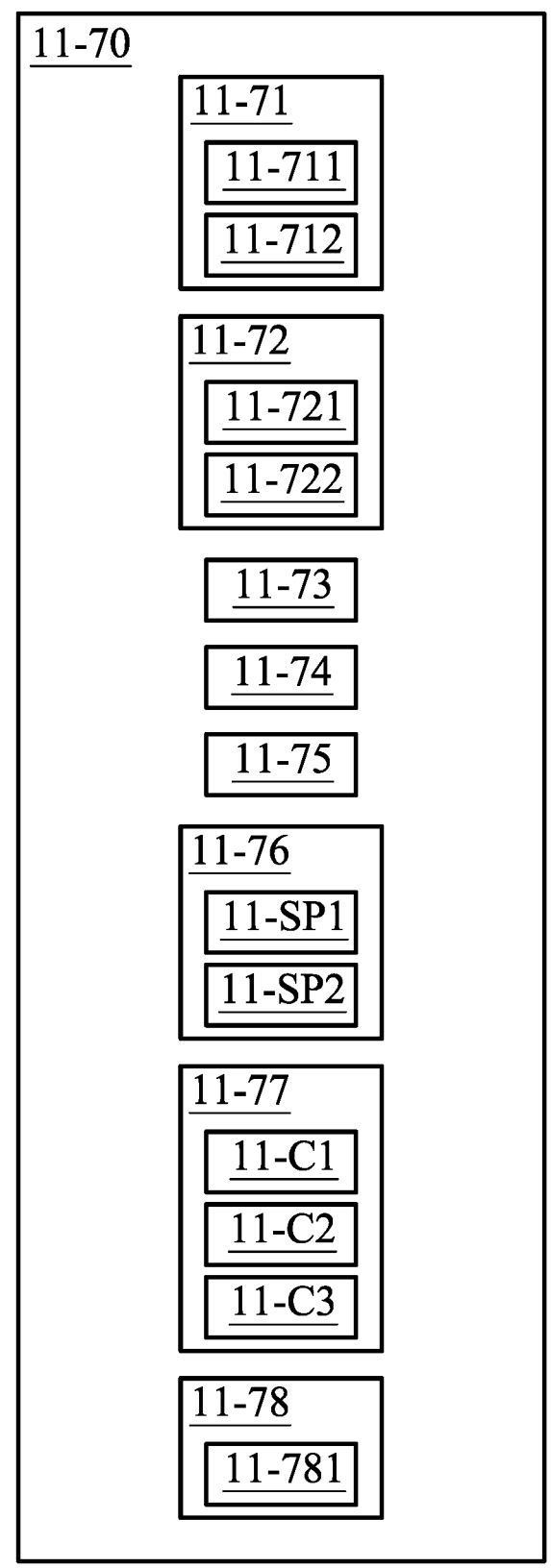
FIG. 130 shows a schematic view of a control assembly of the optical element driving mechanism according to an embodiment of the present disclosure.

Please refer to FIG. 130, the control assembly 11-70 may include a first predetermined information 11-71, a second predetermined information 11-72, an extreme motion range 11-73, a predetermined time 11-74, a first time 11-75, an initial calibration procedure 11-76, and a driving procedure 11-77.

The first predetermined information 11-71 may include a first target position 11-711, and a first predetermined information 11-712.

The first target position 11-711 is the position of the movable part 11-20 relative to the fixed part 11-10 when the movable part 11-20 is in a first state. The first target position 11-711 may be sensed and obtained by an external measuring device. The first predetermined information 11-712 is the output value of the sensing information 11-40a when the movable part 11-20 is in the first state. In the first state, the value of the first predetermined information 11-712 may be 1 in a binary computer.

In the first state, a first gap is provided between the movable part 11-20 and the first stopping assembly 11-50. In the first state, a second gap is provided between the movable part 11-20 and the second stopping assembly 11-60. The first gap is smaller than the second gap, and the first gap is not zero. A shortest distance of the first gap is less than the smallest size of the light receiving opening 11-122.

The second predetermined information 11-72 may include a second target position 11-721, and a second predetermined information 11-722.

The second target position 11-721 is the position of the movable part 11-20 relative to the fixed part 11-10 when the movable part 11-20 is in a second state. The second target position 11-721 may be sensed and obtained by the external measuring device. The second predetermined information 11-722 is the output value of the sensing information 11-40a when the movable part 11-20 is in the second state. In the second state, the value of the second predetermined information 11-722 may be 1 in the binary computer.

In the second state, a third gap is provided between the movable part 11-20 and the first stopping assembly 11-50. In the second state, a fourth gap is provided between the movable part 11-20 and the second stopping assembly 11-60. The fourth gap is smaller than the third gap, and the fourth gap is not zero. A shortest distance of the fourth gap is less than the smallest size of the light receiving opening 11-122.

After receiving the driving signal 11-70a, the driving assembly 11-30 may be used for driving the movable part 11-20 to move relative to the fixed part 11-10 to the first target position 11-711 and the second target position 11-721.

In one embodiment, the first predetermined information 11-712 and the second predetermined information 11-722 may be the same (as described above, the value of the first predetermined information 11-712 and the second predetermined information 11-722 may both be 1 in the binary computer).

The extreme motion range 11-73 is the possible maximum range of movement of the movable part 11-20 relative to the fixed part 11-10 along the first dimension.

The predetermined time 11-74 is defined as the time required for the driving assembly 11-30 to drive the movable part 11-20 to move relative to the fixed part 11-10 from a starting point (may be located at one of the first base blocking wall 11-113 and the second base blocking wall 11-114) of the extreme motion range 11-73 to an end point (may be located at another one of the first base blocking wall 11-113 and the second base blocking wall 11-114) of the extreme motion range 11-73.

The first time 11-75 is the time required for the driving assembly 11-30 to drive the movable part 11-20 to move from the first target position 11-711 to the second target position 11-721.

The initial calibration procedure 11-76 is for confirming the initial state of the movable part 11-20 relative to the fixed part 11-10. The initial calibration procedure 11-76 includes a step 11-SP1, and a step 11-SP2.

In the step 11-SP1, the movable part 11-20 is driven to move relative to the fixed part 11-10 along an direction opposite to the first dimension to the starting point. In the step 11-SP1, the time for the driving assembly 11-30 to drive the movable part 11-20 is at least equal to or greater than the predetermined time 11-74. Thus, the movable part 11-20 is ensured to reach the starting point.

In the step 11-SP2, the movable part 11-20 is driven to move relative to the fixed part 11-10 along a positive direction of the first dimension until the sensing information 11-40a is corresponding to the first predetermined information 11-712. After operating the step 11-SP2, the optical element driving mechanism 11-100 has completed the initial calibration procedure 11-76, and the optical element driving mechanism 11-100 has returned to the initial state.

In the embodiment that the first dimension is a linear motion, the movement of the movable part 11-20 may be a vertical movement or a horizontal movement in the first dimension. In embodiment that the first dimension is a rotational movement, the movement of the movable part 11-20 may be a forward rotation and a reverse rotation in the first dimension around a same axis.

In the driving procedure 11-77, the control assembly 11-70 may continuously output the driving signal 11-70a to the driving assembly 11-30 until a condition 11-C1, a condition 11-C2, and a condition 11-C3 are met in sequence.

The condition 11-C1 is that the sensing information 11-40a corresponds to one of the first predetermined information 11-712 or the second predetermined information 11-722 (the movable part 11-20 may be located at the one of the starting point or the end point). The condition 11-C2 is that the sensing information 11-40a does not correspond to the first predetermined information 11-712 or the second predetermined information 11-722 (the movable part 11-20 is not located at the starting point or the end point). The condition 11-C3 is that the sensing information 11-40a corresponds to the other one of the first predetermined information 11-712 or the second predetermined information 11-722 (the movable part 11-20 may be located at the other one of the starting point or the end point).

In one embodiment, the control assembly 11-70 may further include a third predetermined information 11-78. The third predetermined information 11-78 may include a third target position 11-781. The third target position 11-781 may be located between the first target position 11-711 and the second target position 11-721. The third target position 11-781 may be any position located between the first target position 11-711 and the second target position 11-721. The control assembly 11-70 may control the driving assembly 11-30 with the steps similar to above-described steps, so as to drive the movable part 11-20 the third target position 11-781.

In general, the optical element driving mechanism 11-100 of the present disclosure may control the driving assembly 11-30 by the control assembly 11-70, so as to drive the movable part 11-20. The position sensing assembly 11-40 of the optical element driving mechanism 11-100 of the present disclosure may sense the position of the movable part 11-20 precisely and rapidly, such that the error is minimized. Moreover, the initial calibration procedure 11-76 of the control assembly 11-70 of the optical element driving mechanism 11-100 of the present disclosure may ensure that the movable part 11-20 is located at a correct position to further reduce the error. The driving assembly 11-30, the position sensing assembly 11-40, and the control assembly 11-70 of the present disclosure may also reduce the number of required elements of the optical element driving mechanism 11-100, lowering the weight and volume of the optical element driving mechanism 11-100, so that the effect of miniaturization of the optical element driving mechanism 11-100 is achieved.

Twelfth Embodiment

Figure 131:
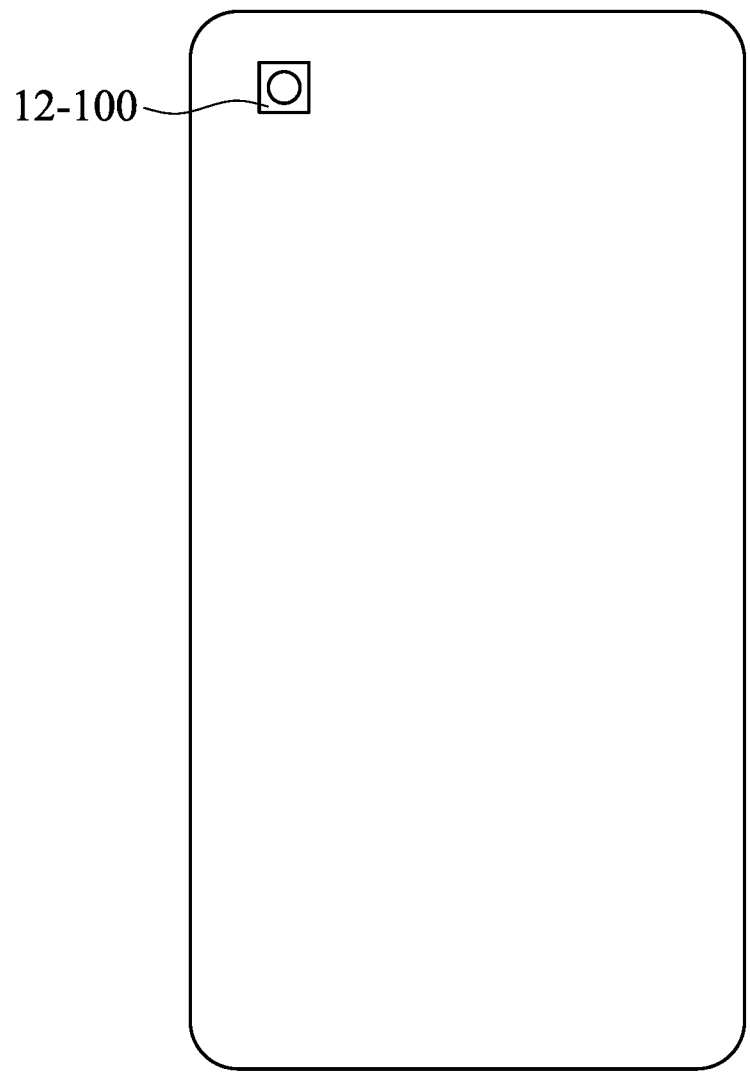
FIG. 131 shows a schematic view of an electrical device with an optical element driving mechanism according to an embodiment of the present disclosure.

Firstly, please refer to FIG. 131, an optical element driving mechanism 12-100 of an embodiment of the present disclosure may be mounted in an electrical device 12-1 for taking photos or videos, wherein the aforementioned electrical device 12-1 may, for example, be a smartphone or a digital camera, but the present disclosure is not limited to these. It should be noted that the position and the size between the optical element driving mechanism 12-100 and the electrical device 12-1 shown in FIG. 131 are only an example, which is not for limiting the position and the size between the optical element driving mechanism 12-100 and the electrical device 12-1. In fact, according to different needs, the optical element driving mechanism 12-100 may be mounted at different positions in the electrical device 12-1.

Figure 132:
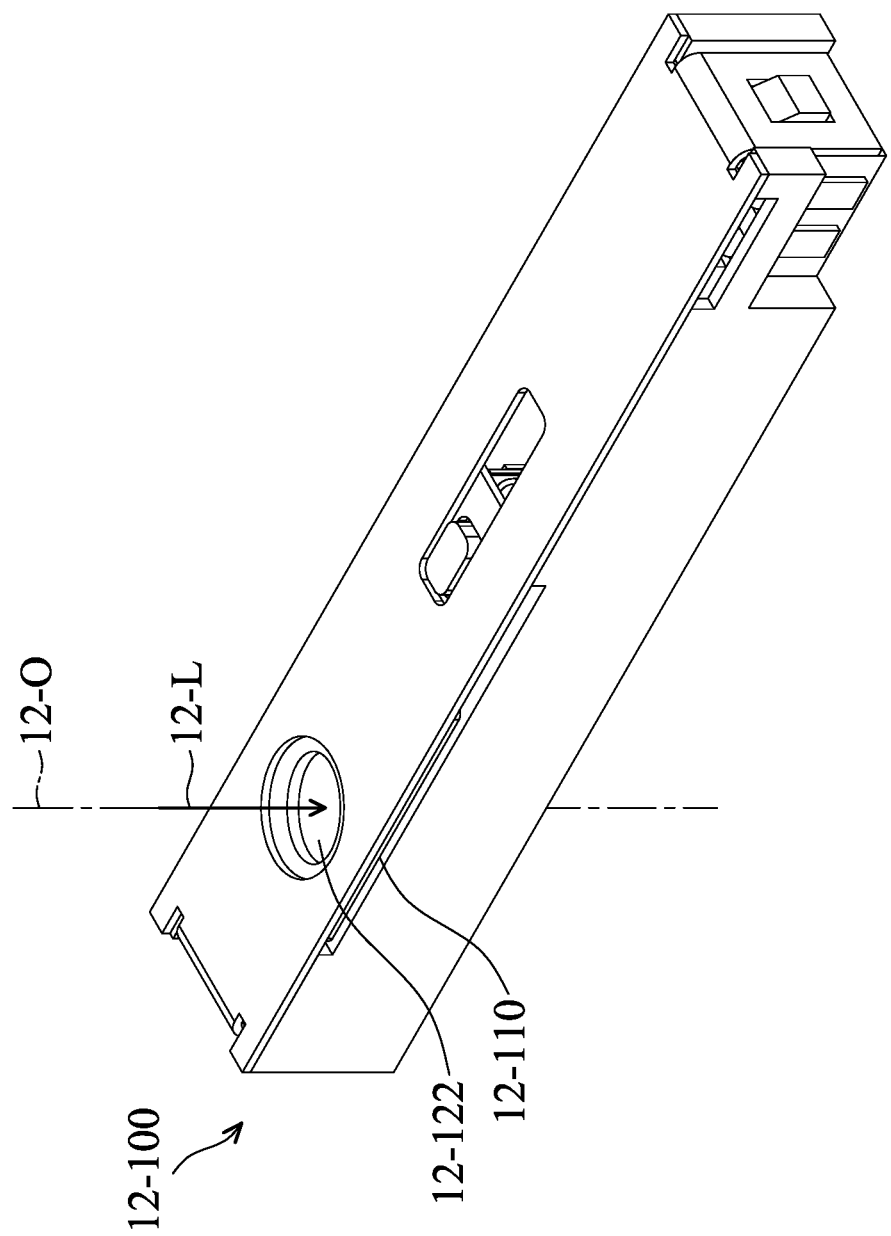
FIG. 132 shows a schematic view of the optical element driving mechanism and an optical element according to an embodiment of the present disclosure.

Please refer to FIG. 132, the optical element driving mechanism 12-100 carries an optical element 12-110. A sensing module may be disposed inside or outside of the optical element driving mechanism 12-100. The sensing module may be located at the downstream of the light entry of the optical element driving mechanism 12-100. A light 12-L incident and passes the optical element 12-110 in the optical element driving mechanism 12-100 along an optical axis 12-O, and then reaches the sensing module for imaging.

Figure 133:
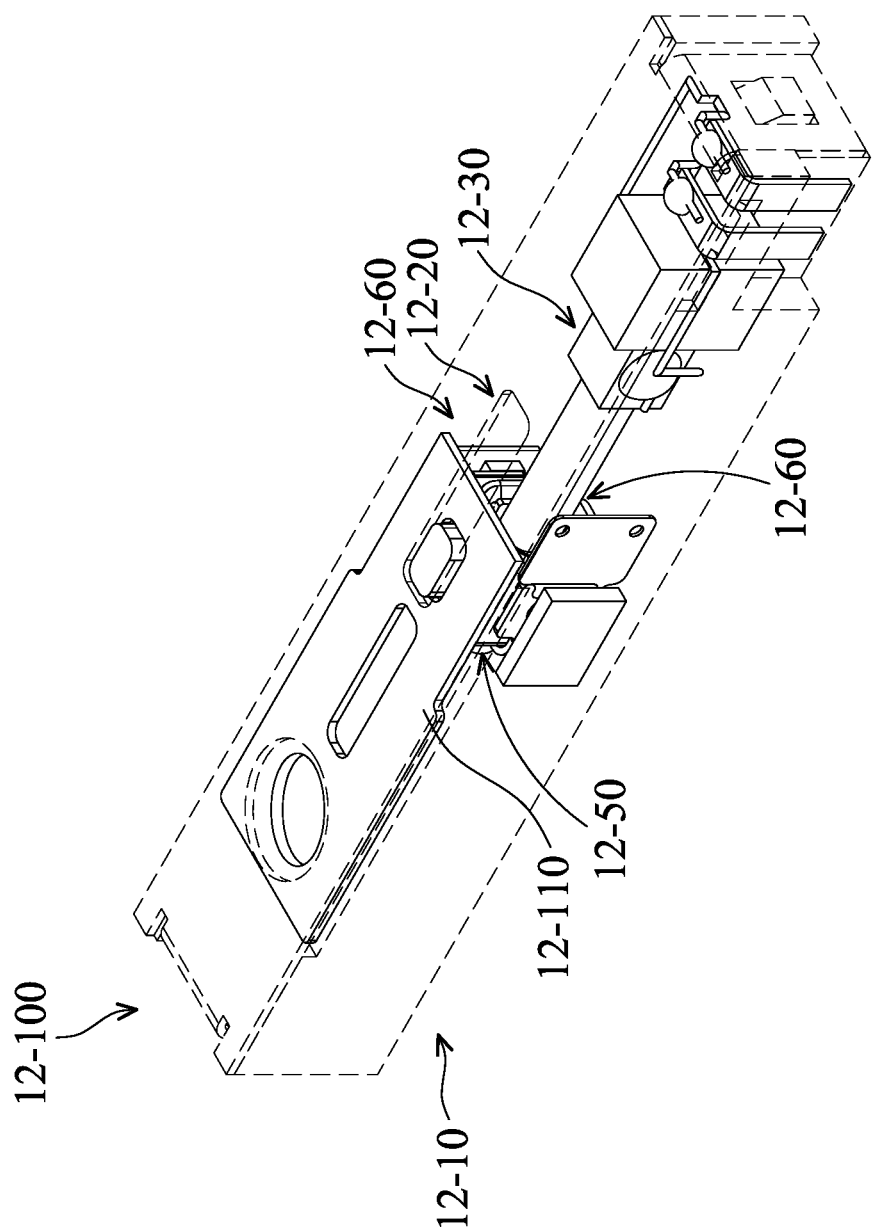
FIG. 133 shows a perspective view of the optical element driving mechanism and the optical element according to an embodiment of the present disclosure, wherein an outer frame is shown as a dashed line.
Figure 134:
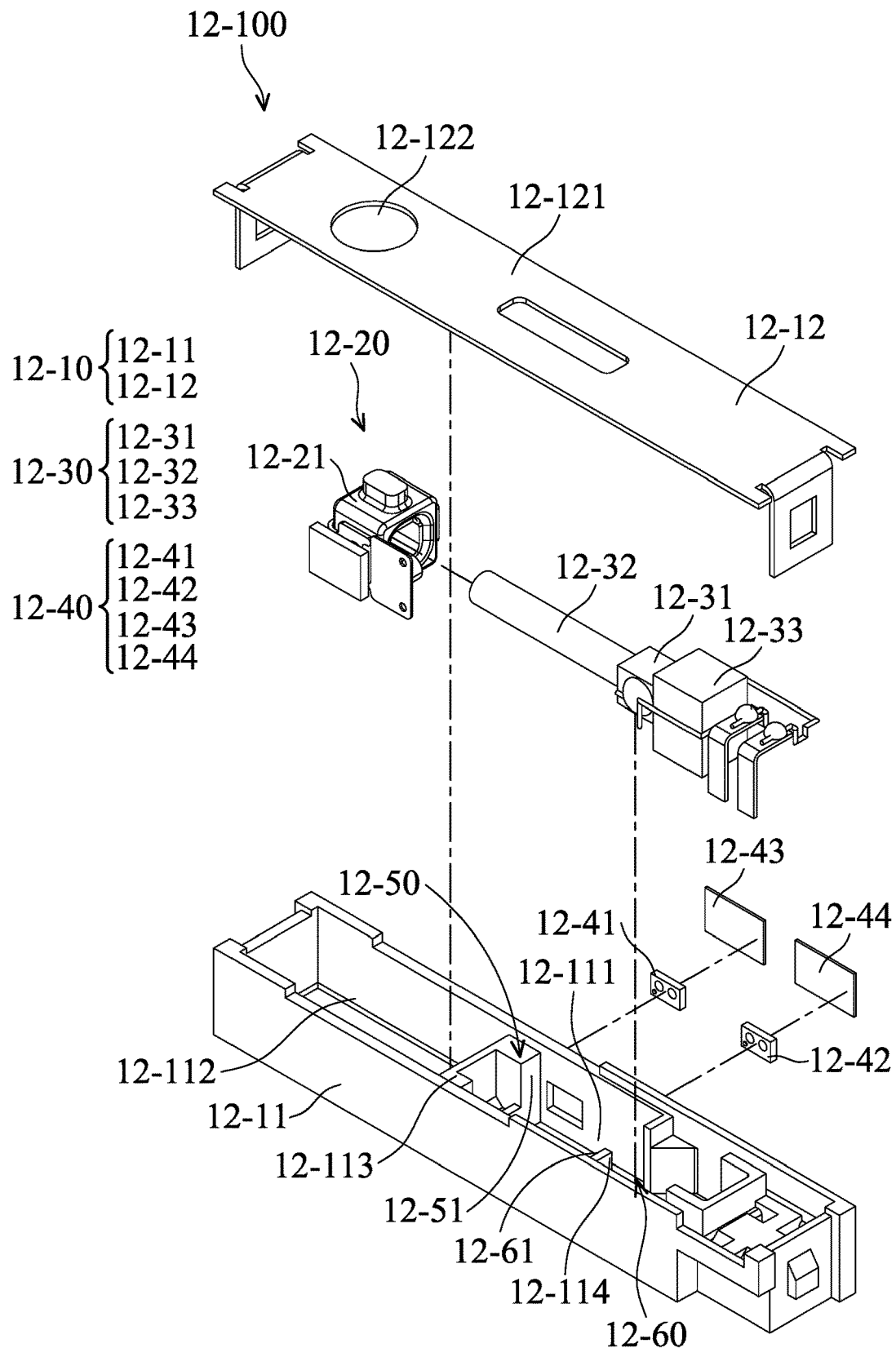
FIG. 134 shows an exploded view of the optical element driving mechanism according to an embodiment of the present disclosure.

Please refer to FIG. 133 and FIG. 134, the optical element driving mechanism 12-100 may include a fixed part 12-10, a movable part 12-20, a driving assembly 12-30, a position sensing assembly 12-40, a first stopping assembly 12-50, a second stopping assembly 12-60, and a control assembly 12-70 (not shown in FIG. 133 and FIG. 134).

Figure 135:
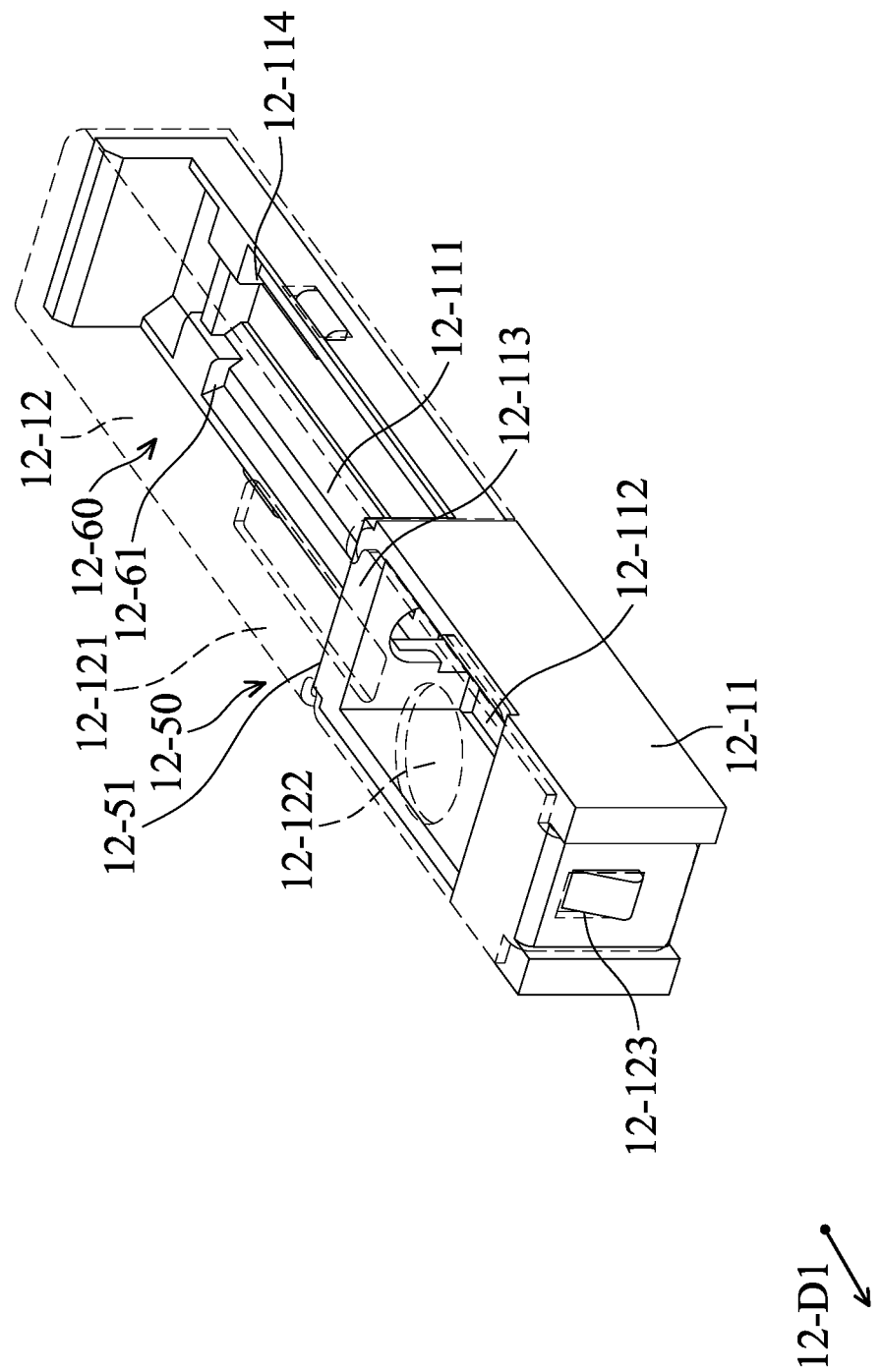
FIG. 135 shows a perspective view of the outer frame, a base, a first stopping assembly, and a second stopping assembly of the optical element driving mechanism according to an embodiment of the present disclosure, wherein the outer frame is shown as a dashed line.

Please refer FIG. 135, the fixed part 12-10 may include a base 12-11, and an outer frame 12-12.

The base 12-11 may include a first accommodating space 12-111, a second accommodating space 12-112, a first base blocking wall 12-113, and a second base blocking wall 12-114. The first accommodating space 12-111 is located between the first base blocking wall 12-113 and the second base blocking wall 12-114. The first accommodating space 12-111 is for accommodating the driving assembly 12-30. The second accommodating space 12-112 may be use to accommodate external optical modules. The first base blocking wall 12-113 is located between the first accommodating space 12-111 and the second accommodating space 12-112. The first base blocking wall 12-113 and second base blocking wall 12-114 may be opposed to each other.

The outer frame 12-12 may include an outer frame body 12-121, a light receiving opening 12-122, and a strengthened fixing structure 12-123. The light receiving opening 12-122 is disposed on the outer frame body 12-121. The light receiving opening 12-122 may be a hole that penetrates the outer frame body 12-121. The light receiving opening 12-122 may be a circular shape opening. The light receiving opening 12-122 may be configured to receive light 12-L (please refer to FIG. 132). The strengthened fixing structure 12-123 has a protruded-recessed structure that is arranged along a first direction 12-D1. The strengthened fixing structure 12-123 may prevent the avoided base 12-11 from separating from the outer frame 12-12, so that the structure of the optical element driving mechanism 12-100 is more solid.

Figure 136:
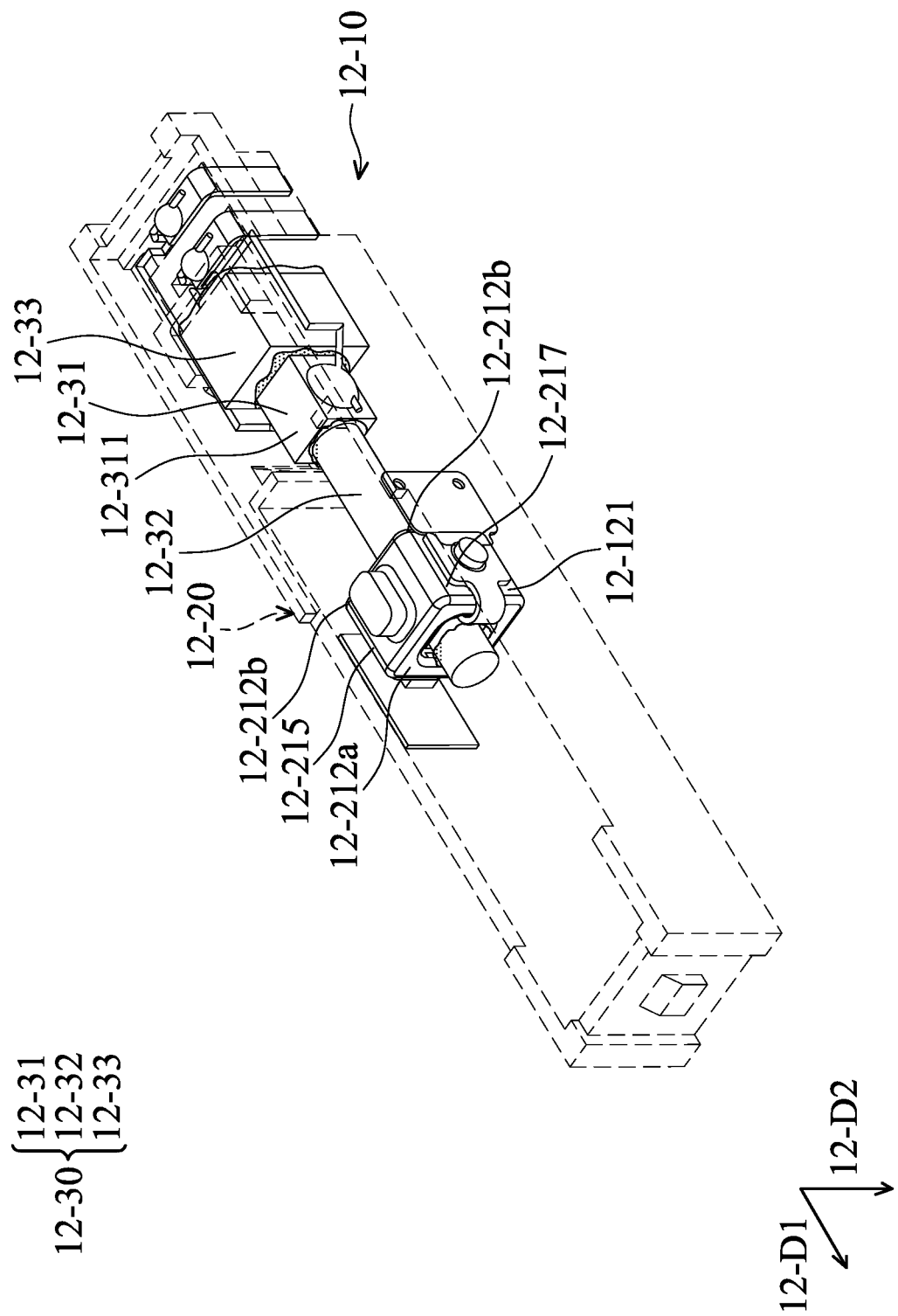
FIG. 136 shows a perspective view of the optical element driving mechanism according to an embodiment of the present disclosure, wherein the base is shown as a dashed line, and the outer frame is omitted.

Please refer to FIG. 136, the movable part 12-20 is movable relative to the fixed part 12-10, and the movable part 12-20 may be connected to the optical element 12-110 (not shown). The optical element 12-110 may be an element that is relevant to the optical element, such as a SOMA (a cover plate, a shutter, an aperture), a prism, lenses, a camera module, optical sensor, or the like. In one embodiment, the movable part 12-20 may include an elastic element 12-21.

Figure 137:
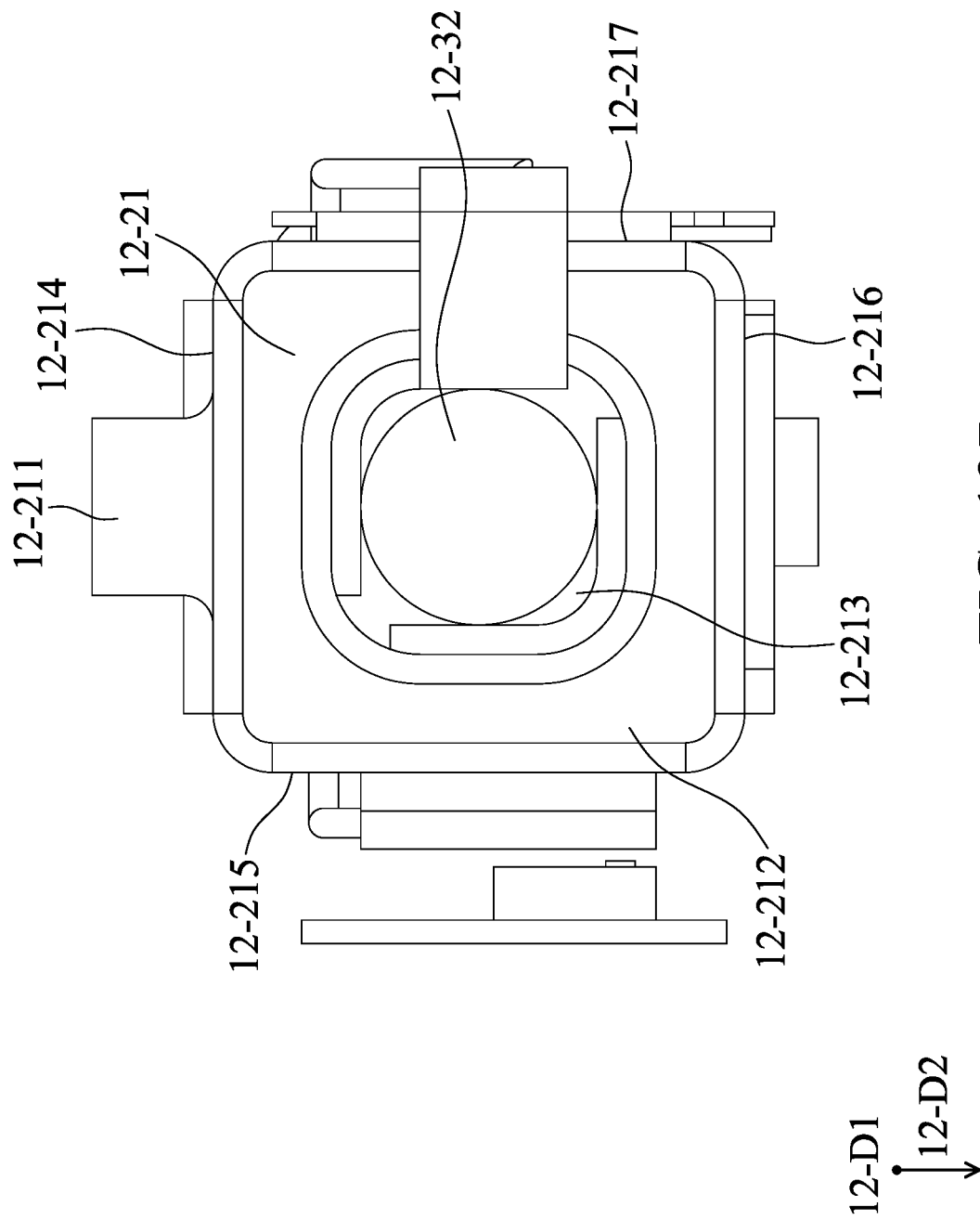
FIG. 137 shows a schematic view of an elastic element, and a transmission element according to an embodiment of the present disclosure.

Please refer to FIG. 137, the elastic element 12-21 may include an elastic element connecting structure 12-211, an elastic element stopping assembly 12-212, an elastic element opening 12-213, a first side 12-214, a second side 12-215, a third side 12-216, and a fourth side 12-217.

Figure 138:
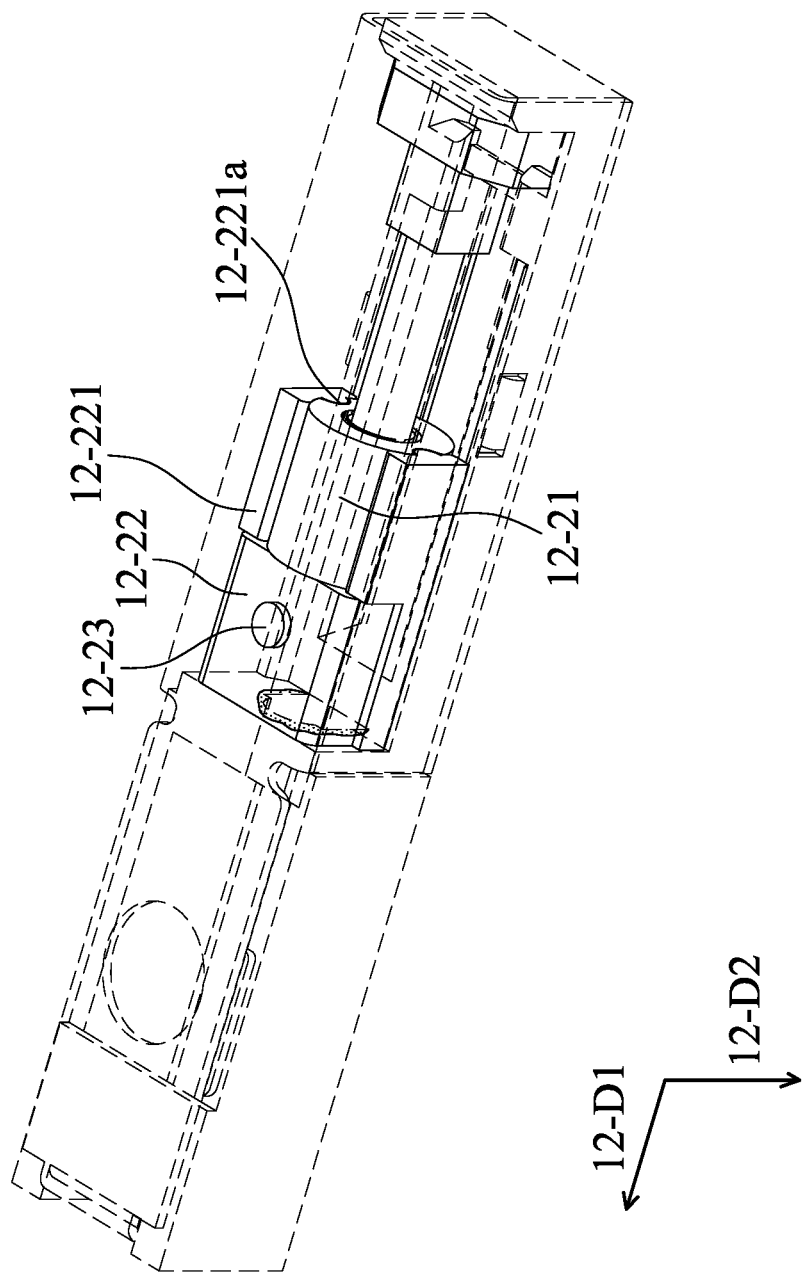
FIG. 138 shows a perspective view of the optical element driving mechanism according to an embodiment of the present disclosure, wherein the base and the outer frame are shown as a dashed line.

Please refer to FIG. 138, in one embodiment, the movable part 12-20 may further include a holder 12-22, and an movable part connecting structure 12-23. The holder 12-22 may be connected to the optical element 12-110 (not shown). The holder 12-22 has a non-metallic material. Specifically, the holder 12-22 has a plastic material. The elastic element 12-21 may be disposed on the holder 12-22. The Young's modulus of the holder 12-22 may be different from the Young's modulus of the elastic element 12-21. Specifically, the Young's modulus of the holder 12-22 may be greater than the Young's modulus of the elastic element 12-21.

The holder 12-22 may include a holder extended portion 12-221. The holder extending portion 12-221 may extend along the first direction 12-D1. The holder extended portion 12-221 corresponds to the elastic element 12-21. The holder extended portion 12-221 may have a protruded structure 12-221a that is protruded toward the elastic element 12-21, so as to hold the elastic element 12-21 more stably.

The elastic element 12-21 has a non-metallic material. Specifically, the elastic element 12-21 has a plastic material or a resin material. The elastic element 12-21 has a substantially polygonal structure when viewed along the first direction 12-D1.

The elastic element connecting structure 12-211 is for connecting the optical element 12-110 (not shown). The elastic element opening 12-213 may be a hole that penetrates the elastic element 12-21, and the elastic element opening 12-213 may have any suitable shape.

The first side 12-214 is not parallel to the second side 12-215. The elastic element stopping assembly 12-212 is for limiting the range of movement of the movable part 12-20 relative to the fixed part 12-10. Please refer to FIG. 136, the elastic element stopping assembly 12-212 may include a first elastic element stopping surface 12-212a, and two second elastic element stopping surfaces 12-212b.

Please refer to FIG. 136 and FIG. 137, the elastic element connecting structure 12-211 is located at the first side 12-214 of the elastic element 12-21 when viewed along the first direction 12-D1. The first elastic element stopping surface 12-212a may be located at the second side 12-215 of the elastic element 12-21 when viewed along the first direction 12-D1. The two second elastic element stopping surfaces 12-212b may be respectively located at the second side 12-215 and the fourth side 12-217 of the elastic element 12-21. Thus, the weight of the elastic element 12-21 is distributed more evenly, so that the optical element driving mechanism 12-100 is more stable.

Please refer to FIG. 137, the first side 12-214, the second side 12-215, the third side 12-216, and the fourth side 12-217 surround the elastic element opening 12-213. The first side 12-214 is not parallel to the second side 12-215. The second side 12-215 is not parallel to the third side 12-216. The first side 12-214 and the third side 12-216 are parallel to each other. The second side 12-215 and fourth side 12-217 are parallel to each other.

Please refer to FIG. 136, the driving assembly 12-30 drives the movable part 12-20 to move relative to the fixed part 12-10 along a first dimension. The first dimension may be the direction that is parallel to the first direction 12-D1 or the rotation that rotates about a second direction 12-D2 that is perpendicular to the first direction 12-D1.

The driving assembly 12-30 may include an electromechanical converting element 12-31, a transmission element 12-32, a weight element 12-33. The electromechanical converting element 12-31 may include a piezoelectric element 12-311. The piezoelectric element 12-311 may stretch or compress after receiving a current. The transmission element 12-32 has an elongated structure, and the transmission element 12-32 extends along the first direction 12-D1.

The transmission element 12-32 penetrates the elastic element opening 12-215 of the elastic element 12-21. The electromechanical converting element 12-31 is disposed on the weight element 12-33. The transmission element 12-32 is disposed on the electromechanical converting element 12-31. The weight element 12-33 may be disposed on the fixed part 12-10.

The position sensing assembly 12-40 is for sensing the movement of the movable part 12-20 relative to the fixed part 12-10, and the position sensing assembly 12-40 outputs a sensing information 12-40a.

Figure 139:
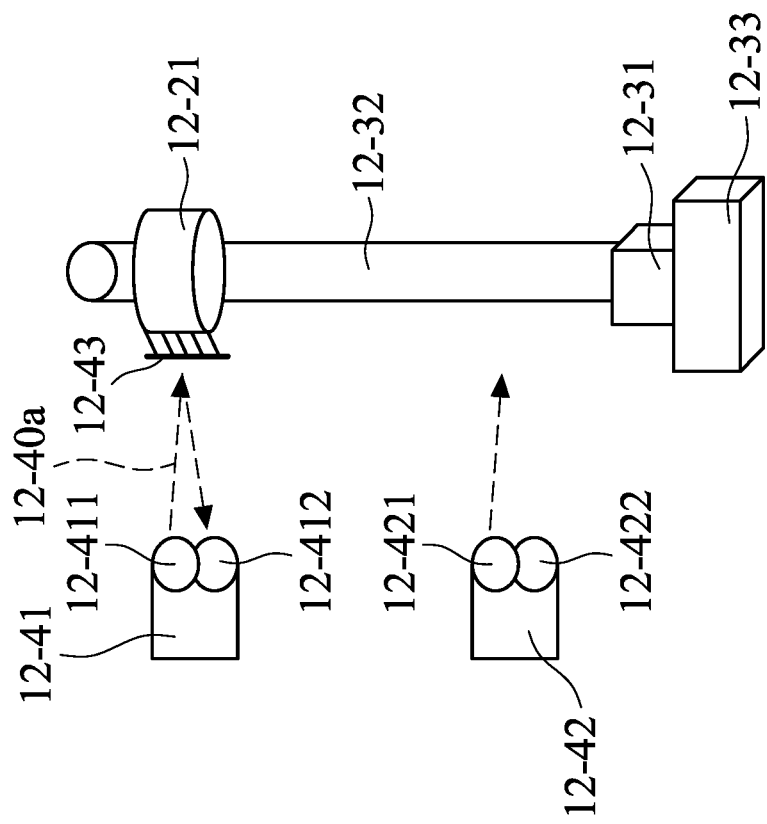
FIG. 139 shows a schematic view of a driving assembly, and a position sensing assembly of the optical element driving mechanism according to an embodiment of the present disclosure.
Figure 140:
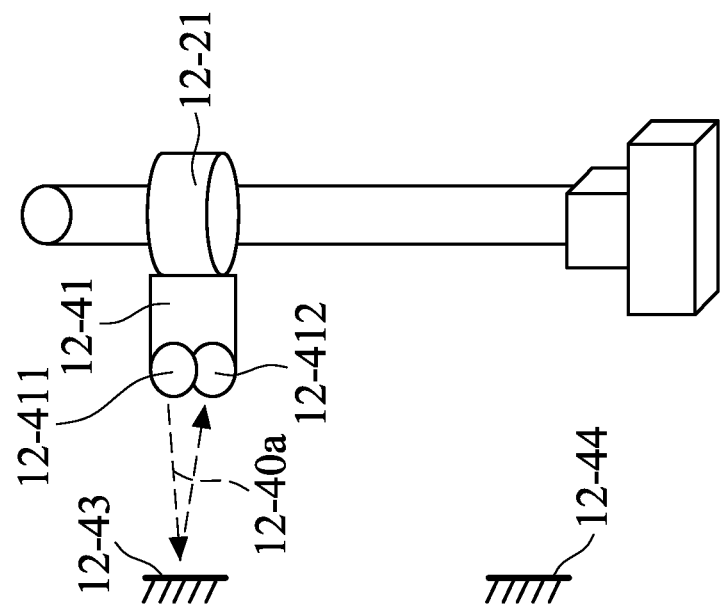
FIG. 140 shows a schematic view of the driving assembly, and the position sensing assembly of the optical element driving mechanism according to an embodiment of the present disclosure.

Please refer to FIG. 139 and FIG. 140, the position sensing assembly 12-40 may include a first sensing element 12-41, a second sensing element 12-42, a first sensed object 12-43, and a second sensed object 12-44.

As shown in FIG. 139, in one embodiment, the second sensed object 12-44 may be omitted. The first sensing element 12-41 and the second sensing element 12-42 may be disposed on the fixed part 12-10 (not shown). The first sensed object 12-43 may be disposed on the elastic element 12-21 of the movable part 12-20. The first sensed object 12-43 may be reflectors or magnetic elements, and the first sensed object 12-43 is configured to correspond to the first sensing element 12-41 and the second sensing element 12-42. The first sensed object 12-43 is movable relative to the first sensing element 12-41 and the second sensing element 12-42.

As shown in FIG. 140, in one embodiment, the second sensing element 12-42 may be omitted. The first sensing element 12-41 may be disposed on the elastic element 12-21 of the movable part 12-20. The first sensed object 12-43 may be disposed on the fixed part 12-10 (not shown). The first sensed object 12-43 and the second sensed object 12-44 may be reflectors or magnetic elements, and the first sensed object 12-43 and the second sensed object 12-44 is configured to correspond to the first sensing element 12-41. The first sensed object 12-43 and the second sensed object 12-44 is movable relative to the first sensing element 12-41.

Figure 141:
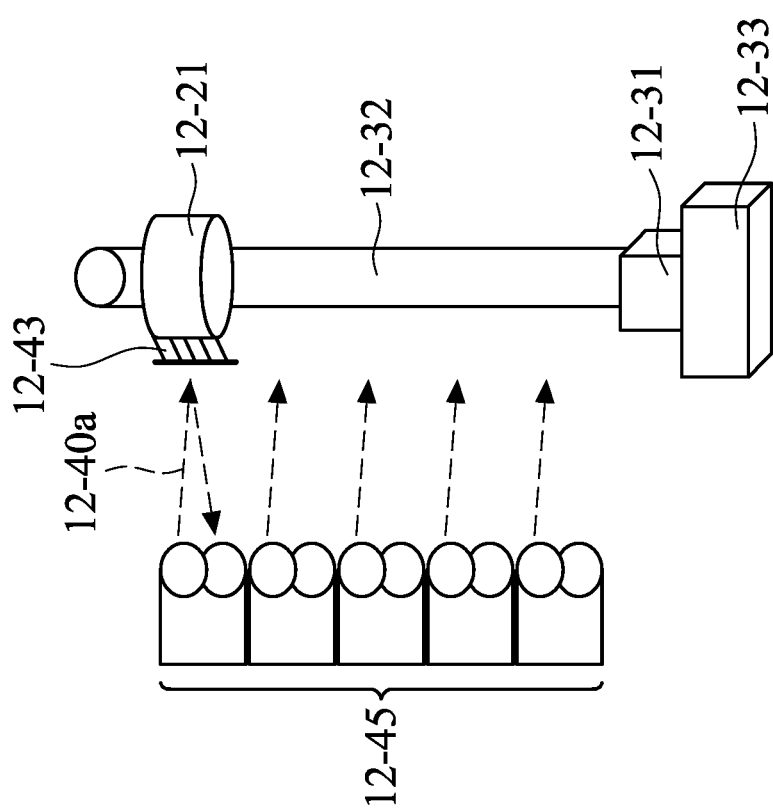
FIG. 141 shows a schematic view of the driving assembly, and the position sensing assembly of the optical element driving mechanism according to an embodiment of the present disclosure.

As shown in FIG. 141, the position sensing assembly 12-40 may further include a plurality of sensing elements 12-45 to sense the position of the sensed object more accurately.

Please refer to FIG. 139 and FIG. 140, the first sensing element 12-41 may include a first sensing information transmitter 12-411, and a first sensing information receiver 12-412. The first sensing information transmitter 12-411 may transmit the sensing information 12-40a, and the sensing information 12-40a is reflected by the first sensed object 12-43 or the second sensed object 12-44. Then, the sensing information 12-40a may be received by the first sensing information receiver 12-412. Thereafter, the sensing information 12-40a is transferred to the control assembly 12-70. The first sensing information receiver 12-412 may be disposed adjacent to the first sensing information transmitter 12-411. In one embodiment, the first sensing information receiver 12-412 may be disposed against the first sensing information transmitter 12-411. Thus, the first sensing information receiver 12-412 may receive the sensing information 12-40a that is transmitted by the first sensing information transmitter 12-411 more quickly, and the sensing error is reduced.

Please refer to FIG. 139, the first second sensing element 12-42 may include a second sensing information transmitter 12-421, and a second sensing information receiver 12-422. The second sensing information transmitter 12-421 may transmit the sensing information 12-40a, and the sensing information 12-40a is reflected by the first sensed object 12-43 or the second sensed object 12-44 (not shown in FIG. 139). Then, the sensing information 12-40a may be received by the second sensing information receiver 12-422. Thereafter, the sensing information 12-40a is transferred to the control assembly 12-70. The second sensing information receiver 12-422 may be disposed adjacent to the second sensing information transmitter 12-421. In one embodiment, the second sensing information receiver 12-422 may be disposed against the second sensing information transmitter 12-421. Thus, the second sensing information receiver 12-422 may receive the sensing information 12-40a that is transmitted by the second sensing information transmitter 12-421 more quickly, and the sensing error is reduced.

Please refer to FIG. 141, the sensing element 12-45 also transmit the sensing information 12-40a, and the sensing element 12-45 receives the reflected sensing information 12-40a. Thereafter, the sensing element 12-45 may transfer the sensing information 12-40a to the control assembly 12-70.

Please refer to FIG. 135, the first stopping assembly 12-50 is disposed on the fixed part 12-10, and the first stopping assembly 12-50 is for limiting the range of movement of the movable part 12-20 relative to the fixed part 12-10. The first stopping assembly 12-50 may be located on the first base blocking wall 12-113.

The first stopping assembly 12-50 has a first stopping surface 12-51. The first a stopping surface 12-51 be in contact with the first elastic element stopping surface 12-212a, so as to limit the range of movement of the elastic element 12-21 of the movable part 12-20.

The second stopping assembly 12-60 is disposed on the fixed part 12-10, and the second stopping assembly 12-60 is for limiting the range of movement of the movable part 12-20 relative to the fixed part 12-10. The second stopping assembly 12-60 may be located on the second base blocking wall 12-114.

The second stopping assembly 12-60 has a second stopping surface 12-61. The second stopping surface 12-61 may be in contact with the second elastic element stopping surface 12-21b, so as to limit the range of movement of the elastic element 12-21 of the movable part 12-20.

The first stopping surface 12-51 and the second stopping surface 12-61 face toward different directions. Specifically, the first stopping surface 12-51 and the second stopping surface 12-61 may be opposed to each other.

Figure 142:
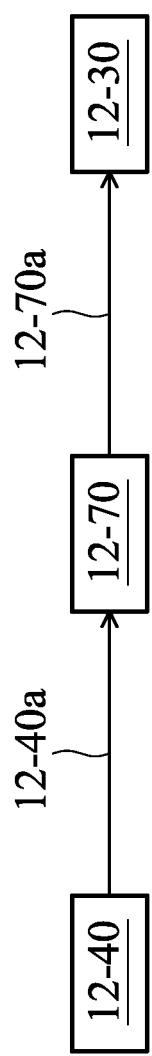
FIG. 142 shows a schematic view of transferring a sensing information, and a driving signal of the optical element driving mechanism according to an embodiment of the present disclosure.

Please refer to FIG. 142, the control assembly 12-70 may output a driving signal 12-70a based on the sensing information 12-40a, or an external command, so as to drive the driving assembly 12-30. That is, the control assembly 12-70 may refer to the sensing information 12-40a and then outputs the driving signal 12-70a to the driving assembly 12-30.

Figure 143:
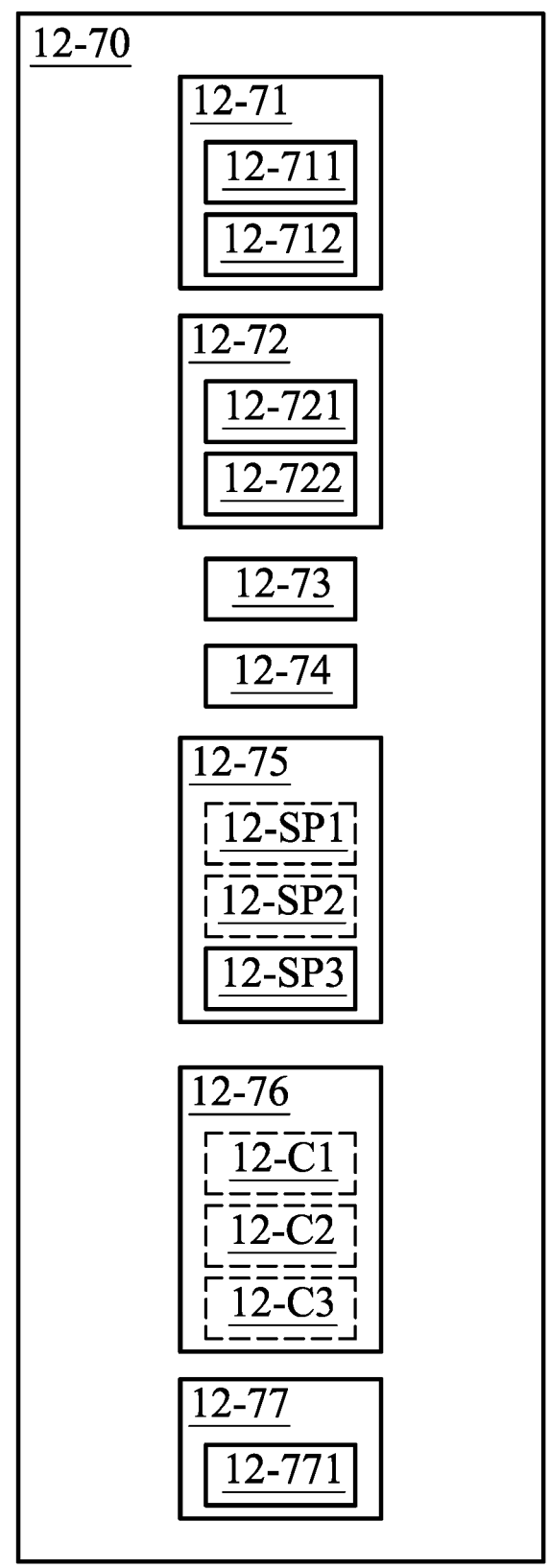
FIG. 143 shows a schematic view of a control assembly of the optical element driving mechanism according to an embodiment of the present disclosure.

Please refer to FIG. 143, the control assembly 12-70 may include a first predetermined information 12-71, a second predetermined information 12-72, an extreme motion range 12-73, a predetermined time 12-74, an initial calibration procedure 12-75, and a driving procedure 12-76.

The first predetermined information 12-71 may include a first target position 12-711, and a first predetermined information 12-712.

The first target position 12-711 is the position of the movable part 12-20 relative to the fixed part 12-10 when the movable part 12-20 is in a first state. The first target position 12-711 may be sensed and obtained by an external measuring device. The first predetermined information 12-712 is the output value of the sensing information 12-40a when the movable part 12-20 is in the first state. In the first state, the value of the first predetermined information 12-712 may be 1 in a binary computer.

In the first state, a first gap is provided between the movable part 12-20 and the first stopping assembly 12-50. In the first state, a second gap is provided between the movable part 12-20 and the second stopping assembly 12-60. The first gap is smaller than the second gap, and the first gap is not zero. A shortest distance of the first gap is less than the smallest size of the light receiving opening 12-122.

The second predetermined information 12-72 may include a second target position 12-721, and a second predetermined information 12-722.

The second target position 12-721 is the position of the movable part 12-20 relative to the fixed part 12-10 when the movable part 12-20 is in a second state. The second target position 12-721 may be sensed and obtained by the external measuring device. The second predetermined information 12-722 is the output value of the sensing information 12-40a when the movable part 12-20 is in the second state. In the second state, the value of the second predetermined information 12-722 may be 0 in the binary computer.

In the second state, a third gap is provided between the movable part 12-20 and the first stopping assembly 12-50. In the second state, a fourth gap is provided between the movable part 12-20 and the second stopping assembly 12-60. The fourth gap is smaller than the third gap, and the fourth gap is not zero. A shortest distance of the fourth gap is less than the smallest size of the light receiving opening 12-122.

After receiving the driving signal 12-70a, the driving assembly 12-30 may be used for driving the movable part 12-20 to move relative to the fixed part 12-10 to the first target position 12-711 and the second target position 12-721.

In one embodiment, the first predetermined information 12-712 and the second predetermined information 12-722 may be different (as described above, the value of the first predetermined information 12-712 may be 1 in the binary computer, while the value of the second predetermined information 12-722 may be 0 in the binary computer).

The extreme motion range 12-73 is the possible maximum range of movement of the movable part 12-20 relative to the fixed part 12-10 along the first dimension.

The predetermined time 12-74 is defined as the time required for the driving assembly 12-30 to drive the movable part 12-20 to move relative to the fixed part 12-10 from a starting point (may be located at one of the first base blocking wall 12-113 and the second base blocking wall 12-114) of the extreme motion range 12-73 to an end point (may be located at another one of the first base blocking wall 12-113 and the second base blocking wall 12-114) of the extreme motion range 12-73.

The initial calibration procedure 12-75 is for confirming the initial state of the movable part 12-20 relative to the fixed part 12-10. The initial calibration procedure 12-75 includes a step 12-SP1, a step 12-SP2, and a step 12-SP3. In one embodiment, the initial calibration procedure 12-75 only needs to perform the step 12-SP1 and the step 12-SP2. In the present embodiment, the initial calibration procedure 12-75 only needs to perform the step 12-SP3. In one embodiment, the initial calibration procedure 12-75 may perform the any combination of the step 12-SP1, the step 12-SP2, and the step 12-SP3.

In the step 12-SP1, the movable part 12-20 is driven to move relative to the fixed part 12-10 along an direction opposite to the first dimension to the starting point. In the step 12-SP1, the time for the driving assembly 12-30 to drive the movable part 12-20 is at least equal to or greater than the predetermined time 12-74. Thus, the movable part 12-20 is ensured to reach the starting point.

In the step 12-SP2, the movable part 12-20 is driven to move relative to the fixed part 12-10 along a positive direction of the first dimension until the sensing information 12-40a is corresponding to the first predetermined information 12-712. After operating the step 12-SP2, the optical element driving mechanism 12-100 has completed the initial calibration procedure 12-75, and the optical element driving mechanism 12-100 has returned to the initial state.

In the step 12-SP3, the movable part 12-20 is driven to move relative to the fixed part 12-10 along the first dimension until the sensing information 12-40a is corresponding to the first predetermined information 12-712 or the second predetermined information 12-722. In one embodiment, after performing the step 12-SP3, it may progress to the driving procedure 12-76.

In the embodiment that the first dimension is a linear motion, the movement of the movable part 12-20 may be a vertical movement or a horizontal movement in the first dimension. In embodiment that the first dimension is a rotational movement, the movement of the movable part 12-20 may be a forward rotation and a reverse rotation in the first dimension around a same axis.

In one embodiment, in the driving procedure 12-76, the control assembly 12-70 may continuously output the driving signal 12-70a to the driving assembly 12-30 until a condition 12-C1, a condition 12-C2, and a condition 12-C3 are met in sequence. In the present embodiment, in the driving procedure 12-76, the control assembly 12-70 may continuously output the driving signal 12-70a to the driving assembly 12-30 without meeting the condition 12-C1, the condition 12-C2, or the condition 12-C3.

The condition 12-C1 is that the sensing information 12-40a corresponds to one of the first predetermined information 12-712 or the second predetermined information 12-722 (the movable part 12-20 may be located at the one of the starting point or the end point). The condition 12-C2 is that the sensing information 12-40a does not correspond to the first predetermined information 12-712 or the second predetermined information 12-722 (the movable part 12-20 is not located at the starting point or the end point). The condition 12-C3 is that the sensing information 12-40a corresponds to the other one of the first predetermined information 12-712 or the second predetermined information 12-722 (the movable part 12-20 may be located at the other one of the starting point or the end point).

In one embodiment, the control assembly 12-70 may further include a third predetermined information 12-77. The third predetermined information 12-77 may include a third target position 12-771. The third target position 12-771 may be located between the first target position 12-711 and the second target position 12-721. The third target position 12-771 may be any position located between the first target position 12-711 and the second target position 12-721. The control assembly 12-70 may control the driving assembly 12-30 with the steps similar to above-described steps, so as to drive the movable part 12-20 the third target position 12-771.

In general, the optical element driving mechanism 12-100 of the present disclosure may control the driving assembly 12-30 by the control assembly 12-70, so as to drive the movable part 12-20. The position sensing assembly 12-40 of the optical element driving mechanism 12-100 of the present disclosure may sense the position of the movable part 12-20 precisely and rapidly, such that the error is minimized. Moreover, the initial calibration procedure 12-75 of the control assembly 12-70 of the optical element driving mechanism 12-100 of the present disclosure may ensure that the movable part 12-20 is located at a correct position to further reduce the error. The driving assembly 12-30, the position sensing assembly 12-40, and the control assembly 12-70 of the present disclosure may also reduce the number of required elements of the optical element driving mechanism 12-100, lowering the weight and volume of the optical element driving mechanism 12-100, so that the effect of miniaturization of the optical element driving mechanism 12-100 is achieved.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
   a first movable part, including a first optical element;
   a fixed assembly, wherein the first movable part is movable relative to the fixed assembly;
   a driving assembly, configured to drive the first movable part to move relative to the fixed assembly; and
   a locking assembly, configured to position the first movable part at a first position relative to the fixed assembly when the driving assembly does not drive the first movable part to move relative to the fixed assembly,
   wherein the fixed assembly includes a first opening for corresponding to a light traveling along a main axis,
   wherein the optical element driving mechanism further includes a second movable part and a third movable part, and the driving assembly includes a first driving element for driving the first movable part to move relative to the fixed assembly in a first direction,
   wherein the locking assembly includes:
      a first locking element, corresponds to a first engaging portion of the first movable part; and
      a second locking element, corresponding to the first movable part;
   wherein the second movable part is connected to the first locking element,
   wherein the third movable part is connected to the second locking element,
   wherein the second movable part and the first locking element are integrated formed in one piece,
   wherein the third movable part and the second locking element are integrated formed in one piece, and
   wherein the driving assembly further includes a second driving element for driving the second movable part to move relative to the fixed assembly.

2. The optical element driving mechanism as claimed in claim 1, wherein
   the second driving element is configured to drive the second movable part to move relative to the fixed assembly in a second direction;
   the second direction is not parallel to the main axis;
   the second direction is perpendicular to the main axis;
   the second direction is not parallel to the first direction;
   the second direction is perpendicular to the first direction;
   the driving assembly further includes a third driving element for driving the third movable part to move relative to the fixed assembly;
   the third driving element is configured to drive the third movable part to move relative to the fixed assembly in the second direction;
   the first driving element is configured to generate a first driving force to the first movable part;
   the second driving element is configured to generate a second driving force to the second movable part;
   the third driving element is configured to generate a third driving force to the third movable part;
   a direction of the first driving force is different from a direction of the second driving force;
   the direction of the first driving force is perpendicular to the direction of the second driving force;
   the direction of the second driving force is different from a direction of the third driving force;
   the direction of the second driving force is opposite to the direction of the third driving force;
   the second movable part is movable relative to the third movable part;
   when viewed in a third direction, a central connection line of the center of the first locking element and the center of the second locking element is not parallel to the first direction;
   when viewed in the third direction, the central connection line of the center of the first locking element and the center of the second locking element is not parallel to the second direction;
   the third direction, the first direction, and the second direction are perpendicular to each other.

3. The optical element driving mechanism as claimed in claim 2, wherein the optical element driving mechanism further includes:
   a first elastic element, wherein the second movable part is movably connected to the fixed assembly via the first elastic element; and
   a second elastic element, wherein the third movable part is movably connected to the fixed assembly via the second elastic element;
   the first elastic element is configured to generate a first prestress to the second movable part;
   the second elastic element is configured to generate a second prestress to the third movable part;
   when the driving assembly does not drive the first movable part to move relative to the fixed assembly, the first movable part is located in the first position relative to the fixed assembly by the first prestress;
   when the driving assembly does not drive the first movable part to move relative to the fixed assembly, the first movable part is located in the first position relative to the fixed assembly by the second prestress;
a direction of the first prestress is different from a direction of the second prestress;
the direction of the first prestress is opposite to the direction of the second prestress;
the direction of the first prestress is different from the direction of the first driving force;
the direction of the first prestress is perpendicular to the direction of the first driving force;
the second movable part or the fixed assembly further includes a first storage slot for receiving the first elastic element;
in the direction of the first prestress, a depth of the first storage slot is at least greater than one-half of a maximum size of the first elastic element;
the third movable part or the fixed assembly further include a second storage slot for receiving the second elastic element;
in the direction of the second prestress, a depth of the second storage slot is at least greater than one-half of a maximum size of the second elastic element;
When viewed along the main axis, a connection line of the center of the first elastic element and the center of the second elastic element is different from the second direction;
when viewed along the main axis, the connection line of the center of the first elastic element and the center of the second elastic element is not perpendicular to the second direction;
when viewed along the main axis, the connection line of the center of the first elastic element and the center of the second elastic element is not parallel to the second direction.

4. The optical element driving mechanism as claimed in claim 3, wherein the first driving element includes a first coil and a first magnetic unit;
the second driving element includes a second magnetic unit;
the third driving element includes a third magnetic unit;
the driving assembly further includes a second coil corresponding to the second magnetic unit;
the second coil corresponds to the third magnetic unit;
the first magnetic unit includes a first N pole and a first S pole which are sequentially arranged in a fourth direction;
the second magnetic unit includes a second N pole and a second S pole which are sequentially arranged in a fifth direction;
the third magnetic unit includes a third N pole and a third S pole which are arranged in sequence in the fifth direction;
the fourth direction and the fifth direction are not parallel;
the fourth direction is perpendicular to the fifth direction;
the fourth direction is parallel to the third direction;
the fifth direction is parallel to the first direction.

5. The optical element driving mechanism as claimed in claim 4, wherein the optical element driving mechanism further includes:
a first guiding element, configured to guide the second movable part to move relative to the fixed assembly in the second direction;
wherein the first guiding element has a long strip structure and extends in the second direction;
the first guiding element is made of metal;
the first guiding element passes through the first elastic element;
the first guiding element passes through the second movable part;
the fixed assembly further has a first positioning groove for setting the first guiding element, and when viewed in a direction perpendicular to the second direction, at least a part of the first guiding element is located in the first positioning groove;
the first positioning groove forms an opening structure, and the first guiding element is exposed by the opening structure.

6. The optical element driving mechanism as claimed in claim 5, wherein the second movable part further includes a first receiving portion for accommodating at least a part of the second magnetic unit;
when viewed in the first direction, a first avoiding structure is located at a corner of the first receiving portion which has a polygonal structure;
the first avoiding structure has a recessed structure corresponding to a corner of the second magnetic unit which has a polygonal structure.

7. The optical element driving mechanism as claimed in claim 6, wherein the fixed assembly further includes a spacing element located between the first movable part and the second movable part;
the fixed assembly has a fixed assembly surface facing the first movable part;
when viewed in the third direction, the fixed assembly surface overlaps at least a part of the first movable part;
the fixed assembly further includes a setting groove for accommodating the spacer element, and the setting groove is formed by the fixed assembly surface;
a shortest distance between the first movable part and the fixed assembly surface is shorter than a shortest distance between the first movable part and the spacer element.

8. The optical element driving mechanism as claimed in claim 7, wherein the optical element driving mechanism further includes a first anti-twist assembly for helping the second movable part to move relative to the fixed assembly in the second direction;
the first anti-twist assembly has a first protruding structure extending in the third direction;
the first anti-twist assembly has a first blocking surface corresponding to the first protruding structure;
an extending direction of the first blocking surface is parallel to the third direction;
when viewed in the third direction, the first protruding structure does not overlap the first guiding element.

9. The optical element driving mechanism as claimed in claim 8, wherein the first movable part includes a holder for being connected to the first optical element;
at least a part of the first optical element is buried in and not exposed from the holder;
the holder is made of a non-metal material;
the first optical element is made of a metal material;
the holder has a first guiding portion corresponding to the fixed assembly;
the first guiding portion has a protruding structure formed on a first surface of the holder;
the holder has a second guiding portion corresponding to the fixed assembly;
the second guiding portion has a protruding structure formed on a second surface of the holder;
the first guiding portion and the second guiding portion extend in different directions;
the first surface and the second surface are not parallel;

the first surface is perpendicular to the second surface, and the first surface is adjacent to the second surface.

10. The optical element driving mechanism as claimed in claim 9, wherein the fixed assembly further includes:
a first electrical connection portion, electrically connected to a first leading wire of the driving assembly;
a second electrical connection portion, electrically connected to a second leading wire of the driving assembly;
a third electrical connection portion, electrically connected to a third leading wire of the driving assembly;
a fourth electrical connection portion, electrically connected to a fourth leading wire of the driving assembly;
an insulating portion, having a protruding structure located between the third electrical connection portion and the fourth electrical connection portion;
a first external contact, electrically connected to the first electrical connection portion;
a second external contact, electrically connected to the second electrical connection portion;
a third external contact, electrically connected to the third electrical connection portion; and
a fourth external contact, electrically connected to the fourth electrical connection portion;
wherein when viewed in the third direction, the fixed assembly has a polygonal structure, the first electrical connection portion and the second electrical connection portion are located on a first side of the fixed assembly;
when viewed in the third direction, the third electrical connection portion and the fourth electrical connection portion are located on the first side of the fixed assembly;
when viewed in the third direction, the fixed assembly further includes a second side, and the first side is greater than the second side;
when viewed in the third direction, the first external contact and the second external contact are located on the first side;
when viewed in the third direction, the third external contact and the fourth external contact are located on the first side.

* * * * *